(12) United States Patent
Ono et al.

(10) Patent No.: US 7,548,891 B2
(45) Date of Patent: Jun. 16, 2009

(54) INFORMATION PROCESSING DEVICE AND METHOD, PROGRAM, AND RECORDING MEDIUM

(75) Inventors: Masumi Ono, Tokyo (JP); Mikio Kamada, Kanagawa (JP); Masamichi Asukai, Kanagawa (JP); Kazunori Ohmura, Kanagawa (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 10/503,121

(22) PCT Filed: Oct. 6, 2003

(86) PCT No.: PCT/JP03/12758

§ 371 (c)(1),
(2), (4) Date: Aug. 9, 2004

(87) PCT Pub. No.: WO2004/053702

PCT Pub. Date: Jun. 24, 2004

(65) Prior Publication Data
US 2005/0149467 A1 Jul. 7, 2005

(30) Foreign Application Priority Data
Dec. 11, 2002 (JP) .............................. 2002-359823
Feb. 19, 2003 (JP) .............................. 2003-040993

(51) Int. Cl.
*G06F 15/18* (2006.01)
(52) U.S. Cl. .............................. 706/12; 706/16; 706/20
(58) Field of Classification Search .................. 706/61, 706/45, 1, 46, 12, 16, 20; 704/231, 246, 704/251
See application file for complete search history.

(56) References Cited

U.S. PATENT DOCUMENTS

| 6,219,657 | B1 * | 4/2001 | Hatayama | 706/14 |
|---|---|---|---|---|
| 6,430,523 | B1 * | 8/2002 | Mizokawa | 702/182 |
| 6,445,978 | B1 * | 9/2002 | Takamura et al. | 700/245 |
| 6,520,905 | B1 * | 2/2003 | Surve et al. | 600/26 |
| 6,629,242 | B2 * | 9/2003 | Kamiya et al. | 713/100 |
| 6,798,898 | B1 * | 9/2004 | Fedorovskaya et al. | 382/128 |
| 6,874,127 | B2 * | 3/2005 | Newell et al. | 715/744 |
| 6,901,390 | B2 * | 5/2005 | Mizokawa | 706/14 |
| 7,007,001 | B2 * | 2/2006 | Oliver et al. | 706/21 |

(Continued)

FOREIGN PATENT DOCUMENTS

JP 7-16349 1/1995

(Continued)

OTHER PUBLICATIONS

Katsuya Goto et al., "Sakura Taisen 3-Paris wa Moete Iruka-Koryaku Guide", the first vol., first edition, Softbank Publishing Inc., May 17, 2001, p. 51.

*Primary Examiner*—David R Vincent
*Assistant Examiner*—Adrian L Kennedy
(74) *Attorney, Agent, or Firm*—Oblon, Spivak, McClelland, Maier & Neustadt, P.C.

(57) ABSTRACT

An information processing apparatus, capable of identifying vital sign information. A learning unit identifies an emotion/state of the user by comparing the generated feature vectors with feature vectors accumulated in a storage unit. Information indicating the resultant identified emotion/state of the user is output to an output unit via an output controller.

25 Claims, 120 Drawing Sheets

U.S. PATENT DOCUMENTS

| | | | |
|---|---|---|---|
| 7,055,101 B2 * | 5/2006 | Abbott et al. | 715/744 |
| 2001/0037193 A1 * | 11/2001 | Nagisa et al. | 704/9 |
| 2002/0002464 A1 * | 1/2002 | Petrushin | 704/275 |
| 2002/0032689 A1 * | 3/2002 | Abbott et al. | 707/104.1 |
| 2002/0095295 A1 * | 7/2002 | Cohen et al. | 704/275 |
| 2003/0154476 A1 * | 8/2003 | Abbott et al. | 725/37 |

FOREIGN PATENT DOCUMENTS

| | | |
|---|---|---|
| JP | 8-191952 | 7/1996 |
| JP | 9-081632 | 3/1997 |
| JP | 11-47444 | 2/1999 |
| JP | 11-333139 | 12/1999 |
| JP | 2000-377 | 1/2000 |
| JP | 2001-034410 | 2/2001 |
| JP | 2001-160021 | 6/2001 |
| JP | 2001-215993 | 8/2001 |
| JP | 2001-236162 | 8/2001 |
| JP | 2002-202943 | 7/2002 |
| JP | 2002-230011 | 8/2002 |
| JP | 2002-298155 | 10/2002 |

* cited by examiner

FIG. 23

| EMOTIONAL STATE | WORDS |
|---|---|
| Jy (JOY) | JOYFUL, GLAD, GRATEFUL, SATISFIED, HAPPY, PLEASANT, COMFORTABLE, ETC. |
| Sp (SURPRISE) | SURPRISED, ASTONISHED, FLURRIED, UNEXPECTED, POUNDING, THUNDERSTRUCK, DUMBFOUNDED, WOW!, ETC. |
| Sd (SADNESS) | SAD, LONELY, LAMENT, CRY, DEPRESSED, MISERABLE, PITIFUL, SOLITARY, VANITY, FEEL SORROW, ETC. |
| Ar (ANGER) | ANGRY, FEEL SICK, ENRAGED, FLY INTO A RAGE, GO INTO A HUFF, UNPLEASANT, ETC. |
| Dl (DISLIKE) | UNWILLING, UNPLEASANT, EMBARRASSED, DISLIKE, DISAGREEABLE, HATEFUL, GRUDGE, ETC. |
| Ig (INTERESTING) | INTERESTING, DELIGHTFUL, INTERESTED, WHAT!, ETC. |
| Sh (SHAME) | SHY, EMBARRASSED, FEEL AWKWARD, BLUSH, BASHFUL, ETC. |
| Lk (LIKING) | LIKE, LOVE, DESIRABLE, LOVELY, FALL IN LOVE, ADMIRE, ENCHANTED, ETC. |
| Ns (NOT STABLE) | HASTY, UNCOMPOSED, IMPATIENT, IRRITATED, CHOKING, UPSET, ETC. |
| St (STABLE) | COMPOSED, SAVED, RELIEVED, RELAXED, HARMONIOUS, CAREFREE, CALM, ETC. |
| Vr (VITAL) | VITAL, ENERGETIC, ETC. |
| Nv (NOT VITAL) | NOT VITAL, TIRED, NOT ENERGETIC, ILL, ETC. |

FIG. 24

| LEVEL | WORDS |
|---|---|
| 1. HIGH | VERY, EXTREMELY, GREATLY, INTENSELY, DEEPLY, GREAT, HEAVY, ETC. |
| 2. MIDDLE | NORMAL, MODERATE, RATHER, EXPRESSIONS WITH NO ADJECTIVES, ETC. |
| 3. LOW | SLIGHTLY, A LITTLE, A BIT, LIGHTLY, ETC. |

FIG. 34

| EMOTIONAL INFORMATION | INNER PRODUCT | TYPE OF Vμ1 | ORDER (R) OF MAGNITUDE OF INNER PRODUCT |
|---|---|---|---|
| JOY/HIGH | 0.75 | Vμ1-1 | 14 |
| JOY/MIDDLE | 0.49 | Vμ1-2 | 22 |
| .. | .. | .. | .. |
| STABILITY/MIDDLE | 0.97 | Vμ1-29 | 1 |
| .. | .. | .. | .. |
| SADNESS/LOW | 0.83 | Vμ1-36 | 10 |

FIG. 37

| EMOTIONAL INFORMATION | INNER PRODUCT | TYPE OF Vμ2 | ORDER (R) OF MAGNITUDE OF INNER PRODUCT |
|---|---|---|---|
| JOY/HIGH | 0.77 | Vμ2-1 | 13 |
| JOY/MIDDLE | 0.51 | Vμ2-2 | 21 |
| : | : | : | : |
| STABILITY/MIDDLE | 0.98 | Vμ2-29 | 1 |
| : | : | : | : |
| SADNESS/LOW | 0.85 | Vμ2-36 | 8 |

FIG. 77

| EMOTIONAL STATE | DECLARED EMOTIONAL STATE |
|---|---|
| Jy (JOY) | 0001 |
| Sp (SURPRISE) | 0010 |
| Sd (SADNESS) | 0011 |
| Ar (ANGER) | 0100 |
| Dl (DISLIKE) | 0101 |
| Ig (INTEREST) | 0110 |
| Sh (SHAME) | 0111 |
| Lk (LIKING) | 1000 |
| Ns (NOT STABLE) | 1001 |
| St (STABLE) | 1010 |
| Vr (VITAL) | 1011 |
| Nv (NOT VITAL) | 1100 |

INFORMATION PROCESSING DEVICE AND METHOD, PROGRAM, AND RECORDING MEDIUM

TECHNICAL FIELD

The present invention relates to an information processing apparatus, an information processing method, a program, and a storage medium, and more particularly, to an information processing apparatus, an information processing method, a program, and a storage medium, capable of extracting and learning features from various kinds of information in which the emotion or the state of a user is reflected, and identifying the emotion or the state of the user and the strength level of the emotion or the state on the basis of the learning result.

BACKGROUND ART

In conventional communication techniques using information processing apparatuses, in face-to-face communication using no information processing apparatuses, not only meanings are conveyed using linguistic words, but also other information such as information indicating emotion/state is conveyed via a face expression, a motion, a mood, and/or other means. In contrast, in communication using a telephone, a mail, or a chat, although meanings using linguistic words can be conveyed, emotion, states, or moods that cannot be expressed using words cannot be conveyed. It is known to use a computer graphic image called an avatar in virtual communication via the Internet. However, avatars cannot well express emotion of users.

Thus, at present, in communication using information apparatuses, transmission of information is very limited.

To break through the above limitation, a communication apparatus has been proposed which transmits voice information, image information, and vital sign information, guesses the psychological or physiological state of a user from received information, and outputs a guessed value (a specific example of this technique may be found, for example, in Japanese Unexamined Patent Application Publication No. 2002-34936 (hereinafter referred to as Patent Document 1)).

In the technique disclosed in Patent Document 1, deviations from mean values are calculated for various items of vital sign information associated with a user, and the emotion or the state of the user is guessed on the basis of the calculated deviations. However, such a simple algorithm cannot necessarily correctly guess the emotion or state such as "joy", "anger", "sadness", or "happiness" of a user. Presentation of incorrect information about emotion of a user can results in a misunderstanding in communication between users.

Various manners of displaying information have been proposed. One known technique is to display information using a table, a graph, or a graphic image. Another technique is to change a face expression or a color of a face. It is also known to modulate a voice or a sound depending on information being received. However, any of those known techniques cannot well express user's emotion or state guessed from vital sign information. It is also difficult to represent motion or mood of users.

DISCLOSURE OF INVENTION

An object of the present invention is to provide a technique of identifying emotion/state of a user and a strength level of the emotion/state. Another object of the present invention is to provide a technique that allows communication using non-linguistic information.

The present invention provides an information processing apparatus comprising input means for inputting non-linguistic information and linguistic information, learning means for leaning emotion of a user by relating input non-linguistic information to linguistic information, storage means for storing information obtained as a result of learning performed by the learning means, and output means for converting input non-linguistic information or stored non-linguistic information into a signal in a predetermined form and outputting the resultant converted signal.

The learning means may learn the emotion of the user together with the strength level of the emotion.

When new non-linguistic information is input, the learning means may identify the emotion of the user on the basis of the non-linguistic information stored in the storage means, and the output means may output an identification result made by the learning means.

The storage means may store new non-linguistic information corresponding to emotion identified by the learning means such that the new non-linguistic information is added to existing non-linguistic information accumulated in the storage means.

The information processing apparatus may further comprise parameter generation means for generating a parameter indicating a feature of the non-linguistic information, and the learning means may perform statistical processing on values of the parameter and may store the resultant statistical value of the parameter in the storage means.

The learning means may identify the emotion of the user by comparing a parameter generated, by the parameter generation mean, from input non-linguistic information with the parameter stored in the storage means.

The input means may input pulse information or body motion information associated with the user as the non-linguistic information.

The input means may input, as the non-linguistic information, vibration information indicating a vibration generated when the user presses a keyboard.

The input means may input, as the non-linguistic information, grasp pressure information indicating a grasp pressure at which a mouse is grasped by the user or ambient temperature information.

The information processing apparatus may be a game machine used to play an on-line game.

The input means may input, as the non-linguistic information, acceleration information or grasp pressure information associated with a controller of the game machine.

The output means may extract particular non-linguistic information specified by the user from the stored non-linguistic information, convert the extracted non-linguistic information into a signal in the predetermined form, and output the resultant signal to another game machine specified by the user.

The present invention also provides an information processing method comprising the steps of inputting linguistic information and non-linguistic information, leaning emotion of a user by relating input non-linguistic information to linguistic information, storing information obtained as a result of learning performed in the learning step, and converting input non-linguistic information or stored non-linguistic information into a signal in a predetermined form and outputting the resultant converted signal.

The present invention also provides a program for causing a computer to execute a process comprising the control steps of inputting linguistic information and non-linguistic information, leaning emotion of a user by relating input non-linguistic information to linguistic information, storing information obtained as a result of learning performed in the learning step, and converting input non-linguistic information or stored non-linguistic information into a signal in a predetermined form and outputting the resultant converted signal.

A storage medium including a program stored therein for causing a computer to execute a process comprising the control steps of: inputting linguistic information and non-linguistic information; leaning emotion of a user by relating input non-linguistic information to linguistic information, storing information obtained as a result of learning performed in the learning step, and converting input non-linguistic information or stored non-linguistic information into a signal in a predetermined form and outputting the resultant converted signal.

In the information processing apparatus, the information processing method, the program, and the storage medium according to the present invention, non-linguistic information and linguistic information are input, and learning on the input non-linguistic information is performed by relating it to the linguistic information. The input non-linguistic information or the stored non-linguistic information is converted into a signal in the predetermined form and output.

In the present description, the term "emotion" is used to describe not only an emotional state such as a state of joy or of dislike but also a general state such as a vital state or a stable state of a user.

BRIEF DESCRIPTION OF THE DRAWINGS

FIG. 23 is a table showing examples of words representing emotions/states;

FIG. 24 is a table showing examples of words representing strength levels of emotions/states;

FIG. 34 is a diagram showing examples of calculated inner products of Vc1 and various vectors;

FIG. 37 is a diagram showing examples of calculated inner products of Vc2 and various vectors;

FIG. 77 is a diagram showing an example of a set of items of emotion/state declaration information;

FIG. 119 is a flow chart showing an information output process;

FIG. 120 is a flow chart showing a remaining part of the information output process;

FIG. 121 is a flow chart showing a process of outputting stored information;

FIG. 122 is a diagram showing an example of a waveform of a driving signal for driving a vibration presentation unit, the driving signal being output in an information output process;

FIG. 123 is a diagram showing an example of a waveform of a driving signal for driving a light emission unit, the driving signal being output in an information output process;

FIG. 124 is a diagram showing an example of a waveform of a driving signal for driving a light emission unit, the driving signal being output in an information output process;

FIG. 125 is a diagram showing an example of a waveform of a driving signal for driving a vibration presentation unit, the driving signal being output in an information output process;

FIG. 126 is a diagram showing an example of a waveform of a driving signal for driving a light emission unit, the driving signal being output in an information output process; and FIG. 127 is a diagram showing an example of a waveform of a driving signal for driving a light emission unit, the driving signal being output in an information output process.

BEST MODE FOR CARRYING OUT THE INVENTION

Figure 1:
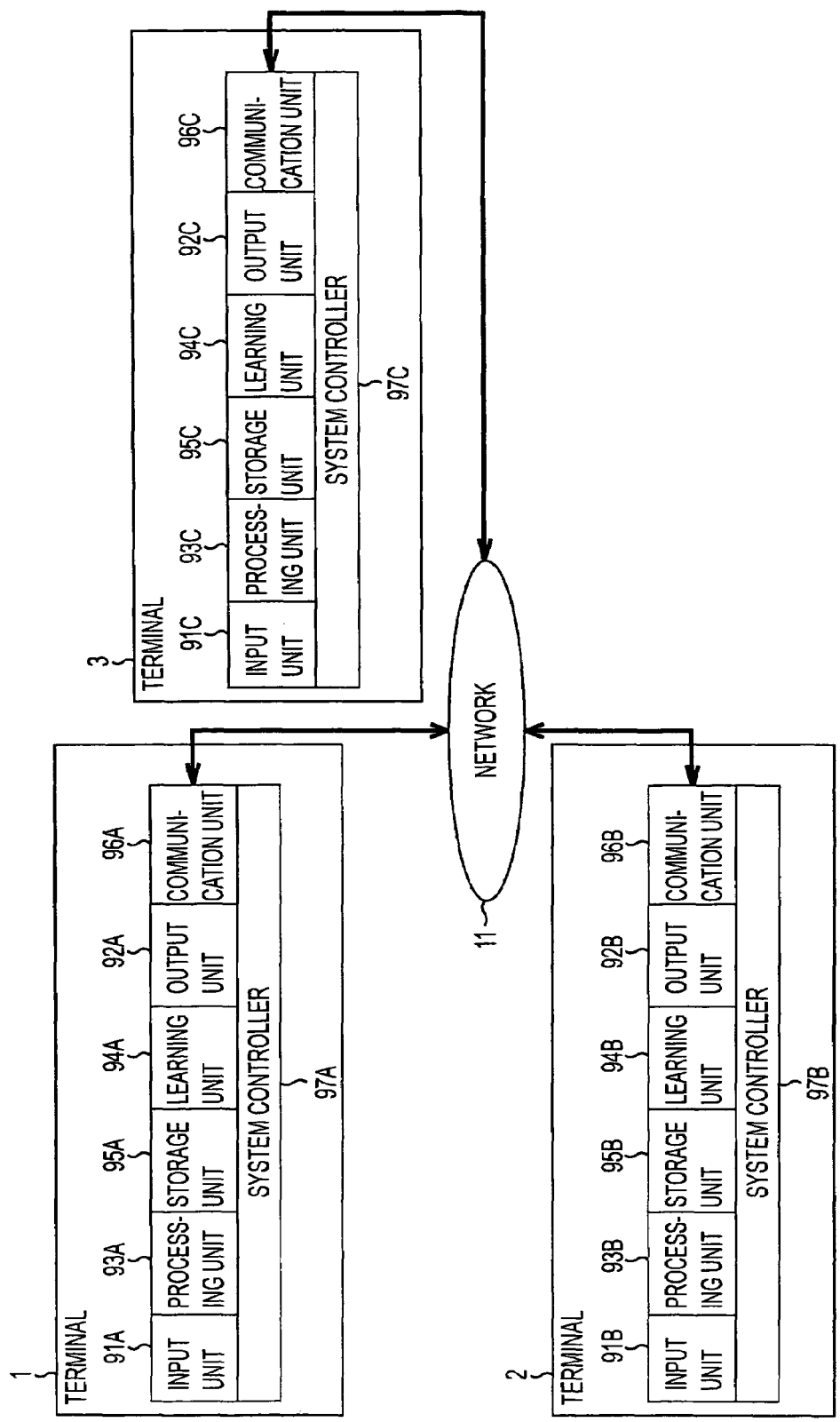
FIG. 1 is a diagram showing a manner in which information processing apparatuses are connected, in accordance with the present invention.

The present invention is described in further detail below with reference to specific embodiments in conjunction with the accompanying drawings. FIG. 1 shows a structure of a communication system using information processing apparatuses according to the present invention.

In FIG. 1, a terminal 1, a terminal 2, and a terminal 3 are information processing apparatuses according to the present invention, and they are connected to a network 11 so that they communicate with each other.

Each of the terminal 1 (terminal A), the terminal 2 (terminal B), and the terminal 3 (terminal C) includes an input unit 91A, 91B, or 91C used to input information, a processing unit 93A, 93B, or 93C for processing the information input via the input unit, a learning unit 94A, 94B, or 94C for learning/identifying the emotion/state and the strength level of a user from the input information, a storage unit 95A, 95B, or 95C for storing information learned/identified by the learning unit, an output unit 92A, 92B, or 92C for outputting information identified by the learning unit or for outputting information stored in the storage unit, a communication unit 96A, 96B, or 96C for transmitting/receiving information, and a system controller 97A, 97B, or 97C for controlling various parts.

The terminal 1 (terminal A), the terminal 2 (terminal B), and the terminal 3 (terminal C) are similar in structure to each other, and parts thereof, that is, the parts such as the input unit 91A, . . . , the system controller 97A of the terminal 1, the parts such as the input unit 91B, . . . , the system controller 97B of the terminal 2, the parts such as the input unit 91C, . . . , system controller 97C of the terminal 3 are similar in functions. In the following description, when it is not needed to discriminate those parts among terminals, the parts are represented in a generic manner, such as the input unit 91, . . . , the system controller 97.

Figure 2:
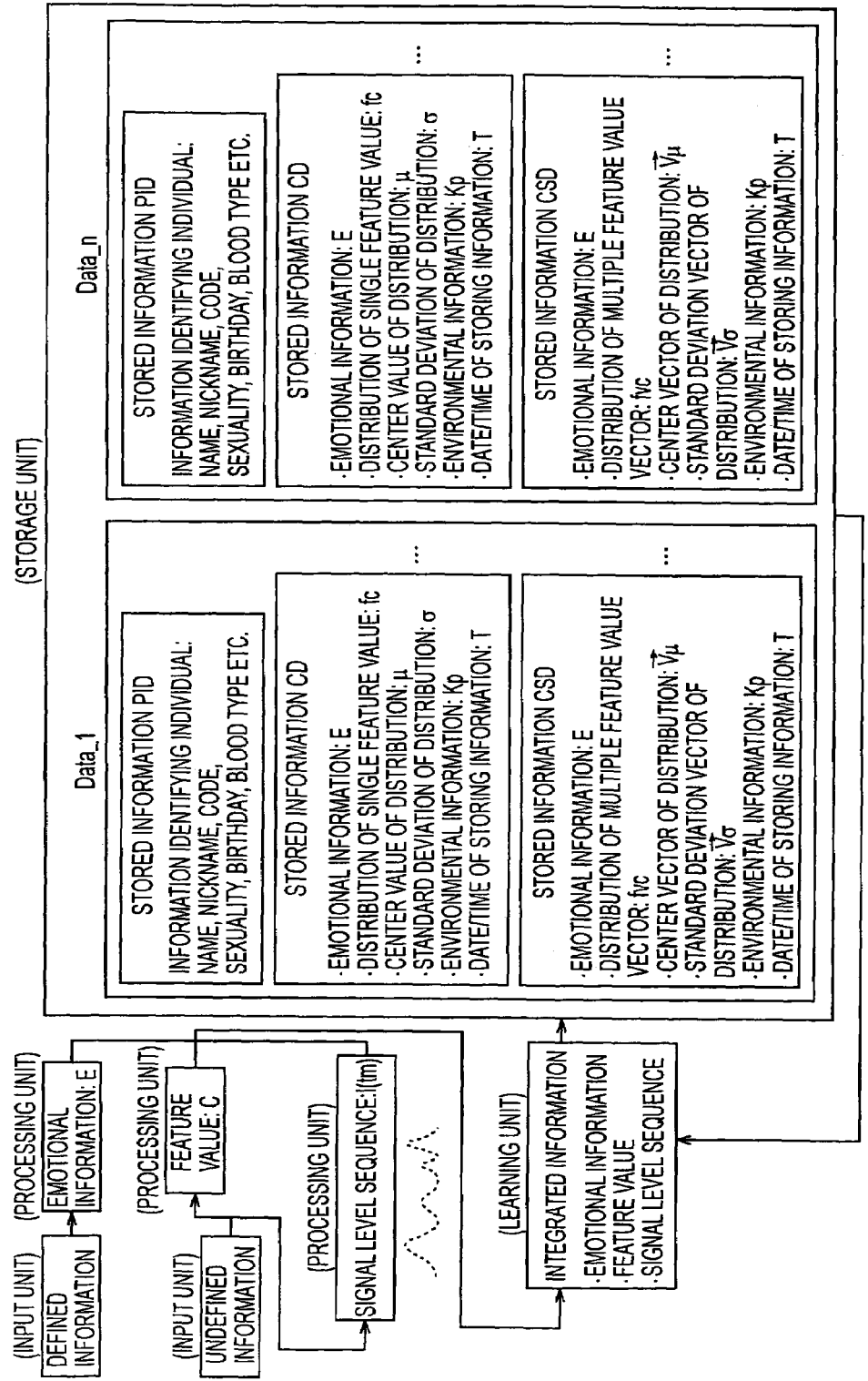
FIG. 2 is a diagram showing information input to an information processing apparatus and information stored therein, in accordance with the present invention.

As shown in FIG. 2, information input to the terminal 1, the terminal 2, or the terminal 3 via their input unit can be classified into defined information and undefined information. Defined information refers to information that can be uniquely interpreted without needing any other additional information. Examples of defined information are linguistic words, symbols assigned unique meanings, self-declared information transmitted in response to a particular operation performed by a user.

Non-defined information refers to information that can be interpreted in many ways or information that is difficult to interpret. Examples of undefined information are physiological information such as a pulse, a blood flow, a blood pressure, breathing, body temperature, skin surface temperature, electric resistance of skin, sweat, brain waves, and brain magnetism, body motion, head motion, or motion of another part of a user, a vibration that occurs when a keyboard is pressed, and a pressure at which a mouse is grasped.

The processing unit 93 extracts the emotion/state of a user and the strength level of the emotion/state (emotion information E) from input defined information. The processing unit 93 also extracts feature values C and a sequence of signal levels from undefined information. The extracted information, feature values, and signal levels are supplied to the learning unit 94.

The learning unit 94 combines the received emotion information E, the feature values C, and the sequence of signal levels into a single data and stores it in the storage unit 95 separately for each user. The stored data includes PID, CD, and CSD.

PID is information identifying a particular user. PID may include a name, a nickname, an e-mail address, an identification number assigned to the user, sexuality, a birthday, a residence address, and/or a blood type.

CD includes emotion information E associated with a user identified by identification information PID, a distribution of fc of a feature value extracted from input undefined information, the center value μ of the distribution fc, the standard deviation σ of the distribution fc, environmental information (such as temperature, humidity, environmental sound, the number of nearby persons, weather information, and/or position information) Kp indicating an environment in which the user is located, as of the time when information is input by the user, a date/time T when the information is stored.

The emotion/state is classified into twelve kinds, as shown in Table 1.

TABLE 1

EMOTION/STATE

JOY
SURPRISE
SADNESS
ANGER
DISLIKE
INTEREST
SHAME
LIKING
INSTABILITY
STABILITY
VITALITY
NON-VITALITY

Each kind of emotion/state is divided into three strength levels: high level, middle level, and low level. Thus, there are a total of 36 (=12×3) different kinds of emotion information E. Therefore, there are 36 CDs for each feature. If the number of feature values is m, there are 36×m CDS for each user.

Stored information CDS includes emotion information E associated with a user identified by identification information PID, a distribution fvc of a combination of feature values C extracted from undefined information, the center vector Vμ of the distribution, the standard deviation vector Vσ of the distribution, environmental information (such as temperature, humidity, environmental sound, the number of nearby persons, weather information, and/or position information) Kp indicating an environment in which the user is located, as of the time when information is input by the user, and a date/time T when the information is stored.

The emotion/state is classified into twelve kinds, as shown in Table 1, and each kind of emotion/state is divided into three strength levels: high level, middle level, and low level. Therefore, there are 36 CSDs for each user.

The information stored in the storage unit 95 is referred to when emotion or a state of a user is learned or identified. New information is stored in the storage unit 95 such that it is added to the existing information stored in the storage unit 95.

Once a sufficient amount of information is stored in the storage unit 95, the information processing apparatus can identify the emotion/state and the level of a particular user only from undefined information. To identify the emotion, the state and the level of a particular user from undefined information, feature values of the undefined information are extracted and compared with the information associated with the particular user stored in the storage unit 95.

For example, the processing unit 93 extracts feature values C1, C2, . . . , Cm from the undefined information associated with a particular user a, and the learning unit 94 generates a feature value vector Vcx(C1, C2, . . . , Cm) from the extracted feature values.

Furthermore, the learning unit 94 reads plural pieces of stored information CSD associated with the user a from the storage unit 95 and the learning unit 94 extracts center vectors Vμ1, Vμ2, . . . Vμ36 corresponding to all respective kinds of emotion/state and the strength levels.

The learning unit 94 then calculates the inner product (Vcx, Vμn) of the feature value vector Vcx and each center vector Vμn (n=1, 2, . . . , 36). Each vector component is then examined in descending order of the inner product (Vcx, Vμn) to determine whether (Vμnm−σnm)≦Vcxm≦(Vμnm+σnm) is satisfied, where Vμnm denotes an mth component of Vμn, σnm denotes an mth component of a standard deviation vector σn of a distribution fvcn, and Vcxm denotes an mth component of Vcx.

Figure 3:
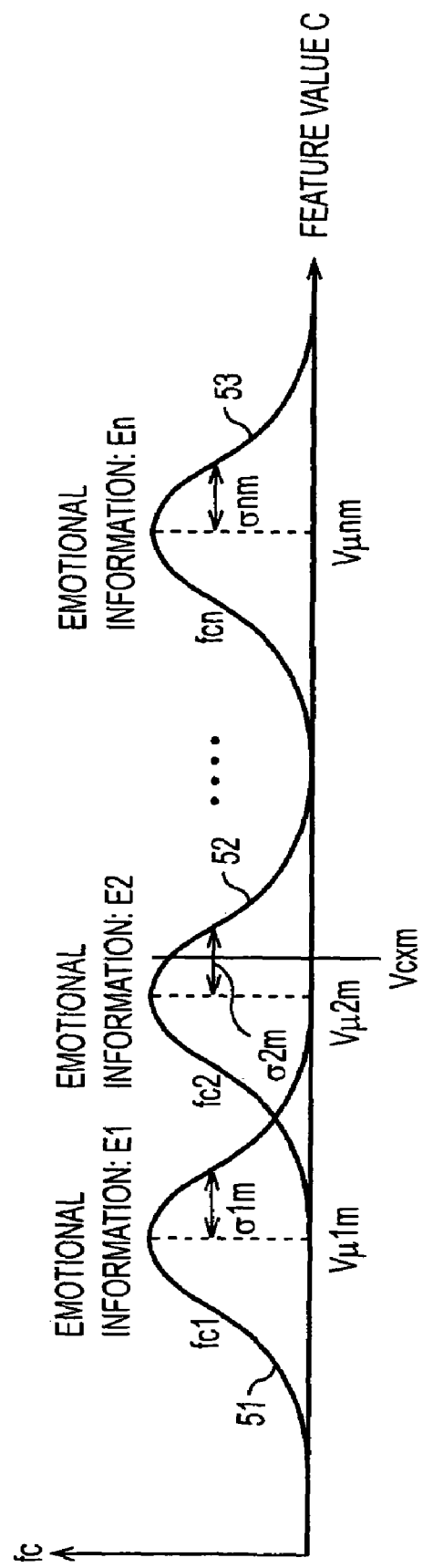
FIG. 3 is a graph showing distributions of feature values corresponding to emotions/states.

FIG. 3 shows distributions of feature values C corresponding to emotion information E1 to En, wherein the vertical axis represents distributions fc of feature values and the horizontal axis represents feature values C. In the example shown in FIG. 3, the feature value C is Vcxm, and the condition (Vμ2m−σ2m)≦Vcxm≦(Vμ2m+σ2m) is satisfied in the distribution corresponding to emotion information E2.

All components of the vector are examined in the above-described manner to determine whether the condition is satisfied. Of distributions satisfying the above condition, a distribution corresponding to a maximum inner product (Vcx, Vμn) is detected, and the feature vector is determined to belong to the detected distribution.

Figure 4:
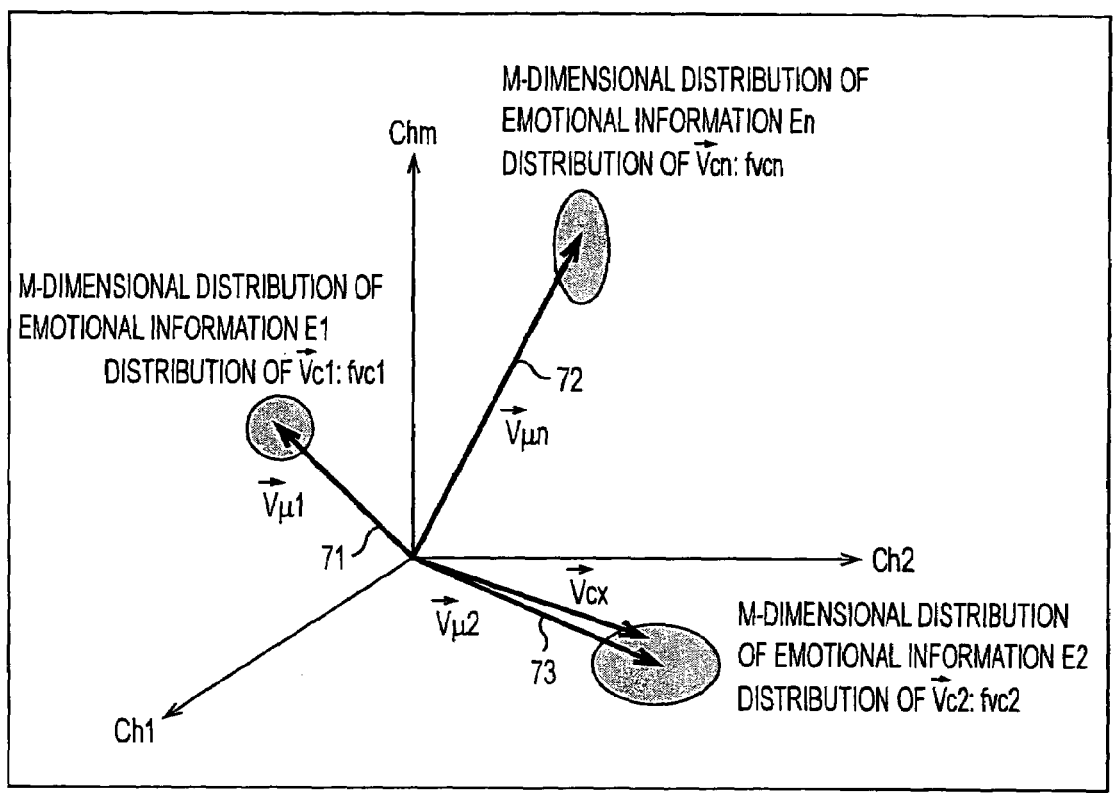
FIG. 4 is a diagram showing distributions of feature value vectors corresponding to emotions/states.

FIG. 4 shows a feature value vector Vcx generated from input undefined information and distributions of feature value vectors corresponding to some kinds of emotion information stored in the storage unit 95. Each of those vectors has m components, and is plotted in an m-dimensional space having axes ch1, ch2, . . . , chm. In this space, there exist a distribution fvc1 of feature value vectors corresponding to emotion information E1, a center vector Vμ1 of the distribution fvc1, a distribution fvc2 of feature value vectors corresponding to emotion information E2, a center vector Vμ2 of the distribution fvc2, and a distribution fvcn of feature value vectors corresponding to emotion information En.

Of inner products (Vcx, Vμ1), (Vcx, Vμ2), and (Vcx, Vμn) of Vcx and the respective center vectors Vμ1, Vμ2 and Vμn, the inner product (Vcx, Vμ2) is greatest in magnitude, and conditions (Vμ2m−σ2m)≦Vcxm≦Vμ2m+σ2m) are satisfied for Vcx and all m components of Vμ2, and thus Vcx can be regarded as belonging to emotion information E2.

It is possible to identify the emotion, the state, the level of a particular user from input undefined information in the above-described manner.

EXAMPLE 1

Figure 5:
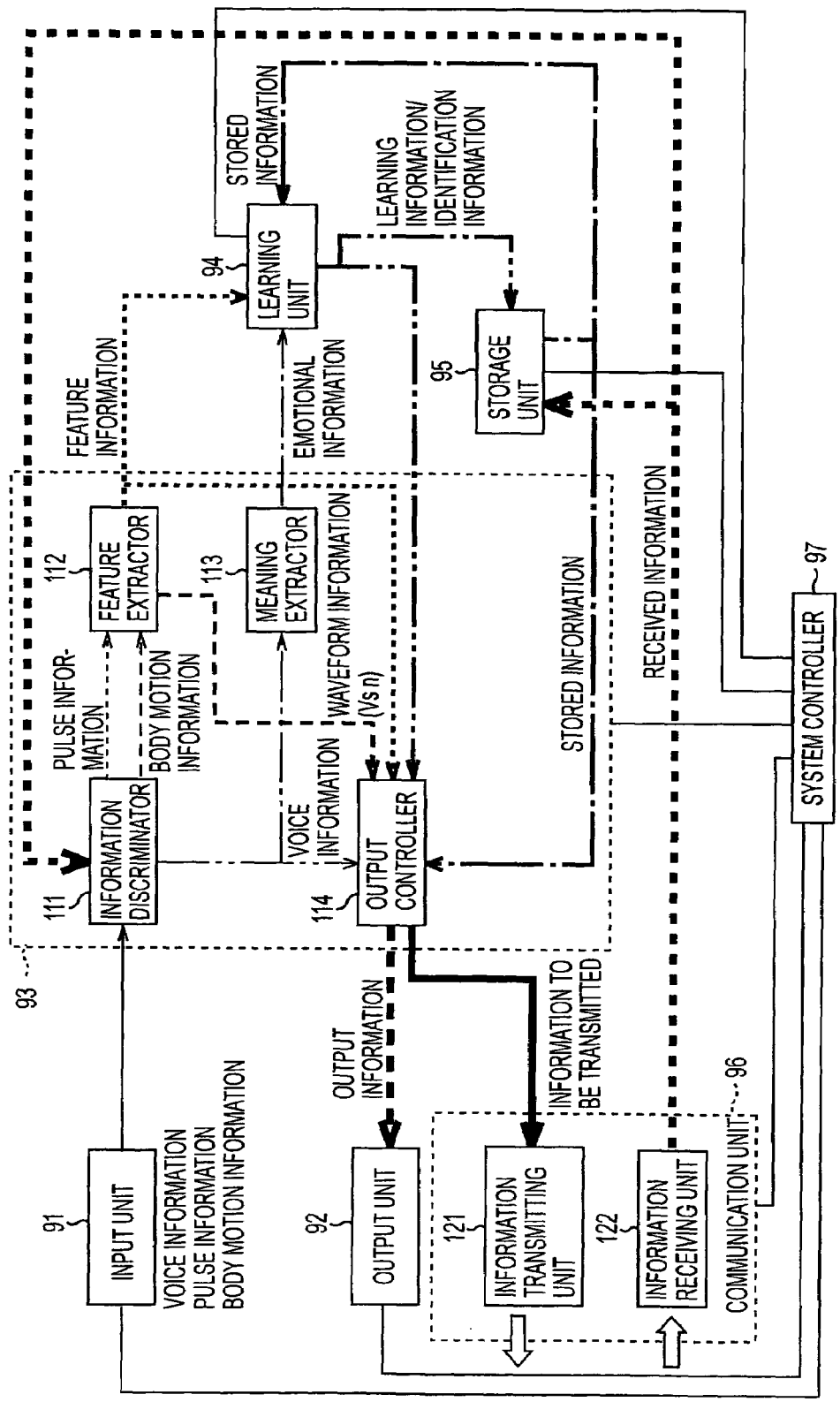
FIG. 5 is a block diagram showing an example of a structure of a first-type information processing apparatus according to the present invention.

FIG. 5 shows an example of a structure of a first-type information processing apparatus according to the present invention. This information processing apparatus can be applied to, for example, a portable telephone. The information processing apparatus includes an input unit 91 used to input voice information, pulse information and distance information of a user, a processing unit 93 for processing the information input via the input unit 91, a learning unit 94 for performing learning and identification on the basis of property information and emotion information output from the processing unit 93, a storage unit 95 for storing learned information and identified information output from the learning unit 94, an output unit 92 for outputting information on the basis of output information output from the processing unit 93, a communication unit 96 for communication, and a system controller 97 for controlling various parts.

The processing unit 93 includes an information discriminator 111 for classifying information input via the input unit 91 into voice information, pulse information, or body motion information, a feature extractor 112 for extracting property information from pulse information and body motion information, a meaning extractor 113 for extracting emotion information from voice information, and an output controller 114 for outputting information to the output unit 92. The communication unit 96 includes an information transmitting unit 121 for transmitting information and an information receiving unit 122 for receiving information.

Figure 6:
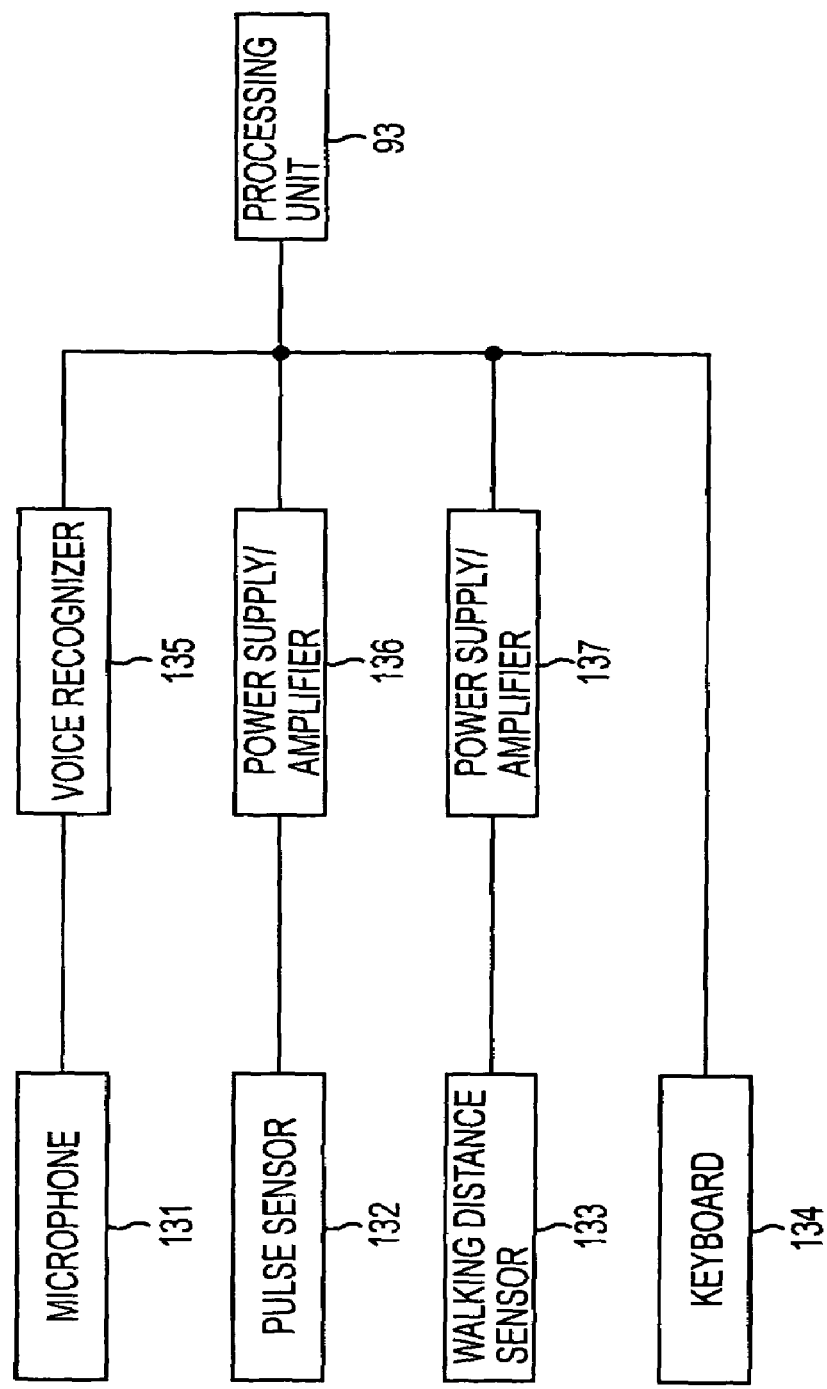
FIG. 6 is a block diagram showing an example of a structure of an input unit shown in FIG. 5.

FIG. 6 shows an example of a structure of the input unit 91. In this example shown in FIG. 6, the input unit 91 includes a microphone 131 for capturing a voice of a user, a pulse sensor 132 for detecting a pulse of the user, a distance sensor 133 for detecting a body motion of the user, a voice recognition unit 135 for recognize textual or numeric information input via a keyboard 134 or voice information input via the microphone 131, a power supply/amplifier 136 for amplifying a signal output from the pulse sensor 132, and a power supply/amplifier 137 for amplifying a signal output from the distance sensor 133.

Figure 7:
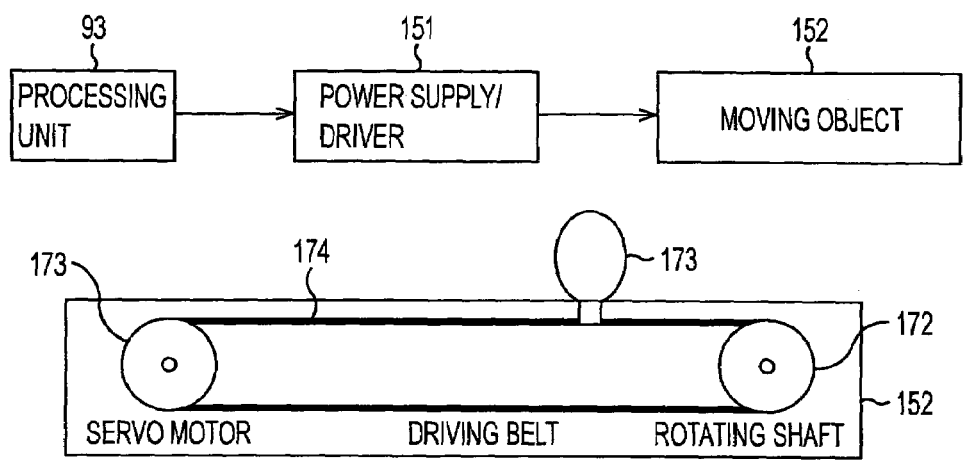
FIG. 7 is a block diagram showing an example of a structure of an output unit shown in FIG. 5.
Figure 8:
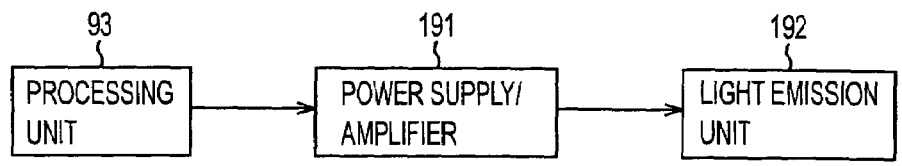
FIG. 8 is a block diagram showing an example of a structure of an output unit shown in FIG. 5.

FIGS. 7 and 8 show examples of the output unit 92. In the example shown in FIG. 7, the output unit 92 includes a moving object 152 for moving an object in accordance with a particular signal, and a power supply/driver 151 for driving the moving object 152, wherein the moving object 152 includes an object 173, a driving belt 174, a servo motor 171, and a rotating shaft 172.

In the example shown in FIG. 8, the output unit 92 includes a light emitting unit 192 for emitting light in accordance with a particular signal, and a power supply/amplifier 191 for driving the light emitting unit 192.

Figure 9:
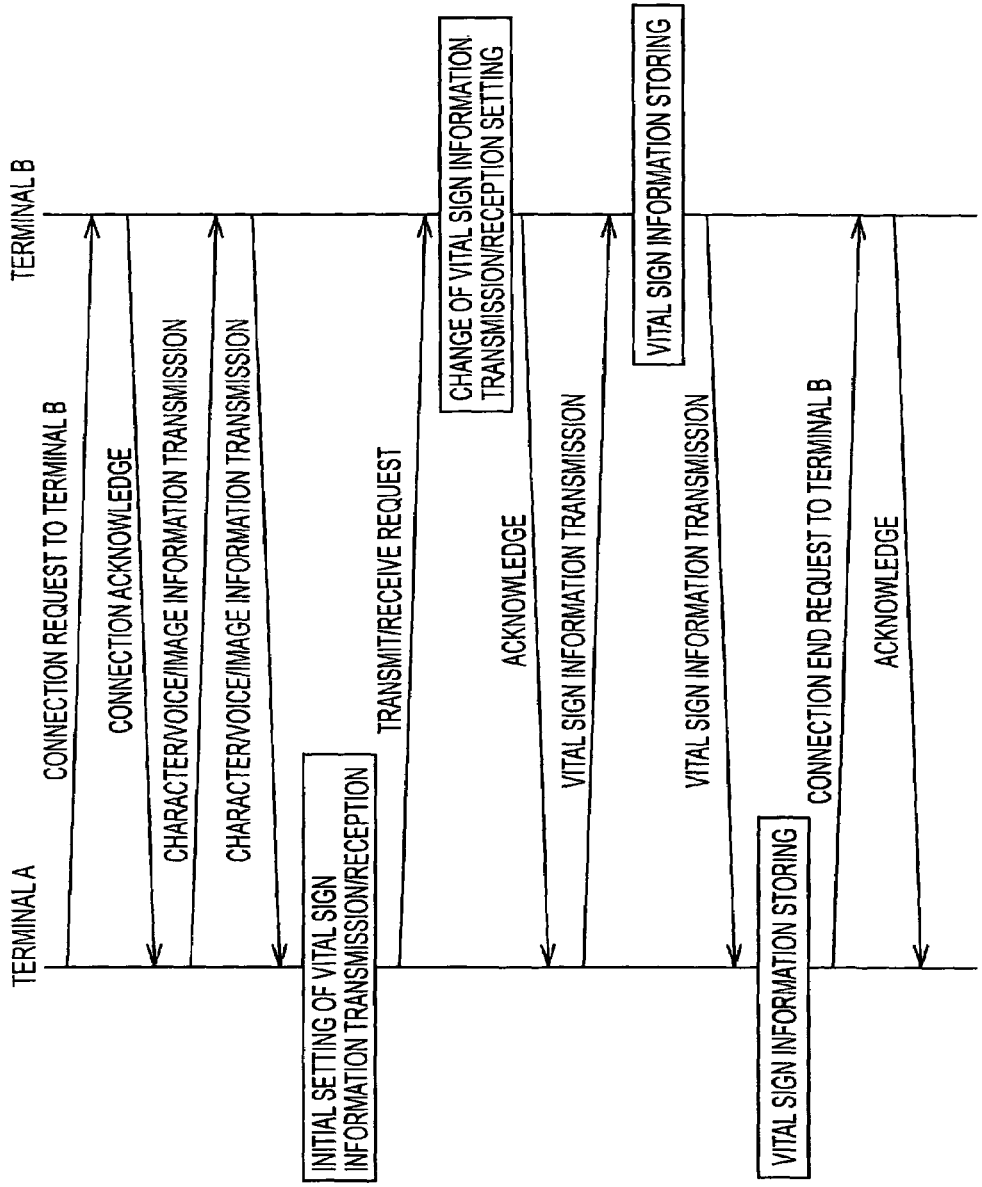
FIG. 9 is a diagram showing an example of a manner in which information is transmitted/received between a terminal A and a terminal B.

Herein, an information processing apparatus of a user a is denoted by a terminal A, and an information processing apparatus of a user b is denoted by a terminal B. The user a and the user b can communicate with each other using their terminals A and B in accordance with a procedure shown in FIG. 9. First, the terminal A transmits a connection request to the terminal B. In response, the terminal B returns a connection acknowledgment signal to the terminal A. Thereafter, textual information such as a mail or a chat, voice information such as a conversation, or image information acquired using a CCD camera or the like is transmitted between the terminal A and the terminal B.

Figure 11:
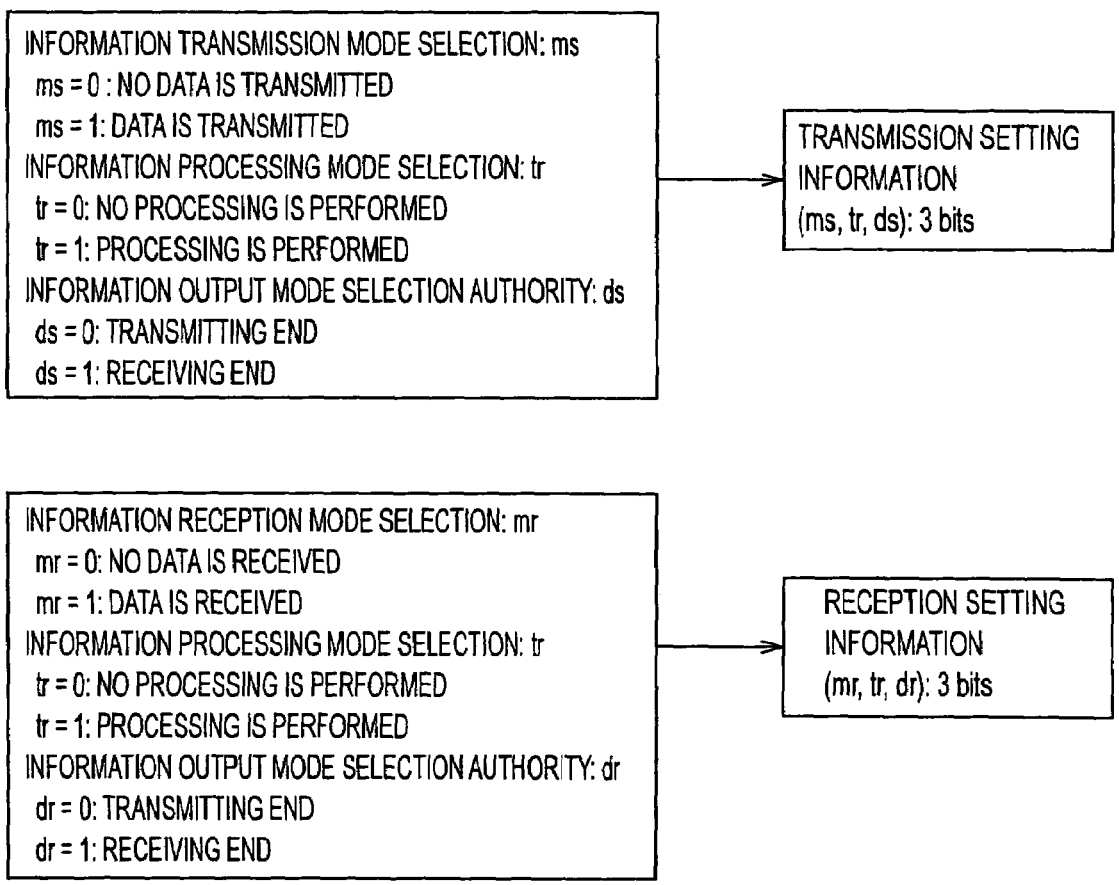
FIG. 11 is a diagram showing an example of a content of transmission setting information and an example of a content of reception setting information.

The terminal A performs initial setting associated with transmission/reception of vital sign information (pulse information and body motion information of users, in this specific example), and transmits a transmission/reception request to the terminal B together with transmission setting information and reception setting information such as those shown in FIG. 11.

The transmission setting information includes an information transmission mode selection ms, an information processing mode selection ts, and an information output mode selection authority ds. The reception setting information includes an information reception mode selection mr, an information processing mode selection tr, and an information output mode selection authority dr.

The parameter of information transmission mode selection ms indicates whether or not to transmit vital sign information. The parameter of information processing mode selection ts indicates whether or not to process vital sign information when the vital sign information is transmitted. The parameter of information output mode selection authority ds indicates whether setting of the form in which to transmit vital sign information is performed at a transmitting end or a receiving end.

The parameter of information reception mode selection mr indicates whether to receive vital sign information. The parameter of an information processing mode selection tr indicates whether to process vital sign information when it is received. The parameter of an information output mode selection authority dr indicates whether selection of the output form of vital sign information is performed at a receiving end or a transmitting end.

If the terminal B receives the vital sign information transmission request from the terminal A, the terminal B changes the setting associated with transmission/reception of vital sign information and returns an acknowledgment signal to the terminal A.

The terminal A then transmits vital sign information of the user a to the terminal B, and the terminal B transmits vital sign information of the user b to the terminal A. The terminal A and the terminal B store the received vital sign information.

If the terminal A transmits a connection end request to the terminal B, the terminal B transmits a connection end acknowledgment signal, and the communication is ended.

Figure 10:
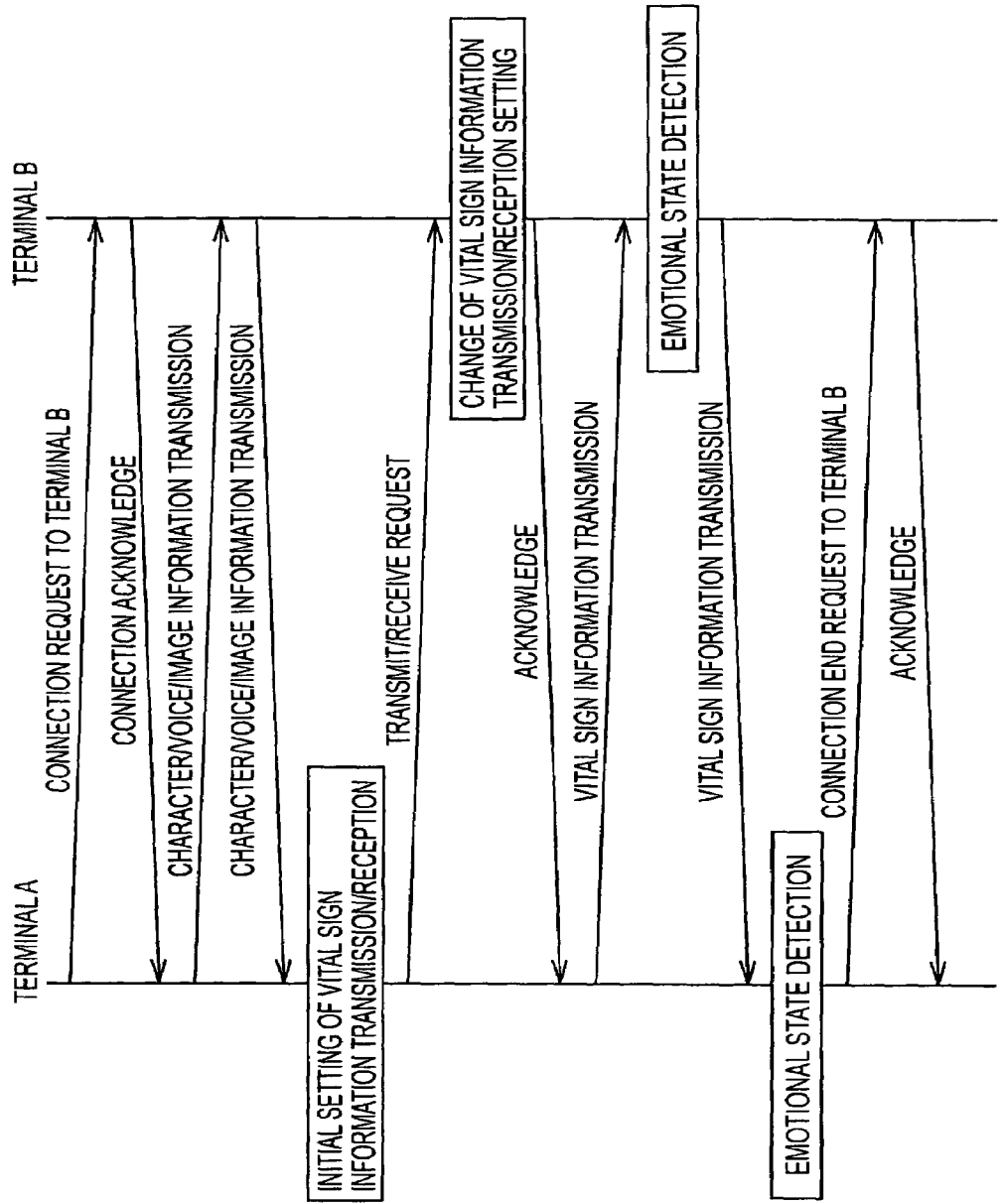
FIG. 10 is a diagram showing an example of a manner in which information is transmitted/received between a terminal A and a terminal B.

Communication is performed between the terminal A and the terminal B in the above-described manner, and vital sign information is stored in the terminal A and the terminal B. After a sufficient amount of vital sign information is stored, transmission/reception of information is performed as shown in FIG. 10. If vital sign information is transmitted between the terminal A and the terminal B, the terminal A and the terminal B detect the emotion or the state of users.

Figure 12:
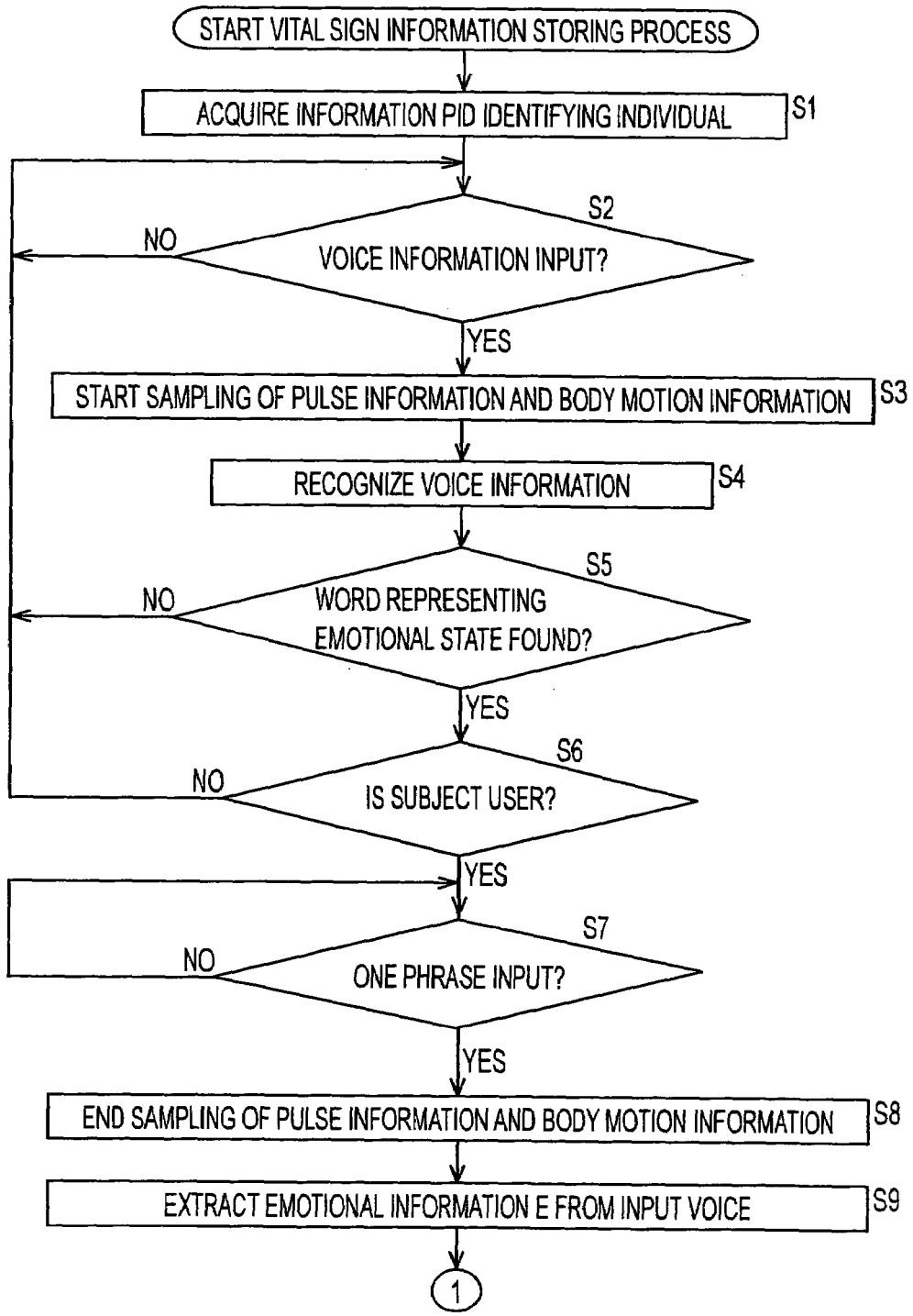
FIG. 12 is a flow chart showing a vital sign information storage process.
Figure 13:
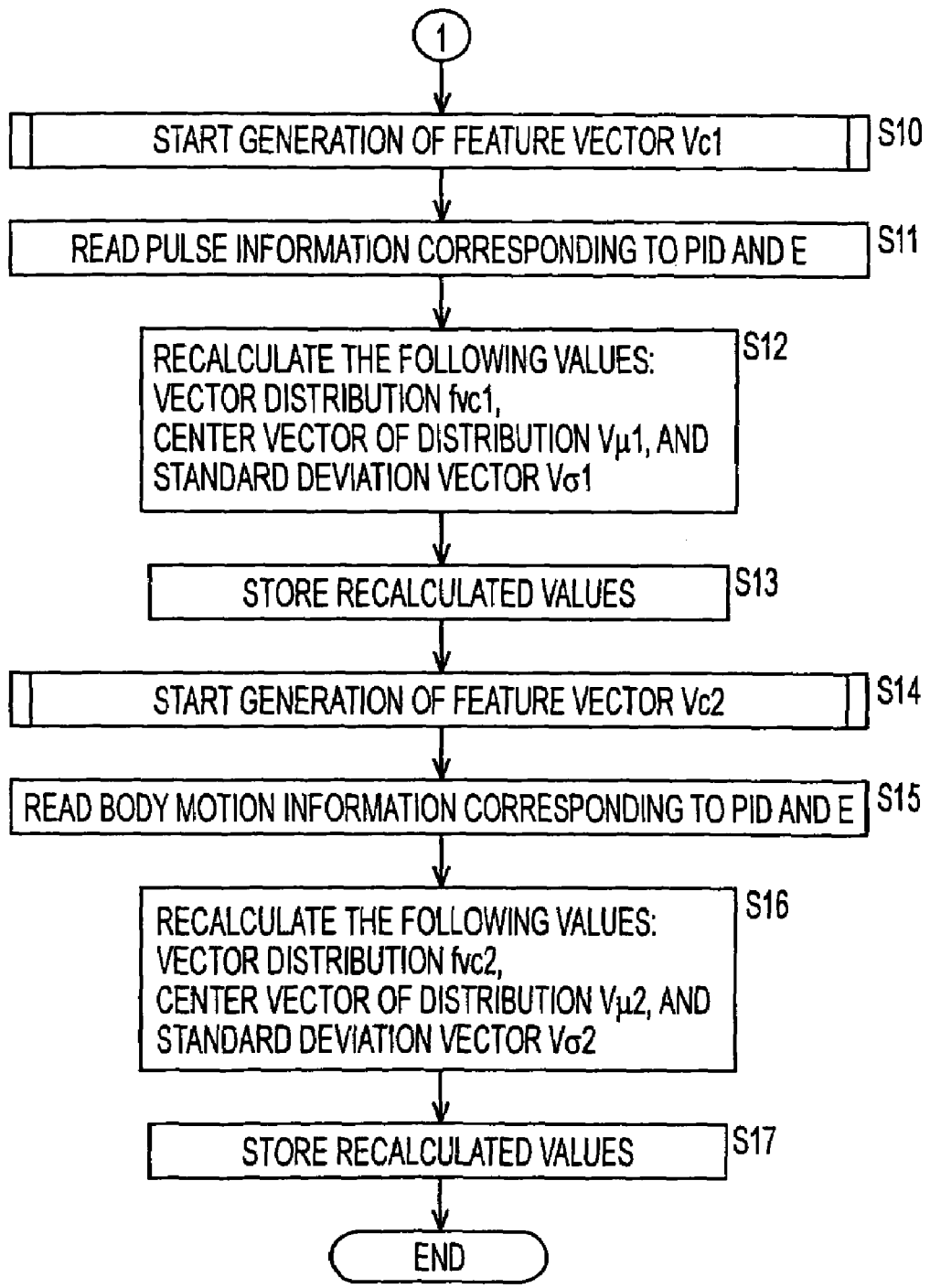
FIG. 13 is a flow chart showing a vital sign information storage process.

Referring to FIG. 12, a process performed by the terminal B to store vital sign information is described below. First, in step S1, at the start of communication with the terminal A, the system controller 97 of the terminal B acquires information (for example, a name or a nickname) PID identifying the user a of the terminal A with which to communicate. In step S2, the system controller 97 of the terminal B commands the information discriminator 111 to determine whether voice information of the user a is received from terminal A. If voice information is not yet received, the process waits until voice information is received.

If it is determined in step S2 that voice information is input, the process proceeds to step S3. In step S3, the system controller 97 of the terminal B commands the feature extractor 112 to start sampling pulse information and body motion information associated with the user a received from the terminal A. In the next step S4, the system controller 97 of the terminal B commands the meaning extractor 113 to recognize the voice. In step S5, the system controller 97 of the terminal B determines whether the recognized voice includes a word indicating an emotion/state and a strength level thereof. If it is determined that the recognized voice does not include a word indicating an emotion/state and the strength level of the emotion/state, the process returns to step S2, and the above-described process is repeated. FIG. 23 shows example of words indicating emotions or states, and FIG. 24 shows examples of words indicating strength levels.

In the case in which it is determined in step S5 that the recognized voice includes a word indicating an emotion/state or a strength level of an emotion/state, then, in step S6, the system controller 97 of the terminal B determines whether the subject of the detected word is the user a, that is, whether the detected word indicates the emotion/state or the strength level of the emotion/state of the user a. If the subject is not the user a, then the process returns to step S2, and the above-described process is repeated.

In the case in which it is determined in step S6 that the user is the subject, the process proceeds to step S7. In step S7, the system controller 97 of the terminal B determines whether one phrase of voice of the user a has been input. If one phrase of voice has not yet been input, the system controller 97 of the terminal B waits until one phrase of voice is input.

If it is determined in step S7 that one phrase has been input, then, in step S8, the system controller 97 of the terminal B commands the feature extractor 112 to end the sampling of pulse information and body motion information.

The sampling of pulse information and body motion information may be performed by the feature extractor 112 of the terminal A, and the sampled information may be transmitted to the terminal B.

In step S9, the system controller 97 of the terminal B commands the meaning extractor 113 to extract emotion information E.

For example, if the user a utters "That sounds a little interesting.", the emotional/state corresponding to a word "interesting" is "interest", and the strength level corresponding to a word "a little" is "low level". Thus, "weak interest" is extracted as emotion information E.

In step S10, the system controller 97 of the terminal B commands the feature extractor 112 to generate a feature vector Vc1 on the basis of pulse information of the user a. In step S11, the system controller 97 of the terminal B reads, from the storage unit 95, pulse information corresponding to information PID identifying the user and the emotion information E. In this specific case, a feature vector of pulse information corresponding to weak interest of the user a is read. Then in step S12, the system controller 97 of the terminal B commands the learning unit 94 to add the newly generated feature vector Vc1 to the read feature vector and recalculate the vector distribution fvc1, the distribution center vector Vµ1, and the standard deviation vector Vσ1. In step S13, the recalculated vectors are stored in the storage unit 95.

In step S14, the system controller 97 of the terminal B commands the feature extractor 112 to generate a feature vector Vc2 on the basis of body motion information of the user a. In step S15, the system controller 97 of the terminal B reads, from the storage unit 95, body motion information corresponding to information PID identifying the user and the emotion information E. In this specific case, a feature vector of body motion information corresponding to weak interest of the user a is read. Then in step S16, the system controller 97 of the terminal B commands the learning unit 94 to add the generated feature vector Vc2 to the read feature vector and recalculate the vector distribution fvc2, the distribution center vector Vµ2, and the standard deviation vector Vσ2. In step S17, the recalculated vectors are stored in the storage unit 95.

Figure 14:
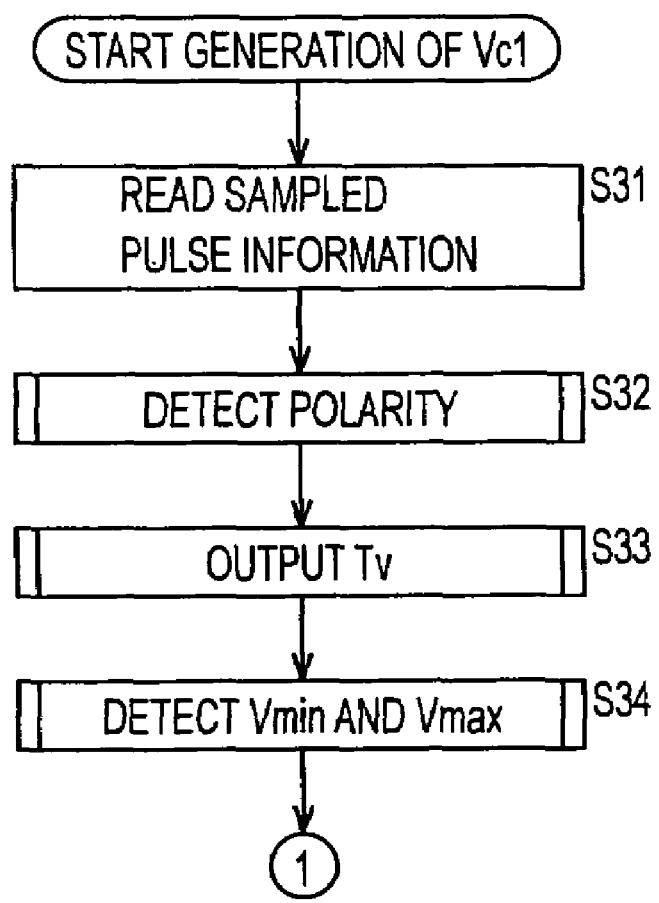
FIG. 14 is a flow chart showing a process of generating a feature value vector Vc1.
Figure 15:
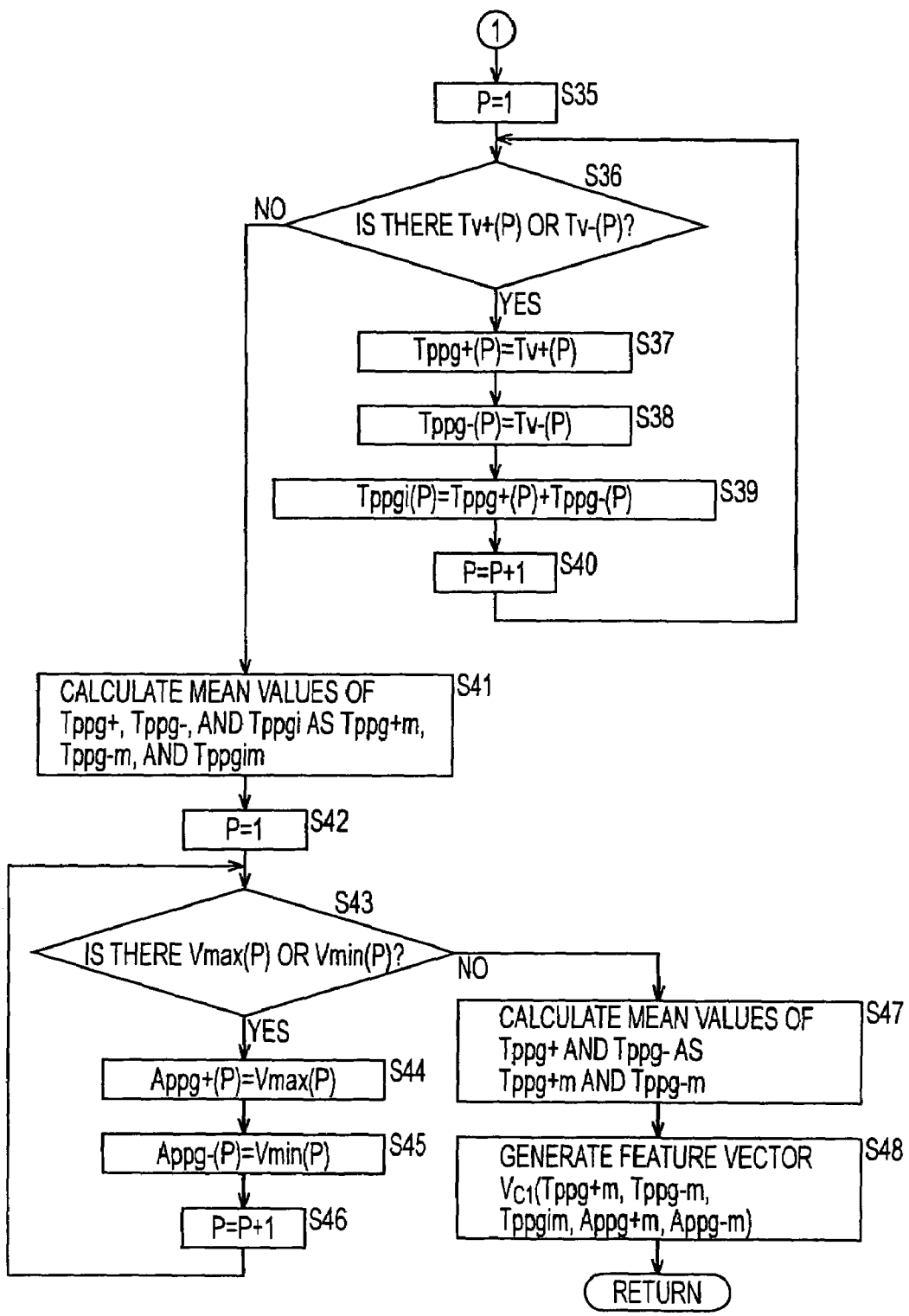
FIG. 15 is a flow chart showing a process of generating a feature value vector Vc1.

Now, referring to FIGS. 14 and 15, the process of generating the feature vector Vc1 of pulse information is described below. This process is performed by the feature extractor 112 of the terminal B. In step S31, the feature extractor 112 of the terminal B reads sampled pulse information. In step S32, the feature extractor 112 performs a polarity detection process that will be described later. In step S33, the feature extractor 112 performs a Tv generation process that will be described later. In step S34, the feature extractor 112 performs a Vmin/Vmax detection process that will be described later.

Figure 16:
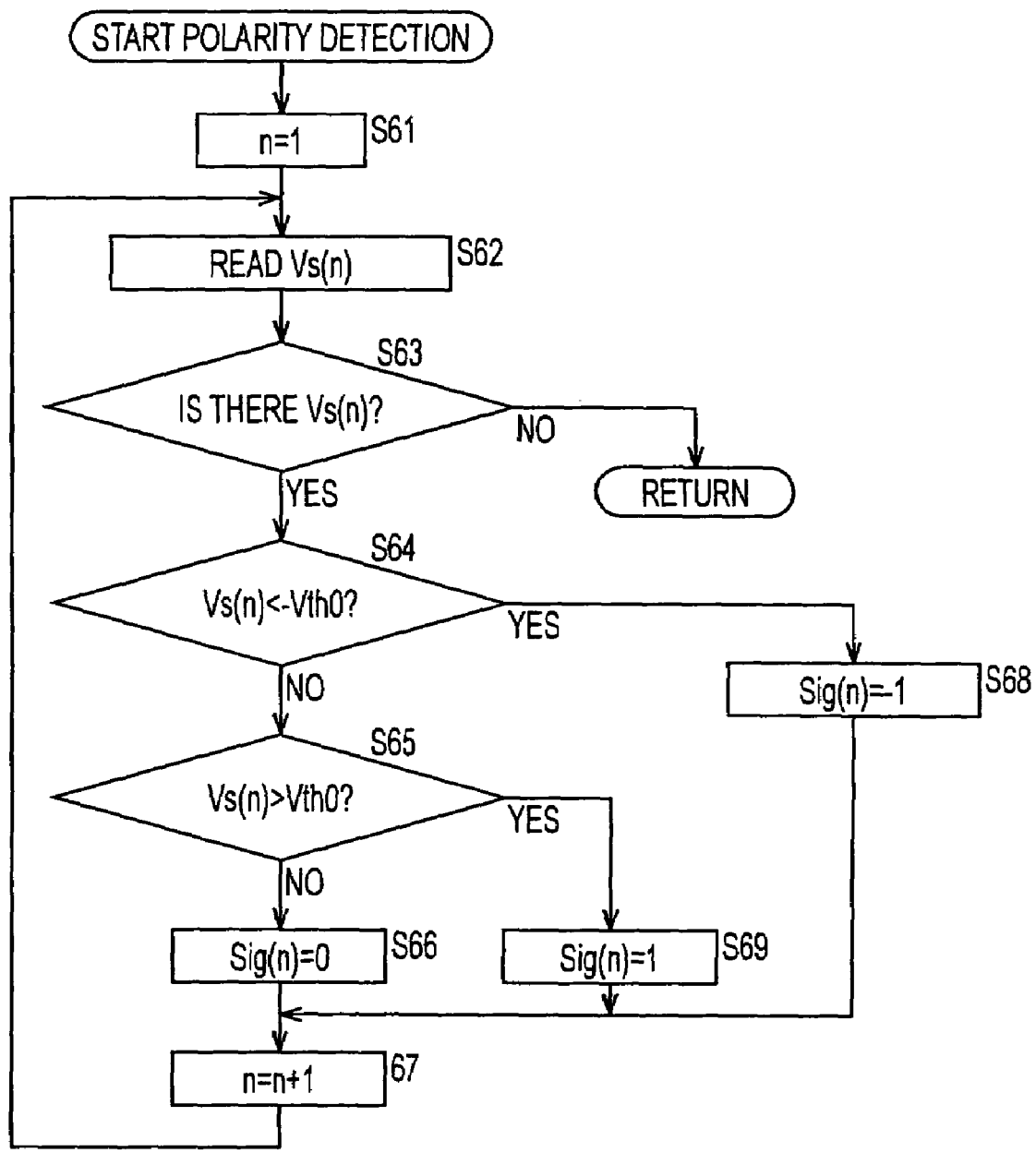
FIG. 16 is a flow chart showing a polarity detection process.
Figure 17:
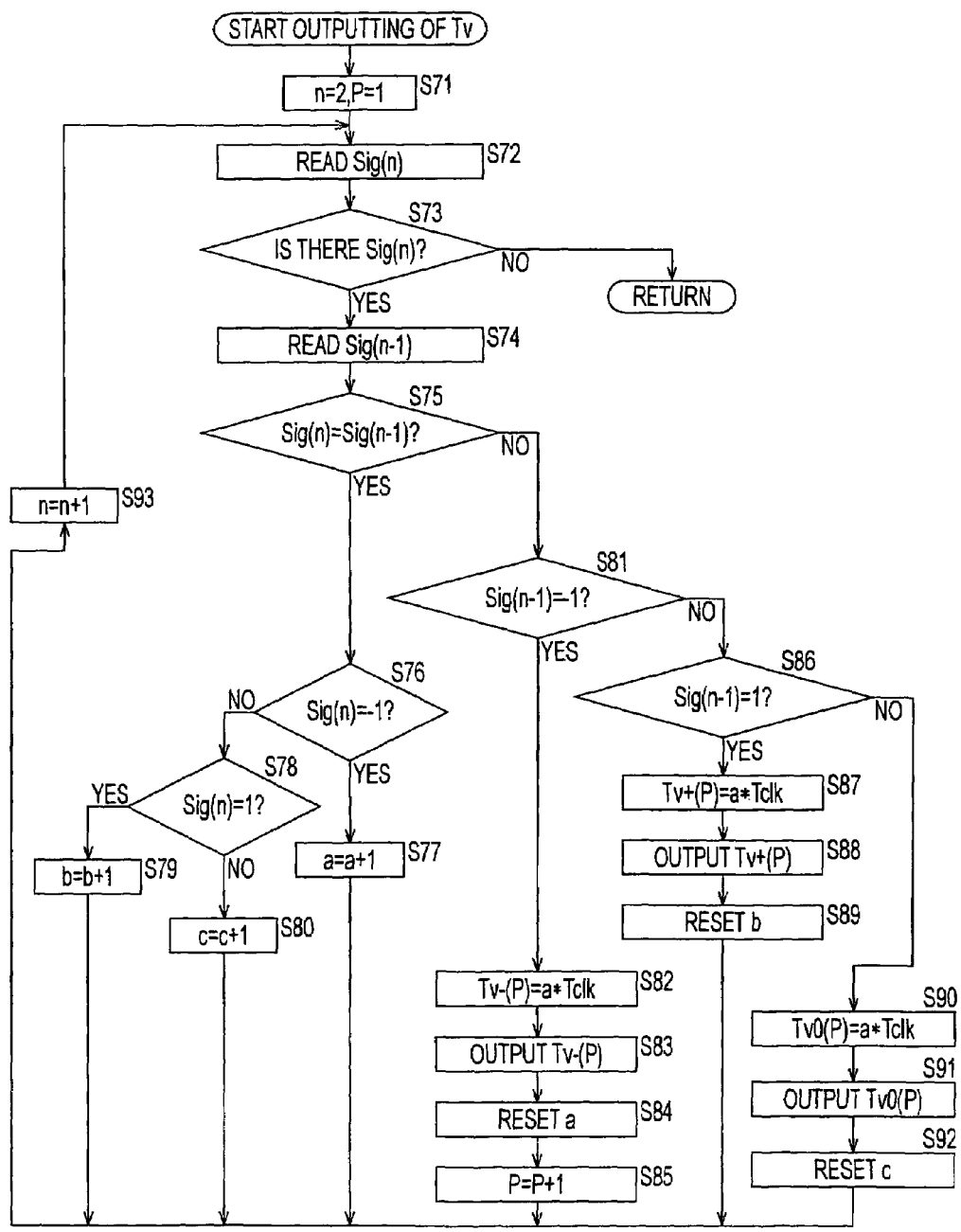
FIG. 17 is a flow chart showing a Tv generation process.
Figure 18:
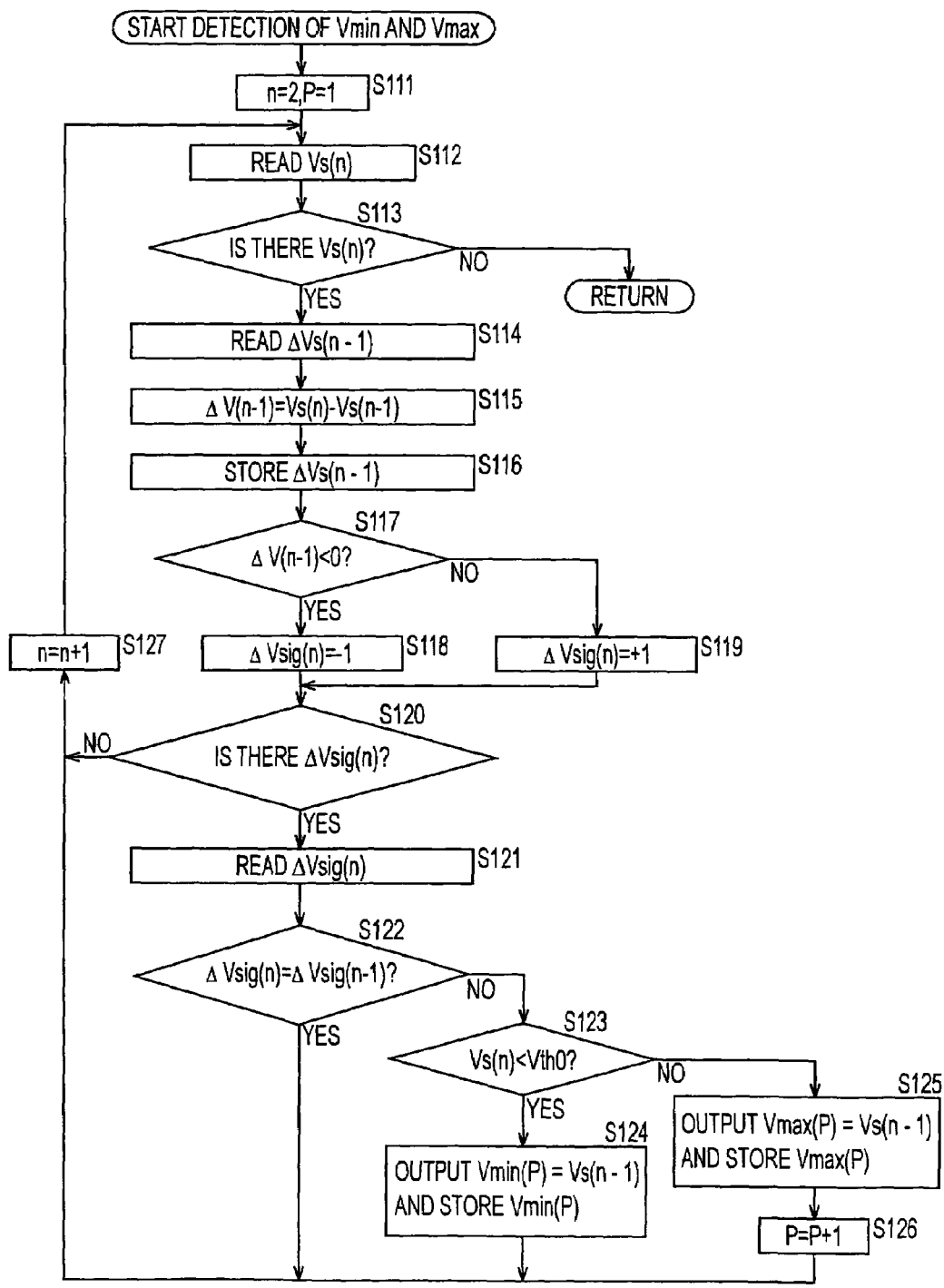
FIG. 18 is a flow chart showing a process of detecting Vmin and Vmax.

Referring to FIGS. 16 to 18, the polarity detection process, the Tv generation process, and the Vmin/Vmax detection process are described.

Figure 19:
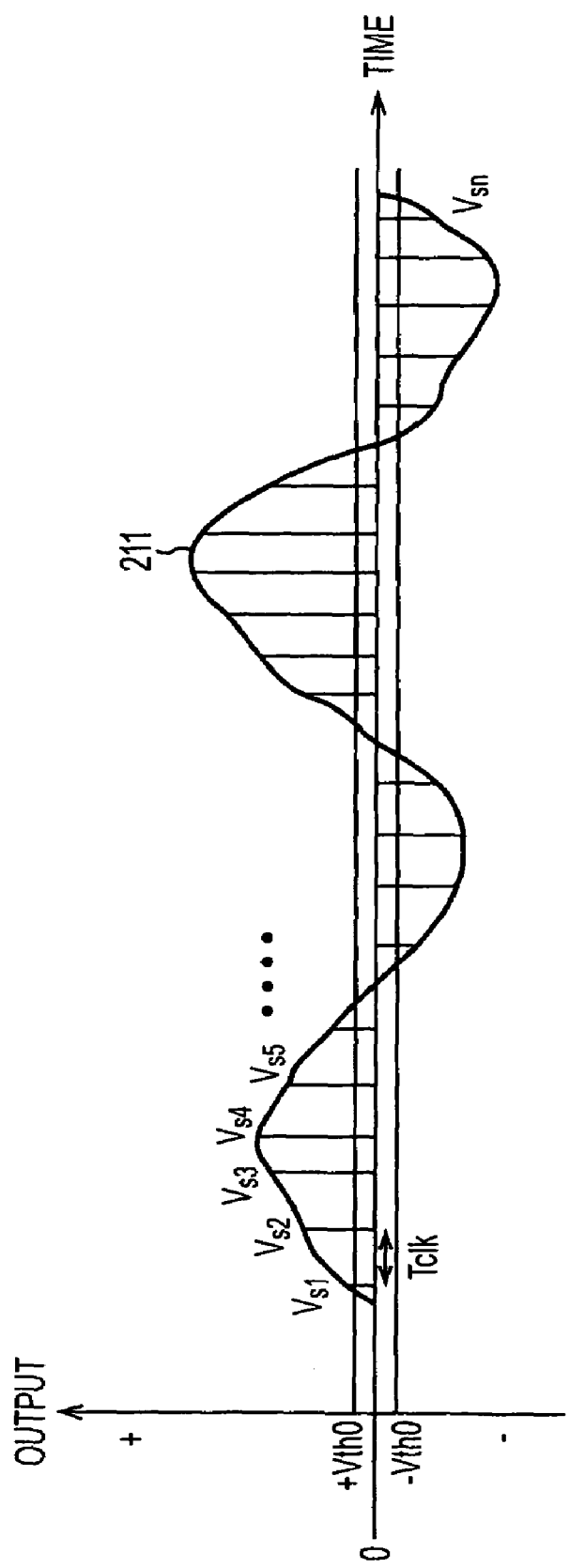
FIG. 19 is a diagram showing a manner in which waveform information is sampled.

First, referring to FIG. 16, the process of detecting the polarity of a sampled waveform is described. In step S61, the feature extractor 112 of the terminal B sets a parameter n to 1. In step S62, the feature extractor 112 of the terminal B reads Vs(n). If a waveform 211 shown in FIG. 19 is sampled at intervals Tclk, sampled values Vs1, Vs2, Vs3, ..., Vsn are obtained. In this polarity detection process, Vs(n) is read depending on the current value of n such that Vs1 is read when n=1, Vs2 is read when n=2, and so on.

In step S63, the feature extractor 112 of the terminal B determines whether Vs(n) exists. If it is determined that Vs(n) does not exit, the process is ended. If it is determined in step S63 that Vs(n) exists, then the process proceeds to step S64. In step S64, the feature extractor 112 of the terminal B determines whether Vs(n) is smaller than a threshold value −Vth0. If it is determined that Vs(n) is not smaller than −Vth0, then the process proceeds to step S65. In step S65, it is further determined whether Vs(n) is greater than a threshold value Vth0. If it is determined that Vs(n) is not greater than Vth0, then the process proceeds to step S66. In step S66, Sig(n) is set to 1.

In the case in which it is determined in step S64 that Vs(n) is smaller than the threshold value −Vth0, the feature extractor 112 of the terminal B sets Sig(n) to −1. In the case in which it is determined in step S65 that Vs(n) is greater than the threshold value Vth0, the feature extractor 112 of the terminal B sets Sig(n) to 1.

In step S67, the feature extractor 112 of the terminal B increments the value of n by 1. Then the process returns to step S62, and the above-described process is repeated.

Thus, the parameter Sig(n) indicating the polarity of the waveform is produced. That is, when the waveform is positive in polarity, Sig(n) is set to 1, and Sig(n) is set to −1 when the waveform is negative in polarity. When the waveform is neither positive nor negative in polarity, that is, when the waveform is zero, Sig(n) is set to 0.

Now, referring to FIG. 17, a Tv generation process is described below. In step S71, the feature extractor 112 of the terminal B sets a parameter n to 2 and a parameter P to 1. In step S72, the feature extractor 112 of the terminal B reads Sig(n) generated as a result of the polarity detection process. In step S73, it is determined whether Sig(n) exists. If it is determined that Sig(n) does not exit, the process is ended.

In the case in which it is determined in step S73 that Sig(n) exists, the process proceeds to step S74. In step S74, the feature extractor 112 of the terminal B reads Sig(n−1). In step S75, the feature extractor 112 determines whether Sig(n) and Sig(n−1) are equal in value to each other. If it is determined that Sig(n) and Sig(n−1) are equal in value to each other, then, in step S76, it is further determined whether Sig(n) is equal to −1. If it is determined that Sig(n) is not equal to −1, then in step S78 it is determined whether Sig(n) is equal to 1. If it is determined that Sig(n) is not equal to 1, the process proceeds to step S80. In step S80, a parameter c is incremented by 1. Thereafter, the process proceeds to step S93.

In the case in which it is determined in step S76 that Sig(n) is equal to −1, the process proceeds to step S77. In step S77, the feature extractor 112 of the terminal B increments the parameter a by 1. Thereafter, the process proceeds to step S93. In the case in which it is determined in step S78 that Sig(n) is equal to 1, the process proceeds to step S79. In step S79, the feature extractor 112 of the terminal B increments the parameter b by 1. Thereafter, the process proceeds to step S93.

In step S93, the feature extractor 112 of the terminal B increments the value of n by 1. The process then returns to step S72, and the above-described process is repeated.

If it is determined in step S75 that Sig(n) and Sig(n−1) are not equal in value to each other, the process proceeds to step S81. In step S81, the feature extractor 112 of the terminal B determines whether Sig(n−1) is equal to −1. If it is determined that Sig(n−1) is not equal to −1, the process proceeds to step S86. In step S86, the feature extractor 112 of the terminal B determines whether Sig(n−1) is equal to 1. If it is determined that Sig(n−1) is not equal to 1, the process proceeds to step S90. In step S90, the value of Tv0(P) is set to c*Tclk. Then in step S91, the feature extractor 112 of the terminal B outputs Tv0(P) and resets the value of the parameter c to 0. Thereafter, the process proceeds to step S93.

In the case in which it is determined in step S81 that Sig(n−1) is equal to −1, the process proceeds to step S82. In step S82, the feature extractor 112 of the terminal B sets the value of Tv−(P) to a*Tclk. Then, in step S83, Tv−(P) is output. Furthermore, in step S84, the value of the parameter a is reset to 0. The process then proceeds to step S85. In step S85, the value of the parameter P is incremented by 1, and the process proceeds to step S93.

In the case in which it is determined in step S86 that Sig(n−1) is equal to −1, the process proceeds to step S87. In step S87, the feature extractor 112 of the terminal B sets the value of Tv+(P) to b*Tclk. Then in step S88, the feature extractor 112 of the terminal B outputs Tv+(P) and, in step S86, resets the value of the parameter b to 0. Thereafter, the process proceeds to step S93.

Figure 20:
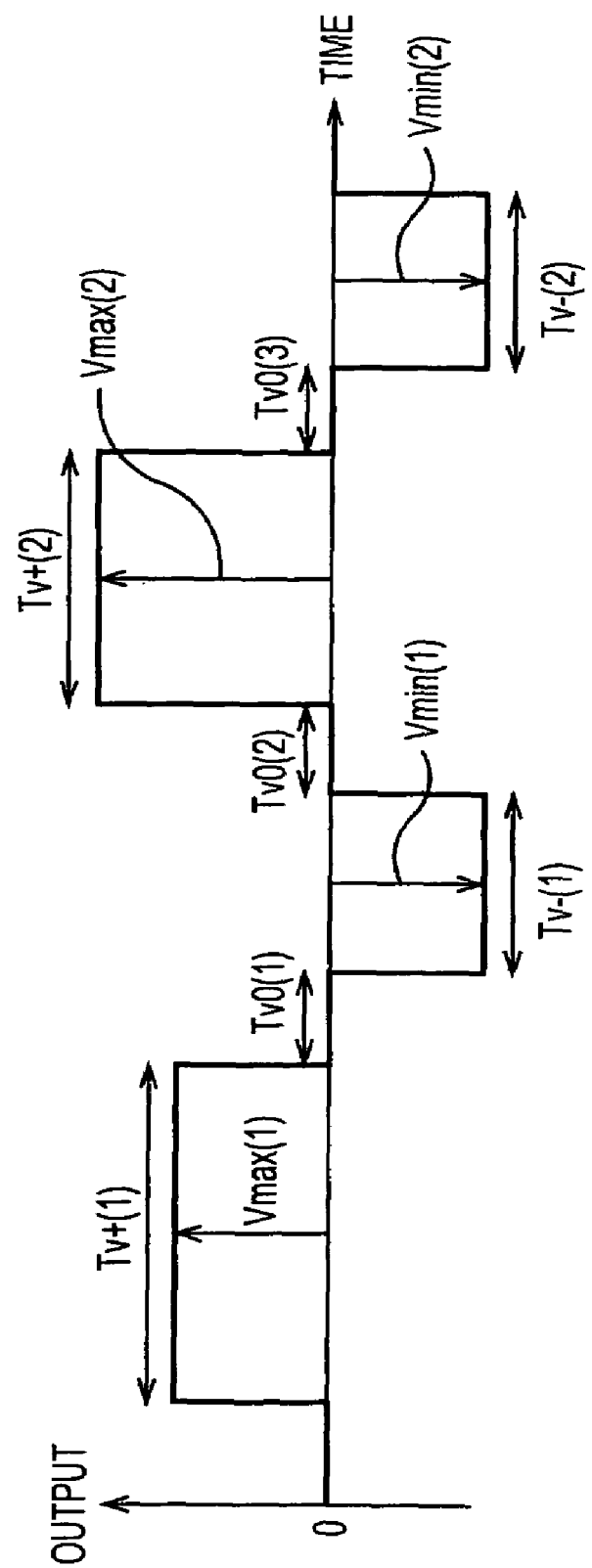
FIG. 20 is a diagram showing an example of information obtained via the Tv generation process and the Vmin/Vmax detection process.

Thus, in the above iteration loop, the value of a is incremented when the waveform is detected to be negative in polarity, while the value of b is incremented when the waveform is detected to be positive in polarity. When the waveform is detected to be 0, the value of c is incremented. When a transition occurs in polarity of the waveform, a, b, or c is multiplied by the sampling interval Tclk. Thus, as shown in FIG. 20, periods during which the waveform is positive are given as Tv+(1), Tv+(2), and so on, and periods during which the output level of the waveform is within the range from −Vth0 to +Vth0 are given as Tv0(1), Tv0(2), Tv0(3), and so on. Periods during which the waveform is negative are given as Tv−(1), Tv−(2), and so on.

Now, referring to FIG. 18, the Vmin/Vmax detection process is described below. First, in step S111, the feature extractor 112 of the terminal B sets a parameter n to 2 and a parameter P to 1. Then in step S112, the feature extractor 112 reads Vs(n). In step S113, the feature extractor 112 determines whether Vs(n) exists. If it is determined that Vs(n) does not exit, the process is ended. In the case in which it is determined in step S113 that Vs(n) exists, the process proceeds to step S114. In step S114, the feature extractor 112 of the terminal B the feature extractor 112 reads Vs(n−1), and, in step S115, sets the value of Vs(n)−Vs(n−1) into ΔVs (n−1). In step S116, the value of ΔVs (n−1) is stored.

In step S117, the feature extractor 112 of the terminal B determines whether ΔVs(n−1) is smaller than 0. If it is determined that ΔVs(n−1) is smaller than 0, then, in step S118, the feature extractor 112 sets ΔVSig(n) to −1. If it is determined in step S117 that ΔVs(n−1) is not smaller than 0, then the process proceeds to step S119. In step S119. ΔVSig(n) to 1 The process then proceeds to step S120. In step S120, it is determined whether ΔVSig(n−1) exists. If it is determined that ΔVSig(n−1) does not exit, the process proceeds to step S127. In step S127, the value of n is incremented by 1. Thereafter, the process returns to step S112.

In the case in which it is determined in step S120 that ΔVSig(n−1) exists, the process proceeds to step S121. In step S121, the feature extractor 112 of the terminal B reads ΔVSig (n−1). In step S122, the feature extractor 112 determines whether ΔVSig(n) and ΔVSig(n−1) are equal in value to each other. If it is determined that ΔVSig(n) and ΔVSig(n−1) are not equal in value to each other, the process proceeds to step S123. In step S123, the feature extractor 112 determines whether Vs(n) is smaller than Vth0. If it is determined that Vs(n) is not smaller than Vth0, the process proceeds to step S125. In step S125, Vmax(P) is set to be equal to Vs(n−1) and Vmax(P) is output. The value of P is then incremented by 1 and the process proceeds to step S127.

If it is determined in step S122 that ΔVSig(n) and ΔVSig (n−1) are equal in value to each other, the feature extractor 112 of the terminal B advances the process to step S127.

In the case in which it is determined in step S123 that Vs(n) is smaller than Vth0, then the process proceeds to step S124. In step S124, the feature extractor 112 of the terminal B sets the value of Vmin(P) to be equal to the value of Vs(n−1) and outputs Vmin(P). Thereafter, the process proceeds to step S127.

Thus, as shown in FIG. 20, peak values Vmax(1) and Vmax(2) in respective periods Tv+(1) and Tv+(2) of the waveform 221 are obtained, and similarly, peak values Vmin (1) and Vmin(2) in respective periods Tv−(1) and Tv−(2) of the waveform 221 are obtained.

Referring again to FIG. 15, in step S35, the feature extractor 112 of the terminal B sets the value of the parameter P to 1. In step S36, the feature extractor 112 of the terminal B determines whether Tv+(P) or Tv−(P) exists. If it is determined that Tv+(P) or Tv−(P) exists, the process proceeds to step S37. In step S37, the value of Tv+(P) is set into Tppg+(P), and, in step S38, the value of Tv−(P) is set into Tpp−(P). Furthermore, in step S39, the feature extractor 112 of the terminal B sets the sum of Tppg+(P) and Tppg−(P) into Tppgi (P). Then in step S40, the value of the parameter P is incremented by 1. Then the process returns to step S36, and the above-described process is repeated.

For example, when P is set to 3 after Tv+(1), Tv+(2), Tv−(1), and Tv−(2) have been obtained as a result of outputting Tv in step S33, it is determined in step S36 that Tv+(P) or Tv−(P) does not exist. In this case, in step S41, the feature extractor 112 of the terminal B calculates the mean value of each of Tppg+, Tppg−, and Tppgi as Tppg+m, Tppg−m, and Tppgim as follows: Tppg+m=(Tppg+(1)+Tppg+(2))/2, Tppg−m=(Tppg−(1)+Tppg−(2))/2, and Tppgim=(Tppgi(1)+Tppgi(2))/2.

In the next step S42, the feature extractor 112 of the terminal B sets the value of the parameter P to 1. Then, in step S43, the feature extractor 112 of the terminal B determines whether Vmax(P) or Vmin(P) exists. If it is determined that Vmax(P) or Vmin(P) exists, then, in step S44, the value of Vmax(P) is set into Appg+(P), and furthermore in step S45 the value of Vmin(P) is set into Appg−(P). Then, in step S46, the value of the parameter P is incremented by 1. Then the process returns to step S43, and the above-described process is repeated.

After Vmax(1), Vmax(2), Vmin(1), and Vmin(2) have been obtained as a result of the Vmin/Vmax detection process in step S34, when the value of the parameter P is set to 3, it is determined in step S43 that Vmax(P) or Vmin(P) does not exist. In this case, in step S47, the feature extractor 112 of the terminal B calculates the mean values of Appg+ and Appg− as Appg+m and Appg−m as follows:

$Appg+m=(Appg+(1)+Appg+(2))/2$ and $Appg-m=(Appg-(1)+Appg-(2))/2.$

Then in step S48, the feature extractor 112 of the terminal B generates a feature value vector Vc1(Tppg+m, Tppg−m, Tppgim, Appg+m, Appg−m).

Figure 25:
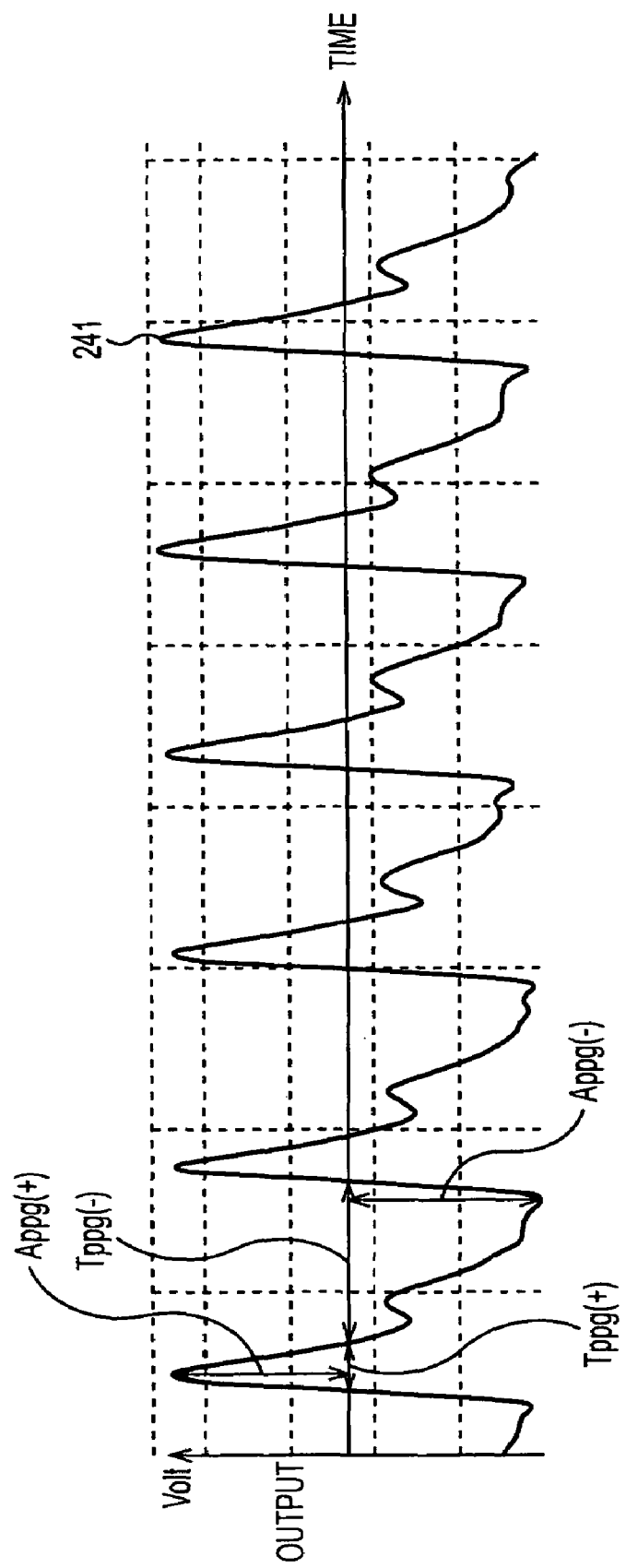
FIG. 25 is a graph showing an example of a pulse information waveform.

FIG. 25 shows an example of a pulse waveform 241. In FIG. 25, Tppg+ denotes a period of time during which the output of the waveform 241 is positive, Tppg− a period of time during which the output of the waveform 241 is negative, Tppgi a period of time of one pulse, Appg+ a peak value of the pulse waveform in the period of Tppg+, and Appg− a peak value of the pulse waveform in the period of Tppg−.

In the above-described manner, the feature vector Vc1 of pulse information corresponding to a low-level interest of the user a is generated.

Figure 21:
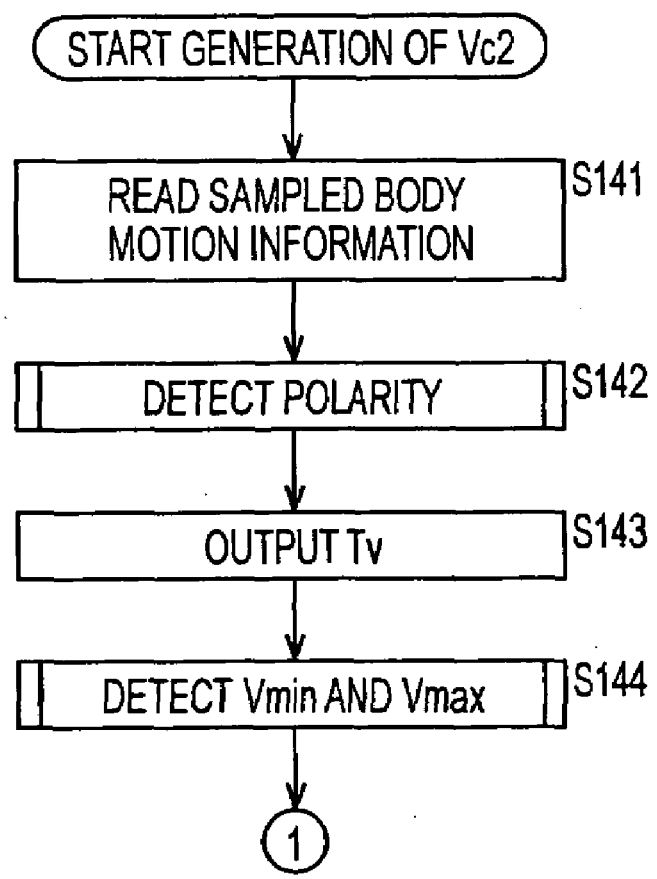
FIG. 21 is a flow chart showing a process of generating a feature value vector Vc2.
Figure 22:
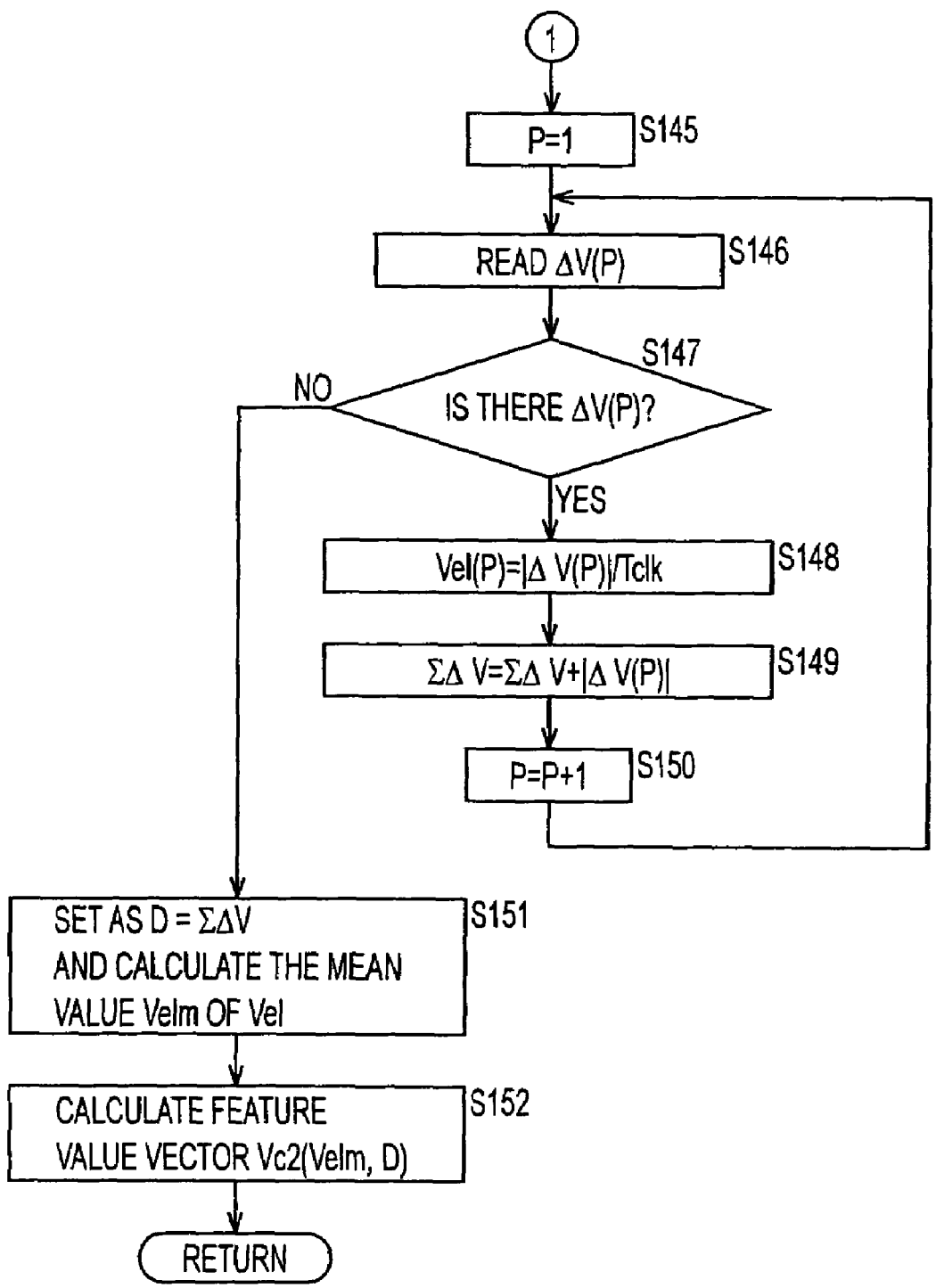
FIG. 22 is a flow chart showing a remaining part of the process of generating the feature value vector Vc2.

Referring to FIG. 21, the process of generating a feature vector Vc2 of body motion information of the user a is described below.

In step S141, the feature extractor 112 of the terminal B reads sampled body motion information. Then in step S142, the feature extractor 112 of the terminal B performs the polarity detection process described above with reference to FIG. 16, then in step S143 the Tv generation process described above with reference to FIG. 17, and furthermore in step S144, the Vmin/Vmax detection process. Then in step S145, the feature extractor 112 of the terminal B sets the value of the parameter P to 1. In step S146, the feature extractor 112 of the terminal B reads the values of ΔV stored in the Vmax/Vmin detection process (step S116 shown in FIG. 18).

Figure 26:
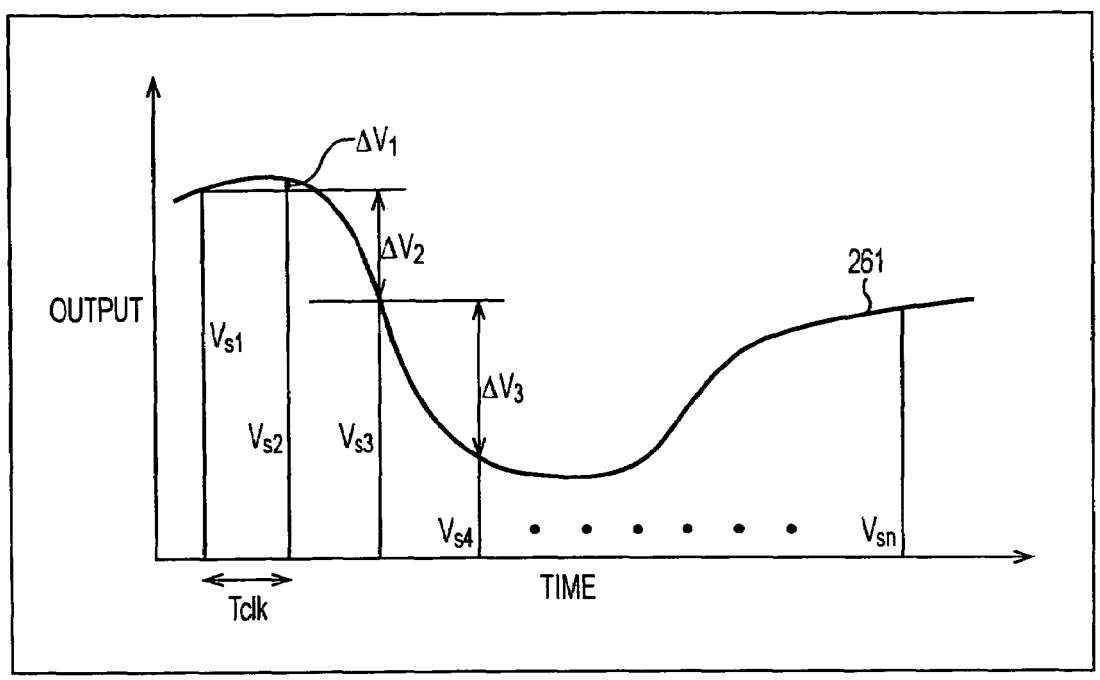
FIG. 26 is a graph showing an example of a body motion information waveform.

FIG. 26 shows an example of a waveform 261 of body motion information. In reading of ΔV(P), ΔV1 is read when P=1 and ΔV2 is read when P=2. In step S147, the feature extractor 112 of the terminal B determines whether ΔV(P) exists. If it is determined that ΔV(P) exists, then, in step S148, the feature extractor 112 of the terminal B sets the value of |ΔV(P)|/Tclk into Vel(P), and then in step S149 the value of ΣΔV+|ΔV(P)| into ΣΔV. Thereafter, in step S150, the feature extractor 112 of the terminal B increments the value of P by 1 and returns the flow to step S146 to repeat the above-described process.

Because the ΔV(P) represents the distance the user a moves in the period of time Tclk, the Vel(P) indicates the speed at which the user a moves and ΣΔV indicates the total distance the user a moves.

If it is determined in step S147 that ΔV(P) does not exist, then, in step S151, the feature extractor 112 of the terminal B sets the value of ΣΔV into D and calculates the mean value Velm of the speed Vel. Then, in step S152, the feature extractor 112 of the terminal B generates a feature vector Vc2(Velm, D).

In the above-described manner, a feature vector Vc2 of body motion information corresponding to a low-level interest of the user a is generated.

Figure 27:
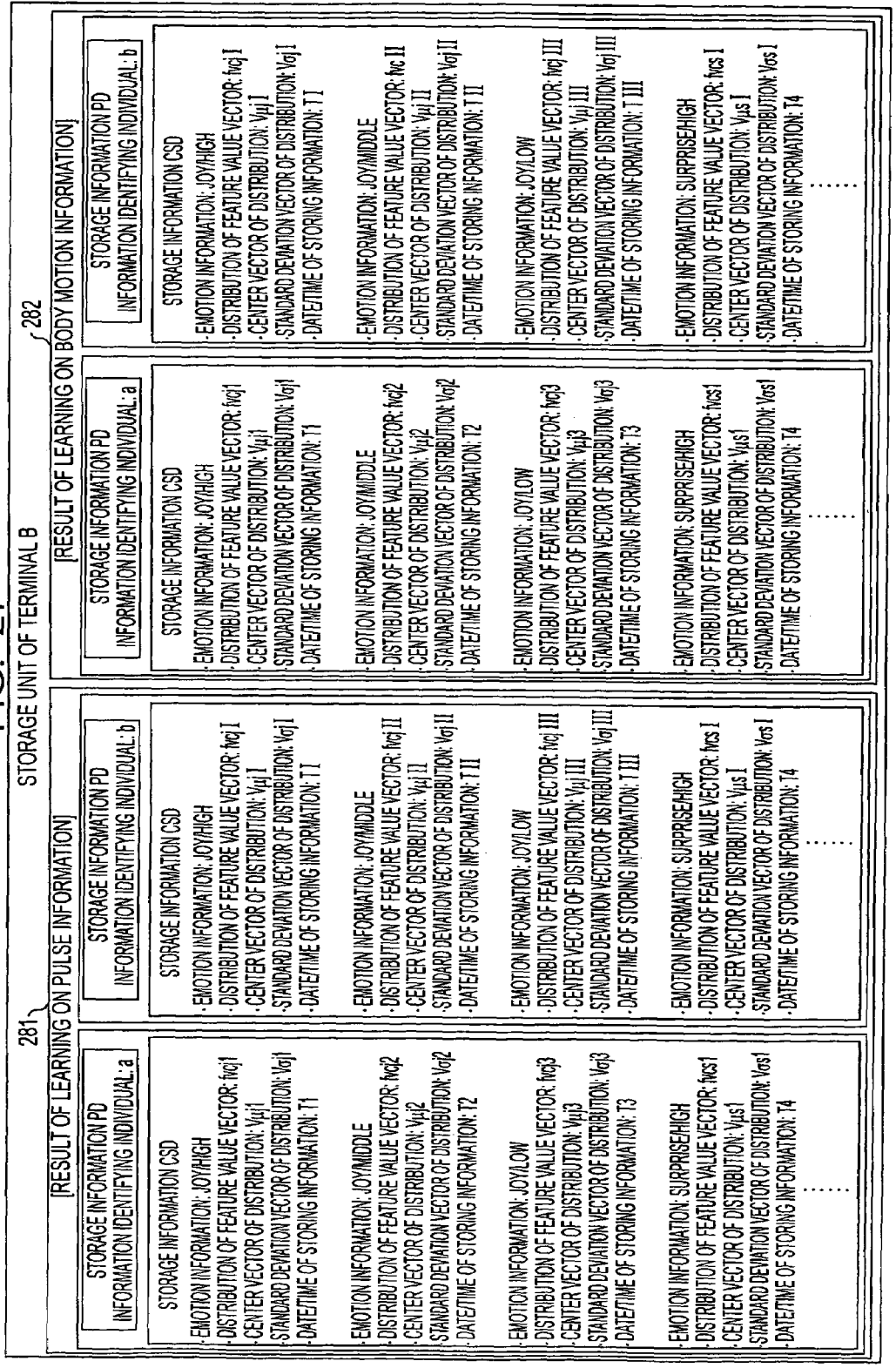
FIG. 27 is a diagram showing an example of information stored in a storage unit of a terminal B.

Thus, the terminal B generates feature value vectors Vc1 and Vc2 from pulse information and body motion information of the user a transmitted from the terminal A and the terminal B stores the generated feature value vectors Vc1 and Vc2. Similarly, the terminal B generates feature value vectors from pulse information and body motion information of the user b and stores the generated feature value vectors. As a result, as shown in FIG. 27, a learning result 281 associated with pulse information and a learning result 282 associated with body motion information are stored in the storage unit 95 of the terminal B, for the user a and the user b, separately.

Similarly, the terminal A stores learning results associated with pulse information and body motion information of the user a and the user b, separately.

Once a sufficient amount of vital sign information has been stored as a result of a repetition of above-described vital sign information storage process, it becomes possible to identify the emotion/state and the level of each user from vital sign information.

Figure 28:
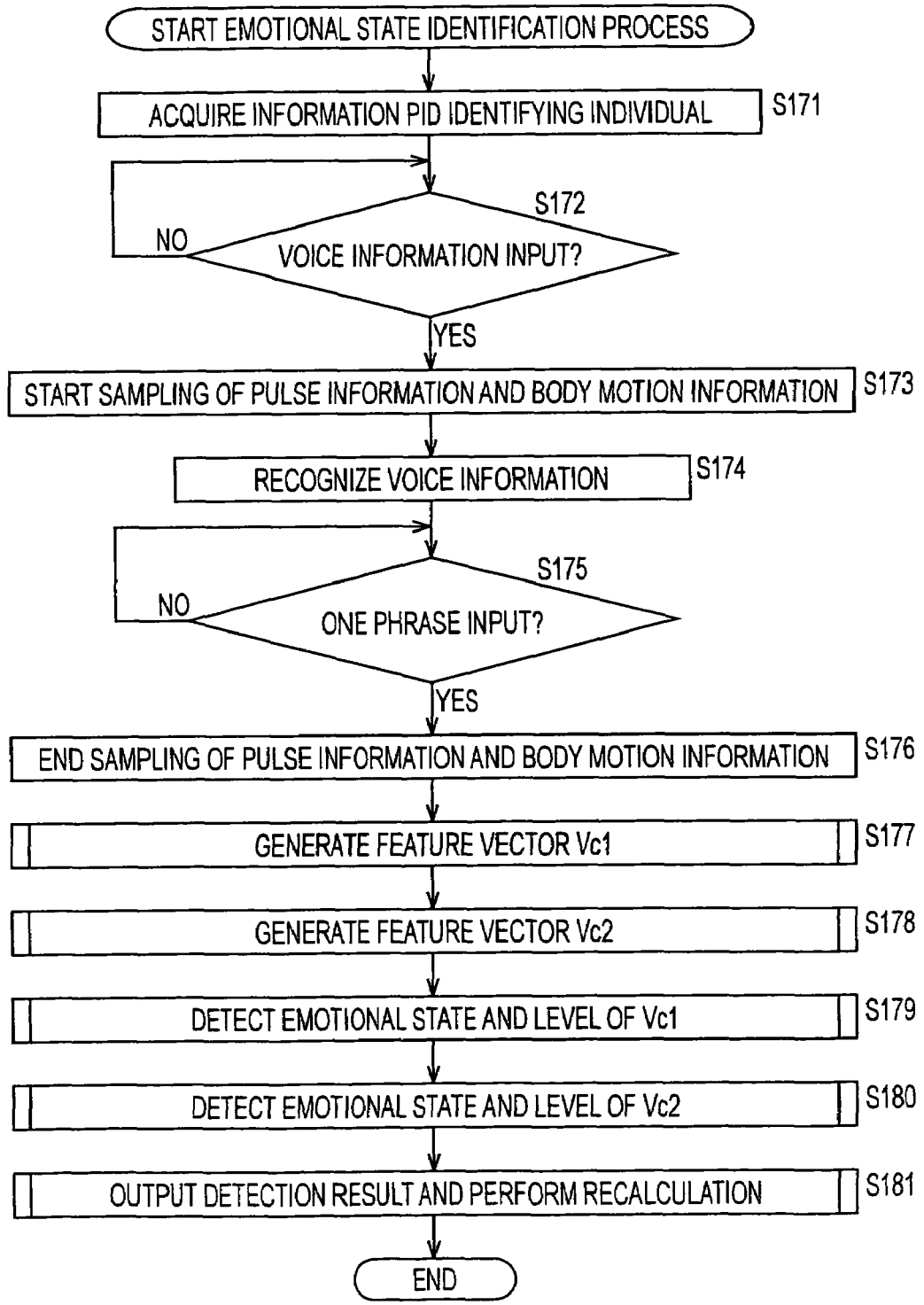
FIG. 28 is a flow chart showing an emotion/state identification process.

Referring to FIG. 28, a process performed by the terminal B to identify an emotional state is described below.

First, in step S171, at the start of communication with the terminal A, the system controller 97 of the terminal B acquires information PID identifying the user a of the terminal A with which to communicate. In step S172, the system controller 97 of the terminal B commands, the information discriminator 111 to determine whether voice information of the user a is received from terminal A. If voice information is not yet received, the process waits until voice information is received. If it is determined that voice information is input, then, in step S173, the system controller 97 of the terminal B commands the feature extractor 112 to start sampling of pulse information and body motion information of a user a. Then in step S174, the system controller 97 of the terminal B commands the meaning extractor 113 to recognize the voice.

In step S175, the system controller 97 of the terminal B determines whether one phrase of voice of the user a has been input. If one phrase of voice has not yet been input, the system controller 897 waits until one phrase of voice is input.

If it is determined in step S175 that one phrase has been input, then, in step S176, the system controller 97 of the terminal B commands the feature extractor 112 to end the sampling of pulse information and body motion information.

The sampling of pulse information and body motion information may be performed by the feature extractor 112 of the terminal A and the sampled information may be transmitted to the terminal B.

In step S177, the system controller 97 of the terminal B commands the feature extractor 112 to generate a feature vector Vc1 on the basis of pulse information of the user a. In step 178, the system controller 97 of the terminal B commands the feature extractor 112 to generate a feature vector Vc2 on the basis of body motion information of the user a. In step S179, the system controller 97 of the terminal B commands the learning unit 94 to identify the emotional state of Vc1 and the level thereof. In step S180, the system controller 97 of the terminal B commands the learning unit 94 to identify the emotional state of Vc2 and the level thereof. In step S181, the system controller 97 of the terminal B commands the learning unit 94 to output the identification result and perform a recalculation.

Figure 29:
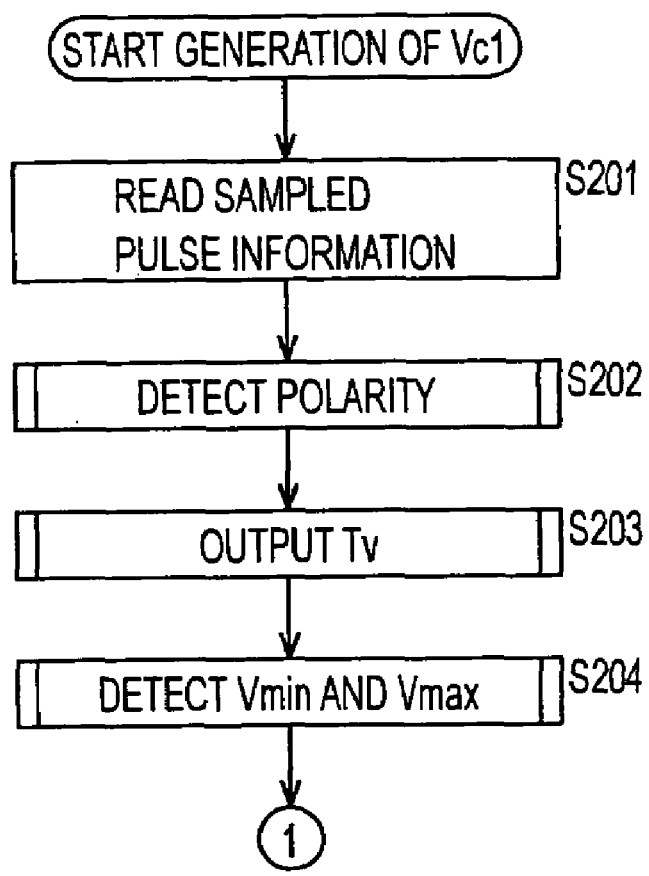
FIG. 29 is a flow chart showing a process of generating a feature value vector Vc1.

Now, referring to FIGS. 29 and 30, the process of generating the feature vector Vc1 of pulse information is described below. This process is performed by the feature extractor 112 of the terminal B. In step S201, the feature extractor 112 of the terminal B reads sampled pulse information. In step S202, the feature extractor 112 of the terminal B performs the polarity detection process described above with reference to FIG. 16, and, in step S203, the Tv generation process described above with reference to FIG. 17, and furthermore in step S204 the Vmin/Vmax detection process described above with reference to FIG. 18.

Figure 30:
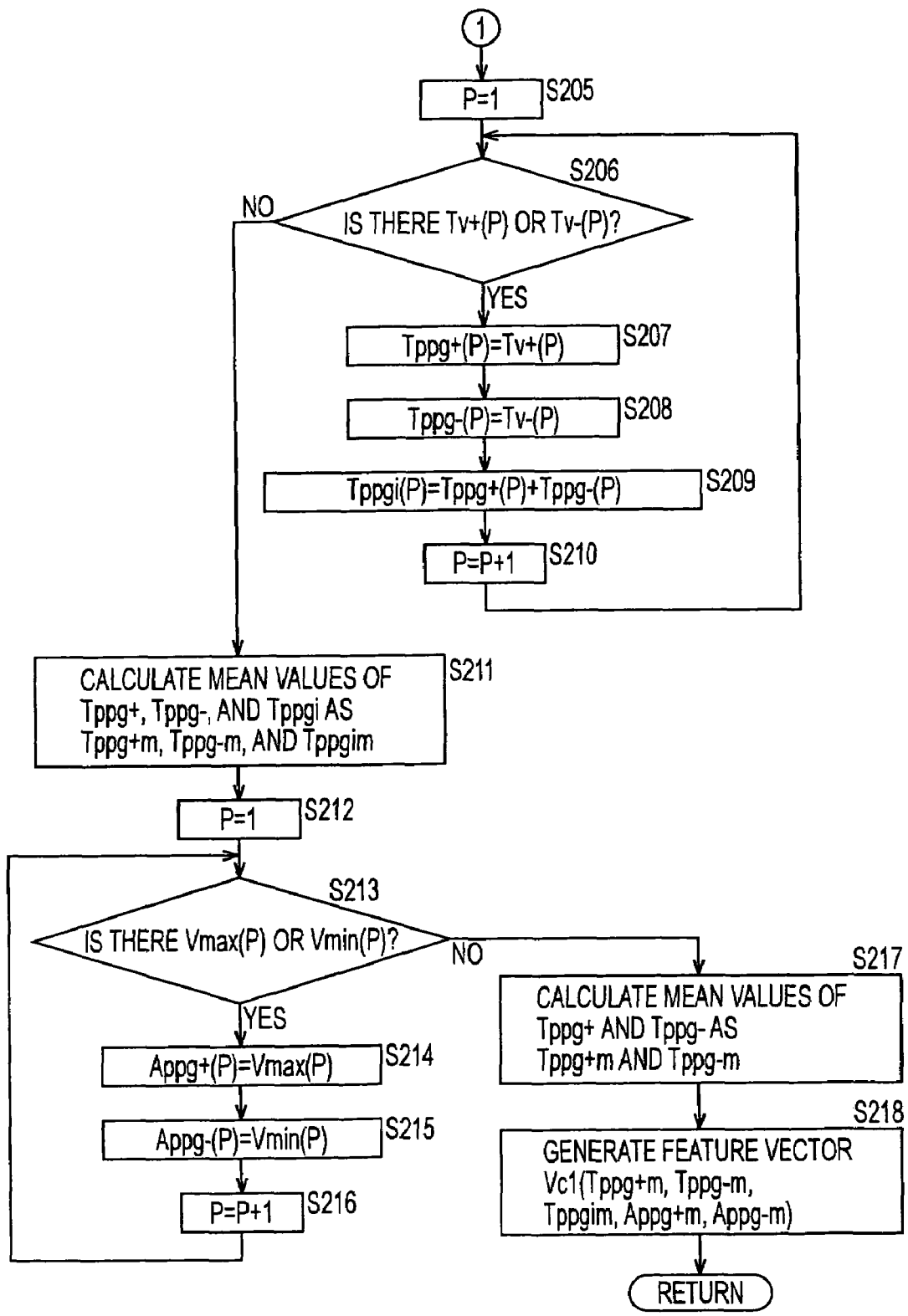
FIG. 30 is a flow chart showing a remaining part of the process of generating the feature value vector Vc1.

In step S205 shown in FIG. 30, the feature extractor 112 of the terminal B sets the value of the parameter P to 1. In step S206, the feature extractor 112 of the terminal B determines whether Tv+(P) or Tv−(P) exists. If it is determined that Tv+(P) or Tv−(P) exists, the process then proceeds to step S207. In step S207, the value of Tv+(P) is set into Tppg+(P). In step S208, the value of Tv−(P) is set into Tppg−(P). In step S209, the feature extractor 112 of the terminal B sets the sum of Tppg+(P) and Tppg−(P) into Tppgi(P). Then in step S210, the value of the parameter P is incremented by 1. Thereafter, the flow returns to step S206, and the above-described process is repeated.

If it is determined in step S206 that Tv+(P) or Tv−(P) does not exist, the process jumps to step S211. In step S211, the feature extractor 112 of the terminal B calculates the mean value of each of Tppg+, Tppg−, and Tppgi as Tppg+m, Tppg−m, and Tppgim, respectively.

In the next step S212, the feature extractor 112 of the terminal B sets the value of the parameter P to 1. In step S213, the feature extractor 112 of the terminal B determines whether Vmax(P) or Vmin(P) exists. If it is determined that Vmax(P) or Vmin(P) exists, the process proceeds to step S214. In step S214, the value of Vmax(P) is set into Appg+(P), and, in step S215, the value of Vmin(P) is set into Appg−(P). Then in step S216, the value of the parameter P is incremented by 1. Thereafter, the flow returns to step S213, and the above-described process is repeated.

If it is determined in step S213 that Vmax(P) or Vmin(P) does not exist, the process proceeds to step S217. In step S217, the feature extractor 112 of the terminal B calculates the mean value of each of Appg+ and Appg− as Appg+m and Appg−m, respectively.

Then in step S218, the feature extractor 112 of the terminal B generates a feature value vector Vc1(Tppg+m, Tppg−m, Tppgim, Appg+m, Appg−m).

In the above-described manner, the feature vector Vc1 of pulse information of the user a is generated.

Figure 31:
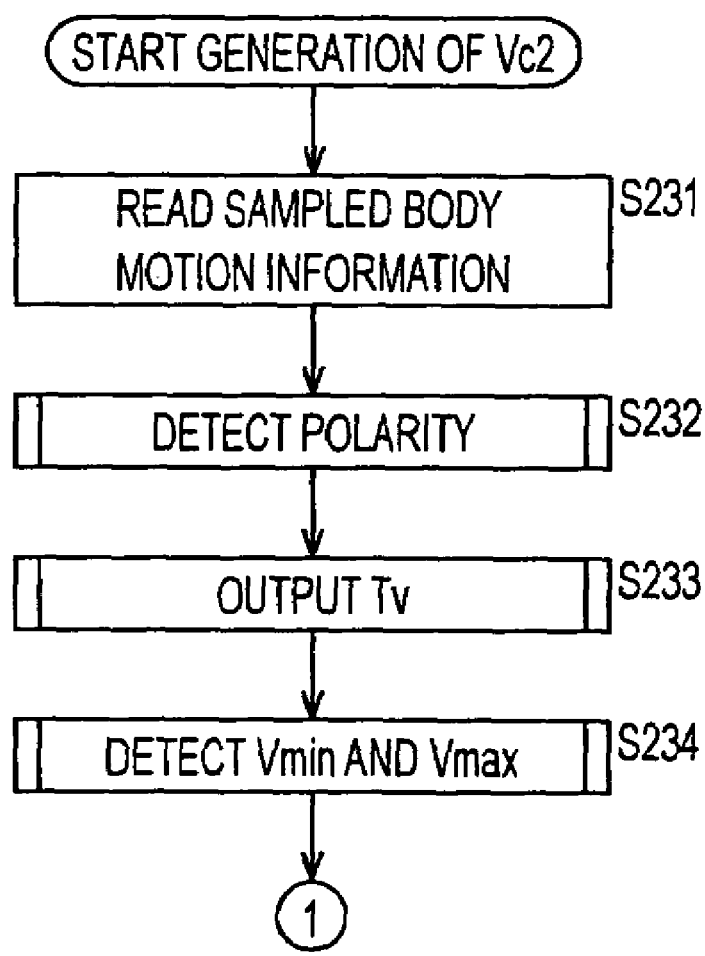
FIG. 31 is a flow chart showing a process of generating a feature value vector Vc2.
Figure 32:
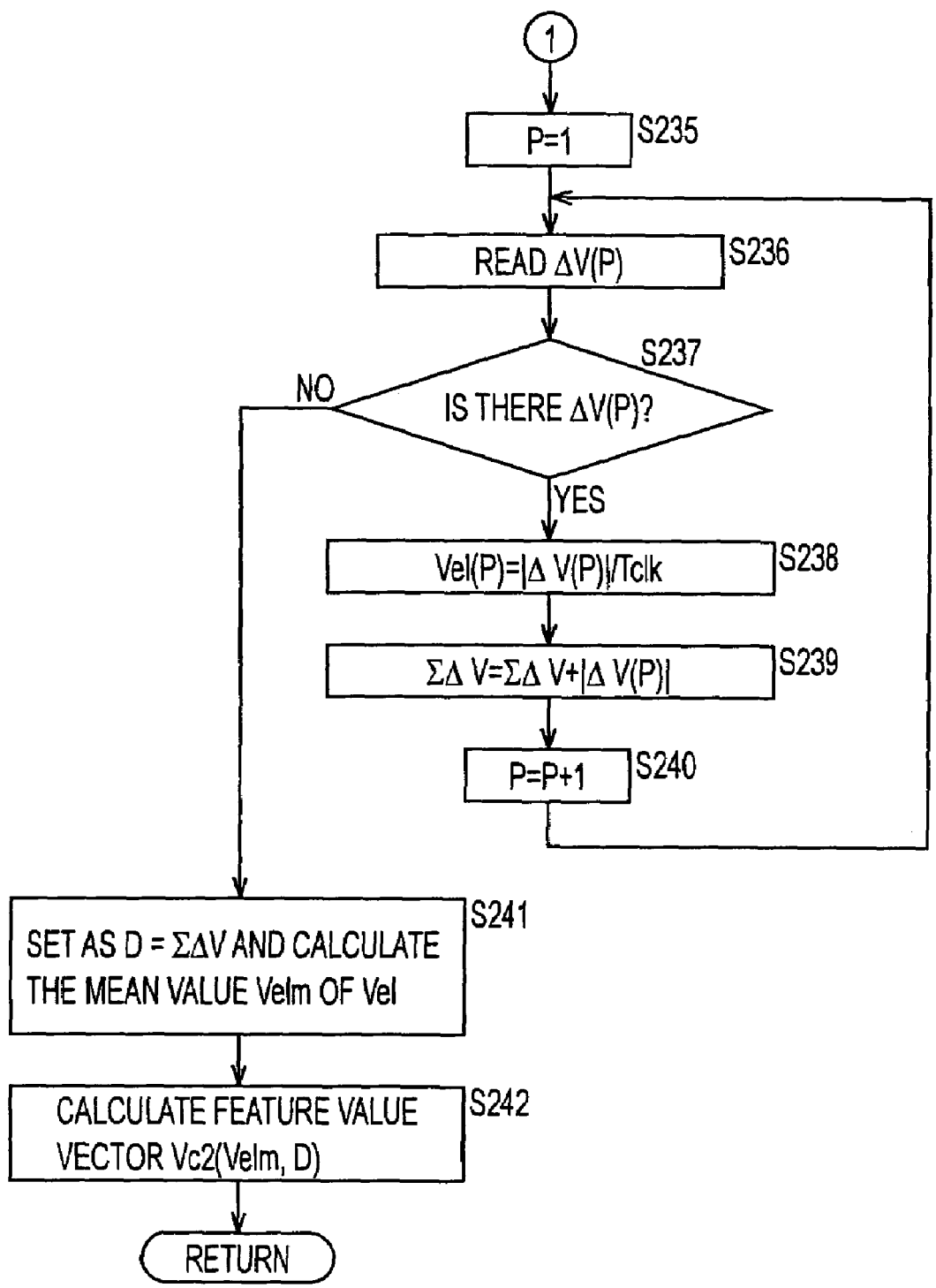
FIG. 32 is a flow chart showing a remaining part of the process of generating the feature value vector Vc2.

Now, referring to FIG. 31, the process of generating a feature vector Vc2 of body motion information of the user a is described below.

In step S231, the feature extractor 112 of the terminal B reads sampled body motion information. In step S232, the feature extractor 232 of the terminal B performs the polarity detection process described above with reference to FIG. 16, and, in step S233, the Tv generation process described above with reference to FIG. 17, and furthermore in step S234, the Vmin/Vmax detection process described above with reference to FIG. 18. Then in step S235, the feature extractor 112 of the terminal B and a parameter P to 1. In step S236, the feature extractor 112 of the terminal B reads the values of $\Delta V$ stored in the Vmax/Vmin detection process (step S116 shown in FIG. 18).

In step S237, the feature extractor 112 of the terminal B determines whether $\Delta V(P)$ exists. If it is determined that $\Delta V(P)$ exists, then, in step S238, the feature extractor 112 of the terminal B sets the value of $|\Delta V(P)|/Tclk$ into Vel(P), and furthermore, in step S239, the value of $\Sigma \Delta V + |\Delta V(P)|$ into $\Sigma \Delta V$. Thereafter, in step S240, the feature extractor 112 of the terminal B increments the value of P by 1 and returns the flow to step S236 to repeat the above-described process.

If it is determined in step S237 that $\Delta V(P)$ does not exist, the process proceeds to step S241. In step S241, the feature extractor 112 of the terminal B sets the value of $\Sigma \Delta V$ into D and calculates the mean value Velm of Vel. Then in step S252, the feature extractor 112 of the terminal B generates a feature vector Vc2(Velm, D).

In the above-described manner, the feature vector Vc2 of body motion information of the user a is generated.

Figure 33:
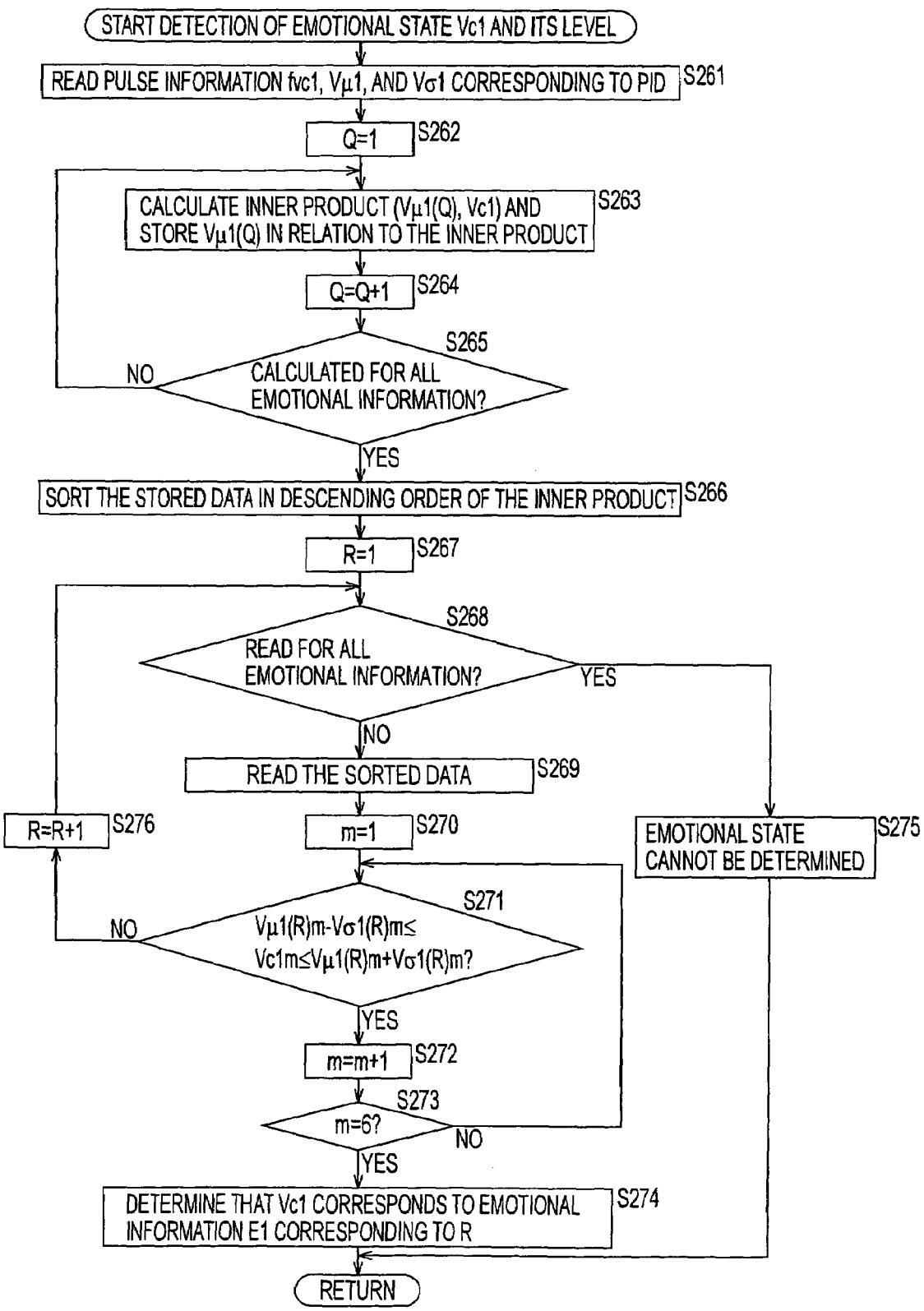
FIG. 33 is a flow chart showing a process of identifying the emotion/state and the strength level of Vc1.

Now, referring to FIG. 33, a process of identifying the emotional state and the level of Vc1 is described below. This process is performed by the learning unit 94 of the terminal B.

In step S261, the learning unit 94 of the terminal B reads, from the storage unit 95, the feature value vector distribution fvc1, the distribution center vector $V\mu 1$, and the distribution standard deviation vector $V\sigma 1$ associated with pulse information of the user a.

As described above, the emotion/state is classified into twelve kinds, as shown in Table 1, and each kind of emotion/state is divided into three strength levels: high level, middle level, and low level. Therefore, there are a total of 36 kinds of emotion information. Thus, there are 36 feature value vector distributions fvc1, 36 distribution center vectors $V\mu 1$, and 36 distribution standard deviation vectors $V\sigma 1$ corresponding to the respective 36 kinds of emotion information.

In step S262, the learning unit 94 of the terminal B sets a parameter Q to 1. Then in step S263, the learning unit 94 of the terminal B calculates the inner product of the vector $V\mu 1(Q)$ and the feature value vector Vc1 calculated in step S177 (in FIG. 28), and stores $V\mu 1(Q)$ in relation to the inner product. Then in step S264, the learning unit 94 of the terminal B increments the value of Q by 1. In step 265, the learning unit 94 of the terminal B determines whether the calculation is completed for all kinds of the emotion information, that is, whether the calculation of the inner product is completed for all 36 center vectors $V\mu 1$. If it is determined that the inner product is not calculated for all kinds of the emotion information, the flow returns to step S263, and the above-described process is repeated.

When the calculation of the inner product is completed for all 36 center vectors $V\mu 1$ corresponding to the respective kinds of emotion information, data is stored as shown in FIG. 34 in the storage unit (not shown) in the learning unit 94 of the terminal B. In step S266, the learning unit 94 of the terminal B sorts the data in descending order of inner product.

In step S267, the learning unit 94 of the terminal B sets a parameter R to 1. In step S268, the learning unit 94 of the terminal B determines whether data associated with all kinds of the emotion information are read. If it is determined that data associated with all kinds of the emotion information are not read, the process proceeds to step S269. In step S269, the sorted data is read. In the example shown in Table 2, a center vector $V\mu 1$-29 of a feature value vector corresponding to a "middle-level stable state" has a greatest inner product, and thus data corresponding to the center vector $V\mu 1$-29 is first read.

In step S270, the learning unit 94 of the terminal B sets a parameter m to 1. Then in step S271, the learning unit 94 of the terminal B determines whether the condition $V\mu 1(R)m - V\sigma 1(R)m \leq Vc1m \leq V\mu 1(R)m + V\sigma 1(R)m$ is satisfied, wherein $V\mu 1(R)m$ denotes an mth component of the vector $V\mu 1(R)$, and $V\sigma 1(R)m$ and Vc1m respectively denote mth components of vectors $V\sigma 1$ and Vc1. As described above, the feature value vector of pulse information includes following five components: Tppg+m, Tppg−m, Tppgim, Appg+m, and Appg−m. When m=1, the component Tppg+m is extracted from each of vectors $V\mu 1(R)$, $V\sigma 1(R)$, Vc1 and subjected to the process.

If it is determined in step S271 that the condition $V\mu 1(R)m - V\sigma 1(R)m \leq Vc1m \leq V\mu 1(R)m + V\sigma 1(R)m$ is not satisfied, then, in step S276, the learning unit 94 of the terminal B increments the value of R by 1 and returns the flow to step S268 to repeat the above-described process. If it is determined in step S271 that the condition $V\mu 1(R)m - V\sigma 1(R)m \leq Vc1m \leq V\mu 1(R)m + V\sigma 1(R)m$ is satisfied, then, in step S272, the learning unit 94 of the terminal B increments the value of m by 1 and advances the process to step S273. In step S273, the learning unit 94 of the terminal B determines whether m is equal to 6. If it is determined that m is not equal to 6, the flow returns to step S271 to repeat the above-described process.

If it is determined in step S273 that m is equal to 6, that is, if it is determined that the condition $V\mu 1(R)m - V\sigma 1(R)m \leq Vchm \leq V\mu 1(R)m + V\sigma 1(R)m$ is satisfied for all five components of respective vectors $V\mu 1(R)$, $V\sigma 1(R)$, and Vcc, the process proceeds to step S274. In step S274, the learning unit 94 of the terminal B determines that Vc1 belongs to emotion information E1 corresponding to R. When R=1, the emotion information E1 corresponding to R is a "middle-level stable state".

If it is determined in step S268 that data associated with all kinds of the emotion information are read, the learning unit 94 of the terminal B determines that the emotion/state and the level of Vc1 cannot be identified, and ends the process.

Figure 35:
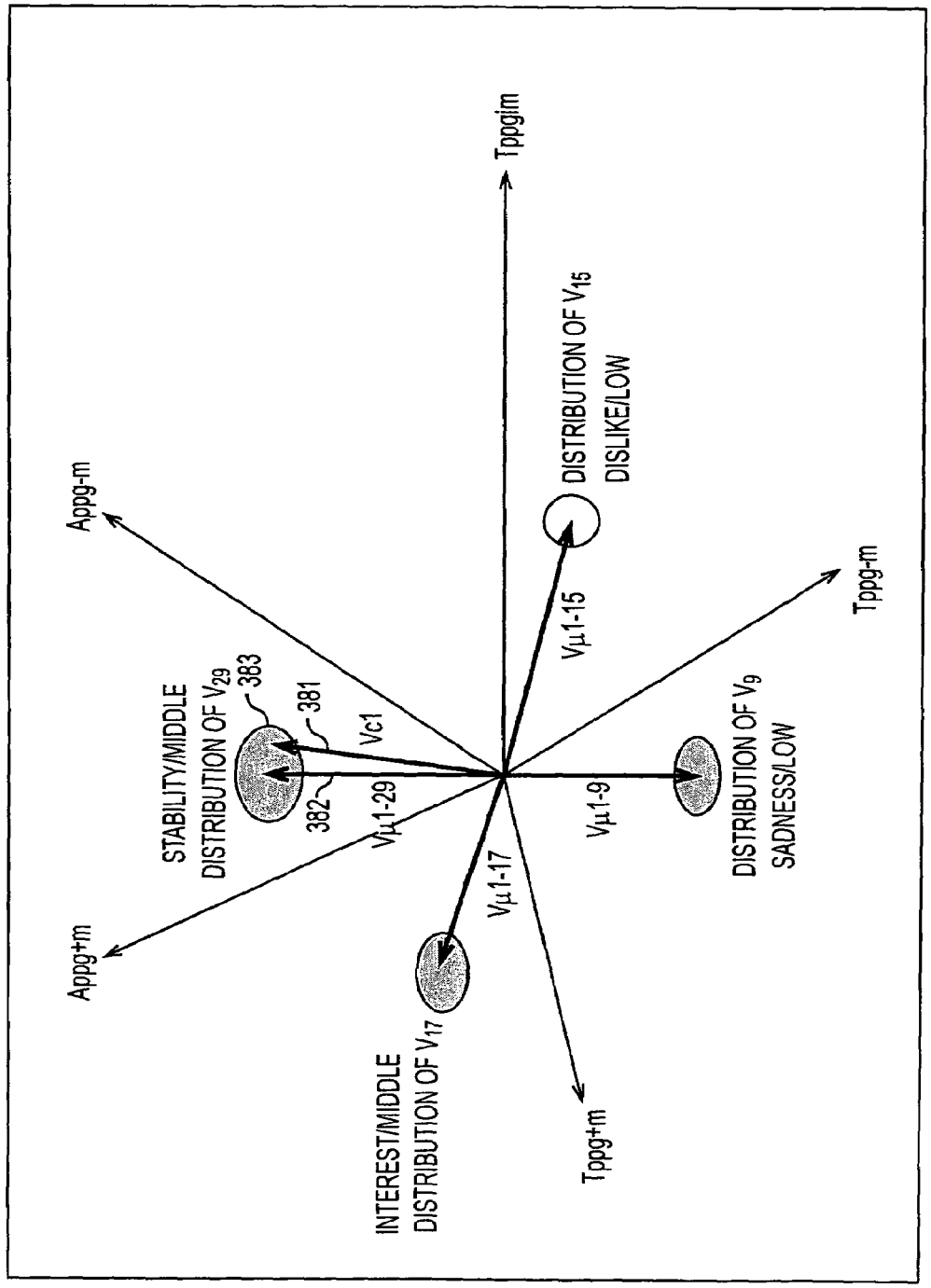
FIG. 35 is a diagram showing Vc1 and distributions of various vectors.

FIG. 35 shows examples of feature vectors of pulse information corresponding to some kinds of emotion information of the user a. In this figure, feature vectors are plotted in a 5-dimensional space including a Tppg+m axis, a Tppg−m axis, a Tppgim axis, an Appg+m axis, and an Appg−m axis. The feature value vector 381 (Vc1) generated in step S177 in FIG. 28 is close to a center vector 382 (Vμ1-29) of a feature value vector distribution 383 corresponding to the "middle-level stable state", and thus as a result of the process of identifying the emotion/state and the level of the Vc1, the feature value vector 381 (Vc1) is identified as a feature value vector corresponding to the "middle-level stable state".

Figure 36:
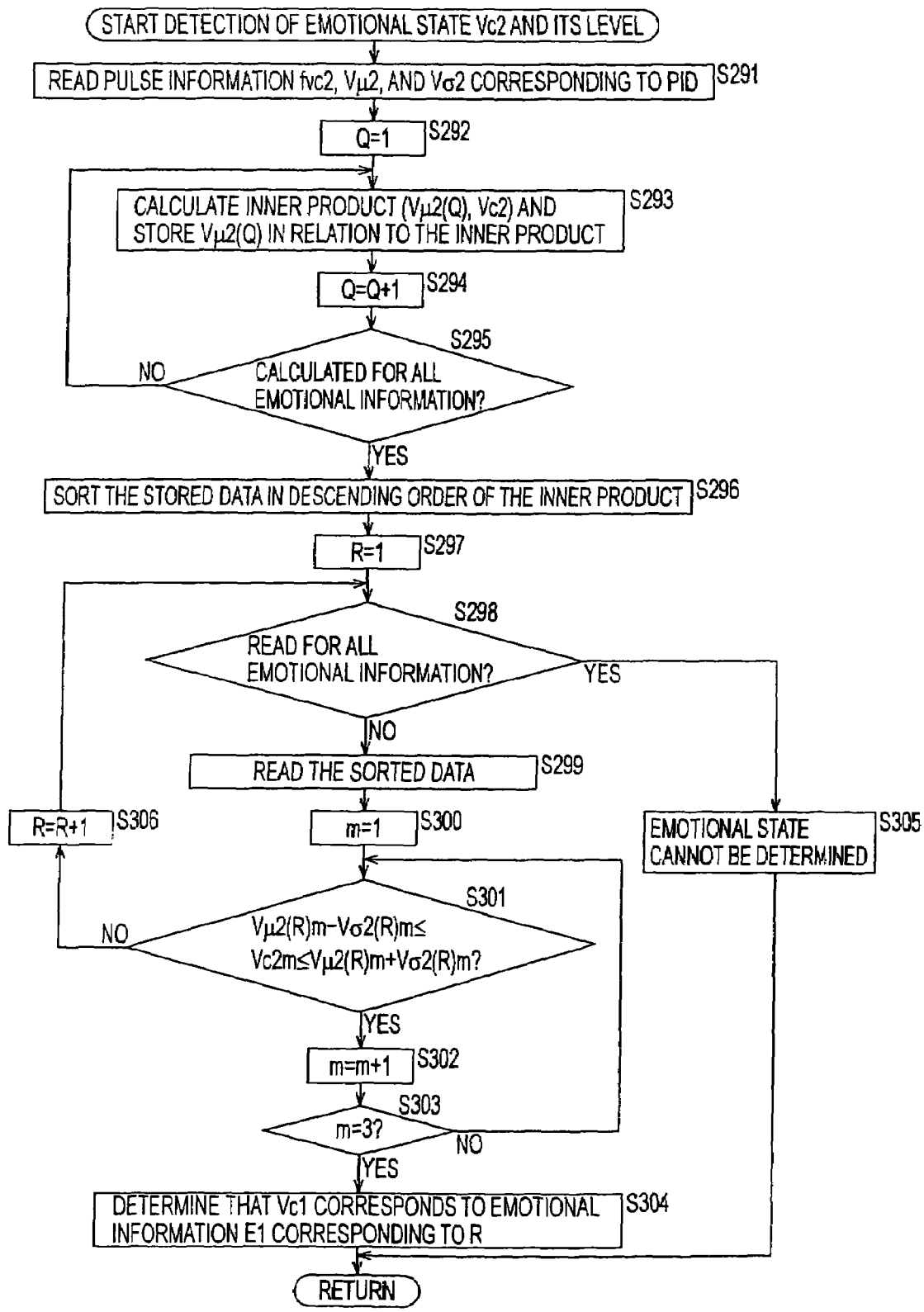
FIG. 36 is a flow chart showing a process of identifying the emotion/state and the strength level of Vc2.

Now, referring to FIG. 36, a process of identifying the emotional, the state, and the level of Vc2 is described below. This process is performed by the learning unit 94 of the terminal B.

In step S291, the learning unit 94 of the terminal B reads, from the storage unit 95, the feature value vector distribution fvc2, the distribution center vector Vμ2, and the distribution standard deviation vector Vσ2 associated with body motion information of the user a.

As described above, the emotion/state is classified into twelve kinds, as shown in Table 1, and each kind of emotion/state is divided into three strength levels: high level, middle level, and low level. Therefore, there are a total of 36 kinds of emotion information. Thus, there are 36 feature value vector distributions fvc2, 36 distribution center vectors Vμ2, and 36 distribution standard deviation vectors Vσ2 corresponding to the respective 36 kinds of emotion information.

In step S292, the learning unit 94 of the terminal B sets a parameter Q to 1. In step S293, the learning unit 94 of the terminal B calculates the inner product of the vector Vp2(Q) and the feature value vector Vc2 calculated in step S178 (in FIG. 28), and stores Vμ2(Q) in relation to the inner product. Then in step S294, the learning unit 94 of the terminal B increments the value of Q by 1. In step 295, the learning unit 94 of the terminal B determines whether the calculation is completed for all kinds of the emotion information, that is, whether the calculation of the inner product is completed for all 36 center vectors Vμ2. If it is determined that the inner product is not calculated for all kinds of the emotion information, the flow returns to step S293, and the above-described process is repeated.

When the calculation of the inner product is completed for all 36 center vectors Vμ2 corresponding to the respective kinds the emotion information, data is stored as shown in FIG. 37 in the storage unit (not shown) in the learning unit 94 of the terminal B. In step S296, the learning unit 94 of the terminal B sorts the data in descending order of inner product.

In step S297, the learning unit 94 of the terminal B sets the parameter R to 1. In step S298, the learning unit 94 of the terminal B determines whether data associated with all kinds of the emotion information are read. If it is determined that data associated with all kinds of the emotion information are not read, the process proceeds to step S299. In step S299, the sorted data is read. In the example shown in FIG. 37, a center vector Vμ2-29 of a feature value vector corresponding to a "middle-level stable state" has a greatest inner product, and thus data corresponding to the center vector Vμ2-29 is first read.

In step S270, the learning unit 94 of the terminal B sets the parameter m to 1. Then in step S271, the learning unit 94 of the terminal B determines whether the condition Vμ2(R)m−Vσ2(R)m≦Vc2m≦Vμ2(R)m+Vσ2(R)m is satisfied, wherein Vμ2(R)m denotes an mth component of the vector Vμ2(R), and Vσ2(R)m and Vc2m respectively denote mth components of vectors Vσ2 and Vc2. As described above, the feature value vector of body motion information includes two components Velm and D. When m=1, the Velm component of each of vectors Vμ2(R), Vσ2(R), and Vc2 is extracted and subjected to the process.

If it is determined in step S301 that the condition Vμ2(R)m−Vσ2(R)m≦Vc2m≦Vμ2(R)m+Vσ2(R)m is not satisfied, then, in step S306, the learning unit 94 of the terminal B increments the value of R by 1 and returns the flow to step S298 to repeat the above-described process. On the other hand, if it is determined in step S301 that the condition Vμ2(R)m−Vσ2(R)m≦Vc2m≦Vμ2(R)m+Vσ2(R)m is satisfied, then, in step S302, the learning unit 94 of the terminal B increments the value of m by 1 and advances the process to step S303. In step S303, the learning unit 94 of the terminal B determines whether m is equal to 3. If it is determined that m is not equal to 3, then the flow returns to step S301 to repeat the above-described process.

If it is determined in step S303 that m is equal to 3, that is, if it is determined that the condition Vμ2(R)m−Vσ2(R)m≦Vc2m≦Vμ2(R)m+Vσ2(R)m is satisfied for two components of respective vectors Vμ2(R), Vσ2(R), and Vc2, the process proceeds to step S274. In step S274, the learning unit 94 of the terminal B determines that Vc2 belongs to emotion information E2 corresponding to R. When R=1, the emotion information E2 corresponding to R is a "middle-level stable state".

If it is determined in step S298 that data associated with all kinds of emotion information are read, the learning unit 94 of the terminal B determines that the emotion/state and the level of Vc2 cannot be identified, and ends the process.

Figure 38:
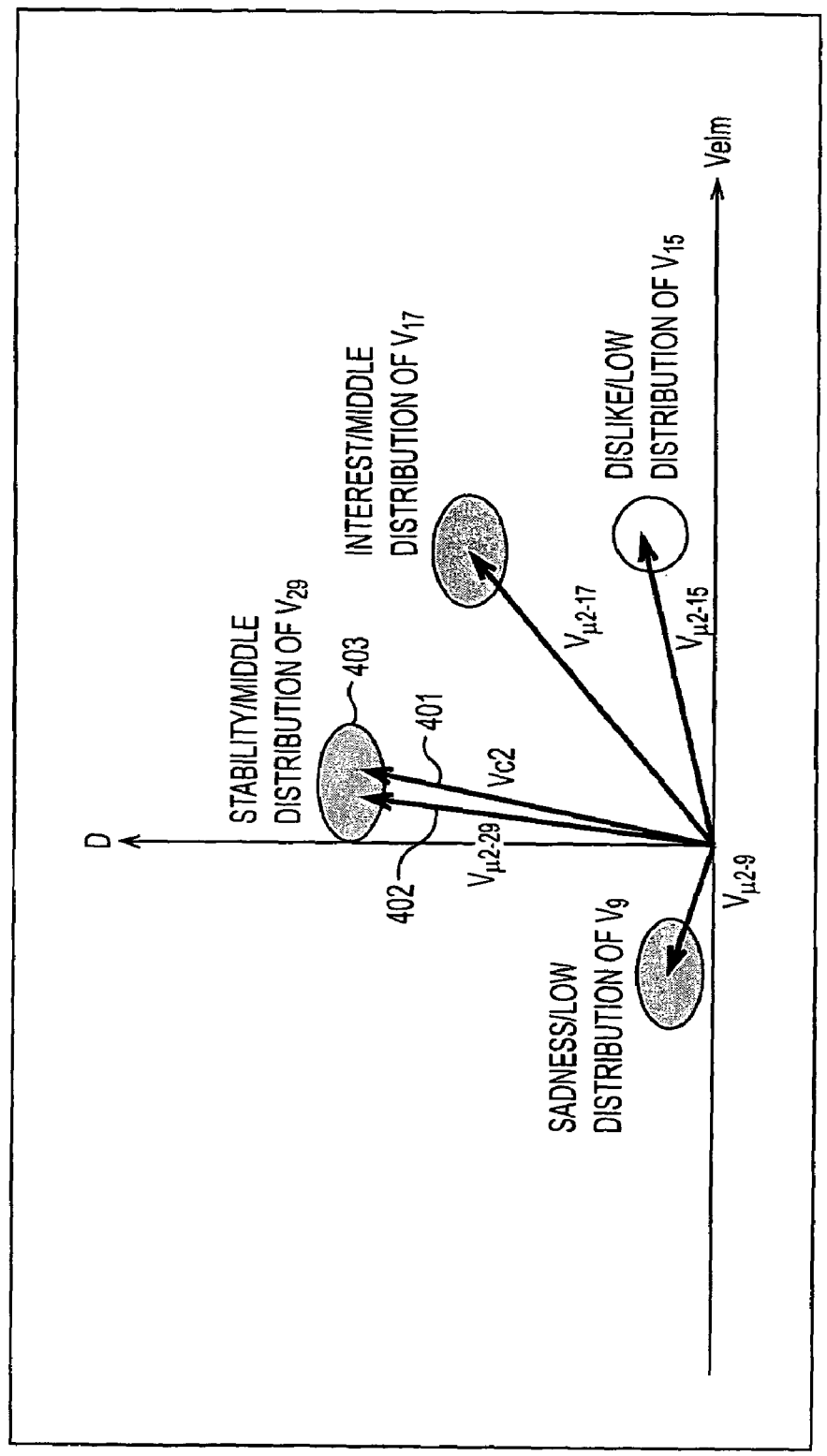
FIG. 38 is a diagram showing Vc2 and distributions of various vectors.

FIG. 38 shows examples of feature vectors of body motion information corresponding to some kinds of emotion information of the user a. In FIG. 38, the feature vectors of body motion information are plotted in a 2-dimensional space including a Velm axis and a D axis. The feature value vector 401 (Vc2) generated in step S178 in FIG. 28 is close to a center vector 402 (Vμ2-29) of a feature value vector distribution 403 corresponding to the "middle-level stable state", and thus as a result of the process of identifying the emotion/state and the level of the Vc2, the feature value vector 401 (Vc2) is identified as a feature value vector corresponding to the "middle-level stable state".

Figure 39:
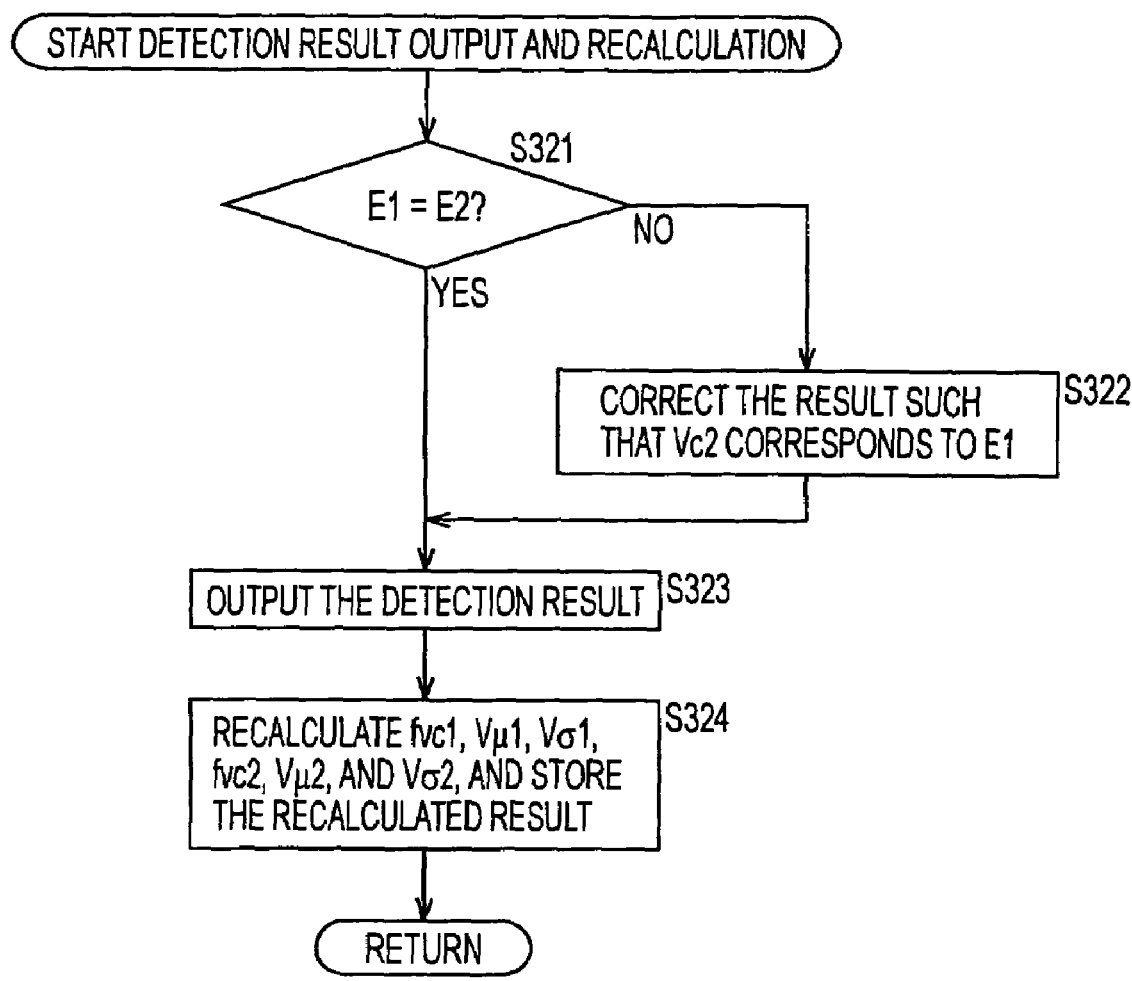
FIG. 39 is a flow chart showing a process of outputting an identification result and a recalculation process.

Now, referring to FIG. 39, the process of outputting the identification result and performing a recalculation is described below. This process is performed by the learning unit 94 of the terminal B. In step S321, the learning unit 94 of the terminal B determines whether the emotion information E1 identified by Vc1 and the emotion information E2 identified by Vc2 are identical to each other. If it is determined that E1 and E2 are not identical to each other, then, in step S322, the learning unit 94 of the terminal B corrects the identification result such that the feature value vector Vc2 of body motion information generated in step S178 (FIG. 28) belongs to E1. As described above, emotion information E1 is identified by the feature value vector Vc1 generated from pulse information, and emotion information E2 is identified on the basis of body motion information. E1 and E2 are not necessarily identical to each other. If E1 and E2 are different, emotion information identified by a vector with a greater number components, that is, with a greater number of dimensions is selected. In this specific case, emotion information E1 identified by a 5-dimensional vector Vc1 is selected, and emotion information E2 identified by a 2-dimensional vector Vc2 is corrected such that the feature value vector Vc2 must correspond to emotion information E1.

In step S323, the learning unit 94 of the terminal B outputs the identification result to the output controller 114. In step S324, the learning unit 94 of the terminal B recalculates the distribution fvc1 of the feature value vector of pulse information corresponding to emotion information E1 of the user a and the center vector V$\mu$1 and the standard deviation vector V$\sigma$1 of the distribution fvc1, and the distribution fvc2 of the feature value vector of body motion information corresponding to emotion information E1 of the user a and the center vector V$\mu$2 and the standard deviation vector V$\sigma$2 of the distribution fvc2, and the learning unit 94 of the terminal B stores the recalculated result. More specifically, the feature value vectors Vc1 and Vc2 generated in steps S177 and S178 (FIG. 28) are respectively added to the feature value vector of pulse information indicating the "middle-level stable state" of the user a and the feature value vector of body motion information stored in the storage unit, and fvc1, V$\mu$1, and V$\sigma$1 and also fvc2, V$\mu$2, and V$\sigma$2 are recalculated and stored in the storage unit 95.

In this way, the emotion/state and the level are identified from pulse information and body motion information, and information associated with the feature vectors of the identified emotion, state, and level is stored.

Thus, the terminal B generates feature value vectors Vc1 and Vc2 from pulse information and body motion information of the user a transmitted from the terminal A, and the terminal B identifies the emotion/state and the strength level from the generated feature value vectors Vc1 and Vc2. Similarly, the terminal B also can generate feature value vectors from pulse information and body motion information of the user b and can identify the emotion/state and the level thereof.

Similarly, the terminal A identifies the emotion/state and the strength level of the user a and the user b.

Figure 40:
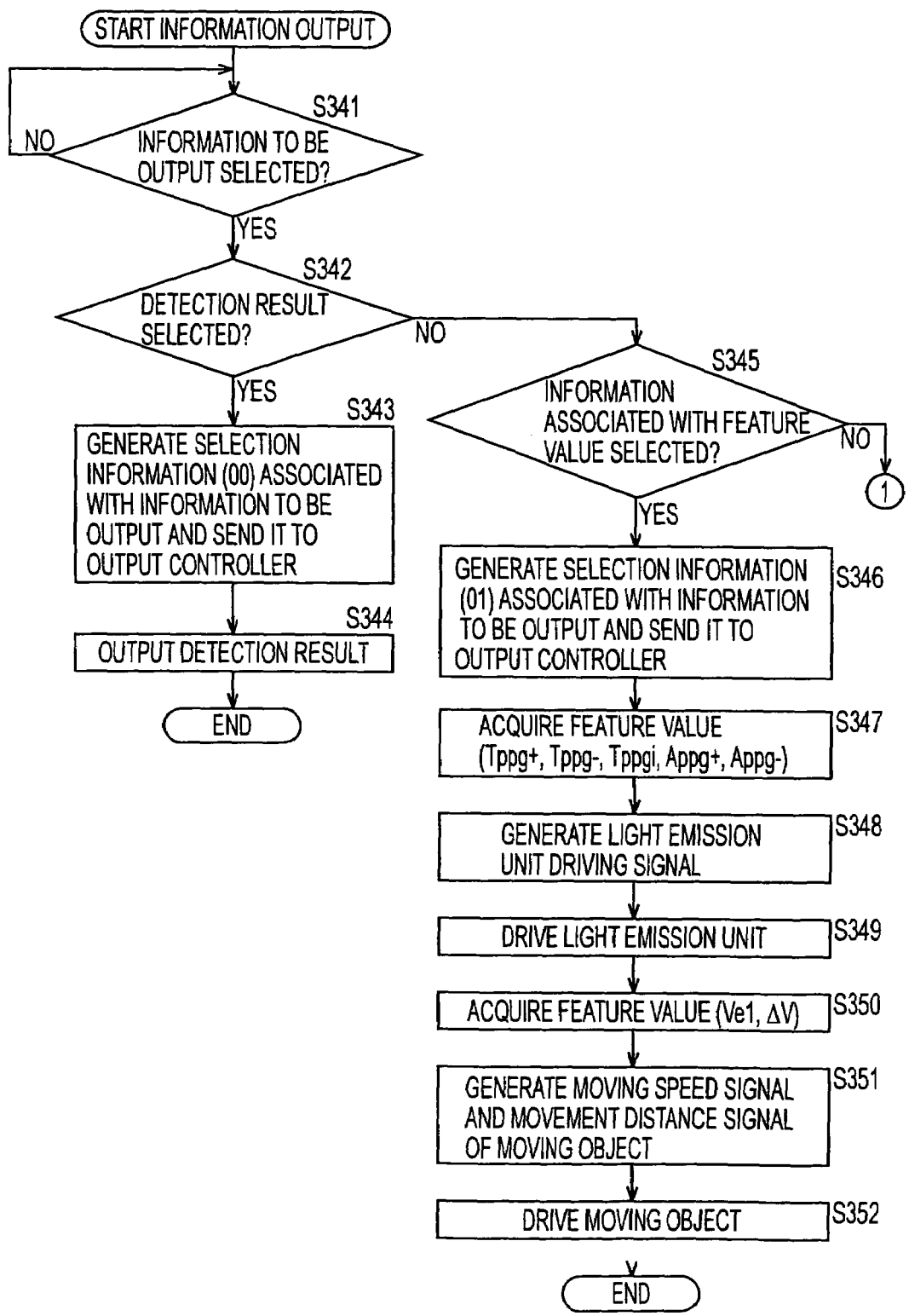
FIG. 40 is a flow chart showing an information output process.
Figure 41:
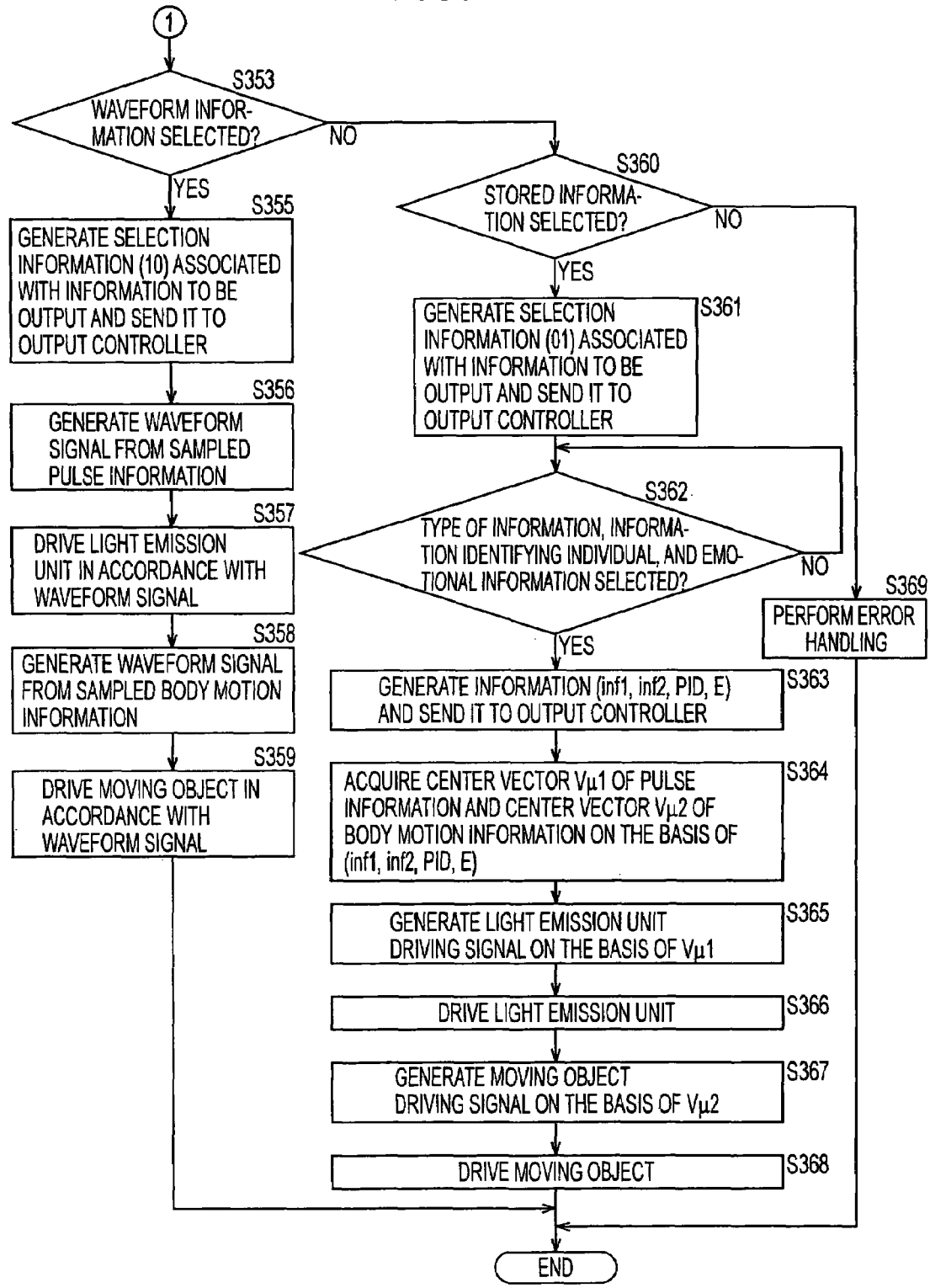
FIG. 41 is a flow chart showing a remaining part of the information output process.

Now, referring to FIGS. 40 and 41, the process of outputting information is described below. In step S341, the system controller 97 determines whether information to be output is selected. If information to be output is not selected, the process waits until information to be output is selected. The selection of information to be output may be performed, for example, by clicking a menu item displayed on the display of the terminal. The selection menu used by a user to select information to be output includes the following four items: "identification result", "information based on feature values", "waveform information", and "stored information".

If it is determined in step S341 that information to be output is selected, then in step S342 the system controller 97 determines whether the information selected to be output is the identification result. If it is determined that the information selected to be output is the identification result, then in step S343 the system controller 97 transmits, to the output controller 114, 2-bit selection information 00 indicating that the identification result should be output.

In step S344, the output controller 144 outputs an identification result associated with the emotion/state and the level thereof. For example, a text message "A middle-level stable state detected" is displayed on the display of the terminal.

If it is determined in step S342 that the information selected to be output is not the identification result, then, in step S345, the system controller 97 determines whether the information selected to be output is the information based on feature values. If it is determined that the information selected to be output is the information based on feature values, then, in step S346, the system controller 97 transmits, to the output controller 114, 2-bit selection information 01 indicating that the information based on feature values should be output.

Figure 42:
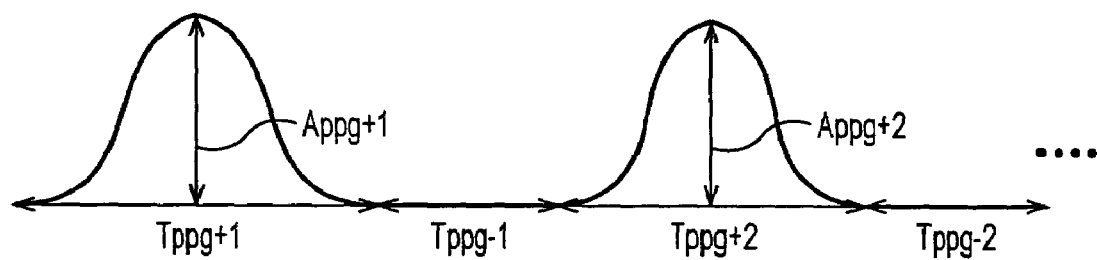
FIG. 42 is a diagram showing an example of a waveform of information output in the information output process.

In step S347, the output controller 114 acquires a feature value (Tppg+, Tppg−, Tppgi, Appg+, Appg−) from the feature extractor 112. In step S348, the output controller 114 generates a light emission unit driving signal. More specifically, as shown in FIG. 42, a sinusoidal wave signal with an amplitude Appg+, an on-period Tppg+, and an off-period Tppg− is generated. In step S349, the output controller 114 drives the light emission unit 192.

In step S350, the output controller 114 acquires a feature value (Vel, $\Delta$V) from the feature extractor 112. Then in step S351, the output controller 114 generates a driving signal for causing a moving object to be moved a distance $\Delta$V at a moving speed of Vel. In step S352, the output controller 114 drives the moving object 152.

If it is determined in step S345 that the information selected to be output is not the information based on feature values, then, in step S353, the system controller 97 determines whether the information selected to be output is the waveform information. If it is determined that the information selected to be output is the waveform information, the system controller 97 transmits, to the output controller 114, 2-bit selection information 10 indicating that the waveform information should be output. In step S356, the output controller 114 acquires sampled pulse information from the feature extractor 112 and generates a waveform signal. In step S357, the output controller 114 drives the light emission unit 192.

In step S358, the output controller 114 acquires sampled pulse information from the feature extractor 112 and generates a waveform signal. In step S359, the output controller 114 drives the moving object 152.

If it is determined in step S353 that the information selected to be output is not the waveform information, then in step S360 the system controller 97 determines whether the information selected to be output is the stored information. If it is determined that the information selected to be output is the stored information, then, in step S361, the system controller 97 transmits, to the output controller 114, 2-bit selection information 01 indicating that the stored information should be output.

In the case in which the information selected to be output is the stored information, a sub-menu is further displayed on the display of the terminal so that a user can specify an item of stored information to be output. More specifically, the user can make selections in terms of items of information inf1 or inf2 such as pulse information or body motion information, information PID identifying a user, and emotion information E. For example, the user can select pulse information as inf1, body motion information as inf2, information indicating the user a as PID, and "strong interest" as emotion information E.

In step S362, the system controller 97 determines whether the items of information inf1 and inf2, information PID identifying a user, and emotion information E are selected. If selection is not performed, the process waits until selection is made.

In step S363, the system controller 97 generates information (inf1, inf2, PID, E) in accordance with the selection made by the user and transmits the generated information to the output controller 114.

In step S364, on the basis of (inf1, inf2, PID, E), the output controller 114 acquires the center vector of pulse information and the center vector of body motion information from the storage unit 95. In this specific case, the center vector V$\mu$1 (Tppg+, Tppg−, Tppgi, Appg+, Appg−) of feature value vectors of pulse information corresponding to "high-level interest" of the user a and the center vector V$\mu$2(Velm, D) of feature value vectors of body motion information corresponding to "high-level interest" of the user a are acquired from the storage unit.

Figure 43:
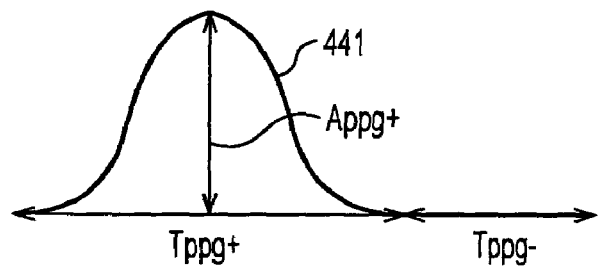
FIG. 43 is a diagram showing an example of a waveform of information output in the information output process.

In step S365, the output controller 114 generates a light emission unit driving signal in accordance with the center vector V$\mu$1. More specifically, as shown in FIG. 43, a sinusoidal wave signal 441 with an amplitude Appg+, an on-period Tppg+, and an off-period Tppg– is generated. Then, in step S365, the output controller 114 drives the light emission unit 192 three times in accordance with the generated driving signal.

In step S366, on the basis of the center vector $V\mu2$, the output controller 114 generates a driving signal for causing the moving object to be moved a distance D at a moving speed of Vel. Then, in step S367, the output controller 114 drives the moving object 152.

If it is determined in step S360 that the information selected to be output is not the stored information, then in step S368 the system controller 97 performs error handling. After completion of the error handling, the process is ended.

Thus, the emotion/state and the strength level thereof identified from the vital sign information are displayed so that the user can recognize them. Furthermore, light may be blinked and/or the object may be moved so that the user can recognize vital sign information via bodily sensations.

EXAMPLE 2

Figure 44:
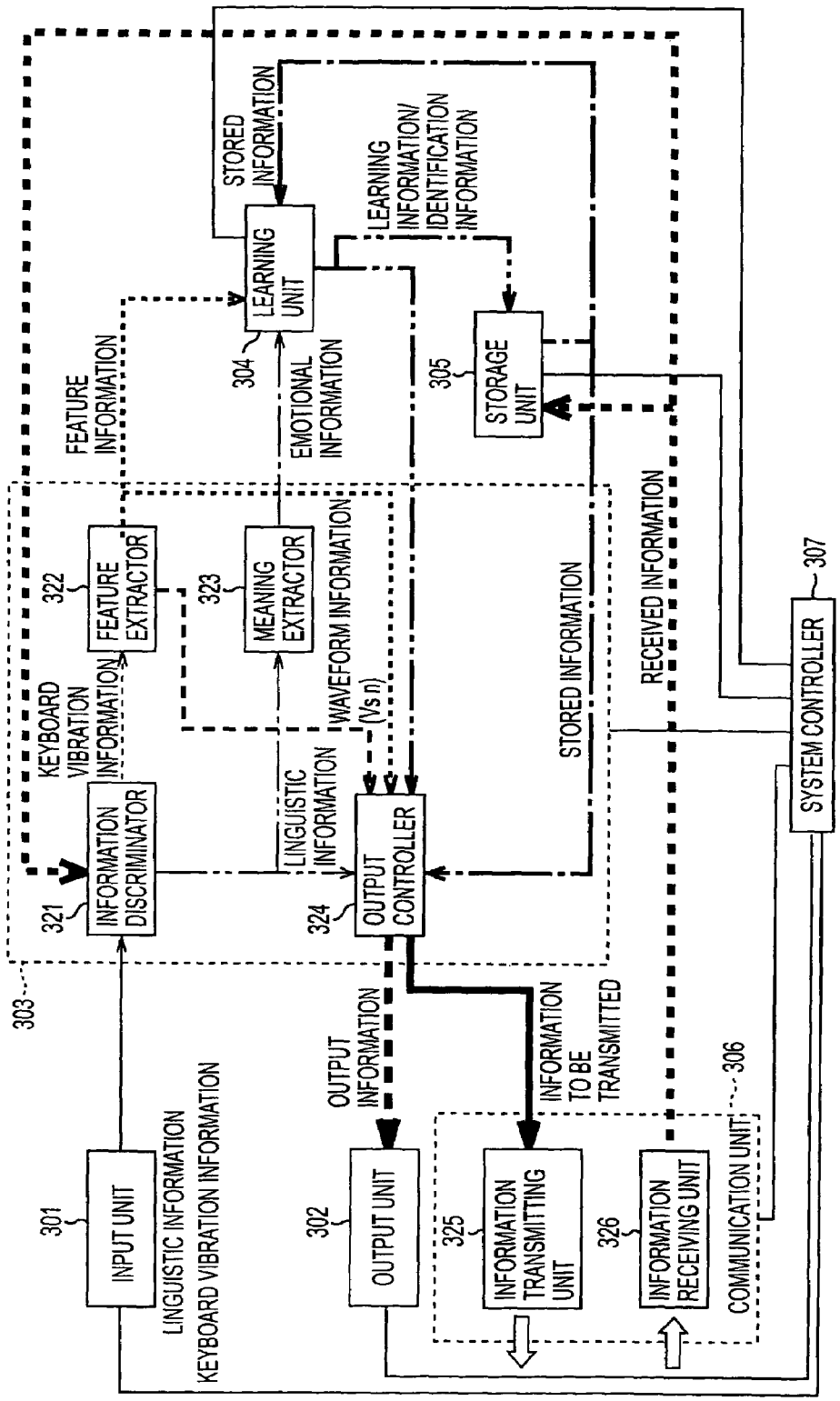
FIG. 44 is a block diagram showing an example of a structure of a second-type information processing apparatus according to the present invention.

FIG. 44 shows an example of a structure of an information processing apparatus according to a second embodiment of the present invention. This information processing apparatus can be applied to, for example, a personal computer. The information processing apparatus includes an input unit 301 used to input linguistic information and/or keyboard vibration information, a processing unit 303 for processing the information input via the input unit 301, a learning unit 304 for performing learning and identification on the basis of property information and emotion information output from the processing unit 303, a storage unit 305 for storing learned information and identified information output from the learning unit 304, an output unit 302 for outputting information on the basis of output information output from the processing unit 303, a communication unit 306 for communication, and a system controller 307 for controlling various parts.

The processing unit 303 includes an information discriminator 321 for classifying information input via the input unit 301 into linguistic information or keyboard vibration information, a feature extractor 322 for extracting property information from keyboard vibration information, a meaning extractor 323 for extracting emotion information from linguistic information, an output controller 324 for outputting information to the output unit 302. The communication unit 306 includes an information transmitting unit 325 for transmitting information and an information receiving unit 326 for receiving information.

Figure 45:
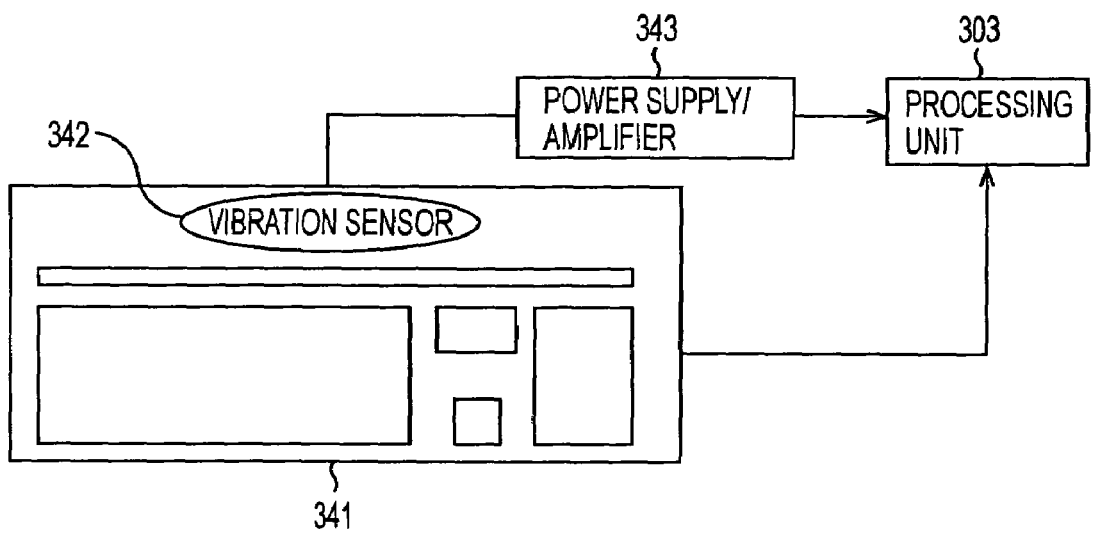
FIG. 45 is a block diagram showing an example of a structure of an input unit shown in FIG. 44.

FIG. 45 shows an example of a structure of the input unit 301. In the example shown in FIG. 45, the input unit 301 includes a keyboard 341, a vibration sensor 342 for detecting a vibration generated when a user presses the keyboard 341, and a power supply/amplifier 343 for amplifying a signal output from the vibration sensor 342.

Figure 46:
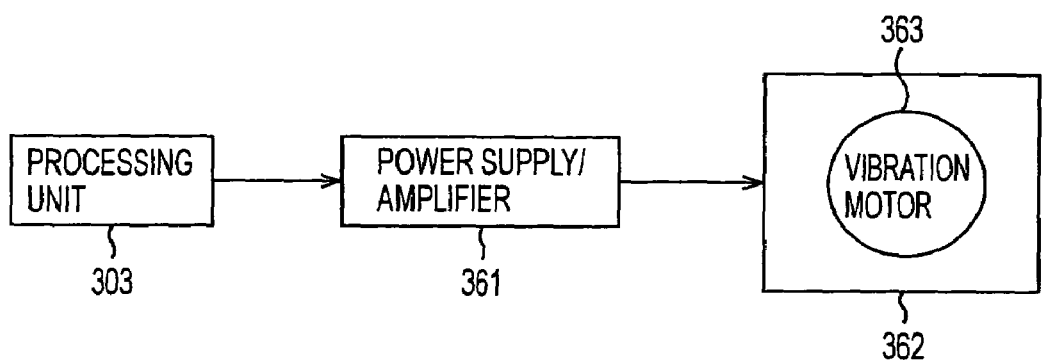
FIG. 46 is a block diagram showing an example of a structure of an output unit shown in FIG. 44.

FIG. 46 shows an example of the output unit 302. In the example shown in FIG. 46, the output unit 302 includes a vibration motor 362, a vibration presentation unit 362 that vibrates in accordance with a driving signal, and a power supply/amplifier 361 for driving the vibration presentation unit.

Figure 47:
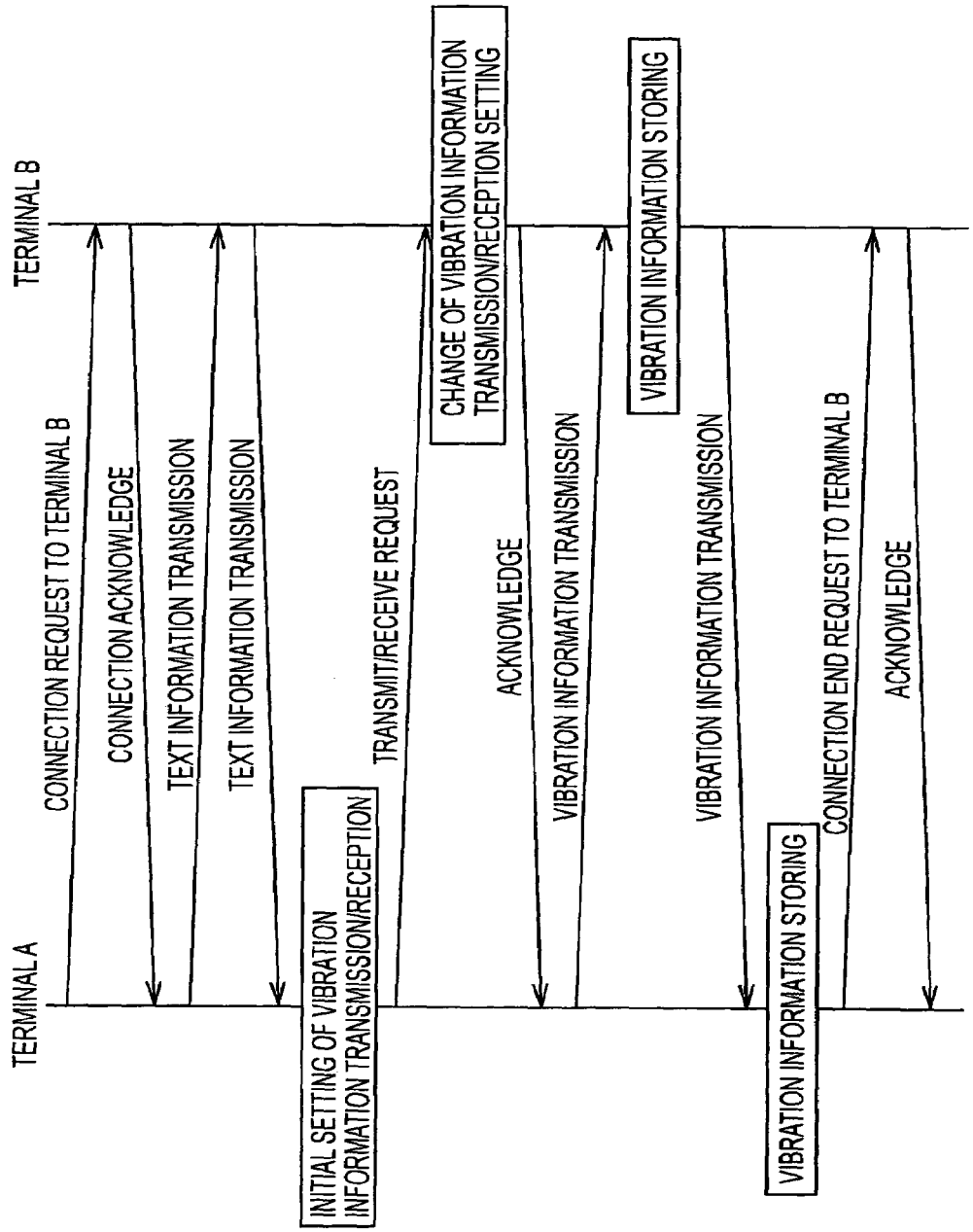
FIG. 47 is a diagram showing an example of a manner in which information is transmitted/received between a terminal A and a terminal B.

Herein, an information processing apparatus of a user a is denoted by a terminal A, and an information processing apparatus of a user b is denoted by a terminal B. The user a and the user b can communicate with each other using their terminals A and B in accordance with a procedure shown in FIG. 47. First, the terminal A transmits a connection request to the terminal B. In response, the terminal B returns a connection acknowledgment signal to the terminal A. Thereafter, textual information such as a mail or a chat is transmitted between the terminal A and the terminal B.

The terminal A performs initial setting associated with transmission/reception of vibration information (vibration generated when a user presses a keyboard, in this specific example), and transmits a transmission/reception request to the terminal B together with transmission setting information and reception setting information such as those shown in FIG. 11, as in the EXAMPLE 1.

If the terminal B receives the vibration information transmission request from the terminal A, the terminal B changes the setting associated with transmission/reception of vibration information and returns an acknowledgment signal to the terminal A.

The terminal A then transmits vibration information of the user a to the terminal B, and the terminal B transmits vibration information of the user b to the terminal A. The terminal A and the terminal B store the received vibration information.

If the terminals A transmits a connection end request to the terminal B, the terminal B transmits a connection end acknowledgment signal, and the communication is ended.

Figure 48:
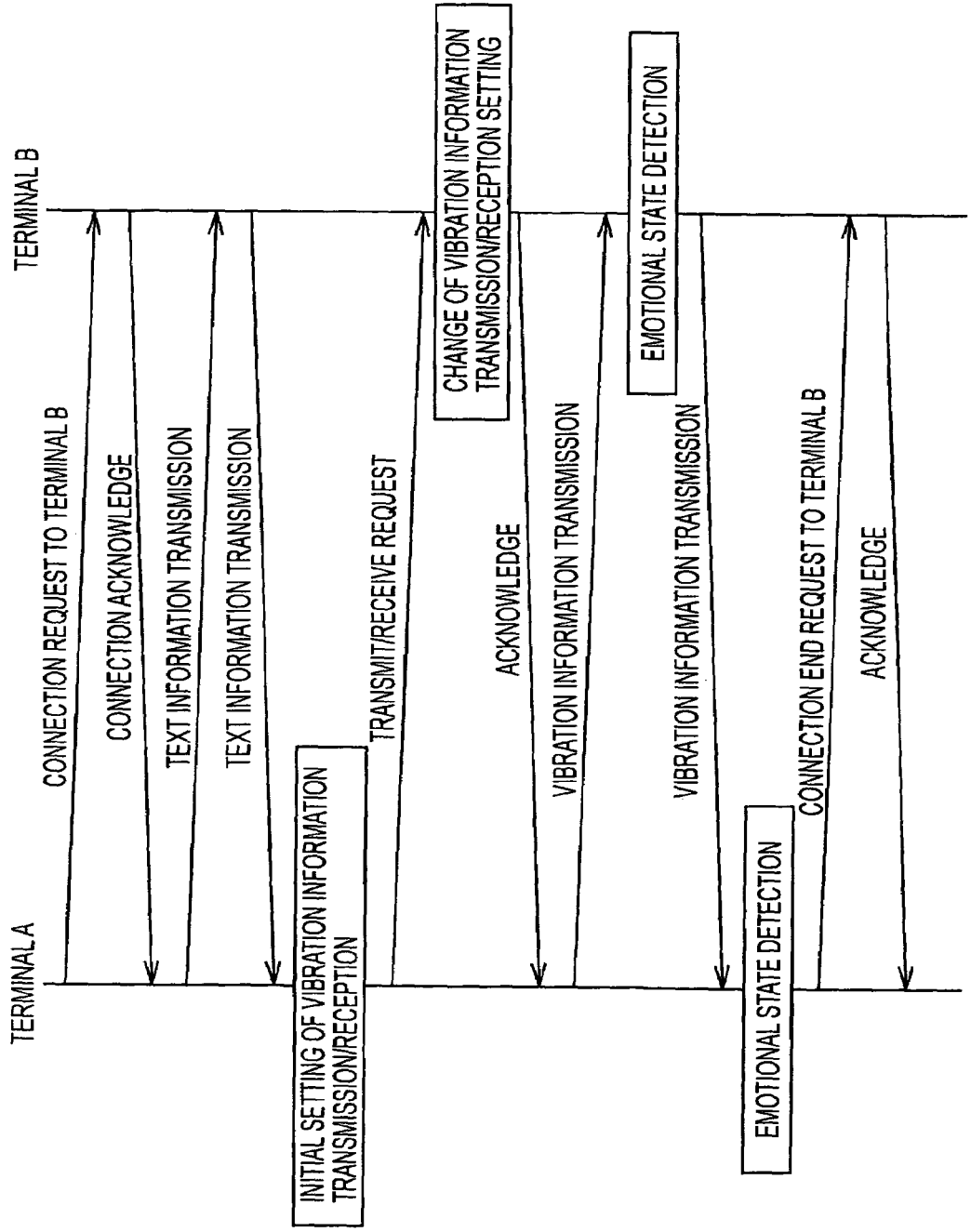
FIG. 48 is a diagram showing an example of a manner in which information is transmitted/received between a terminal A and a terminal B.

Communication is performed between the terminal A and the terminal B in the above-described manner, and vibration information is stored in the terminal A and the terminal B. After a sufficient amount of vibration information is stored, transmission/reception of information is performed as shown in FIG. 48. If vibration information is transmitted between the terminal A and the terminal B, the terminal A and the terminal B detect the emotion or the state of users.

Figure 49:
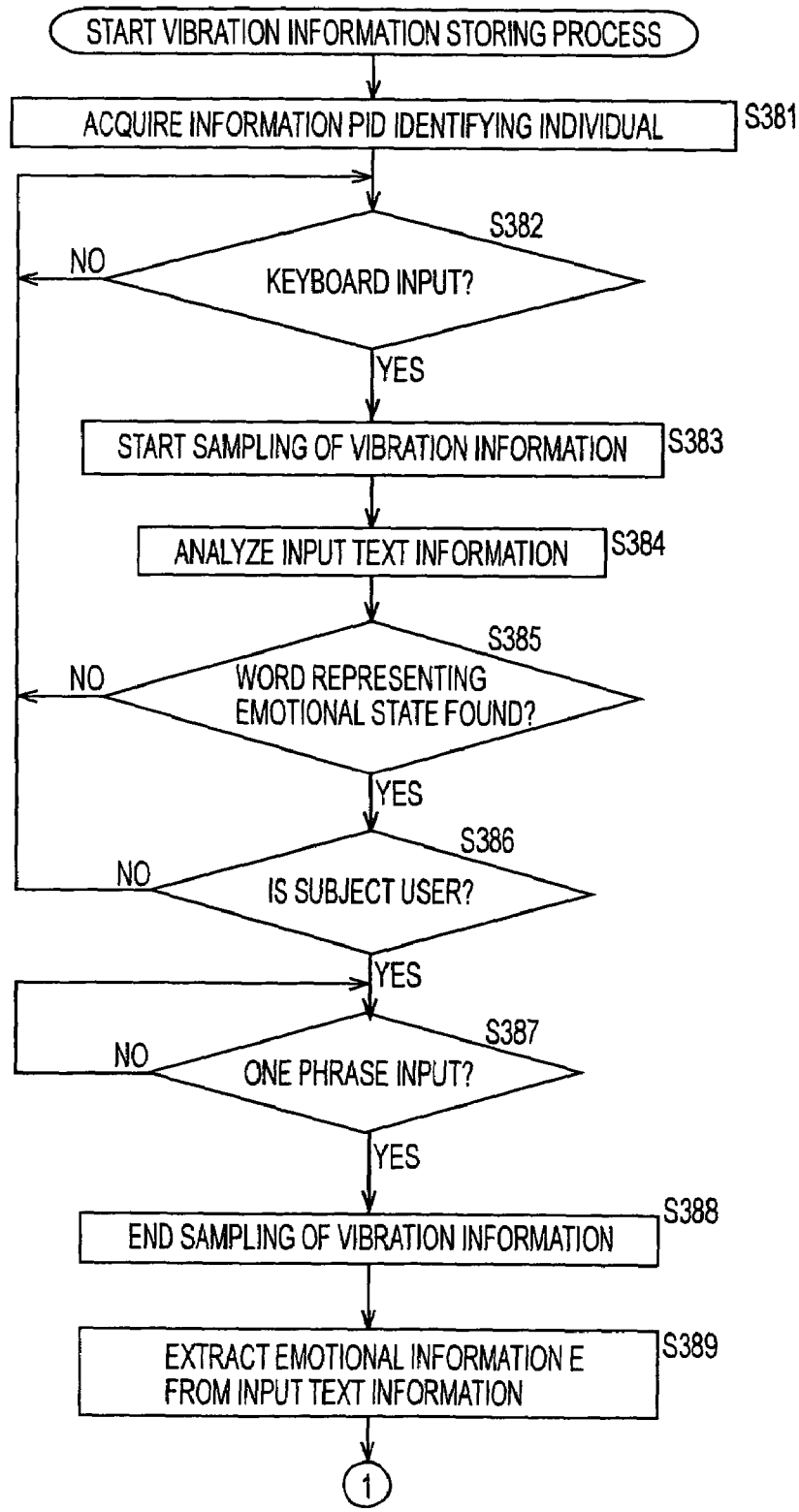
FIG. 49 is a flow chart showing a vibration information storage process.
Figure 50:
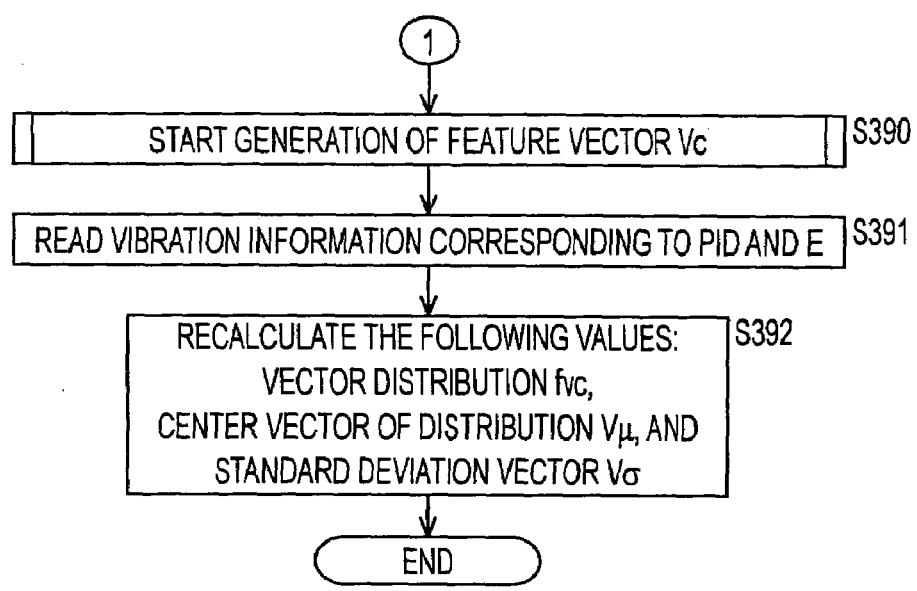
FIG. 50 is a flow chart showing a remaining part of the vibration information storage process.

Referring to FIG. 49, a process performed by the terminal B to store vibration information is described below. First, in step S381, at the start of communication with the terminal A, the system controller 307 of the terminal B acquires information (for example, a name or a nickname) PID identifying the user a of the terminal A with which to communicate. In step S382, the system controller 307 of the terminal B commands the information discriminator 321 to determine whether the keyboard of the terminal A is pressed to input information. If information input via the keyboard is not yet received, the process waits until information input via the keyboard is received.

If it is determined in step S382 that information is input by pressing the keyboard, then, in step S383, the system controller 307 of the terminal B commands the feature extractor 322 to start sampling of vibration information that is generated when the user a presses the keyboard and that is transmitted from the terminal A. Then in step S384, the system controller 307 of the terminal B analyzes input text information, using the meaning extractor 323. In step S385, the system controller 97 of the terminal B determines whether the recognized text information includes a word indicating an emotion, a state, and a strength level of an emotion/state of the user a. If it is determined that the recognized text information does not include a word indicating an emotion, a state, or a strength level of an emotion/state, then the process returns to step S382, and the above-described process is repeated. Words indicating emotions or states may be such as those shown in FIG. 23, and words indicating strength levels may be such as those shown in FIG. 24, as in EXAMPLE 1.

In the case in which it is determined in step S385 that the text information includes a word indicating an emotion, a state, or the strength level of an emotion/state, then, in step S386, the system controller 307 of the terminal B determines whether the subject of the detected word is the user a, that is, whether the detected word indicates the emotion, state, or the level of the emotion of the user a. If the subject is not the user a, then the process returns to step S382, and the above-described process is repeated.

In the case in which it is determined in step S386 that the user is the subject, the process proceeds to step S387. In step S387, the system controller 307 of the terminal B determines whether one phrase of text information has been input. If one phrase of voice has not yet been input, the system controller 307 of the terminal B waits until one phrase of text information is input.

If it is determined in step S387 that one phrase has been input, then, in step S388, the system controller 307 of the terminal B commands the feature extractor 322 to end the sampling of vibration information indicating a vibration caused by pressing of the keyboard.

The sampling of vibration information indicating a vibration caused by pressing the keyboard may be performed by the feature extractor 322 of the terminal A and the sampled information may be transmitted to the terminal B. Then in step S389, the system controller 307 of the terminal B extracts emotion information E via the meaning extractor 323.

For example, when the user a inputs "I am very glad.", an emotional state corresponding to a word "glad" is joy, and a strength level corresponding to a word "very" is a high level. Thus, a high-level joyful state is detected as the emotion information E.

In step S390, the system controller 307 of the terminal B commands the feature extractor 322 to generate feature vector Vc on the basis of pulse information of the user a. In step S391, vibration information corresponding to information PID identifying the user and the emotion information E is read from the storage unit 305. In this specific case, a feature vector of vibration information corresponding to weak interest of the user a is read. Then in step S392, using the learning unit 304, the system controller 307 of the terminal B adds the generated feature vector Vc to the read feature vector and recalculates the vector distribution fvc, the distribution center vector Vµ, and the standard deviation vector Vσ. In step S393, the recalculated vectors are stored in the storage unit 305.

Figure 51:
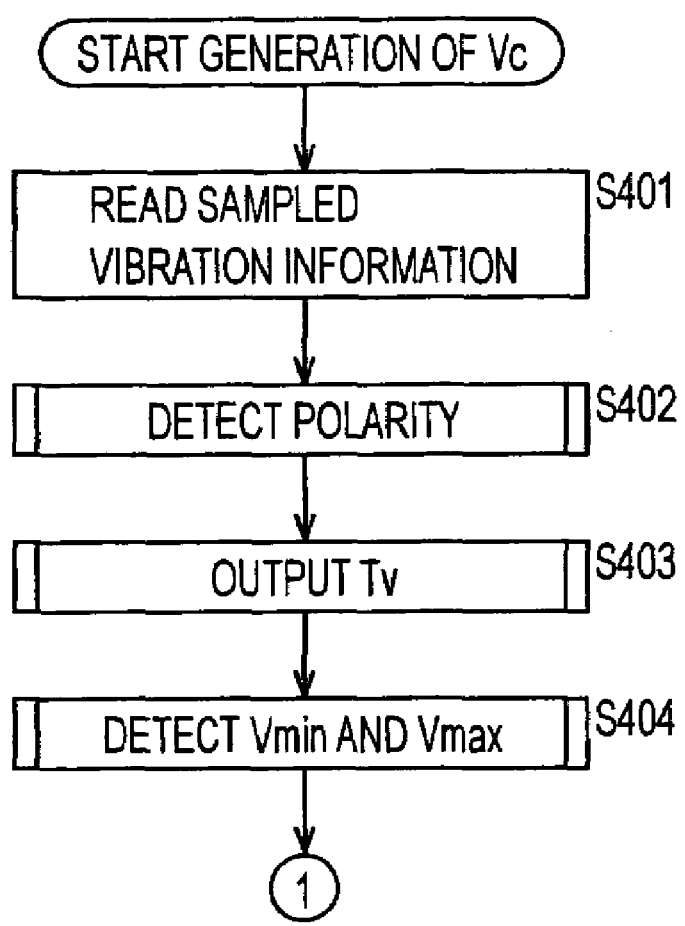
FIG. 51 is a flow chart showing a process of generating a feature value vector Vc.

Now, referring to FIGS. 51 and 52, the process of generating the feature vector Vc of vibration information is described below. This process is performed by the feature extractor 322 of the terminal B. In step S401, the feature extractor 322 of the terminal B reads sampled vibration information. Thereafter, in step S402, as in EXAMPLE 1, the feature extractor 322 of the terminal B performs the polarity detection process described above with reference to FIG. 16, and, in step S403, the Tv generation process described above with reference to FIG. 17, and furthermore in step S404 the Vmin/Vmax detection process described above with reference to FIG. 18.

Figure 54:
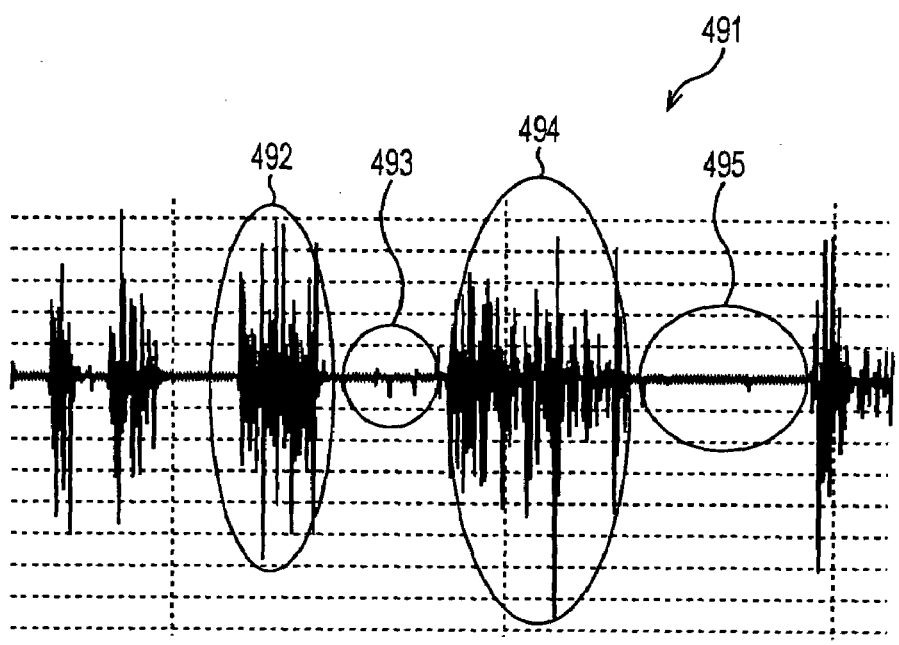
FIG. 54 is a graph showing an example of a keyboard vibration information waveform.

FIG. 54 shows an example of a waveform 491 of a vibration generated when the keyboard is pressed. The waveform 491 includes parts 492 and 494 with definite vibrations caused by pressing-down of a key performed by a user and parts 493 and 495 having substantially no vibrations because no keys are pressed by the user. If the part 492 or 494 with definite vibrations is sampled, and the sampled data is subjected to the polarity detection process and the Tv generation process, Tv+, Tv0, Tv−, Tv0, Tv+ . . . are obtained as the result. On the other hand, when the part 493 or 495 having substantially no vibrations is sampled, and the sampled data is subjected to the polarity detection process and the Tv generation process, only Tv0 with a rather large value is obtained. Therefore, if output Tv0 is smaller than a predetermined threshold value Th, it is possible to determine that a key is pressed down by the user.

On the other hand, when output Tv0 is greater than the predetermined threshold value Th, it is determined that no keys are pressed down by the user.

Figure 52:
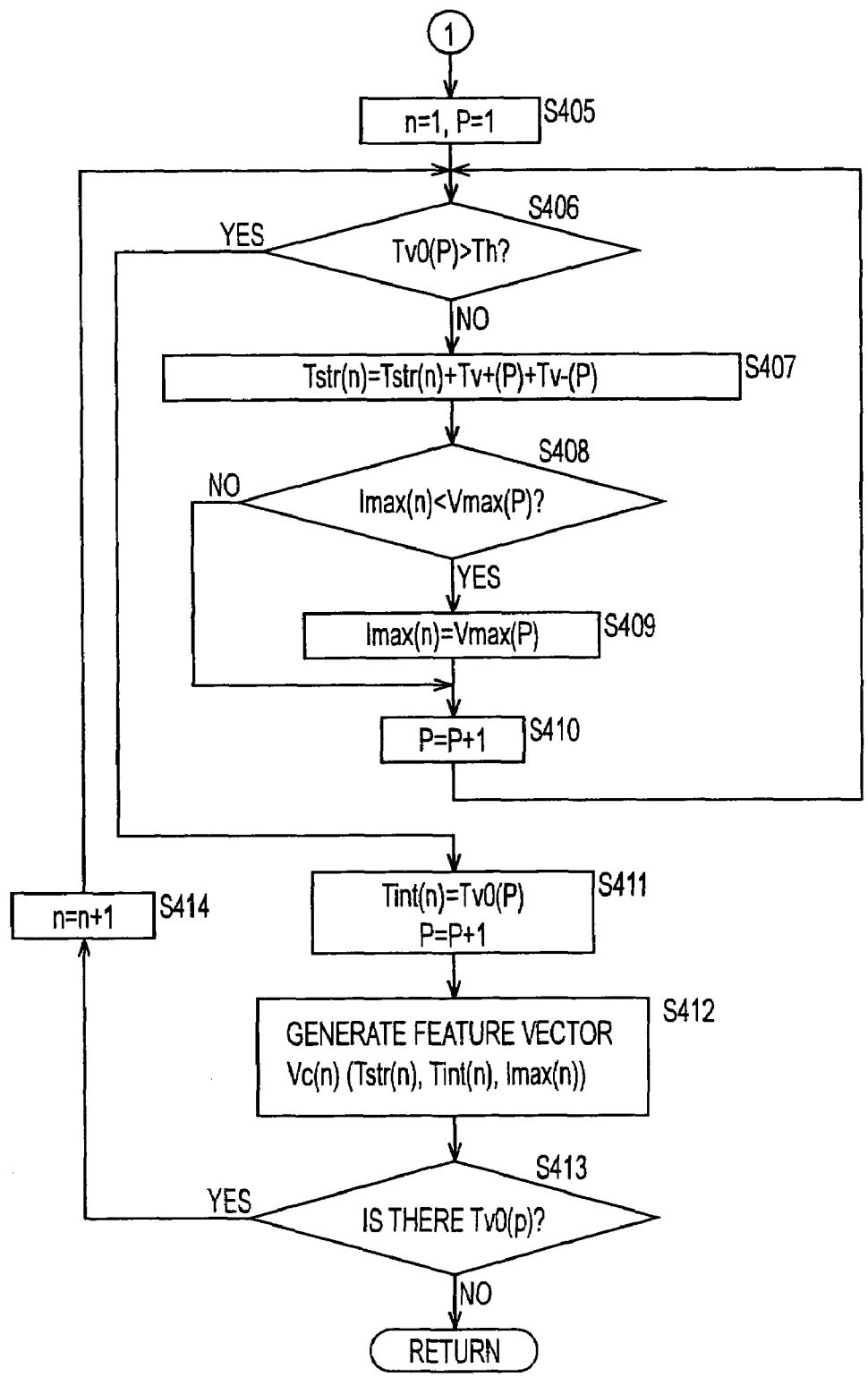
FIG. 52 is a flow chart showing a remaining part of the process of generating the feature value vector Vc.

In step S405 shown in FIG. 52, the feature extractor 322 of the terminal B sets both parameters n and P to 1. Then, in step S406, the feature extractor 322 of the terminal B determines whether Tv0(P) is greater than a threshold value Th. If it is determined that Tv0(P) is greater than the threshold value Th, then, in step S407, the feature extractor 322 of the terminal B sets Tstr(n)+Tv+(P)+Tv−(P) into Tstr(n). Note that Tstr(n) is initially set to 0.

In step S408, the feature extractor 322 of the terminal B determines whether Vmax(P) is greater than Imax(n). Note that the initial value of Imax(n) is 0. If it is determined in step S408 that Vmax(P) is greater than Imax(n), then, in step S409, the feature extractor 322 of the terminal B sets the value of Vmax(P) into Imax(n). Thereafter, in step S410, the feature extractor 322 of the terminal B increments the value of P by 1 and returns the flow to step S406 to repeat the above-described process. On the other hand, if it is determined in step S408 that Vmax(P) is not greater than Imax(n), step S409 is skipped.

In the case in which it is determined in step S406 that Tv0(P) is greater than the threshold value Th, then in step S411, the feature extractor 322 of the terminal B sets the value of Tv0(P) into Tint(n), increments the value of P by 1, and generates a feature value vector Vc1(Tstr(n), Tint(n), Imax(n)). In step S413, the feature extractor 322 of the terminal B determines whether Tv0(P) exists. If it is determined that Tv0(P) exists, then in step S414, the feature extractor 322 of the terminal B increments the value of n by 1. Thereafter, the flow returns to step S406, and the above-described process is repeated.

On the other hand, if it is determined in step S413 that Tv0(P) does not exist, the feature extractor 322 of the terminal B ends the process.

Figure 55A:
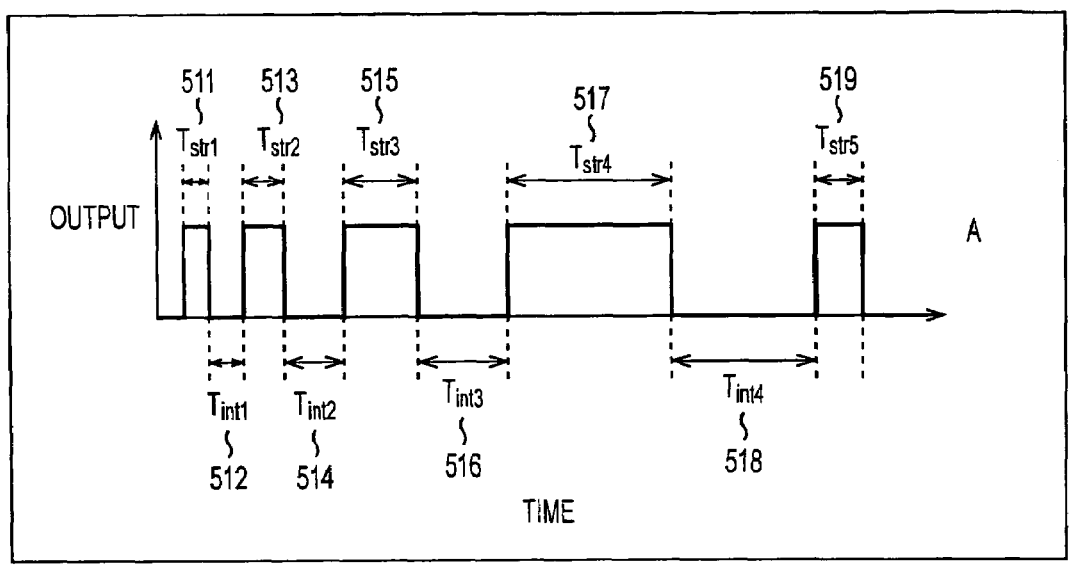
FIG. 55A is a graph showing an example of data obtained from keyboard vibration information.

Thus, as shown in FIG. 55A, Tstr(1) 511, Tint(1) 512, Tstr(2) 513, Tint(2) 514, Tstr(3) 515, Tint(3) 516, Tstr(4) 517, Tint(4) 518, Tstr(5) 511, and Tint(5) 512 are obtained from the waveform 491 shown in FIG. 54. Tstr(1) to Tstr(5) indicate periods during which some keys are pressed down by the user, and Tint(1) to Tint(5) indicate intervals between two adjacent periods during which some keys are pressed down. In this specific example, a key (keys) is pressed down five times.

Figure 55B:
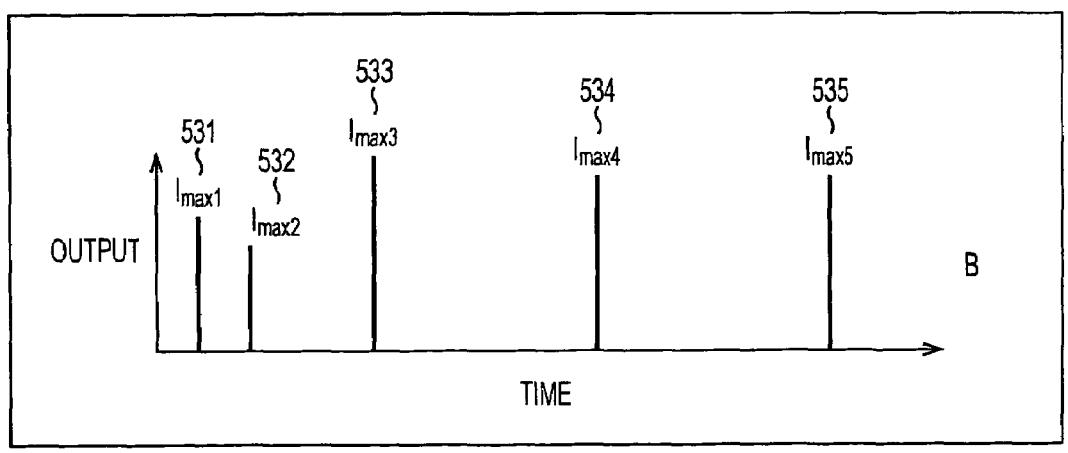
FIG. 55B is a graph showing an example of data obtained from keyboard vibration information.

Furthermore, as shown in FIG. 55B, Imax(1) 531, Imax(2) 532, Imax(3) 533, Imax(4) 534, and Imax(5) 535 are obtained from the waveform 491 shown in FIG. 54, wherein Imax(1) to Imax(5) indicate maximum vibration strengths of first to fifth vibration periods.

In the above-described manner, a feature vector Vc of vibration information corresponding to the high-level joy of the user a is generated.

Figure 53:
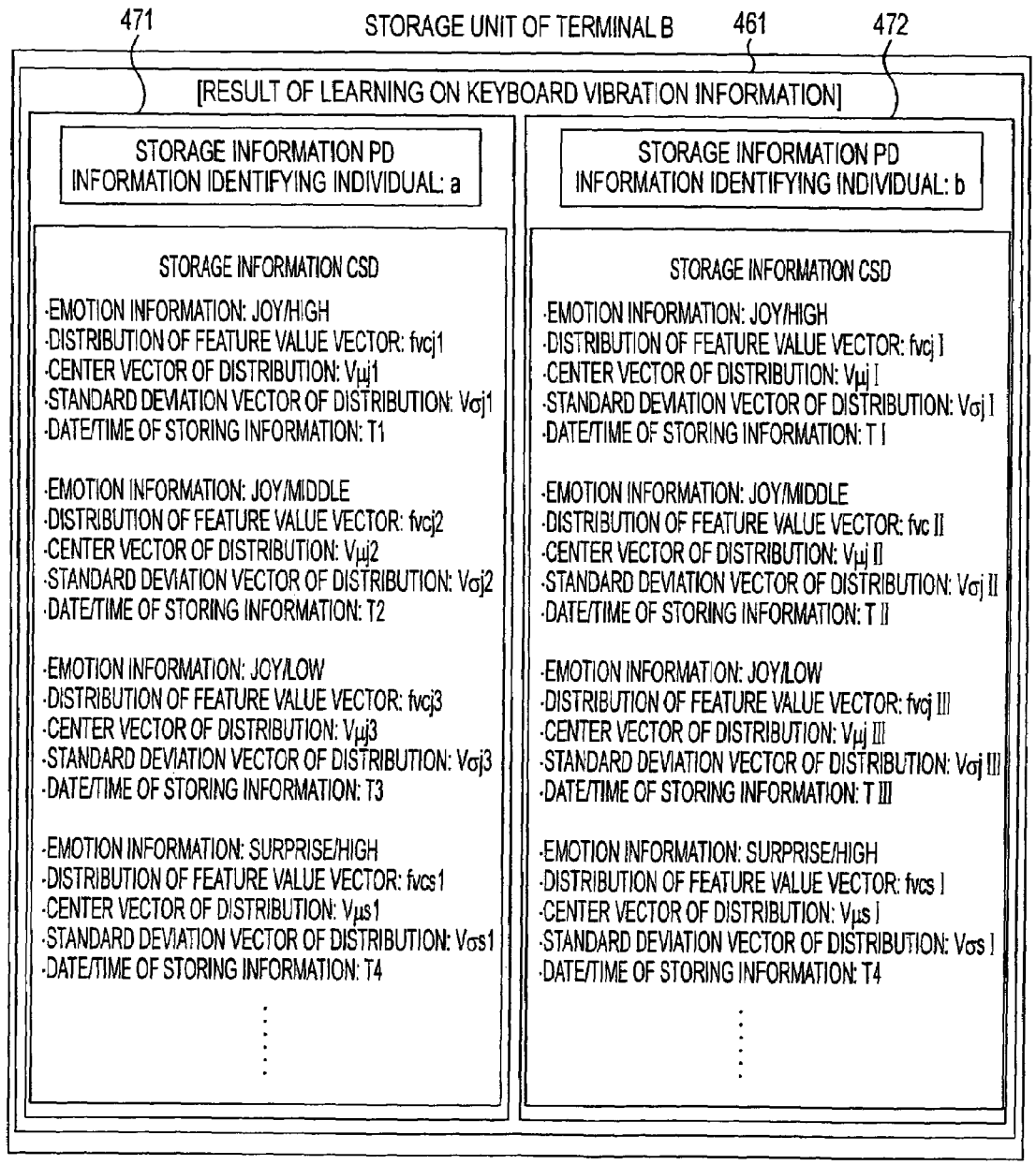
FIG. 53 is a diagram showing an example of information stored in a storage unit of a terminal B.

As described above, in accordance with keyboard vibration information received from the terminal A of the user a, the terminal B generates the feature value vector Vc and stores it. Similarly, the terminal B generates a feature value vector from vibration information associated with a keyboard of the user b and stores the generated feature value vector. Thus, as shown in FIG. 53, a learning result 461 associated with keyboard vibration information is stored in the storage unit 95 of the terminal B, for the user a and the user b, separately.

Similarly, the terminal A stores a learning result associated with keyboard vibration information, for the user a and the user b, separately.

Once a sufficient amount of vibration information has been stored as a result of a repetition of above-described vibration information storage process, it becomes possible to identify the emotion/state and the strength level of each user from vibration information.

Figure 56:
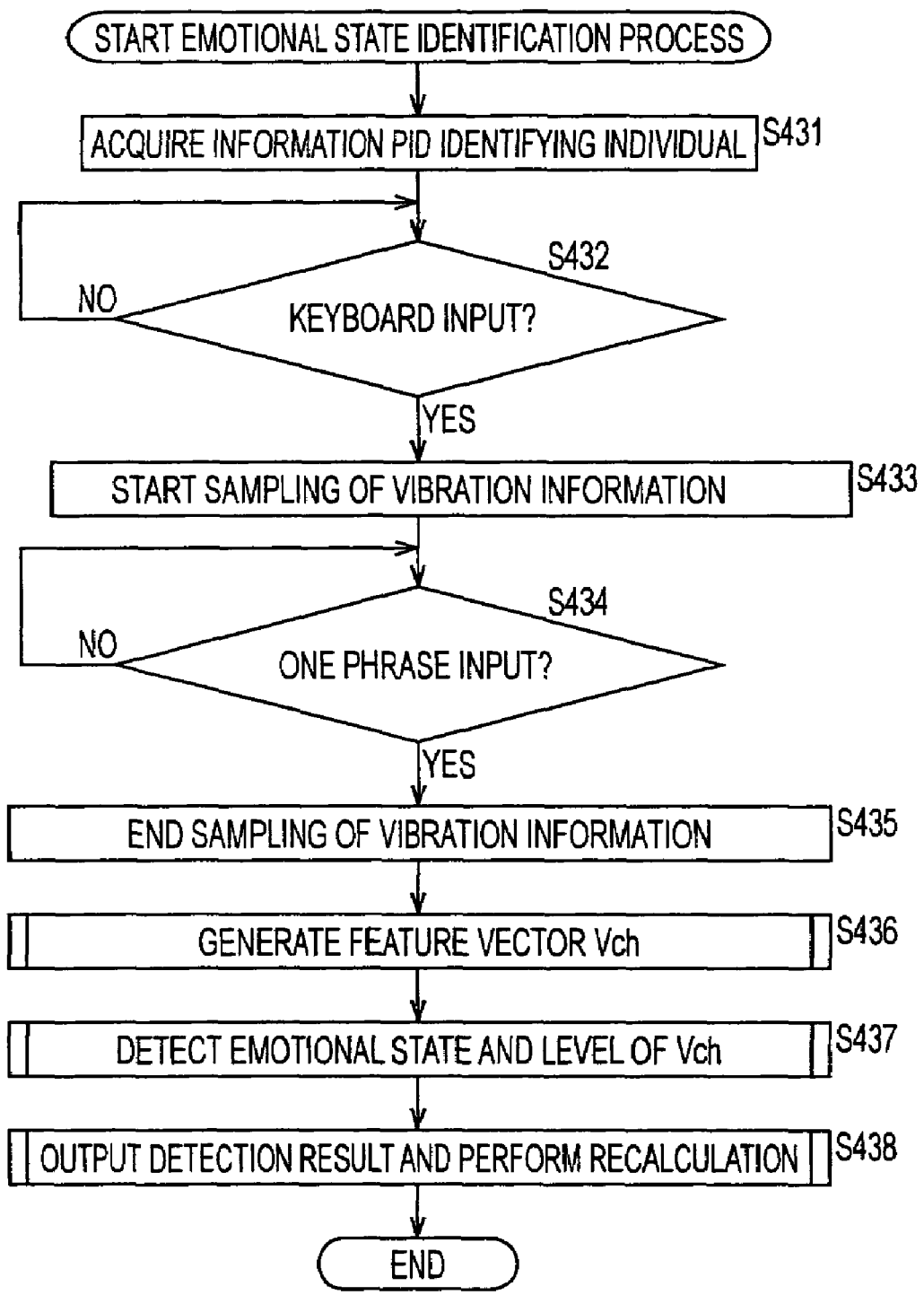
FIG. 56 is a flow chart showing an emotion/state identification process.

Referring to FIG. 56, a process performed by the terminal B to identify an emotional state is described below.

First, in step S431, at the start of communication with the terminal A, the system controller 307 of the terminal B acquires information PID identifying the user a of the terminal A with which to communicate. In step S432, the system controller 307 of the terminal B commands the information discriminator 321 to determine whether the keyboard of the terminal A of the user a is pressed to input information. If information input via the keyboard is not yet received, the process waits until information input via the keyboard is received.

If it is determined in step S432 that the keyboard is pressed to input information, then, in step S433, the system controller 97 of the terminal B commands the feature extractor 322 to start sampling of vibration information that is generated when the user a presses the keyboard and that is transmitted from the terminal A. Then in step S434, the system controller 307 of the terminal B commands the meaning extractor 323 to determine whether one phrase of text information has been input. If one phrase of textual information has not yet been input, the process waits until one phrase of textual information is input. If it is determined in step S434 that one phrase has been input, the system controller 307 of the terminal B commands the feature extractor 322 to end sampling of vibration information that is generated when the user a presses the keyboard and that is transmitted from the terminal A.

The sampling of vibration information indicating a vibration caused by pressing the keyboard may be performed by the feature extractor 322 of the terminal A and the sampled information may be transmitted to the terminal B.

In step S436, the system controller 307 of the terminal B commands the feature extractor 112 to generate a feature vector Vch. In step S437, the system controller 307 of the terminal B commands the learning unit 304 to identify the emotion/state of Vch and the strength level thereof. In step S438, the system controller 307 of the terminal B commands the learning unit 304 to output the identification result and perform a recalculation.

Figure 57:
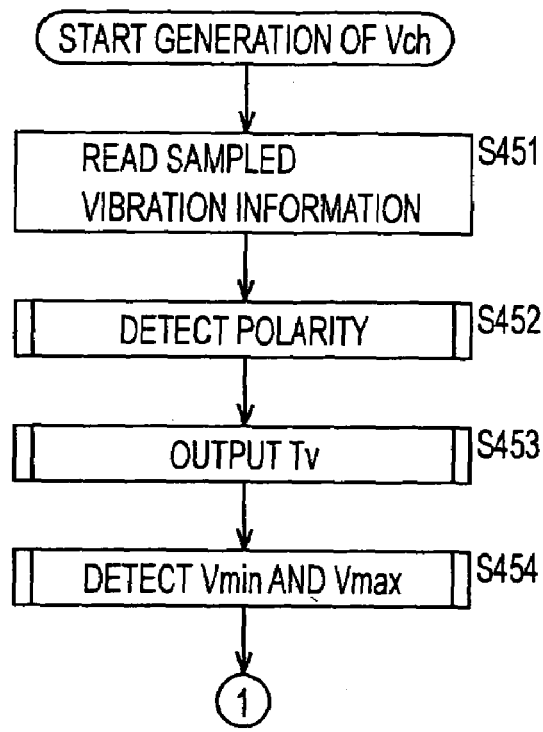
FIG. 57 is a flow chart showing a process of generating a feature value vector Vch.

Now, referring to FIGS. 57 and 58, a Vch generation process is described below. This process is performed by the feature extractor 322 of the terminal B. In step S451, the feature extractor 322 of the terminal B reads sampled vibration information. Thereafter, in step S452, as in EXAMPLE 1, the feature extractor 322 of the terminal B performs the polarity detection process described above with reference to FIG. 16, and, in step S453, the Tv generation process described above with reference to FIG. 17, and furthermore in step S454, the Vmin/Vmax detection process described above with reference to FIG. 18.

Figure 58:
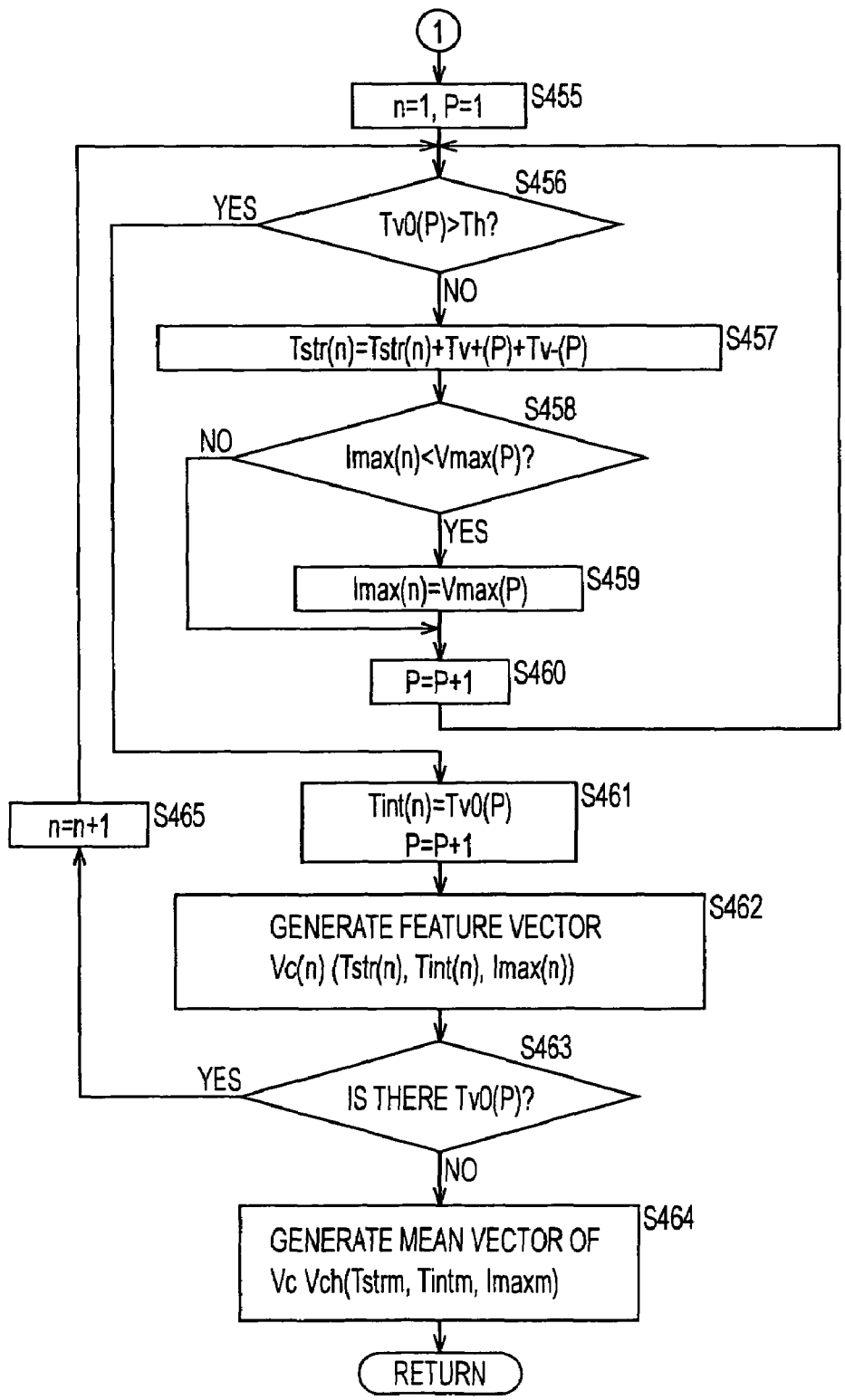
FIG. 58 is a flow chart showing a remaining part of the process of generating the feature value vector Vch.

In step S455 shown in FIG. 58, the feature extractor 322 of the terminal B sets both parameters n and P to 1. Then, in step S456, the feature extractor 322 of the terminal B determines whether Tv0(P) is greater than a threshold value Th. If it is determined that Tv0(P) is not greater than the threshold value Th, then in step S457, the feature extractor 322 of the terminal B sets Tstr(n)+Tv+(P)+Tv−(P) into Tstr(n). Note that Tstr(n) is initially set to 0.

In step S458, the feature extractor 322 of the terminal B determines whether Vmax(P) is greater than Imax(n). Note that the initial value of Imax(n) is 0. If it is determined in step S458 that Vmax(P) is greater than Imax(n), then, in step S459, the feature extractor 322 of the terminal B sets the value of Vmax(P) into Imax(n). Thereafter, in step S460, the feature extractor 322 of the terminal B increments the value of P by 1 and returns the flow to step S456 to repeat the above-described process. On the other hand, if it is determined in step S458 that Vmax(P) is not greater than Imax(n), step S459 is skipped.

In the case in which it is determined in step S456 that Tv0(P) is greater than the threshold value Th, then in step S461, the feature extractor 322 of the terminal B sets the value of Tv0(P) into Tint(n), and increments the value of P by 1. Furthermore, in step S462, the feature extractor 322 of the terminal B generates a feature value vector Vc(Tstr(n), Tint(n), Imax(n)). In step S463, the feature extractor 322 of the terminal B determines whether Tv0(P) exists. If it is determined that Tv0(P) exists, then, in step S465, the feature extractor 322 of the terminal B increments the value of n by 1. Thereafter, the flow returns to step S456, and the above-described process is repeated.

On the other hand, if it is determined in step S463 that Tv0(P) does not exist, then in step S464, the feature extractor 322 of the terminal B generates a mean vector Vch of Vc.

For example, if the user a of the terminal A inputs alphabetic characters "How about that?", vibration information is transmitted to the terminal B. In response to receiving the vibration information, the terminal B generates fifteen feature value vectors Vc corresponding to input fifteen characters including spaces, and the mean vector Vch of those fifteen feature vectors Vc is generated.

Figure 59:
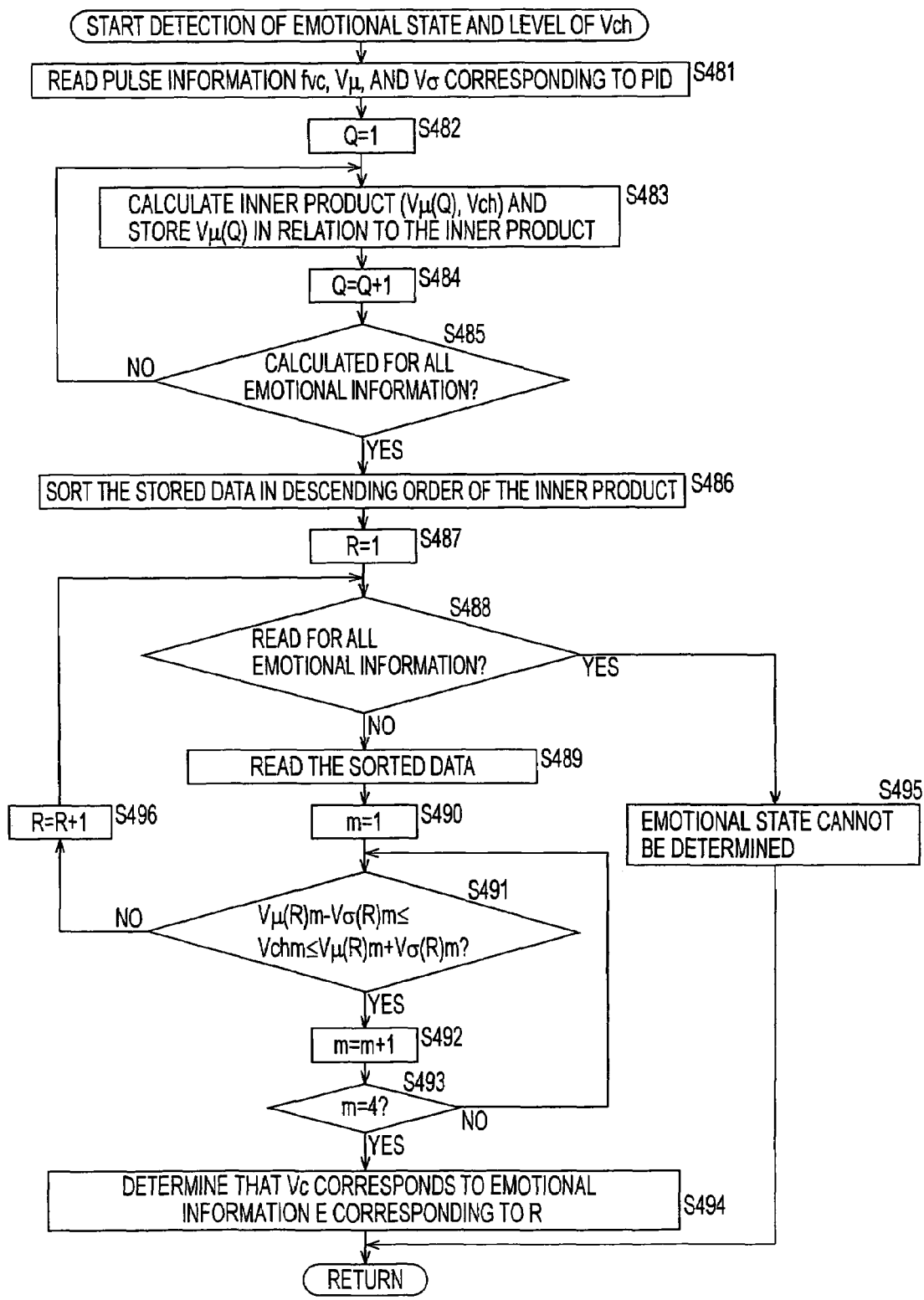
FIG. 59 is a flow chart showing a process of identifying the emotion/state and the strength level of Vch.

Referring to FIG. 59, a process of identifying the emotional, the state, and the strength level of Vch is described below. This process is performed by the learning unit 304 of the terminal B.

In step S481, the learning unit 304 of the terminal B reads, from the storage unit 305, the feature value vector distribution fvc, the distribution center vector Vμ, and the distribution standard deviation vector Vσ associated with vibration information of the user a.

As described above, there are 36 kinds of emotion information, and there are 36 feature value vector distributions fvc, 36 distribution center vectors Vμ, and 36 distribution standard deviation vectors Vσ corresponding to the respective 36 kinds of emotion information.

In step S482, the learning unit 304 of the terminal B sets the parameter Q to 1. Then, in step S483, the learning unit 304 of the terminal B calculates the inner product of the vector Vμ(Q) and the feature value vector Vch calculated in step S436 (in FIG. 56), and stores Vμ(Q) in relation to the inner product. Then in step S484, the learning unit 304 of the terminal B increments the value of Q by 1. In step 485, the learning unit 304 of the terminal B determines whether the calculation is completed for all kinds of the emotion information, that is, whether the calculation of the inner product is completed for all 36 center vectors Vμ. If it is determined that the inner product is not calculated for all kinds of the emotion information, the flow returns to step S483, and the above-described process is repeated.

When the calculation of the inner product is completed for all 36 center vectors Vμ corresponding to the respective kinds of emotion information, data associated with the emotion information, the inner products, data indicating the kinds of the center vector Vμ, and data indicating the order of the inner products are stored in the storage unit (not shown) of the learning unit 304 of the terminal B, as in EXAMPLE 1. In step S486, the learning unit 304 of the terminal B sorts the data in descending order of inner product.

In step S487, the learning unit 304 of the terminal B sets the parameter R to 1. In step S488, the learning unit 304 of the terminal B determines whether data associated with all kinds of the emotion information are read. If it is determined that all data associated with kinds of the emotion information are not read, then in step S489, the learning unit 304 of the terminal B reads the sorted data. In step S490, the learning unit 304 of the terminal B sets the parameter m to 1. In step S491, the learning unit 304 of the terminal B determines whether the condition $V\mu(R)m - V\sigma(R)m \leq Vchm \leq V\mu(R)m + V\sigma(R)m$ is satisfied, wherein $V\mu(R)m$ denotes an mth component of the vector $V\mu(R)$, and $V\sigma(R)m$ and Vchm respectively denote mth components of vectors $V\sigma$ and Vch. As described above, each feature value vector of vibration information includes three components: Tstr, Tint, and Imax. When m=1, the component Tstr is extracted from each vector of $V\mu(R)$, $V\sigma(R)$, and Vc and subjected to the process.

If it is determined in step S491 that the condition $V\mu(R)m - V\sigma(R)m \leq Vchm \leq V\mu(R)m + V\sigma(R)m$ is not satisfied, then, in step S496, the learning unit 304 of the terminal B increments the value of R by 1. Then the process returns to step S488, and the above-described process is repeated. On the other hand, if it is determined in step S491 that the condition $V\mu(R)m - V\sigma(R)m \leq Vchm \leq V\mu(R)m + V\sigma(R)m$ is satisfied, then, in step S492, the learning unit 304 of the terminal B increments the value of m by 1. In step S493, the learning unit 302 of the terminal B determines whether m is equal to 4. If it is determined that m is not equal to 4, then the flow returns to step S491, and the above-described process is repeated.

If it is determined in step S493 that m is equal to 4, that is, if it is determined that the condition $V\mu(R)m - V\sigma(R)m \leq Vchm \leq V\mu(R)m + V\sigma(R)m$ is satisfied for all three components of each vector $V\mu(R)$, $V\sigma(R)$, and Vch, then in step S494, the learning unit 304 of the terminal B determines that Vch belongs to emotion information E corresponding to R.

If it is determined in step S488 that data associated with all kinds of emotion information are read, the learning unit 304 of the terminal B determines that the emotion/state and the strength level of Vch cannot be identified, and ends the process.

Figure 60:
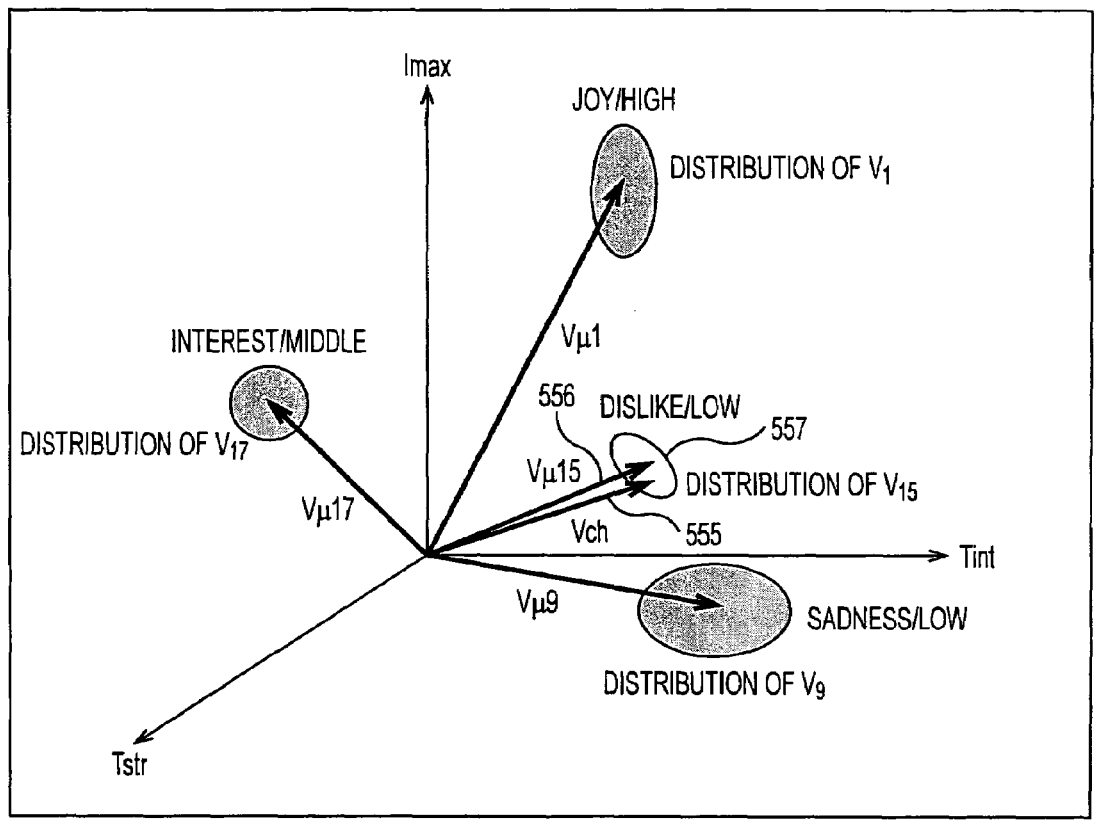
FIG. 60 is a diagram showing Vch and distributions of various vectors.

FIG. 60 shows examples of feature vectors of vibration information corresponding to some kinds of emotion information of the user a. In FIG. 60, the feature vectors are plotted in a 3-dimensional space including a Tstr axis, a Tint axis, and an Imax axis. The feature value vector 555 (Vch) generated in step S436 in FIG. 56 is close to a center vector 556 (Vμ15) of a feature value vector distribution 557 corresponding to the "low-level dislike", and thus as a result of the process of identifying the emotion/state and the strength level of the Vch, the feature value vector 555 (Vch) is identified as a feature value vector corresponding to the "low-level dislike".

In this way, the emotion/state and the strength level thereof are identified from the feature value vector Vch.

Figure 61:
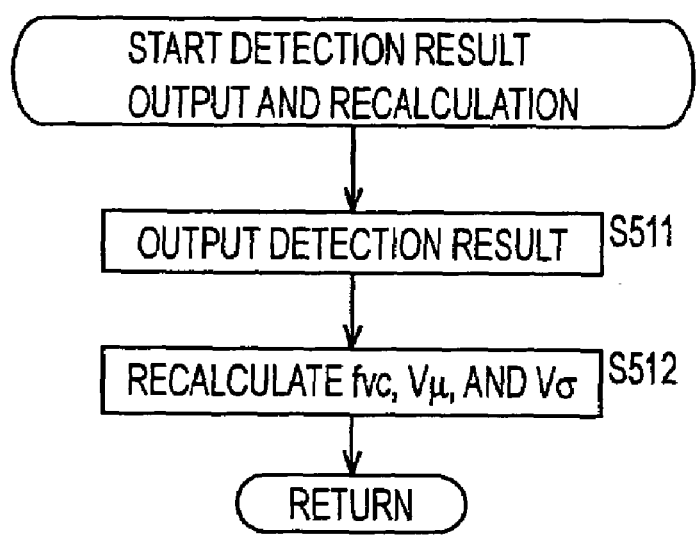
FIG. 61 is a flow chart showing a process of outputting an identification result and a recalculation process.

Now, referring to FIG. 61, the process of outputting the identification result and performing a recalculation is described below. This process is performed by the learning unit 304 of the terminal B. In step S511, the learning unit 304 of the terminal B outputs the identification result to the output controller 324. In step S512, the learning unit 304 of the terminal B recalculates the distribution fvc of the feature value vector of vibration information corresponding to emotion information E of the user a and the center vector Vμ and the standard deviation vector Vσ of the distribution fvc, and the learning unit 304 of the terminal B stores the recalculated result. That is, the feature value vector Vch generated in step S436 (FIG. 56) is added to the feature value vector of vibration information indicating the "weak dislike state" of the user a stored in the storage unit, and fvc, Vμ, and Vσ are recalculated and stored in the storage unit 305.

In this way, the emotion/state and the strength level thereof are identified from vibration information, and information associated with the feature vectors of the identified emotion/state and the strength level thereof is stored.

As described above, in accordance with keyboard vibration information received from the terminal A of the user a, the terminal B generates the feature value vector Vch and identifies the emotion/state and the strength level of Vch. Similarly, in accordance with vibration information associated with the keyboard of the user b, the terminal B generates the feature value vector Vch and identifies the emotion/state and the strength level of Vch.

Similarly, the terminal A identifies the emotion/state and the strength level of the user a and the user b.

Figure 62:
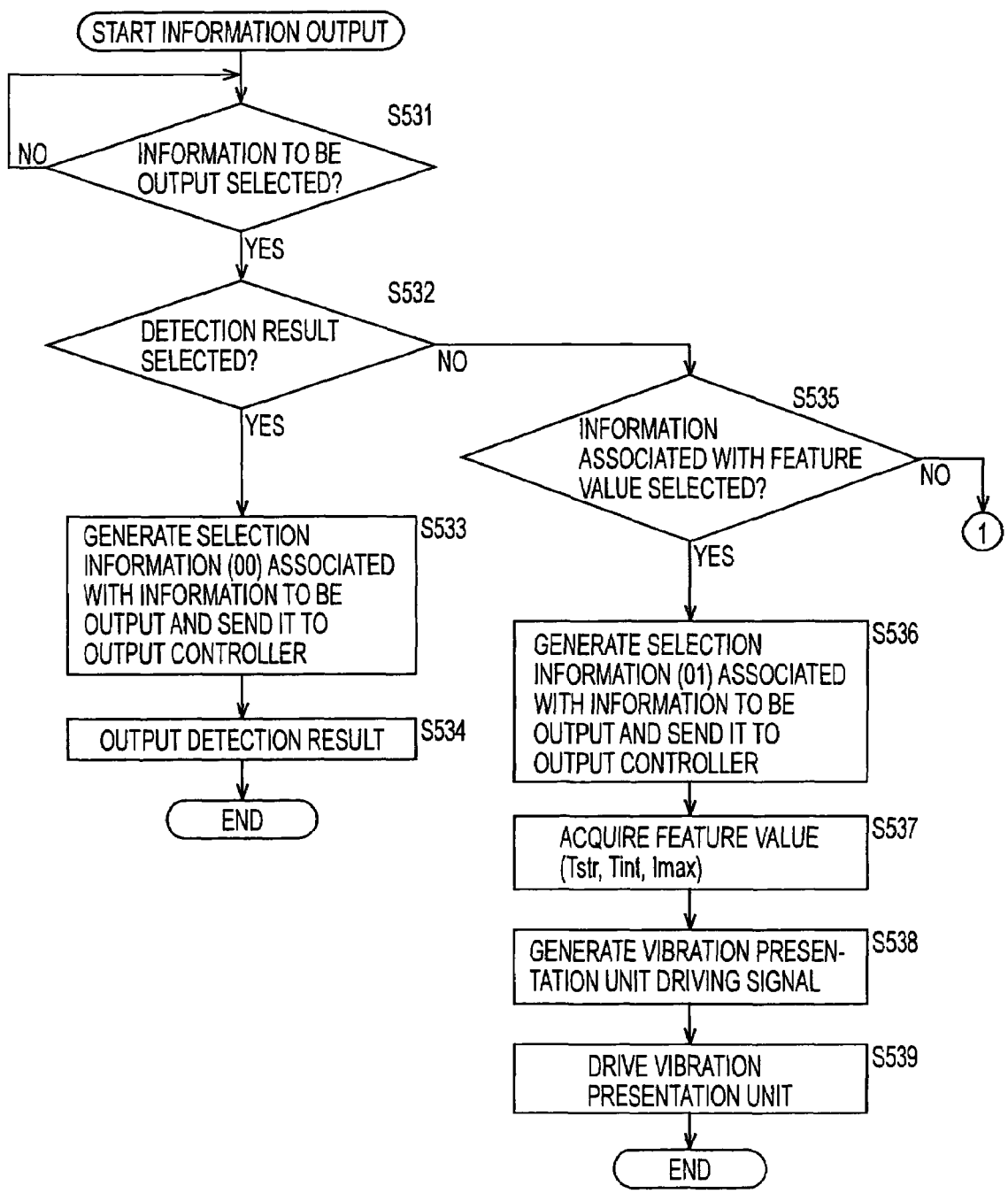
FIG. 62 is a flow chart showing an information output process.
Figure 63:
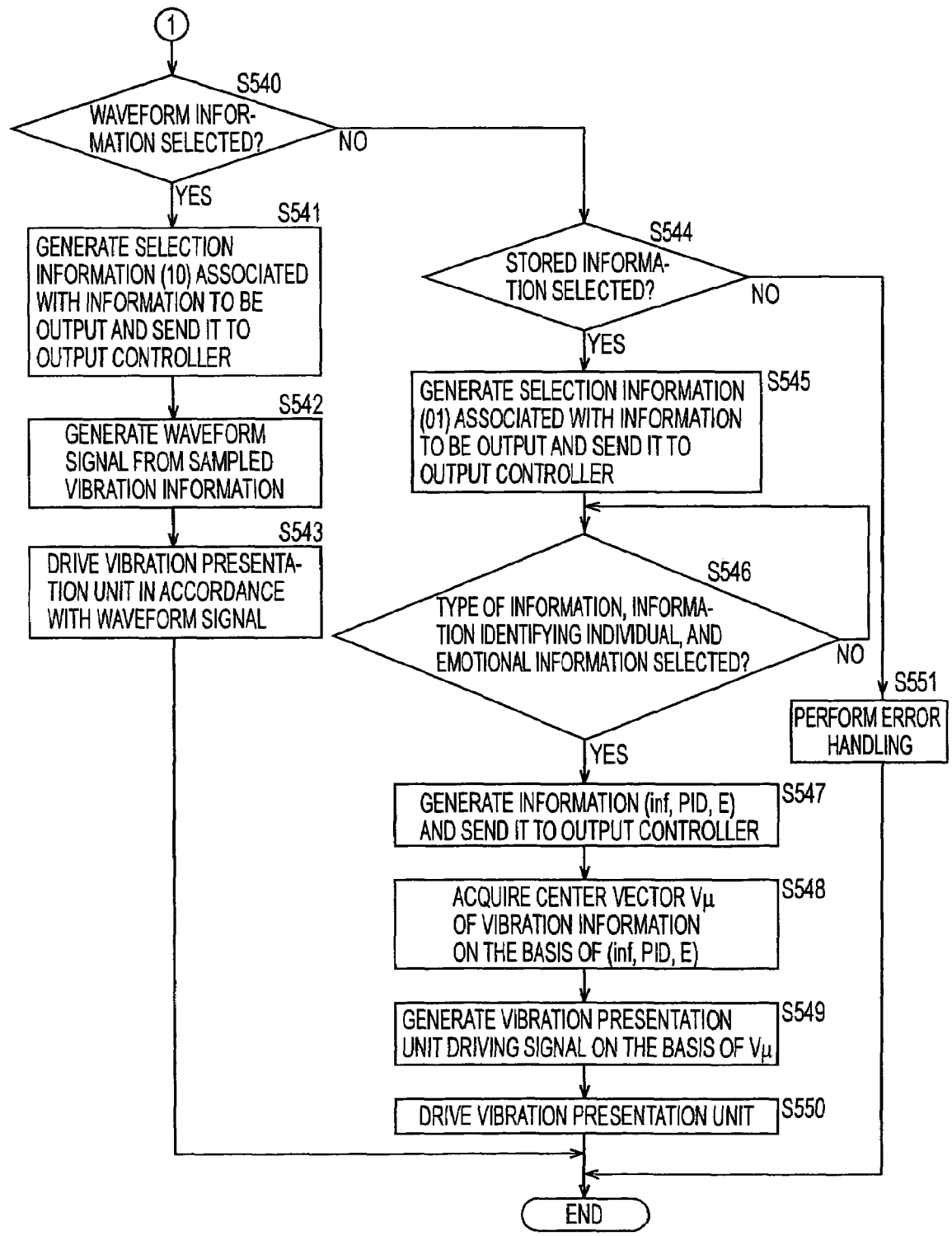
FIG. 63 is a flow chart showing a remaining part of the information output process.

Now, referring to FIGS. 62 and 63, an information outputting process is described below. First, in step S531, the system controller 307 determines whether information to be output is selected. If information to be output is not selected, the process waits until information to be output is selected. The selection of information to be output may be performed, for example, as in EXAMPLE 1, by clicking a menu item displayed on the display of the terminal. The selection menu used by a user to select information to be output includes the following four items: "identification result", "information based on feature values", "waveform information", and "stored information".

If it is determined in step S531 that information to be output is selected, then in step S532 the system controller 307 determines whether the information selected to be output is the identification result. If it is determined that the information selected to be output is the identification result, then in step S533, the system controller 307 transmits, to the output controller 324, 2-bit selection information 00 indicating that the identification result should be output.

In step S534, the output controller 324 outputs an identification result associated with the emotion/state and the strength level thereof. For example, a text "User A is in a weak dislike state" is displayed on the display of the terminal.

If it is determined in step S532 that the information selected to be output is not the identification result, then, in step S307, the system controller 307 determines whether the information selected to be output is the information based on feature values. If it is determined that the information selected to be output is the information based on feature values, then, in step S536, the system controller 307 transmits, to the output controller 324, 2-bit selection information 01 indicating that the information based on feature values should be output.

Figure 64:
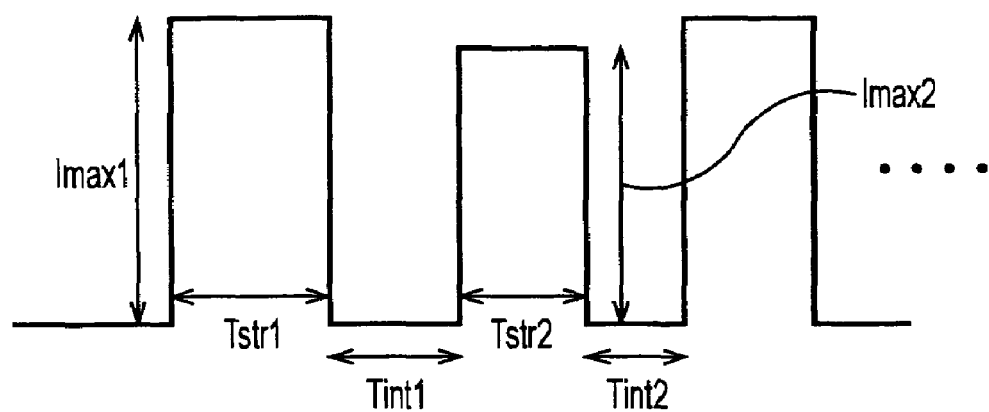
FIG. 64 is a diagram showing an example of a waveform of information output in the information output process.

In step S537, the output controller 324 acquires a feature value (Tstr, Tint, Imax) from the feature extractor 322. Then, in step S538, the output controller 324 generates a vibration presentation unit driving signal. More specifically, as shown in FIG. 64, a rectangular wave signal with an output level Imax, an on-period Tstr, and an off-period Tint is generated. Then in step S539, the output controller 324 drives the vibration presentation unit 362.

If it is determined in step S535 that the information selected to be output is not the information based on feature values, then, in step S540, the system controller 307 determines whether the information selected to be output is the waveform information. If it is determined that the information selected to be output is the waveform information, the system controller 307 transmits, to the output controller 324, 2-bit selection information 10 indicating that the waveform information should be output. In step S542, the output controller 324 acquires sampled vibration information from the feature extractor 322 and generates a waveform signal. In step S543, the output controller 324 drives the vibration presentation unit 362.

If it is determined in step S540 that the information selected to be output is not the waveform information, then, in step S544, the system controller 307 determines whether the information selected to be output is the stored information. If it is determined that the information selected to be output is the stored information, then, in step S545, the system controller 307 transmits, to the output controller 324, 2-bit selection information 01 indicating that the stored information should be output.

In the case in which the information selected to be output is the stored information, a sub-menu is further displayed on the display of the terminal so that a user can specify an item of stored information to be output. More specifically, the user can make selections in terms of items of information inf such as keyboard vibration information, information PID identifying a user, and emotion information E. For example, the user can select keyboard vibration information as inf, information indicating the user a as PID, and "strong vital state" as emotion information E.

In step S546, the system controller 307 determines whether inf indicating a particular kind of information, PID identifying a user, and emotion information E are selected. If selection is not performed, the process waits until selection is made.

In step S547, the system controller 307 generates information (inf, PID, E) in accordance with the selection made by the user and transmits the generated information to the output controller 324.

In step S548, in accordance with (inf, PID, E), the output controller 324 acquires the center vector of vibration information associated with the keyboard from the storage unit 305. In this specific case, the center vector Vμ(Tstr, Tint, Imax) of feature value vectors of pulse information corresponding to the "high-level vitality" of the user a is acquired from the storage unit.

Figure 65:
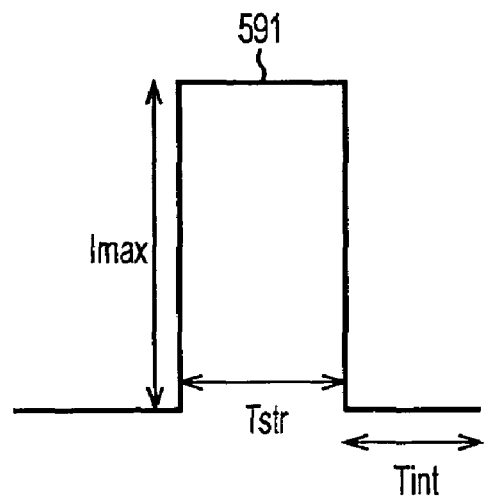
FIG. 65 is a diagram showing an example of a waveform of information output in the information output process.

In step S549, the output controller 324 generates a vibration presentation unit driving signal in accordance with the center vector Vμ. More specifically, as shown in FIG. 65, a rectangular wave signal 591 with an output level Imax, an on-period Tstr, and an off-period Tint is generated. Then in step S550, the output controller 324 drives the vibration presentation unit 362 three times in accordance with the generated driving signal.

If it is determined in step S544 that the information selected to be output is not the stored information, then, in step S551, the system controller 307 performs error handling. After completion of the error handling, the process is ended.

Thus, the emotion/state and the strength level thereof identified from the vibration information are displayed so that the user can recognize them. Furthermore, the vibration presentation unit is driven so that the user can recognize vibration information via bodily sensations.

EXAMPLE 3

Figure 66:
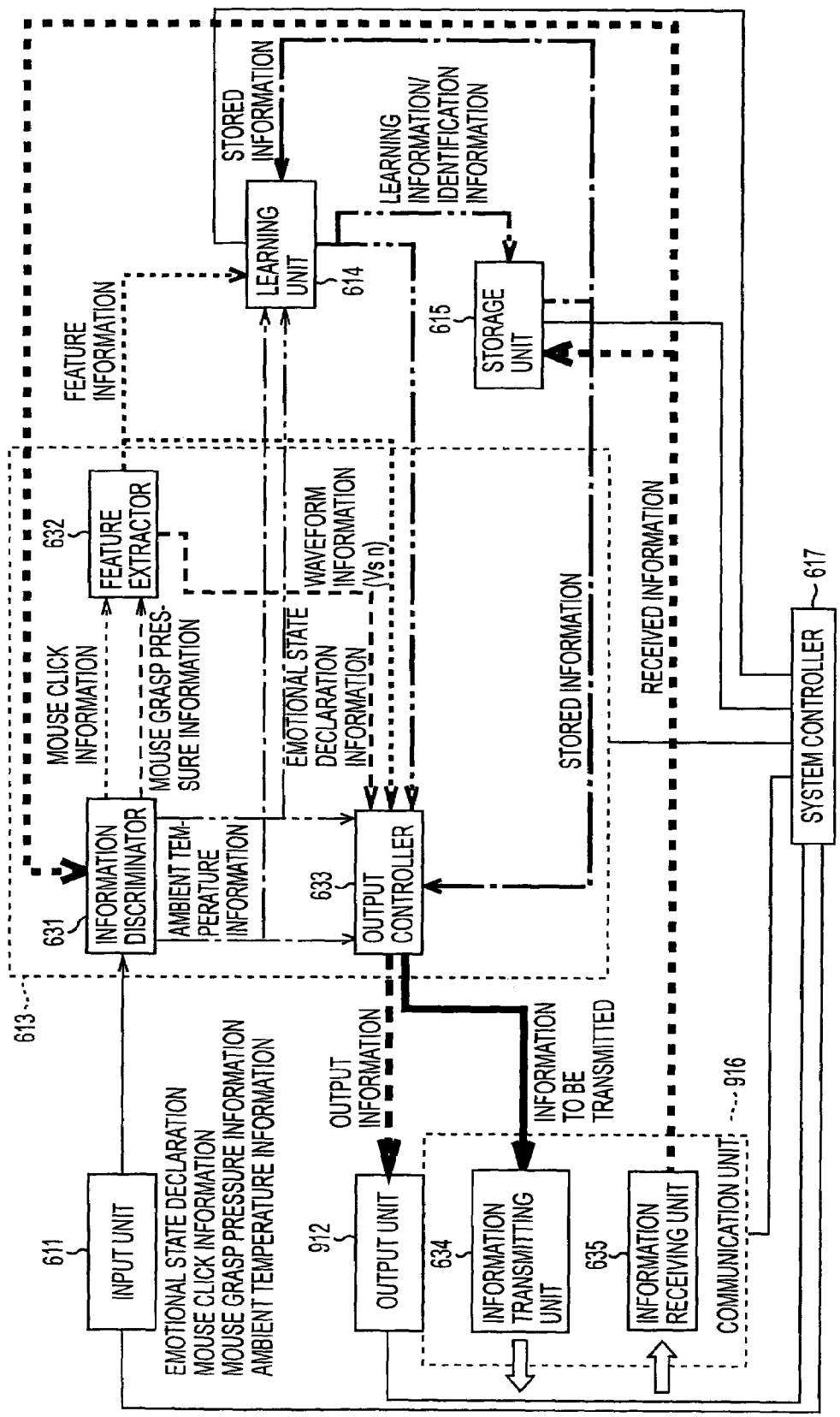
FIG. 66 is a block diagram showing an example of a structure of a third-type information processing apparatus according to the present invention.

FIG. 66 shows an example of a structure of an information processing apparatus according to a third embodiment of the present invention. This information processing apparatus can be applied to, for example, a personal computer. The information processing apparatus includes an input unit 611 for inputting emotion declaration information, mouse click information, mouse grasp pressure information, or ambient temperature information, a processing unit 613 for processing the information input via the input unit 611, a learning unit 614 for performing learning and identification on the basis of property information and emotion information output from the processing unit 613, a storage unit 615 for storing learned information and identified information output from the learning unit 614, an output unit 612 for outputting information on the basis of output information output from the processing unit 613, a communication unit 616 for communication, and a system controller 617 for controlling various parts.

The processing unit 613 includes an information discriminator 631 for classifying information input via the input unit 611 into emotion/state declaration information, ambient temperature information, or mouse click information/grasp pressure information, a feature extractor 632 for extracting property information from mouse click information and mouse grasp pressure information, and an output controller 612 for outputting information to the output unit 612. The communication unit 616 includes an information transmitting unit 634 for transmitting information and an information receiving unit 635 for receiving information.

Figure 67:
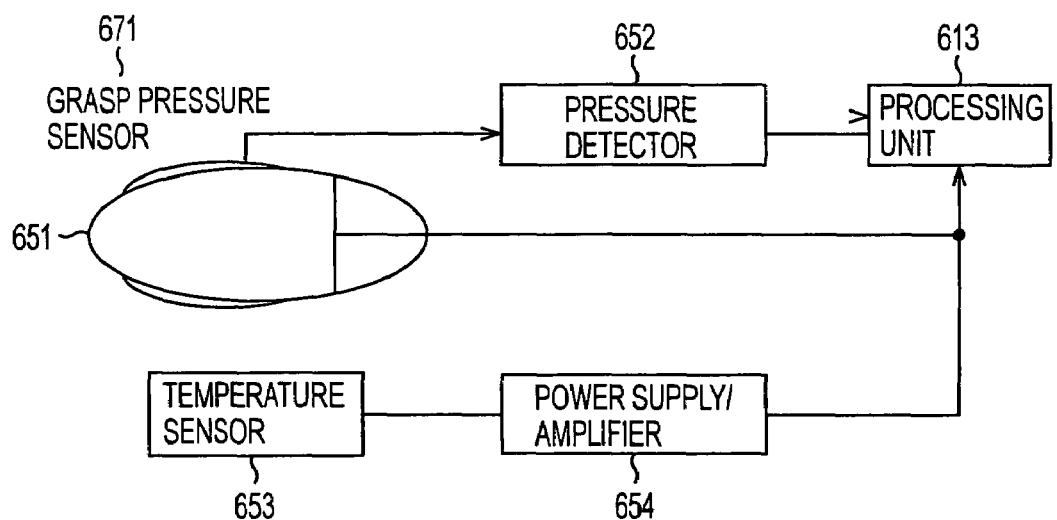
FIG. 67 is a block diagram showing an example of a structure of an input unit shown in FIG. 66.

FIG. 67 shows an example of a structure of the input unit 611. In the example shown in FIG. 67, the input unit 611 includes a grasp pressure sensor 671 for detecting the grasp pressure at which a mouse is grasped by a user, a pressure detector 652 for converting the signal output from the grasp pressure sensor 671 into a pressure signal, a temperature sensor 653 for detecting the ambient temperature, and a poser supply/amplifier 654 for amplifying the signal output from the temperature sensor 653.

Figure 68:
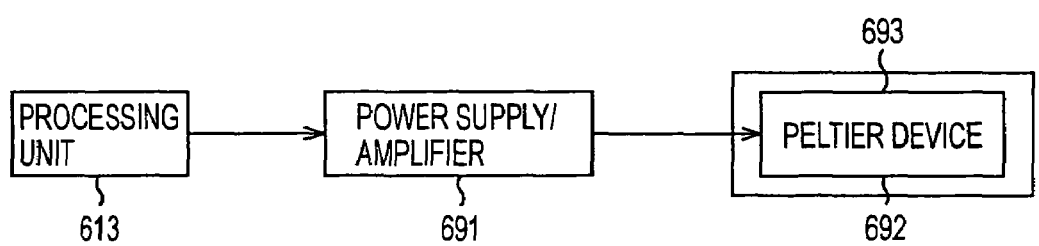
FIG. 68 is a block diagram showing an example of a structure of an output unit shown in FIG. 66.

FIG. 68 shows an example of a structure of the output unit 612. In this example, the output unit 612 includes a temperature presentation unit 692 for generating heat in accordance with a driving signal, and a power supply/amplifier 691 for driving the temperature presentation unit 692. The temperature presentation unit 692 is formed of, for example, a Peltier device 693 whose temperature varies depending on a current passed through the Peltier device 693.

Figure 69:
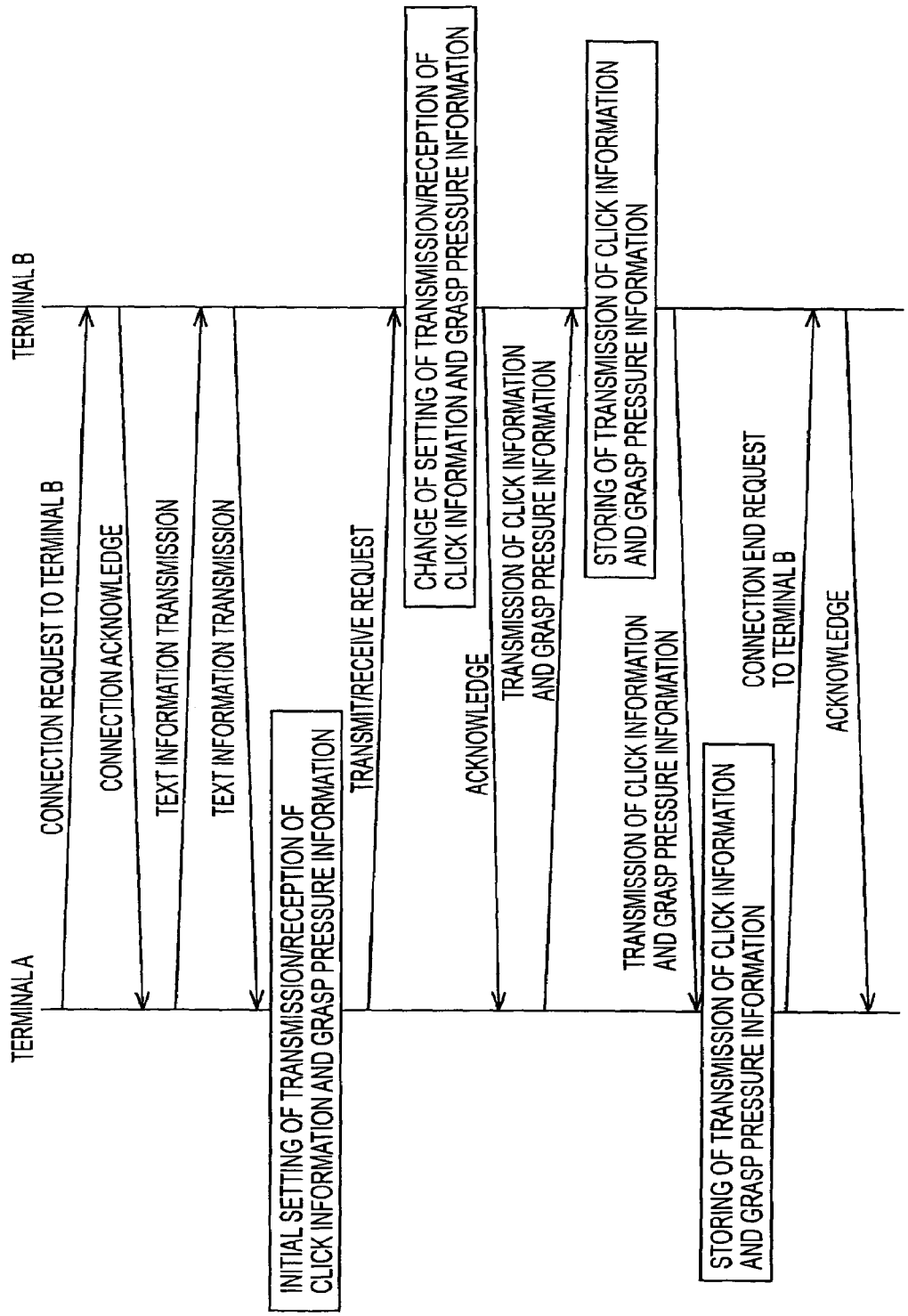
FIG. 69 is a diagram showing an example of a manner in which information is transmitted/received between a terminal A and a terminal B.

Herein, an information processing apparatus of a user a is denoted by a terminal A, and an information processing apparatus of a user b is denoted by a terminal B. The user a and the user b can communicate with each other using their terminals A and B in accordance with a procedure shown in FIG. 69. First, the terminal A transmits a connection request to the terminal B. In response, the terminal B returns a connection acknowledgment signal to the terminal A. Thereafter, textual information such as a mail or a chat is transmitted between the terminal A and the terminal B.

The terminal A performs initial setting associated with transmission/reception of click information and grasp pressure information (grasp pressure with which a user grasps a mouse, in this specific example), and transmits a transmission/reception request to the terminal B together with transmission setting information and reception setting information such as those shown in FIG. 11, as in the EXAMPLE 1.

If the terminal B receives the vibration information transmission request from the terminal A, the terminal B changes the setting associated with transmission/reception of click information and grasp pressure information and returns an acknowledgment signal to the terminal A.

The terminal A then transmits click information and grasp pressure information of the user a to the terminal B, and the terminal B transmits vibration information of the user b to the terminal A. The terminal A and the terminal B store the received <click information and grasp pressure information.

If the terminals A transmits a connection end request to the terminal B, the terminal B transmits a connection end acknowledgment signal, and the communication is ended.

Figure 70:
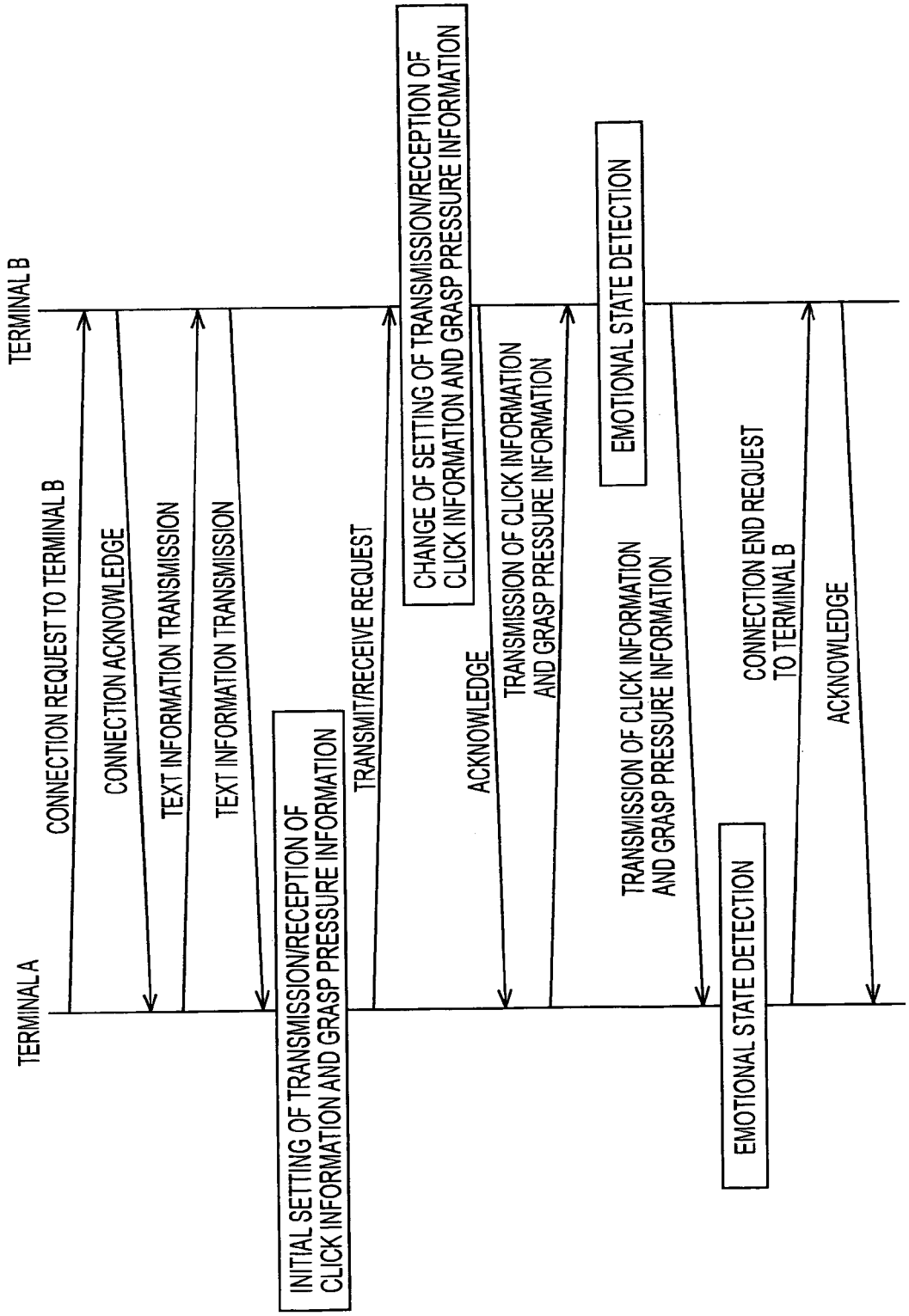
FIG. 70 is a diagram showing an example of a manner in which information is transmitted/received between a terminal A and a terminal B.

Communication is performed between the terminal A and the terminal B in the above-described manner, and click information and grasp pressure information are stored in the terminal A and the terminal B. After sufficient amounts of click information and grasp pressure information are stored, transmission/reception of information is performed as shown in FIG. 70. If click information and grasp pressure information are transmitted between the terminal A and the terminal B, the terminal A and the terminal B detect the emotion or the state of users.

Figure 71:
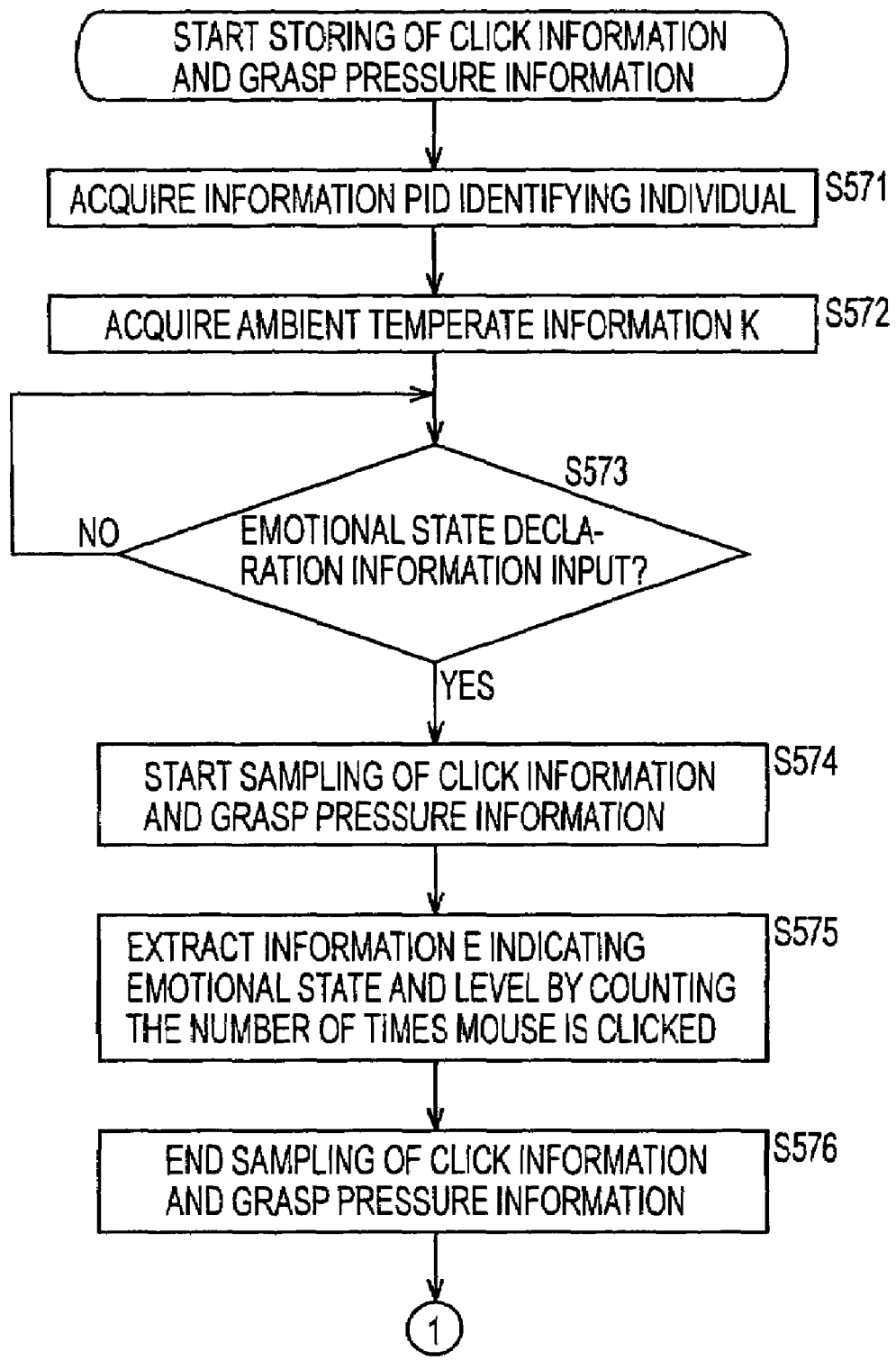
FIG. 71 is a flow chart showing a process of storing click information and grasp pressure information.
Figure 72:
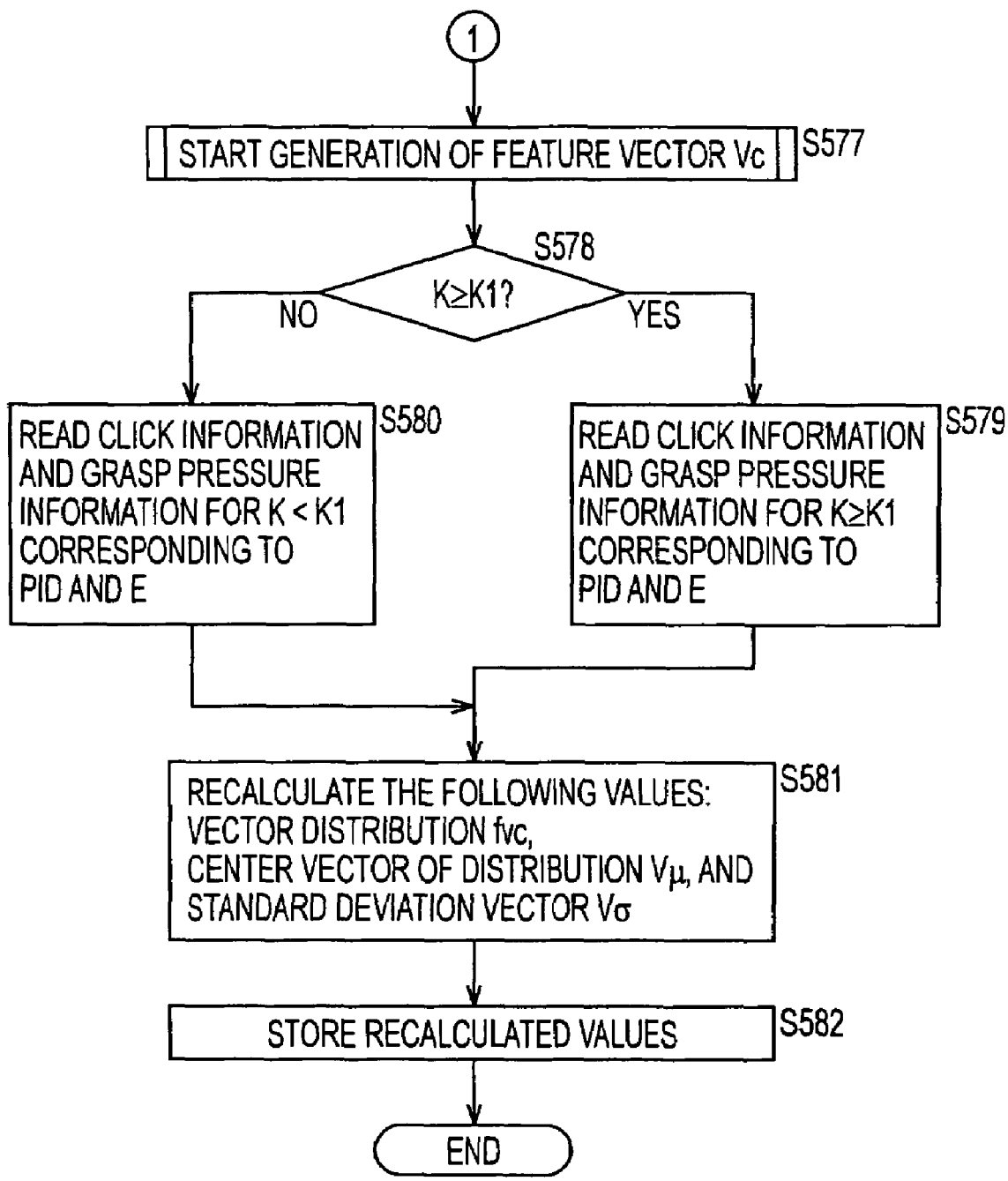
FIG. 72 is a flow chart showing a remaining part of the process of storing click information and grasp pressure information.

Now, referring to FIG. 71, a process performed by the terminal B to store click information and grasp pressure information is described below. First, in step S571, at the start of communication with the terminal A, the system controller 617 of the terminal B acquires information (for example, a name or a nickname) PID identifying the user a of the terminal A with which to communicate. In step S572, the system controller 617 of the terminal B acquires ambient temperature information K transmitted from the terminal A. In step S572, the system controller 617 of the terminal B commands the information discriminator 631 to determine whether emotion/state declaration information is input from the terminal A. If emotion/state declaration information is not yet input, the process waits until emotion/state declaration information is input.

Figure 76:
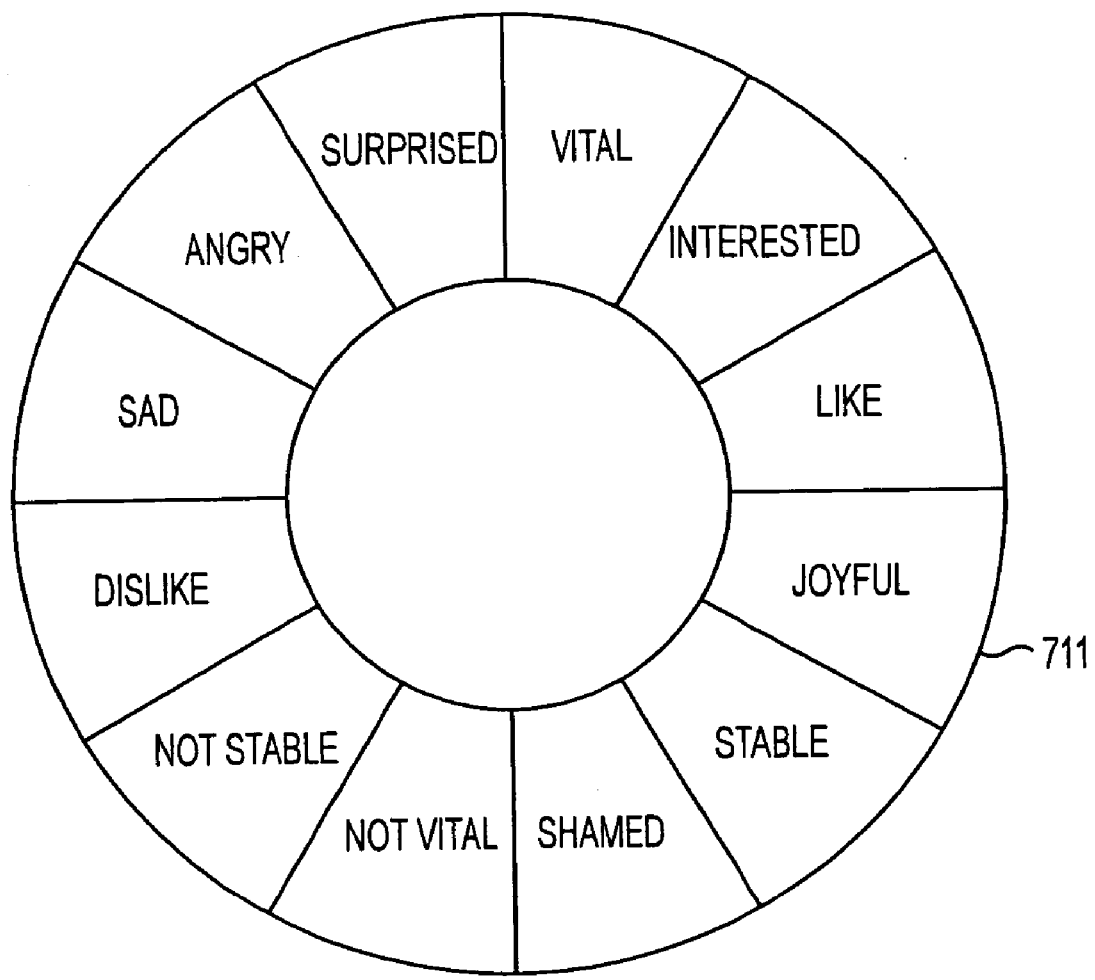
FIG. 76 is a diagram showing an example of an emotion/state declaration chart.

An emotion/state chart such as that shown in FIG. 76 is displayed on the display of the terminal A. The user a declares his/her emotion/state by clicking a corresponding area of the emotion/state chart a particular number of times using a mouse. If the emotion/state chart is clicked with the mouse, emotion/state information such as that shown in FIG. 77 is transmitted from the terminal A to the terminal B. In the declaration, the strength level of the emotion/state is indicated by the number of times the emotion/state chart is clicked. More specifically, a low level is indicated by clicking twice, a middle level by clicking three times, and a high level by clicking four times.

The emotion/state declaration information associated with a user may be acquired by using an agent (such as an avatar) assigned to the user in a virtual space.

In the case in which it is determined in step S573 that emotion/state declaration information is input, then, in step S574, the system controller 617 of the terminal B commands the feature extractor 632 to start sampling of click information and grasp pressure information associated with the user a transmitted from the terminal A. Then in step S575, the system controller 617 of the terminal B extracts emotion information E from the emotion/state declaration information. In step S576, the system controller 617 of the terminal B commands the feature extractor 632 to end the sampling of the click information and grasp pressure information.

The sampling of mouse click information and grasp pressure information may be performed by the feature extractor 632 of the terminal A and the resultant sampled information may be transmitted to the terminal B.

For example, when an area assigned to surprise in the emotion/state declaration chart is clicked four times with the mouse by the user a, a "strong surprise" is extracted as the emotion information E.

In step S577, the system controller 617 of the terminal B commands the feature extractor 632 to generate a feature vector Vc on the basis of click information and grasp pressure information of the user a. In step S578, it is determined whether the ambient temperature K is equal to or higher than a reference value K1. If it is determined that the ambient temperature K is equal to or higher than a reference value K1, then in step S579, click information and grasp pressure information corresponding to information PID and the emotion information E with $K \geq K1$ is read from the storage unit 615. In this specific case, feature value vectors of click information and grasp pressure information corresponding to the strong surprise of the user a at an ambient temperature equal to or higher than K1 are read.

In the case in which it is determined in step S578 that the ambient temperature K is lower than the reference value K1, then, in step S580, the system controller 617 of the terminal B reads, from the storage unit 615, click information and grasp pressure information corresponding to information PID and the emotion information E with $K \geq K1$. In this specific case, feature value vectors of click information and grasp pressure information corresponding to the strong surprise of the user a at an ambient temperature lower than K1 are read.

In step S581, using the learning unit 614, the system controller 617 of the terminal B adds the newly generated feature vector Vc to the read feature vectors and recalculates the vector distribution fvc, the distribution center vector Vμ, and the standard deviation vector Vσ. In step S582, the recalculated vectors are stored in the storage unit 615.

Figure 73:
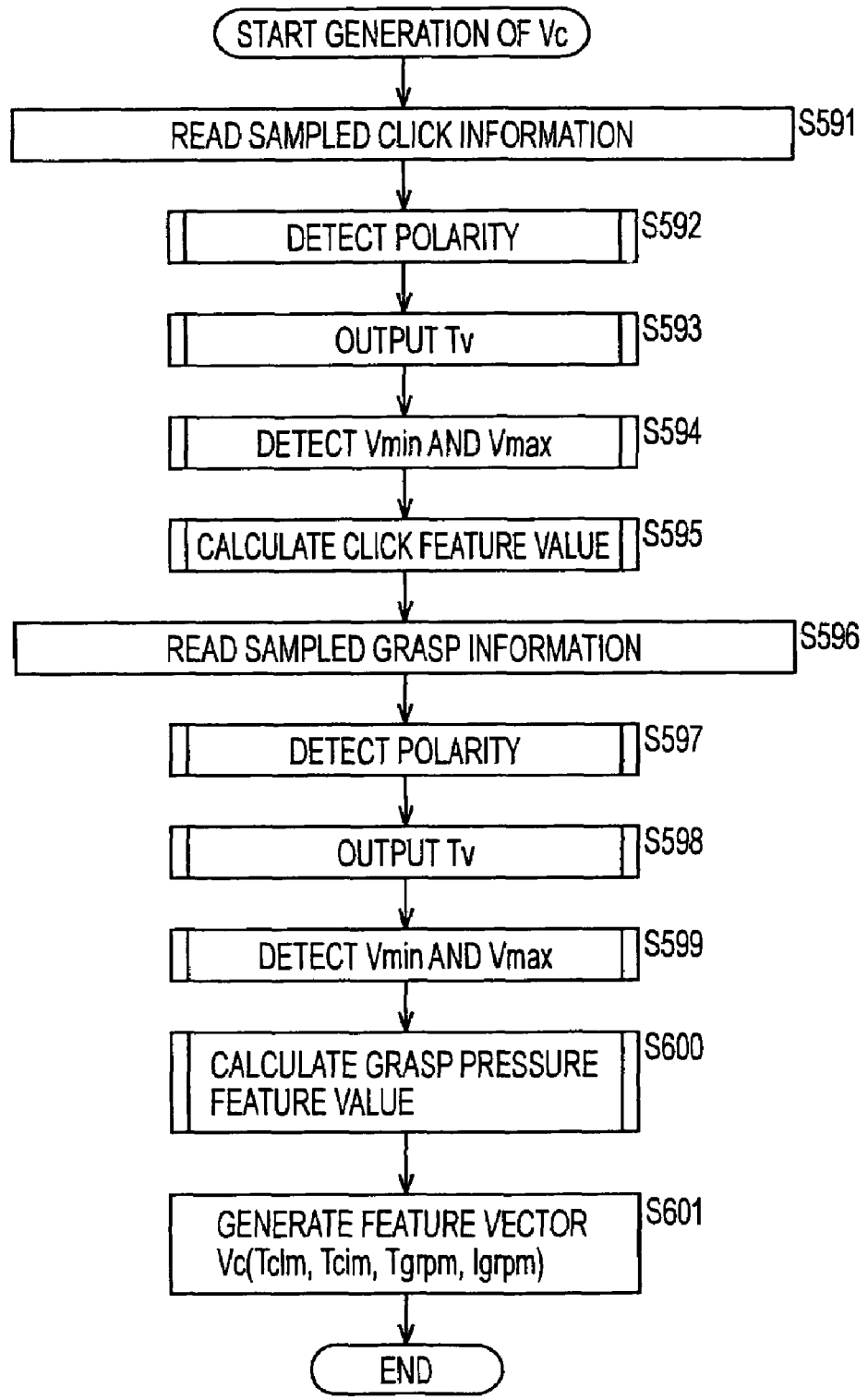
FIG. 73 is a flow chart showing a process of generating a feature value vector Vc.

Now, referring to FIG. 73, the process of generating the feature vectors Vc of click information and grasp pressure information is described below. This process is performed by the feature extractor 632 of the terminal B. In step S591, the feature extractor 632 of the terminal B reads sampled click information and grasp pressure information. Thereafter, in step S592, as in EXAMPLE 1, the feature extractor 632 of the terminal B performs the polarity detection process described above with reference to FIG. 16, and, in step S593, the Tv generation process described above with reference to FIG. 17, and furthermore in step S594, the Vmin/Vmax detection process described above with reference to FIG. 18. In step S595, the feature extractor 632 of the terminal B performs a click feature value calculation to obtain Tclm and Tcim. The details of the calculation process will be described later.

Then in step S596, the feature extractor 632 of the terminal B reads sampled grasp pressure information. In step S597, the feature extractor 632 of the terminal B performs the polarity detection process, and, in step S598, the Tv generation process, and furthermore in step S599 the Vmin/Vmax detection process. In step S600, the feature extractor 632 of the terminal B performs a grasp pressure feature value calculation to obtain Tgrpm and Igrpm. The details of the calculation process will be described later.

In step S601, the feature extractor 632 of the terminal B generates a feature value vector Vc(Tclm, Tcim, Tgrpm, Igrpm).

Figure 79:
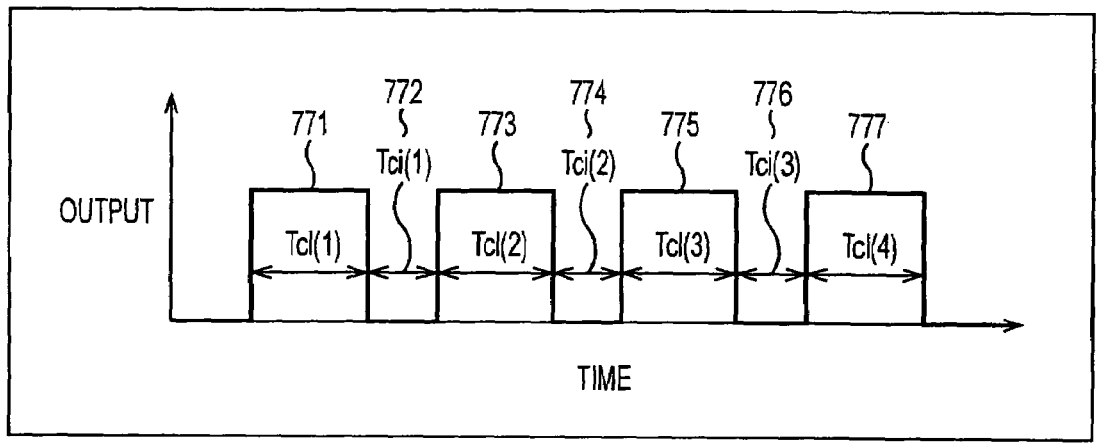
FIG. 79 is a graph showing an example of a keyboard vibration information waveform.

Now, referring to FIG. 74, the process of calculating the click feature value is described below. FIG. 79 shows an example of a waveform of click information generated when a user clicks a mouse. That is, when a click button is clicked down by the user, a pulse 771, a pulse 773, a pulse 775, and a pulse 777 are output when a click button of the mouse is pressed down by the user. When the click button is not pressed, the output becomes 0 as in periods denoted by 772, 774, and 776. If this waveform is sampled, and the sampled data is subjected to the polarity detection process and the Tv generation process, Tv+, Tv0, Tv+, Tv0, Tv+ . . . are obtained as the result.

Figure 74:
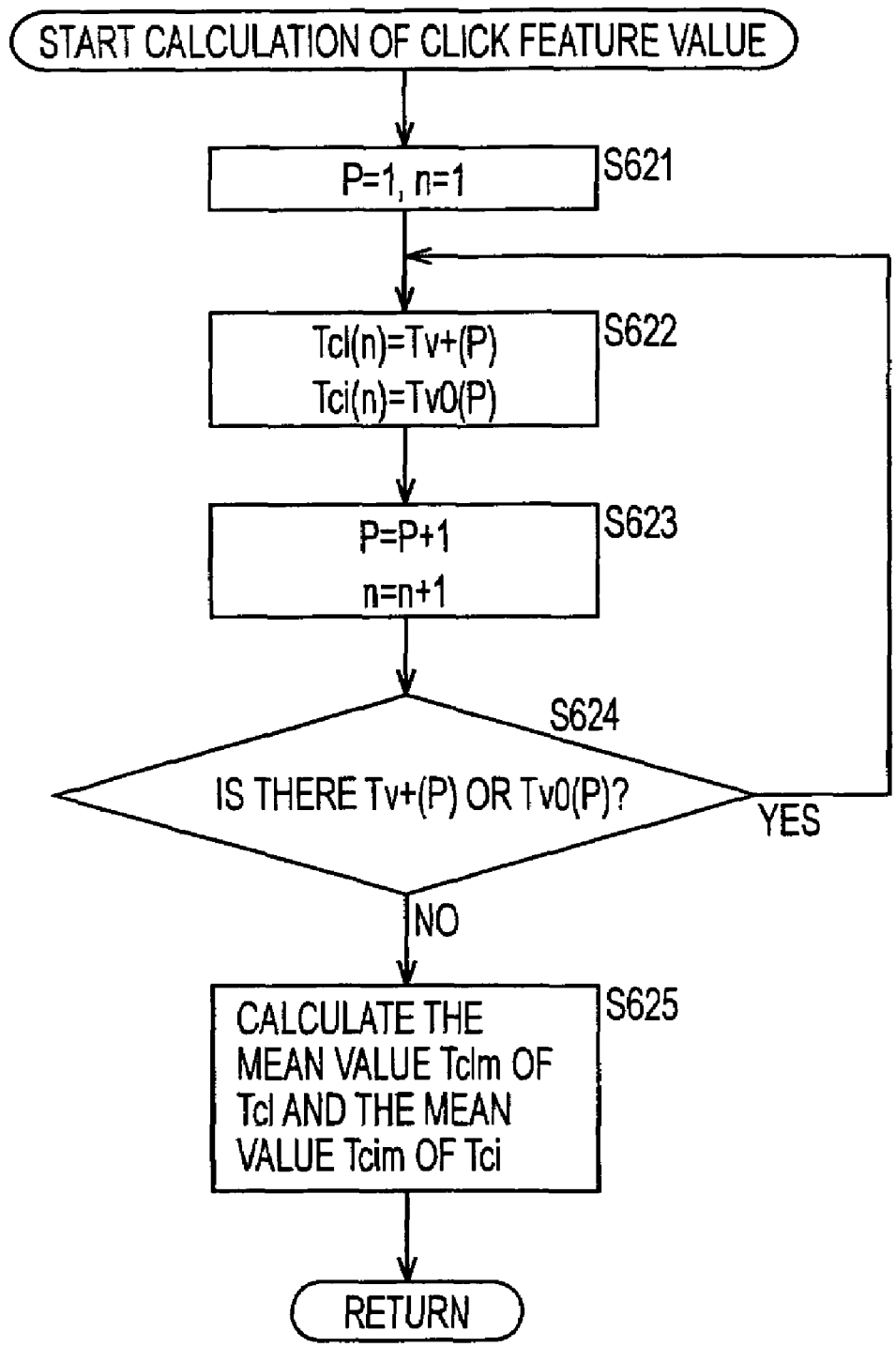
FIG. 74 is a flow chart showing a process of calculating a click feature value.

In step S621 in FIG. 74, the feature extractor 632 of the terminal B sets both parameters n and P to 1. Then, in step S622, the feature extractor 632 of the terminal B sets the value of Tv+(P) into Tc1(n) and the value of Tv0(P) into Tci(n). Then in step S623, the feature extractor 632 of the terminal B increments the values of P and n by 1. In step S624, the feature extractor 632 of the terminal B determines whether Tv+(P) or Tv0(P) exists. If it is determined that Tv+(P) or Tv0(P) exists, then the flow returns to step S622, and the above-described process is repeated.

If it is determined in step S624 that Tv+(P) or Tv−(P) does not exist, then in step S625, the feature extractor 632 of the terminal B calculates the mean value Tclm of Tcl and the mean value Tcim of Tci. In the specific example shown in FIG. 79, Tclm and Tcim are respectively calculated in accordance with the following equations.

$$Tclm=(Tcl(1)+Tcl(2)+Tcl(3)+Tcl(4))/4$$

$$Tcim=(Tci(1)+Tci(2)+Tci(3))/3$$

Figure 75:
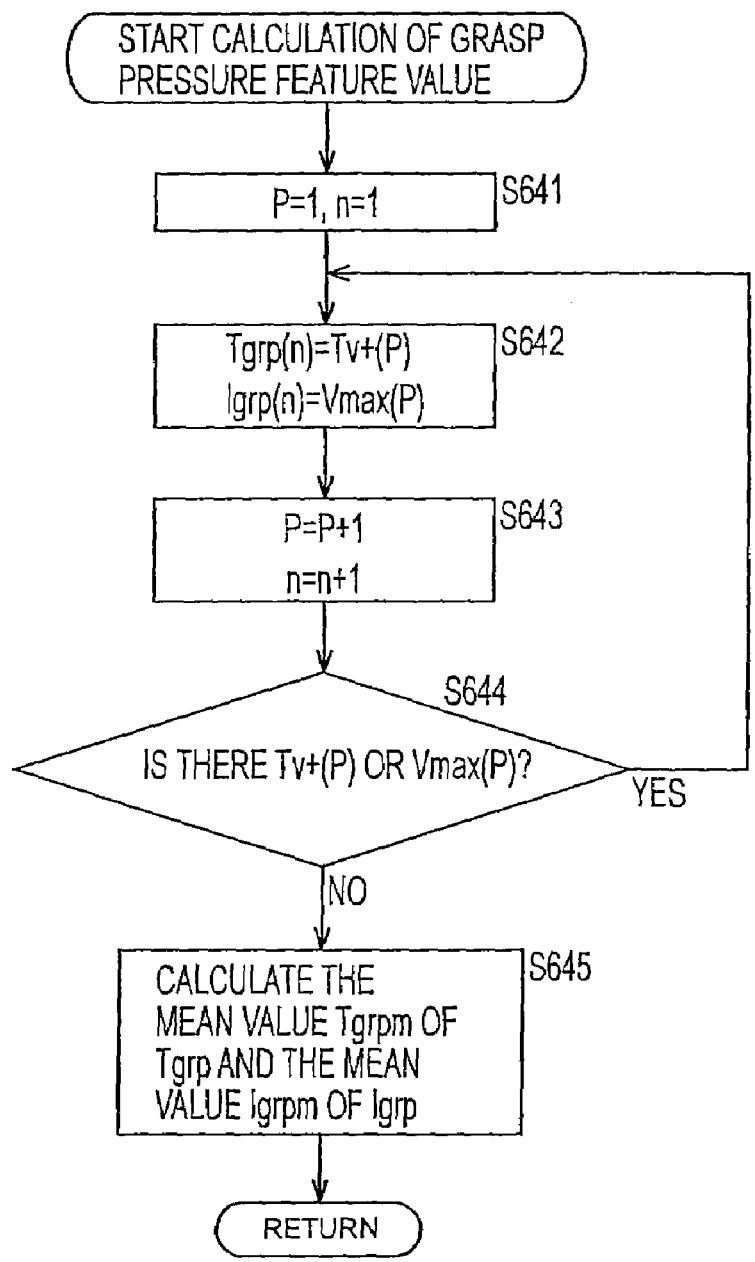
FIG. 75 is a flow chart showing a process of calculating a grasp pressure feature value.
Figure 80:
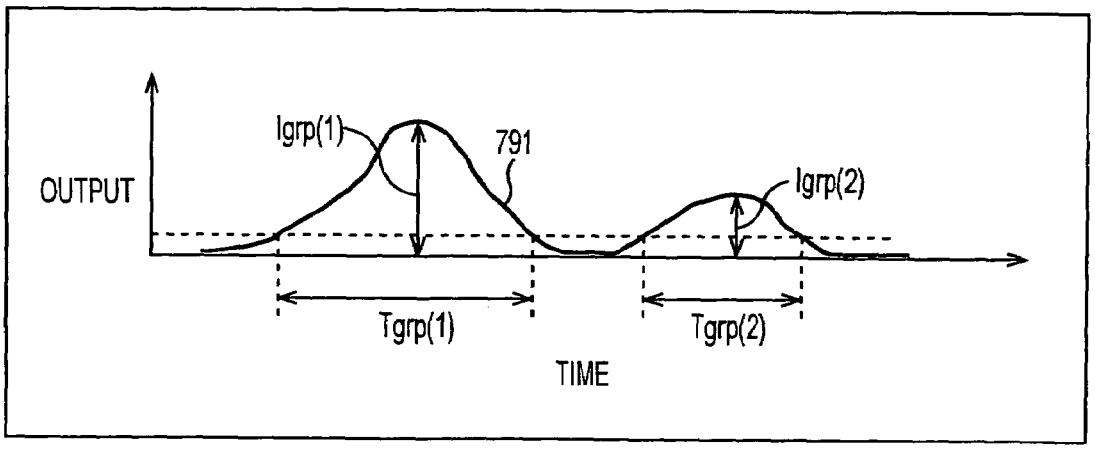
FIG. 80 is a graph showing an example of a waveform of mouse grasp pressure information.

Now, referring to FIG. 75, the process of calculating the grasp pressure feature value is described below. FIG. 80 shows an example of a waveform 791 of a grasp pressure at which a mouse is grasped by a user. If this waveform is sampled, and the sampled data is subjected to the polarity detection process and the Tv generation process, Tv+, Tv0, Tv+ . . . are obtained as the result. That is, Tv+ is obtained when the mouse is grasped by the user at a grasp pressure higher than a threshold value Vth0, while Tv0 is obtained when the grasp pressure is lower than the threshold value Vth0.

By performing the Vmax/Vmin detection process, Vmax indicating a maximum grasp pressure in a period Tv+ during which the mouse is grasped by the user at grasp pressures higher than the threshold value Vth0 is obtained.

In step S641, the feature extractor 632 of the terminal B sets both parameters n and P to 1. Then, in step S642, the value of Tv+(P) is set into Tgrp(n) and the value of Vmax(P) is set into Igrp(n).

In step S643, the feature extractor 632 of the terminal B increments the value of P by 1. In step S644, the feature extractor 632 of the terminal B determines whether Tv+(P) or Tv−(P) exists. If it is determined that Tv+(P) or Tv−(P) exists, then, in step S44, the feature extractor 632 of the terminal B calculates the mean value Tgrpm of Tgrp and the mean value Igrpm of Igrp. In the specific example shown in FIG. 80, Tgrpm and Igrpm are respectively calculated in accordance with the following equations.

$$Tgrpm=(Tgrp(1)+Tgrp(2))/2$$

$$Igrpm=(Igrp(1)+Igrp(2))/2$$

In the above-described manner, a feature vector Vc of click information and grasp pressure information corresponding to the strong surprise of the user a is generated.

Figure 78:
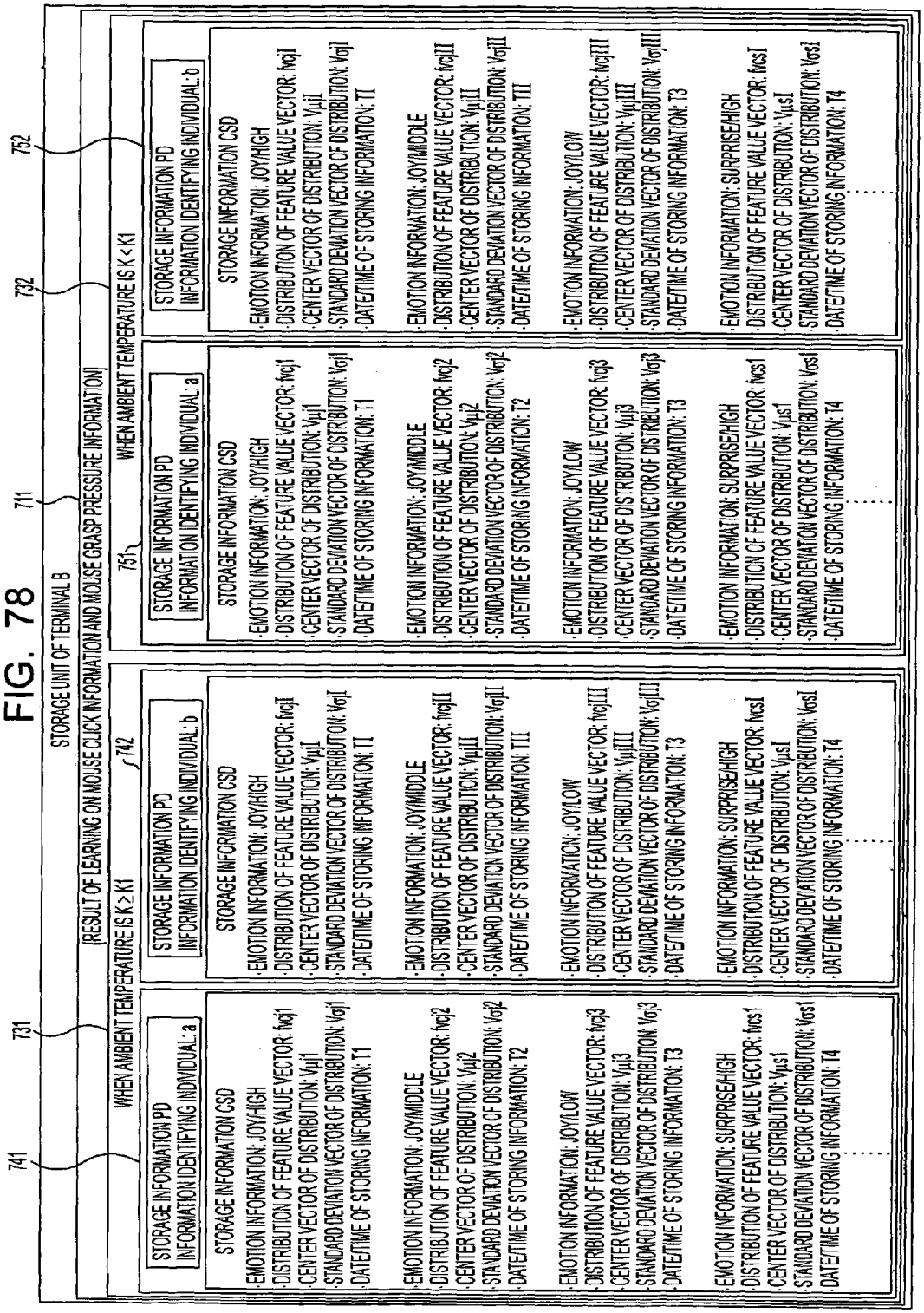
FIG. 78 is a diagram showing an example of information stored in a storage unit of a terminal B.

Thus, the terminal B generates the feature value vector Vc from the click information and grasp pressure information associated with the mouse of the user a received from the terminal A, and the terminal B stores the generated feature value vector Vc. Similarly, the terminal B generates a feature value vector from click information and grasp pressure information associated with the mouse of the user b and stores the generated feature value vector. As a result, as shown in FIG. 78, a learning result 711 associated with the mouse click information and grasp pressure information are stored in the storage unit 615 of the terminal B, separately for the case 731 in which the ambient temperature K≧K1 and the case 732 in which the ambient temperature K<K1. In each of cases 731 and 732 of the ambient temperature K≧K1 and K<K1, the mouse click/grasp pressure information is stored separately for that associated with the user a and that associated with the user b.

Similarly, the terminal A stores a learning result associated with mouse click/grasp pressure information, for the user a and the user b, separately.

Once a sufficient amount of mouse click/grasp pressure information has been stored as a result of a repetition of the above-described click/grasp pressure information storage process, it becomes possible to identify the emotion/state and the strength level of each user from the click/grasp pressure information.

Figure 81:
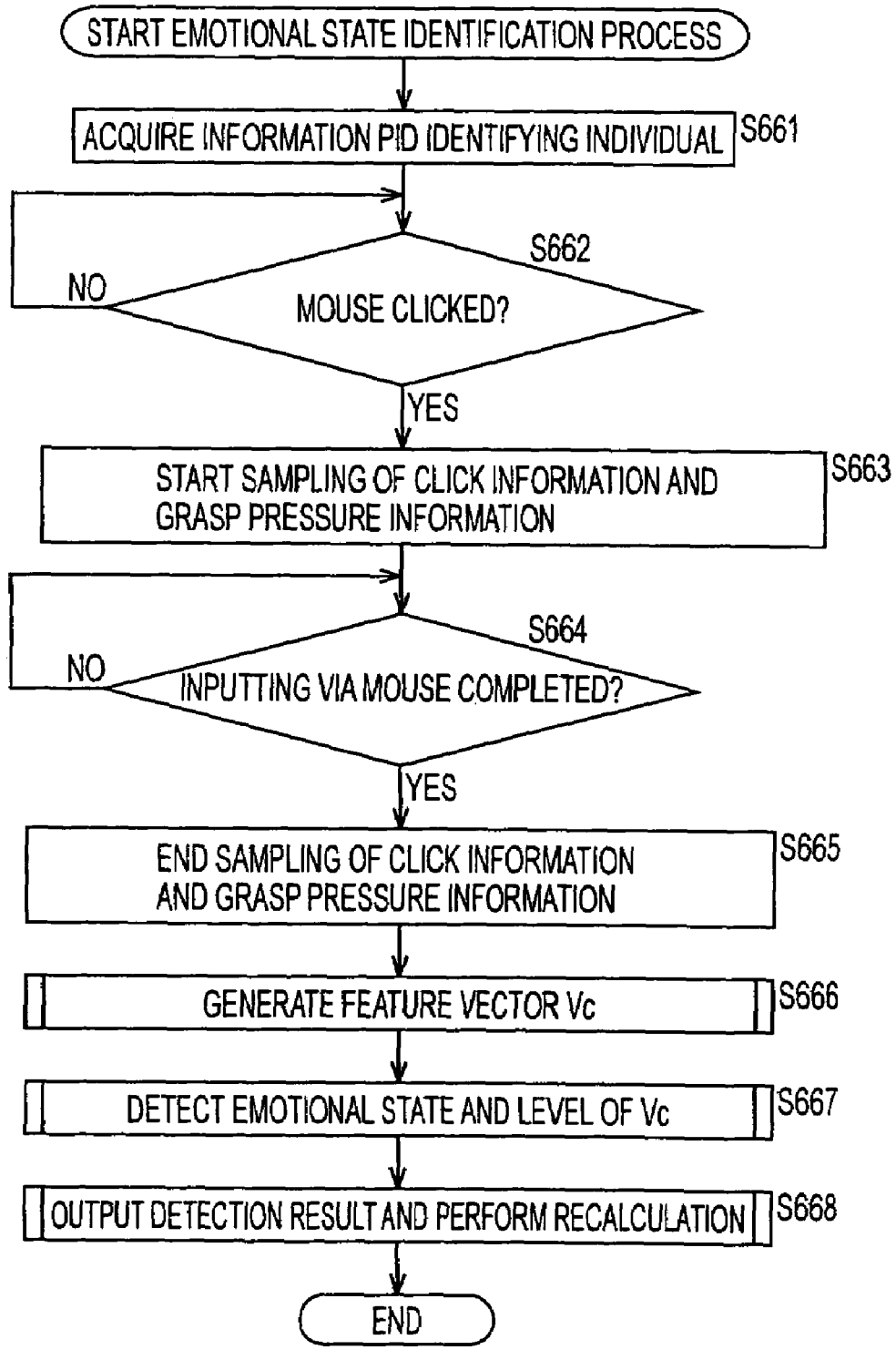
FIG. 81 is a flow chart showing an emotion/state identification process.

Referring to FIG. 81, a process performed by the terminal B to identify an emotional state is described below.

First, in step S661, at the start of communication with the terminal A, the system controller 617 of the terminal B acquires information PID identifying the user a of the terminal A with which to communicate. In step S662, the system controller 617 of the terminal B commands the information discriminator 631 to determine whether a mouse is clicked by the user a to input information. If the mouse is not clicked, the process waits until the mouse is clicked to input information.

If it is determined in step S662 that information is input by clicking the mouse, then in step S663, the system controller 617 of the terminal B commands the feature extractor 632 to start sampling of click information and grasp pressure information associated with the mouse of the user a transmitted from the terminal A. Then in step S664, the system controller 617 of the terminal B commands the information discriminator 631 to determine whether inputting of information using the mouse is completed. If inputting using the mouse is not completed, the process waits until inputting is completed.

If it is determined in step S664 that inputting using the mouse is completed, the system controller 617 of the terminal B commands the feature extractor 632 to end the sampling of click information and grasp pressure information associated with the mouse of the user a transmitted from the terminal A.

The sampling of the click information and the grasp pressure information associated with the mouse may be performed by the feature extractor 632 of the terminal A and the resultant sampled information may be transmitted to the terminal B.

In step S666, the system controller 317 of the terminal B commands the feature extractor 632 to generate a feature vector Vc. In step S667, the system controller 317 of the terminal B commands the learning unit 614 to identify the emotion/state of Vc and the strength level thereof. Furthermore, in step S668, the system controller 317 of the terminal B commands the learning unit 614 to output the identification result and perform a recalculation.

Figure 82:
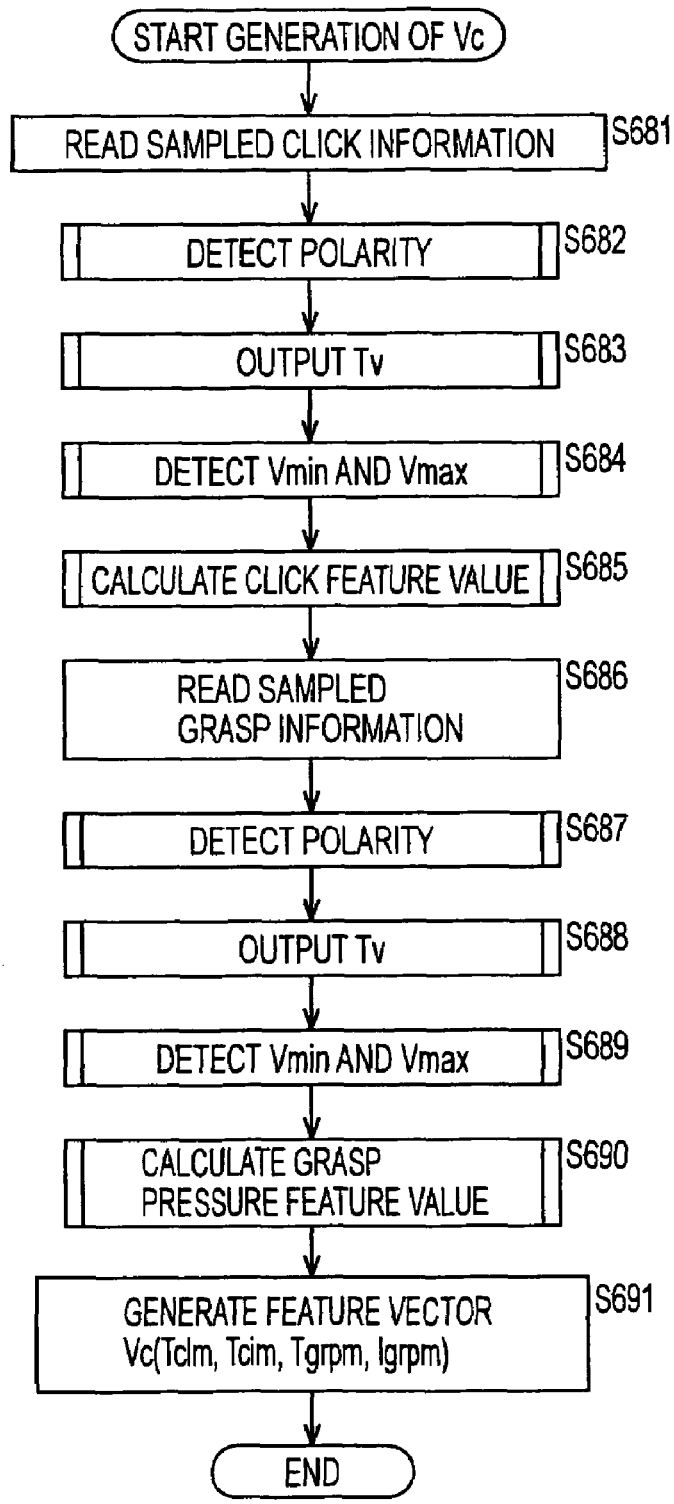
FIG. 82 is a flow chart showing a process of generating a feature value vector Vc.

Referring to FIG. 82, a Vc generation process is described below. This process is performed by the feature extractor 632 of the terminal B. In step S681, the feature extractor 632 of the terminal B reads sampled click information and grasp pressure information. In step S682, the feature extractor 632 of the terminal B performs the polarity detection process, and in step S683 the Tv generation process, and furthermore, in step S684, the Vmin/Vmax detection process. In step S685, the feature extractor 632 of the terminal B performs a click feature value calculation to obtain Tclm and Tcim. The details of the calculation process will be described later.

In step S686, the feature extractor 632 of the terminal B reads sampled grasp pressure information. In step S687, the feature extractor 632 of the terminal B performs the polarity detection process, and in step S688 the Tv generation process, and furthermore, in step S689, the Vmin/Vmax detection process. In step S690, the feature extractor 632 of the terminal B performs a grasp pressure feature value calculation to obtain Tgrpm and Igrpm. The details of the calculation process will be described later.

In step S691, the feature extractor 632 of the terminal B generates a feature value vector Vc(Tclm, Tcim, Tgrpm, Igrpm).

Figure 83:
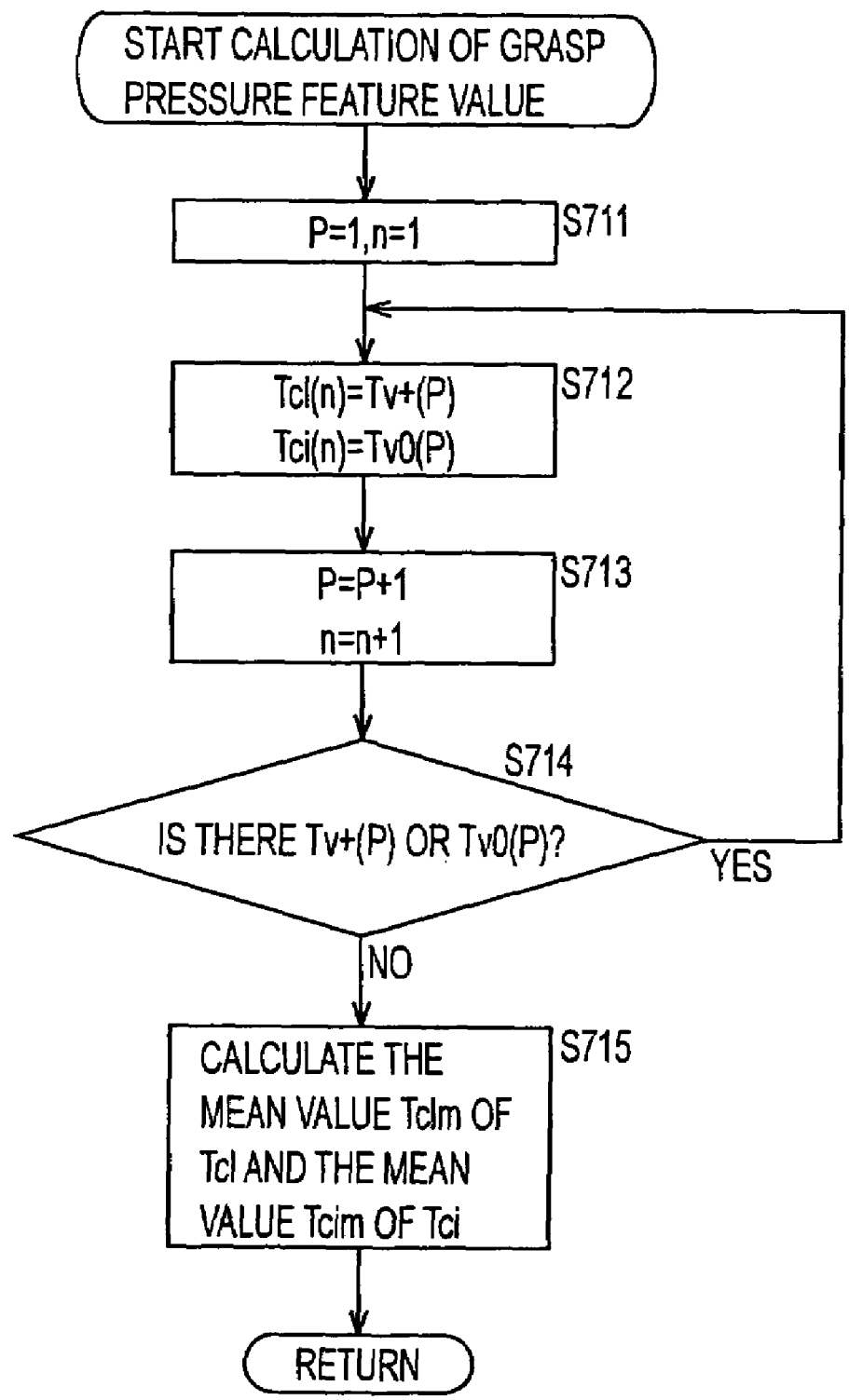
FIG. 83 is a flow chart showing a process of calculating a click feature value.

Referring to FIG. 83, the process of calculating the click feature value is described below.

In step S711, the feature extractor 632 of the terminal B sets both parameters n and P to 1. In step S712, the feature extractor 632 of the terminal B sets the value of Tv+(P) into Tcl(n) and the value of Tv0(P) into Tci(n). Then in step S713, the feature extractor 632 of the terminal B increments the values of P and n by 1. In step S714, the feature extractor 632 of the terminal B determines whether Tv+(P) or Tv−(P) exists. If it is determined that Tv+(P) or Tv−(P) exists, the flow returns to step S712 to repeat the above-described process.

If it is determined in step S714 that Tv+(P) or Tv−(P) does not exist, then in step S715, the feature extractor 632 of the terminal B calculates the mean value Tclm of Tcl and the mean value Tcim of Tci.

Figure 84:
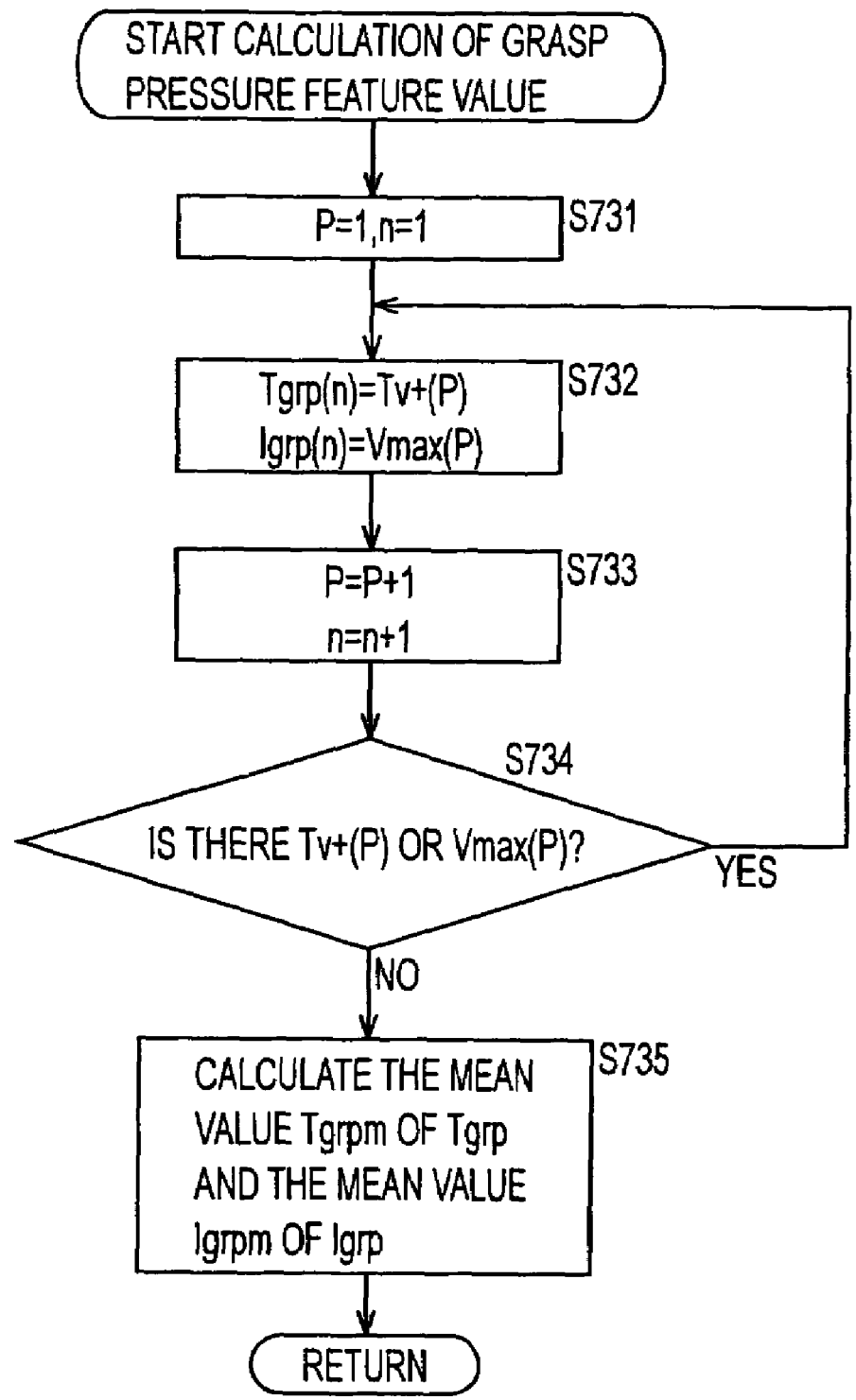
FIG. 84 is a flow chart showing a process of calculating a grasp pressure feature value.

Referring to FIG. 84, the process of calculating the grasp pressure feature value is described below. In step S731, the feature extractor 632 of the terminal B sets both parameters n and P to 1. Then, in step S732, the feature extractor 632 of the terminal B sets the value of Tv+(P) into Tgrp(n) and the value of Vmax(P) into Igrp(n).

In step S733, the feature extractor 632 of the terminal B increments the value of P by 1. Then, in step S734, the feature extractor 632 of the terminal B determines whether Tv+(P) or Tv−(P) exists. If it is determined that Tv+(P) or Tv−(P) exists, then, in step S735, the feature extractor 632 of the terminal B calculates the mean value Tgrpm of Tgrp and the mean value Igrpm of Igrp.

Thus, the feature value vector Vc is generated from the mouse click/grasp pressure information associated with the user a.

Figure 85:
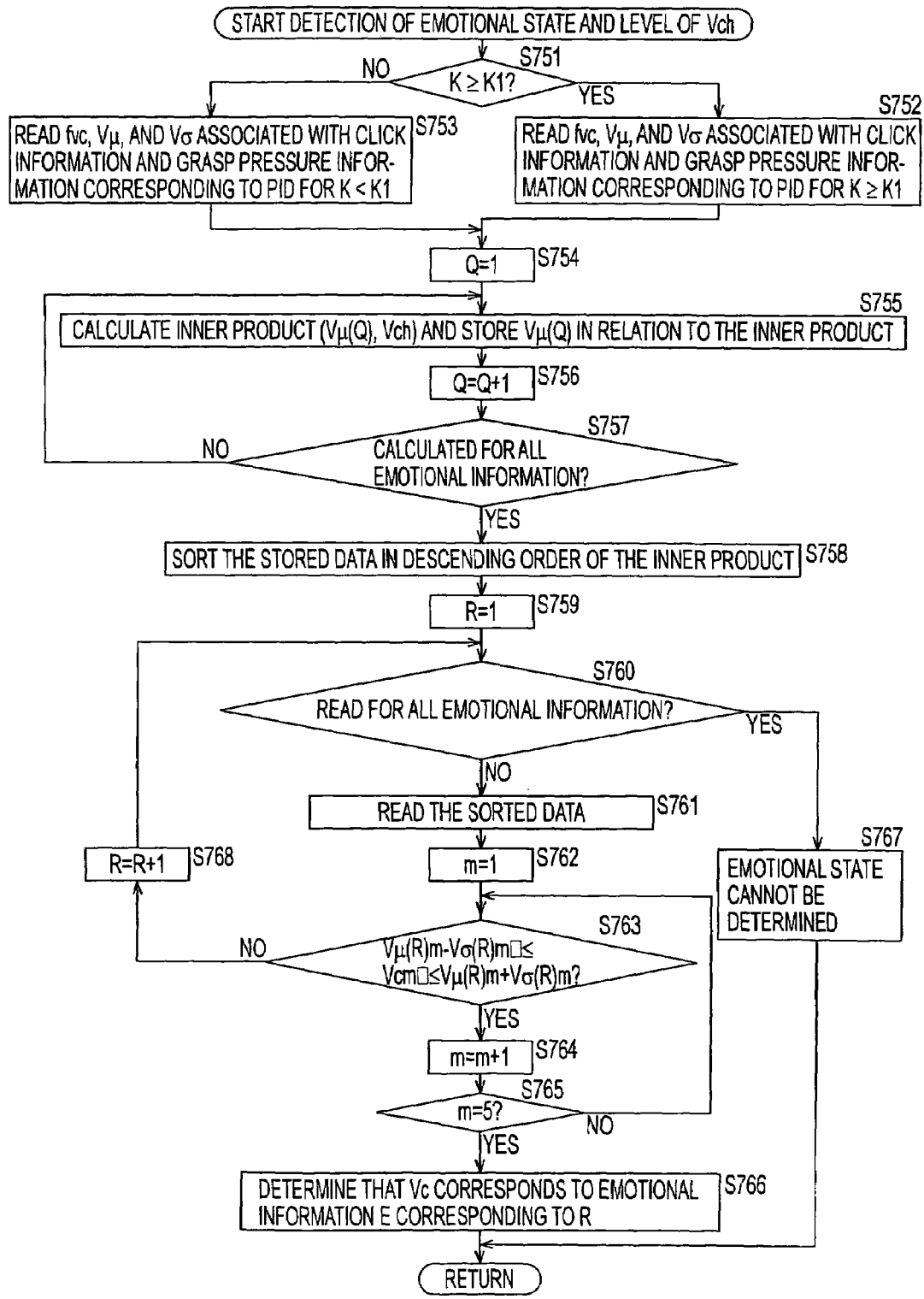
FIG. 85 is a flow chart showing a process of identifying the emotion/state and the strength level of Vc.

Referring to FIG. 85, a process of identifying the emotion/state and the strength level of Vc is described below. This process is performed by the learning unit 614 of the terminal B.

In step S751, the learning unit 614 of the terminal B determines whether the ambient temperature K received from the terminal A is equal to or higher than the reference value K1. If it is determined that the ambient temperature K is equal to or higher than the reference value K1, the learning unit 614 of the terminal B reads, from the storage unit 615, the distribution vector fvc, the distribution center vector Vμ and the distribution standard deviation vector Vσ of feature value vectors of the click information and the grasp pressure information associated with the mouse of the user a with K≧K1. In the case in which it is determined in step S751 that K is lower than the reference value K1, the learning unit 614 of the terminal B reads, from the storage unit 615, the distribution vector fvc, the distribution center vector Vμ and the distribution standard deviation vector Vσ of feature value vectors of the click information and the grasp pressure information associated with the mouse of the user a with K<K1.

As described above, there are 36 kinds of emotion information, and there are 36 feature value vector distributions fvc, 36 distribution center vectors Vμ, and 36 distribution standard deviation vectors Vσ corresponding to the respective 36 kinds of emotion information.

In step S754, the learning unit 614 of the terminal B sets the parameter Q to 1. In step S755, the learning unit 614 of the terminal B calculates the inner product of the vector Vμ(Q) and the feature value vector Vc calculated in step S666 (FIG. 81), and stores Vμ(Q) in relation to the inner product. Then in step S756, the learning unit 614 of the terminal B increments the value of Q by 1. In step 757, the learning unit 304 of the terminal B determines whether the calculation is completed for all kinds of the emotion information, that is, whether the calculation of the inner product is completed for all 36 center vectors Vσ. If it is determined that the inner product is not calculated for all kinds of the emotion information, the flow returns to step S755, and the above-described process is repeated.

When the calculation of the inner product is completed for all 36 center vectors Vμ corresponding to the respective kinds of emotion information, data associated with the emotion information, the inner products, data indicating the kinds of the center vector Vμ, and data indicating the order of the inner products are stored in the storage unit (not shown) of the learning unit 304 of the terminal B, as in EXAMPLE 1. In step S758, the learning unit 614 of the terminal B sorts the data in descending order of inner product.

In step S759, the learning unit 614 of the terminal B sets the parameter R to 1. In step S760, the learning unit 614 of the terminal B determines whether data associated with all kinds of the emotion information are read. If it is determined that all data associated with kinds of the emotion information are not read, the learning unit 614 of the terminal B reads the sorted data. In step S762, the learning unit 614 of the terminal B sets the parameter m to 1. Then in step S763, the learning unit 614 of the terminal B determines whether the condition Vμ(R)m−Vσ(R)m≦Vcm≦Vμ(R)m+Vσ(R)m is satisfied, wherein Vμ(R)m denotes an mth component of the vector Vμ(R), and Vσ(R)m and Vcm respectively denote mth components of vectors Vσ and Vch. As described above, each feature value vector of mouse click/grasp pressure information includes four components: Tclm, Tcim, Tgrpm, and Igrpm. When m=1, the Tclm component is extracted from each vector of Vμ(R), Vσ(R), and Vc and subjected to the process.

If it is determined in step S763 that the condition Vμ(R)m−Vσ(R)m≦Vchm≦Vμ(R)m+Vσ(R)m is not satisfied, then in step S768, the learning unit 614 of the terminal B increments the value of R by 1. Thereafter, the flow returns to step S760, and the above-described process is repeated. On the other hand, if it is determined in step S763 that the condition Vμ(R)m−Vσ(R)m≦Vcm≦Vμ(R)m+Vσ(R)m is satisfied, then in step S764, the learning unit 614 of the terminal B increments the value of m by 1. Then, in step S765, the learning unit 614 of the terminal B determines whether m is equal to 5. If it is determined that m is not equal to 5, the flow returns to step S763, and the above-described process is repeated.

If it is determined in step S493 that m is equal to 5, that is, if it is determined that the condition Vμ(R)m−Vσ(R)m≦Vcm≦Vμ(R)m+Vσ(R)m is satisfied for all four components of each vector Vμ(R), Vσ(R), and Vch, the process proceeds to step S766. In step S766, the learning unit 614 of the terminal B determines that Vc belongs to emotion information E corresponding to R.

If it is determined in step S760 that data associated with all kinds of the emotion information are read, the learning unit 614 of the terminal B determines that the emotion/state and the strength level of Vc cannot be identified, and the learning unit 614 of the terminal B ends the process.

Figure 86:
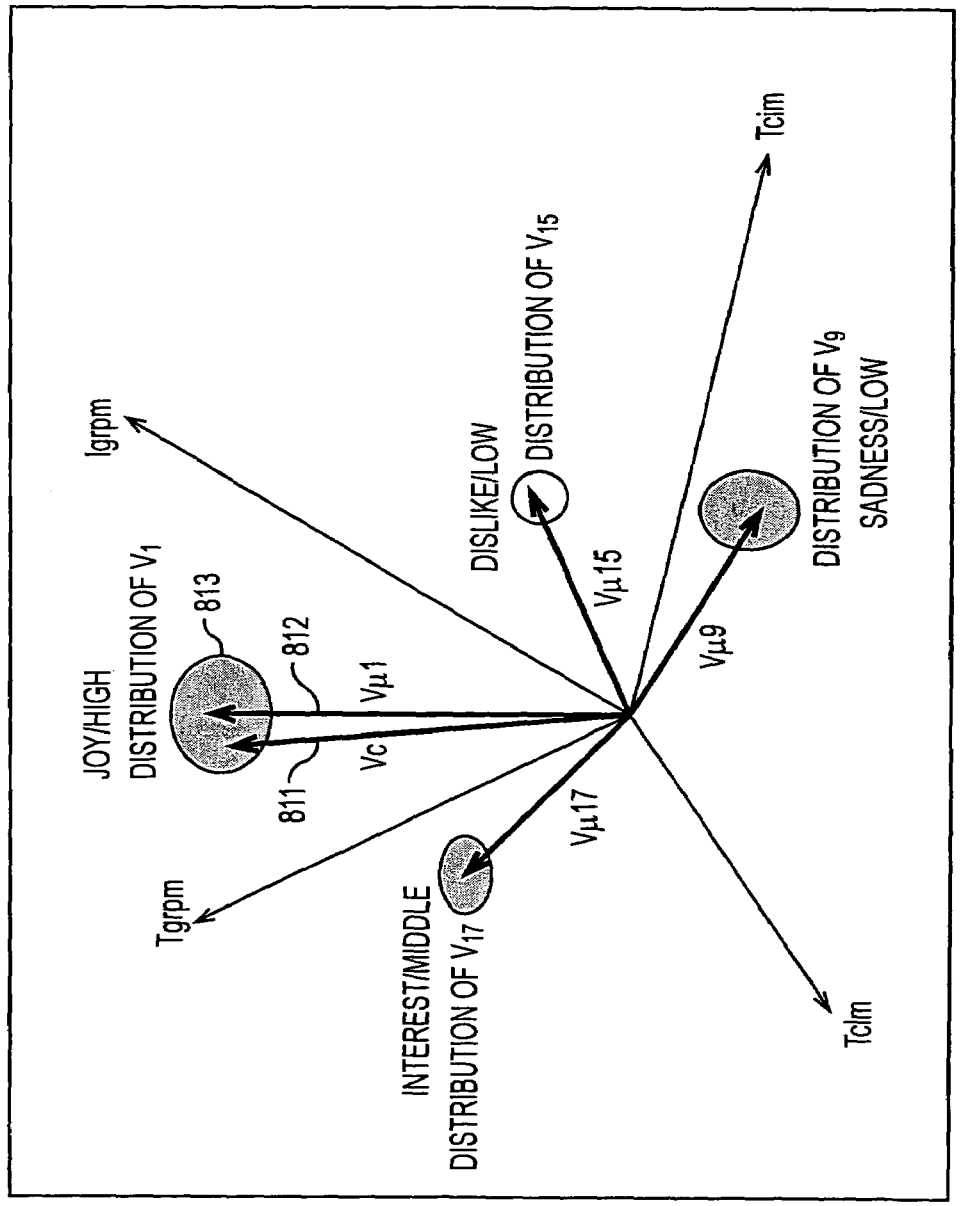
FIG. 86 is a diagram showing Vc and distributions of various vectors.
Figure 87:
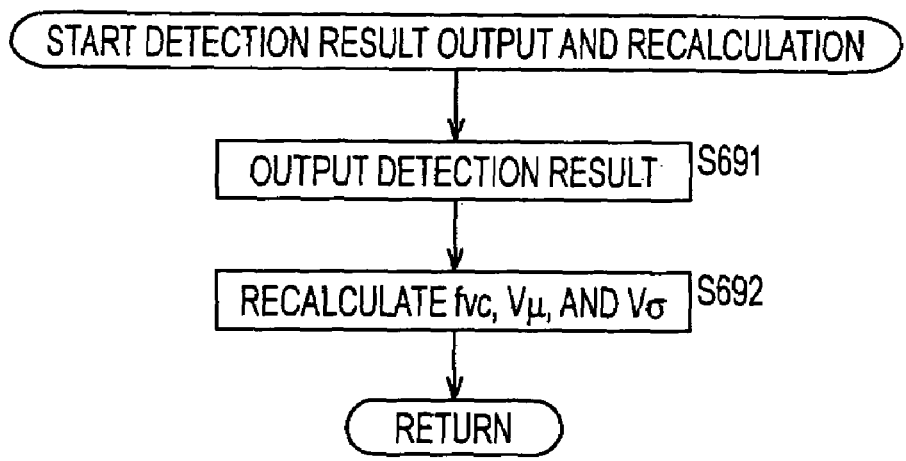
FIG. 87 is a flow chart showing a process of outputting an identification result and a recalculation process.

FIG. 86 shows examples of feature value vectors of click information and grasp pressure information associated with a mouse corresponding to some kinds of emotion information of the user a. In FIG. 86, the feature vectors are plotted in a 4-dimensional space including a Tclm axis, a Tcim axis, a Tgrpm axis, and an Igrpm axis. The feature value vector 811 (Vc) generated in step S666 in FIG. 81 is close to a center vector 812 (Vμ1) of a distribution 813 of a feature value corresponding to a "high-level joy" state, and thus as a result of the process of identifying the emotion/state and the strength level of the Vc, the feature value vector 811 (Vc) is identified as a feature value vector corresponding to the "strong joy".

In this way, the emotion/state and the strength level of the user a are identified from the feature value vector Vc.

Now, referring to FIG. 61, the process of outputting the identification result and performing a recalculation is described below. This process is performed by the learning unit 614 of the terminal B. In step S691, the learning unit 614 of the terminal B outputs the identification result to the output controller 633. In step S692, the learning unit 614 of the terminal B recalculates the distribution fvc of the feature value vector of mouse click information and grasp pressure information corresponding to emotion information E of the user a and the center vector Vμ and the standard deviation vector Vσ of the distribution fvc, and the learning unit 614 of the terminal B stores the recalculated result. That is, the feature value vector Vc generated in step S666 (FIG. 81) is added to the feature value vector of mouse click/grasp pressure information indicating the "strong joy" of the user a stored in the storage unit, and fvc, Vμ, and Vσ are recalculated and stored in the storage unit 615.

In this way, the emotion/state and the level are identified from the mouse click/grasp pressure information, and information associated with the feature vectors of the identified emotion/state and the strength level thereof is stored.

Thus, the terminal B generates the feature value vector Vc from the click/grasp pressure information associated with the mouse of the user a received from the terminal A, and the terminal B identifies the emotion/state and the strength level thereof. Similarly, the terminal B generates the feature value vector Vc from the click/grasp pressure information associated with the mouse of the user b and identifies the emotion/state and the strength level thereof.

Similarly, the terminal A identifies the emotion/state and the strength level of the user a and the user b.

Figure 88:
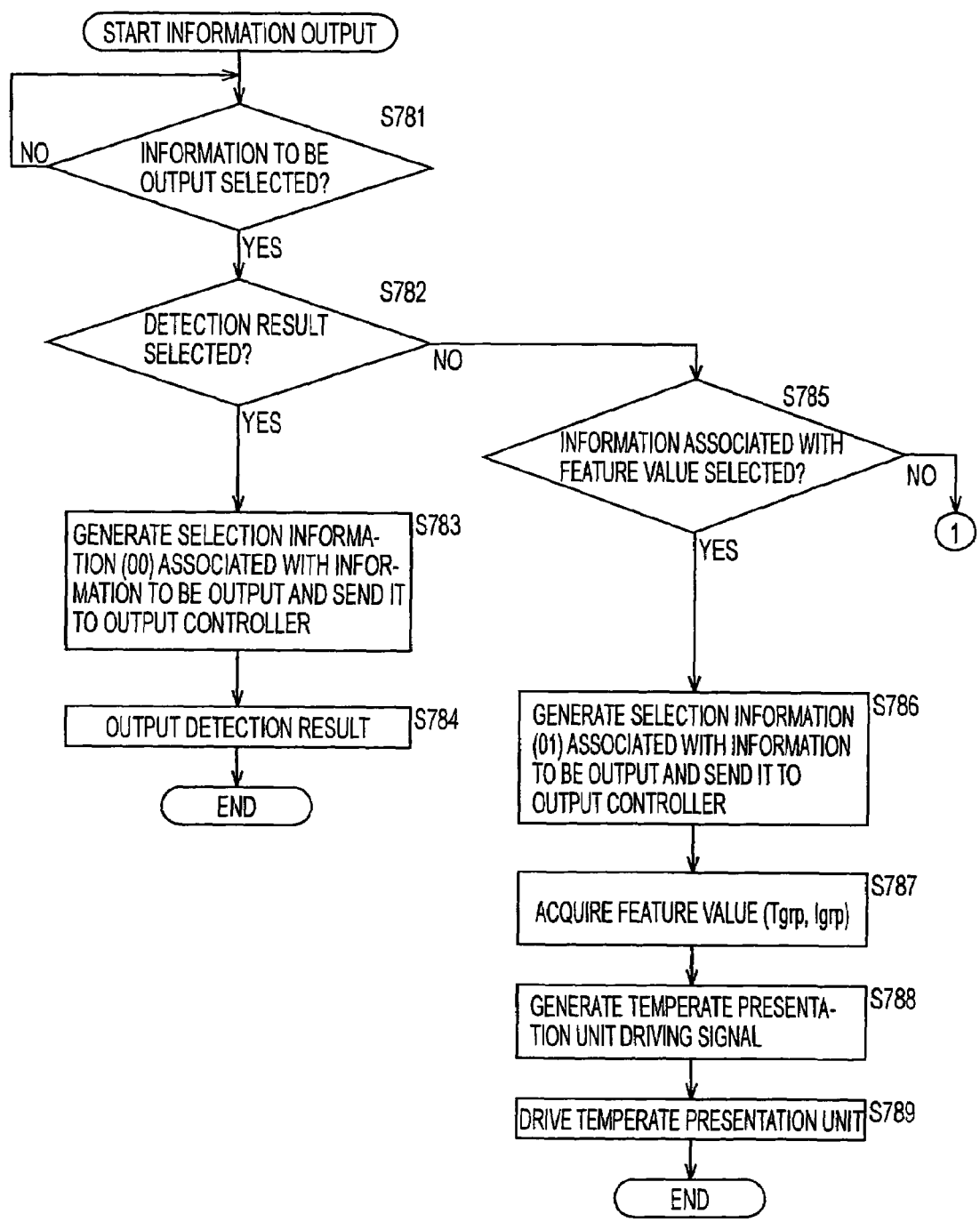
FIG. 88 is a flow chart showing an information output process.
Figure 89:
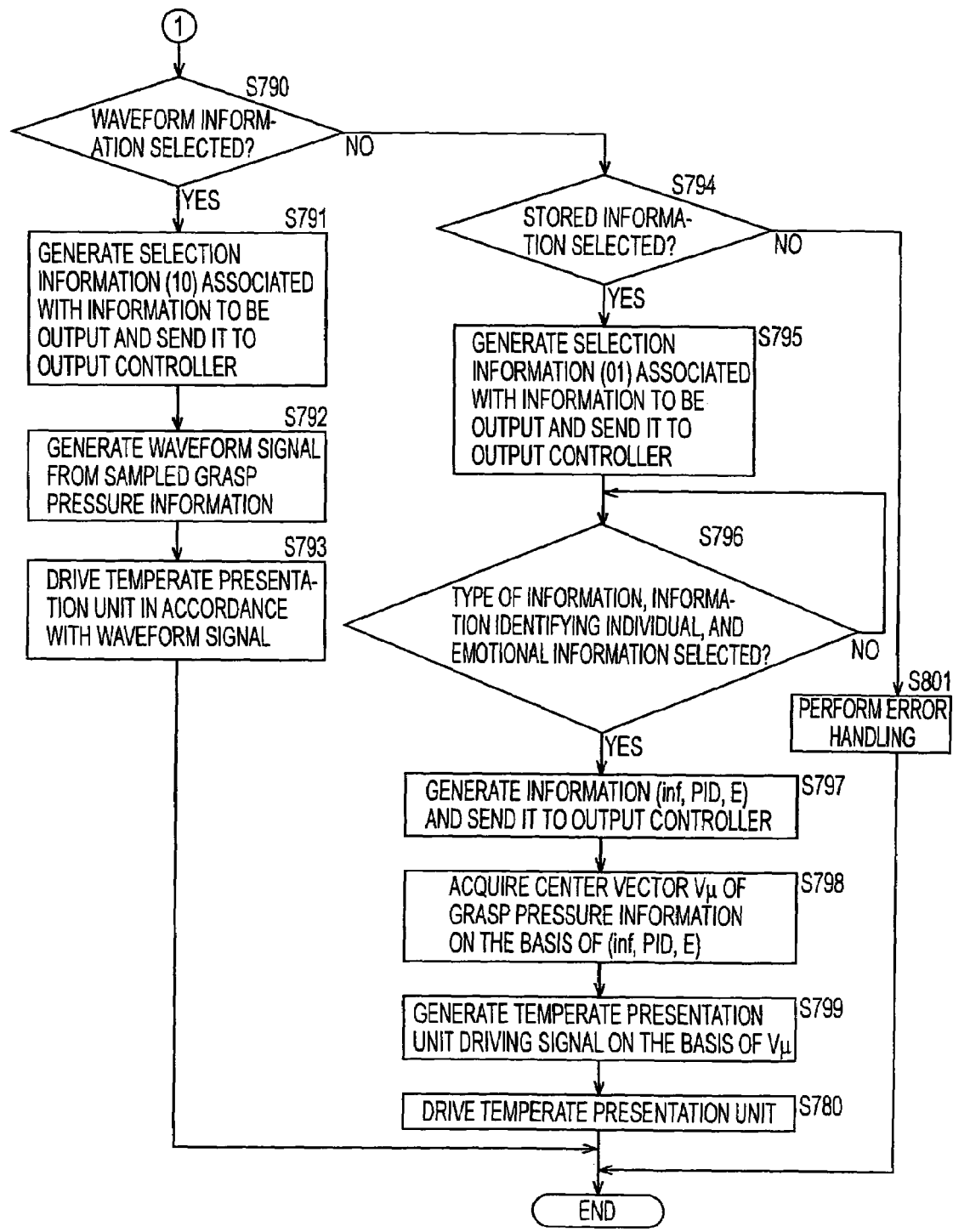
FIG. 89 is a flow chart showing a remaining part of the information output process.

Now, referring to FIGS. 88 and 89, an information outputting process is described below. In step S781, the system controller 617 determines whether information to be output is selected. If information to be output is not selected, the process waits until information to be output is selected. The selection of information to be output may be performed, for example, as in EXAMPLE 1, by clicking a menu item displayed on the display of the terminal. The selection menu used by a user to select information to be output includes the following four items: "identification result", "information based on feature values", "waveform information", and "stored information".

If it is determined in step S781 that information to be output is selected, then in step S782 the system controller 617 determines whether the information selected to be output is the identification result. If it is determined that the information selected to be output is the identification result, then in step S783, the system controller 617 transmits, to the output controller 633, 2-bit selection information 00 indicating that the identification result should be output.

In step S784, the output controller 633 outputs an identification result associated with the emotion/state and the strength level thereof. For example, a text "User A is in a strong joyful state" is displayed on the display of the terminal.

If it is determined in step S782 that the information selected to be output is not the identification result, then in step S785, the system controller 617 determines whether the information selected to be output is the information based on feature values. If it is determined that the information selected to be output is the information based on feature values, then, in step S786, the system controller 617 transmits, to the output controller 633, 2-bit selection information 01 indicating that the information based on feature values should be output.

Figure 90:
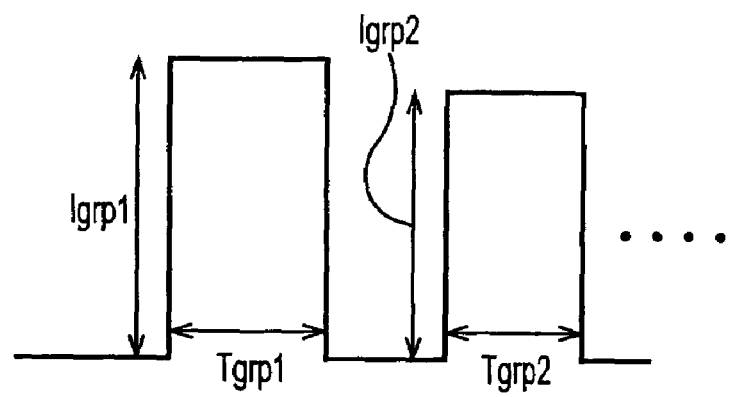
FIG. 90 is a diagram showing an example of a waveform of information output in the information output process.

In step S787, the output controller 633 acquires a feature value (Tgrp, Igrp) from the feature extractor 632. Then in step S788, the output controller 633 generates a temperature presentation unit driving signal. More specifically, as shown in FIG. 90, a rectangular wave signal with an output level Igrp and an on-period Tgrp is generated. Then in step S789, the output controller 633 drives the temperature presentation unit 692.

If it is determined in step S785 that the information selected to be output is not the information based on feature values, then, in step S790, the system controller 617 determines whether the information selected to be output is the waveform information. If it is determined that the information selected to be output is the waveform information, then in step S791, the system controller 617 transmits, to the output controller 633, 2-bit selection information 10 indicating that the waveform information should be output. In step S792, the output controller 633 acquires sampled mouse click/grasp pressure information from the feature extractor 632, and generates a waveform signal from the acquired information. In step S793, the output controller 633 drives the temperature presentation unit 692.

If it is determined in step S790 that the information selected to be output is not the waveform information, then in step S794 the system controller 617 determines whether the information selected to be output is the stored information. If it is determined that the information selected to be output is the stored information, then, in step S795, the system controller 617 transmits, to the output controller 324, 2-bit selection information 01 indicating that the stored information should be output.

In the case in which the information selected to be output is the stored information, a sub-menu is further displayed on the display of the terminal so that a user can specify an item of stored information to be output. More specifically, the user can make selections in terms of items of information inf such as mouse click information or grasp pressure information, information PID identifying a user, and emotion information E. For example, the user can select mouse click information and grasp pressure information as inf, information indicating the user a as PID, and "slight surprise" as emotion information E.

In step S796, the system controller 617 determines whether inf indicating a particular kind of information, PID identifying a user, and emotion information E are selected. If information to be output is not selected, the process waits until information to be output is selected.

In step S797, the system controller 617 generates information (inf, PID, E) in accordance with the selection made by the user and transmits the generated information to the output controller 633.

In step S798, in accordance with (inf, PID, E), the output controller 633 acquires the center vector of vibration information associated with the keyboard from the storage unit 615. In this specific case, the center vector Vμ(Tcl, Tci, Tgrp, Igrp) of feature value vectors of pulse information corresponding to the "weak surprise" of the user a is acquired from the storage unit.

Figure 91:
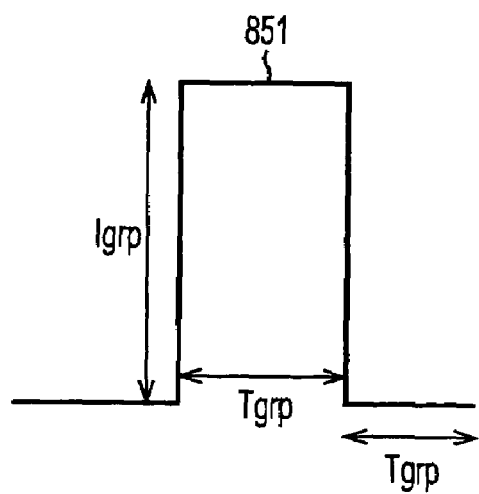
FIG. 91 is a diagram showing an example of a waveform of information output in the information output process.

In step S799, the output controller 633 generates a temperature presentation unit driving signal in accordance with the center vector Vμ. More specifically, as shown in FIG. 91, a rectangular wave signal 851 with an output level Igrp, an on-period Tgrp, and an off-period Tgrp is generated. In step S800, the output controller 633 drives the temperature presentation unit 692 three times in accordance with the generated driving signal.

If it is determined in step S794 that the information selected to be output is not the stored information, then in step S801 the system controller 617 performs error handling. After completion of the error handling, the process is ended.

Thus, the emotion/state and the strength level thereof identified from the mouse click/grasp pressure information are displayed so that the user can recognize them. Furthermore, the temperature presentation unit is driven so that the user can recognize grasp information via a bodily sensation.

EXAMPLE 4

Figure 92:
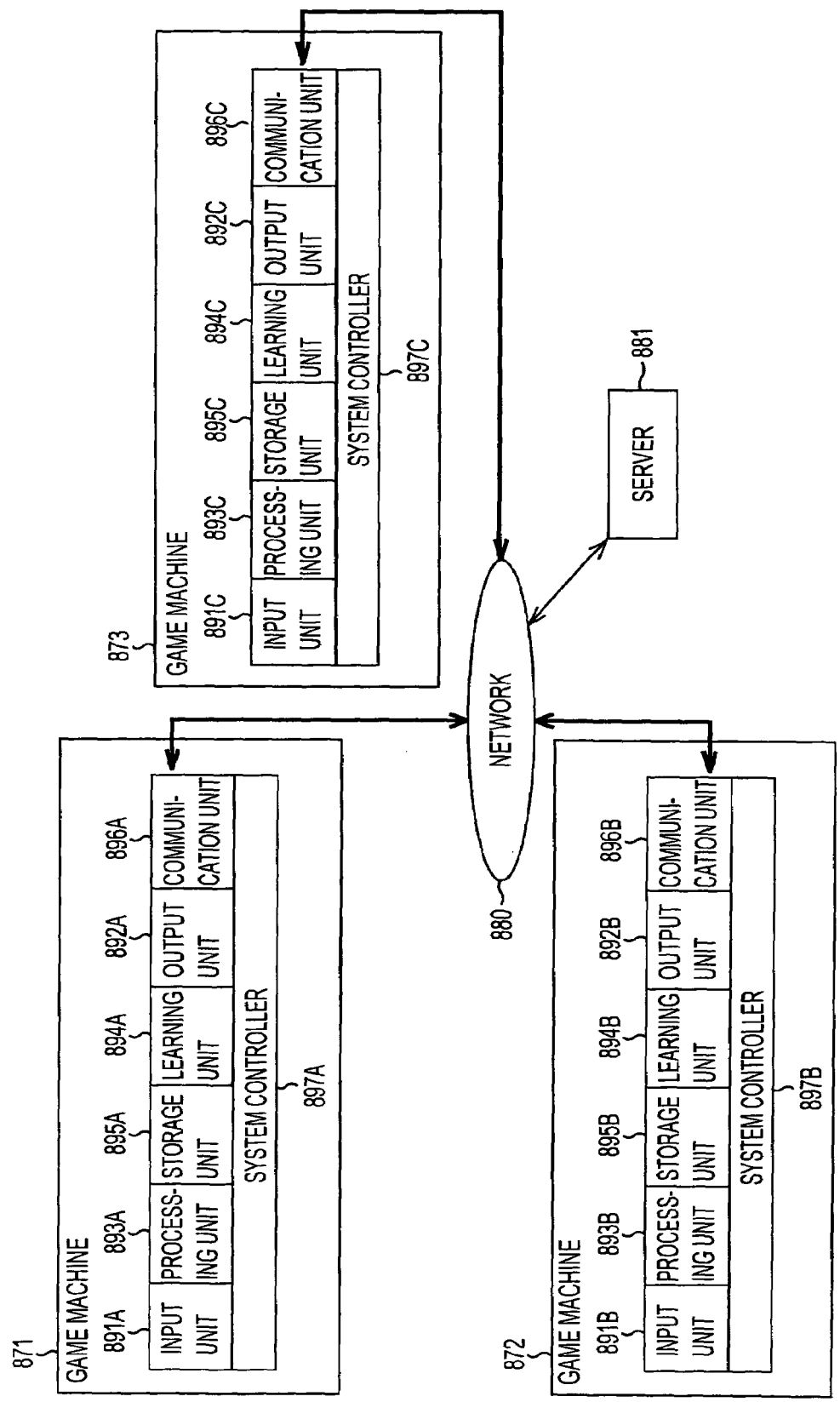
FIG. 92 is a diagram showing a manner in which game machines are connected, in accordance with the present invention.

FIG. 92 shows a structure of a second-type communication system using an information processing apparatus according to the present invention. In this communication system, the terminal 1, the terminal 2, and the terminal 3 in the system shown in FIG. 1 are replaced with a game machine 871, a game machine 872, and a game machine 873. The game machines 871 to 873 are connected to a server 881 via a network 880 such as the Internet so that they can communicate with one another.

Each of the game machine 871 (game machine A), the game machine 872 (game machine B), and the game machine 873 (game machine C) includes, as in the communication system shown in FIG. 1, an input unit 891A, 891B, or 891C used to input information, a processing unit 893A, 893B, or 893C for processing the information input via the input unit, a learning unit 894A, 894B, or 894C for learning/identifying the emotion/state and the strength level of a user from the input information, a storage unit 895A, 895B, or 895C for storing information learned/identified by the learning unit, an output unit 892A, 892B, or 892C for outputting information identified by the learning unit or outputting information stored in the storage unit, a communication unit 896A, 896B, or 896C for transmitting/receiving information, and a system controller 897A, 897B, or 897C for controlling various parts.

The game machine 871 (the game machine A), the game machine 872 (the game machine B), and the game machine 873 (the game machine C) are similar in structure to each other, and parts thereof, that is, the parts such as the input unit 891A, . . . , the system controller 897A of the game machine 871 the parts such as the input unit 891B, . . . , the system controller 897B of the game machine 872 and the parts such as the input unit 891C, . . . , the system controller 897C of the game machine 873 are similar in functions. In the following description, when it is not needed to discriminate those parts among game machines, the parts are represented in a generic manner, such as the input unit 891, . . . , the system controller 897.

Figure 93:
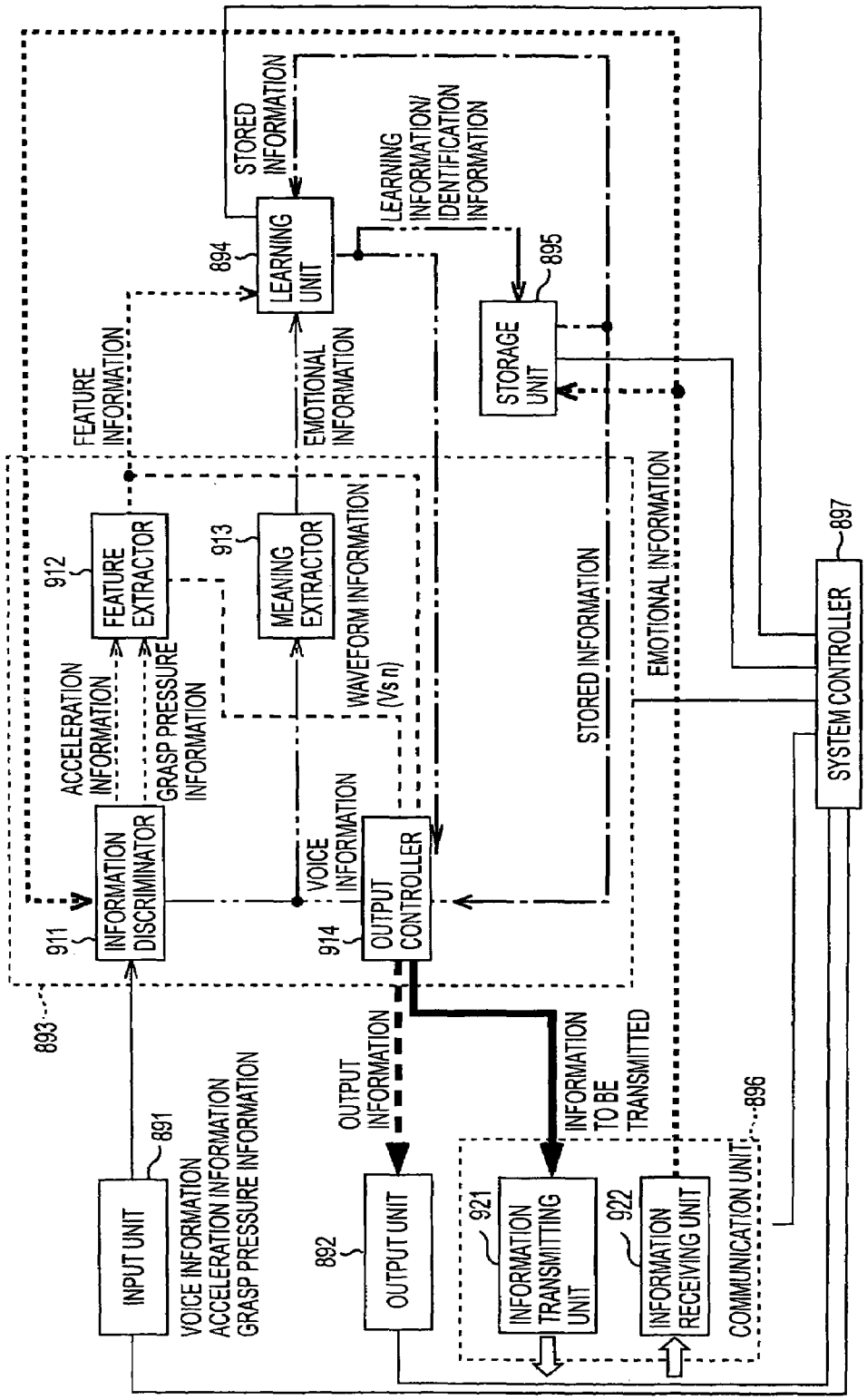
FIG. 93 is a diagram showing an example of a structure of a game machine according to the present invention.

FIG. 93 shows an example of a structure of the game machines 871 to 873. As shown in FIG. 93, the game machine includes an input unit 891 used to input voice information, acceleration information, and grasp pressure information associated with a controller 941 (FIG. 94) of the game machine, a processing unit 893 for processing the information input via the input unit 891, a learning unit 894 for performing learning and identification on the basis of property information and emotion information output from the processing unit 893, a storage unit 895 for storing learned information and identified information output from the learning unit 894, an output unit 892 for outputting information on the basis of output information output from the processing unit 893, a communication unit 896 for communication, and a system controller 897 for controlling various parts.

The processing unit 893 includes an information discriminator 911 for classifying information input via the input unit 891 into acceleration information, grasp pressure information, or voice information, a feature extractor 912 for extracting property information from the acceleration information and the grasp pressure information associated with the controller 941, a meaning extractor 913 for extracting emotion information from voice information, and an output controller 914 for outputting information to the output unit 892. The communication unit 896 includes an information transmitting unit 921 for transmitting information and an information receiving unit 922 for receiving information.

The input unit 891 includes a microphone, an acceleration sensor for detecting an acceleration in directions along three axes (X, Y, and Z axes normal to each other), and grasp pressure sensors for detecting a pressure at which the controller 941 is grasped by a user. The input unit 891 is disposed on the controller 941 of the game machine. The output unit 892 includes a light emission unit for emitting light in accordance with a driving signal, and as vibration presentation unit including a vibration motor that vibrates in accordance with a driving signal. The output unit 892 is also disposed on the controller 941.

Figure 94:
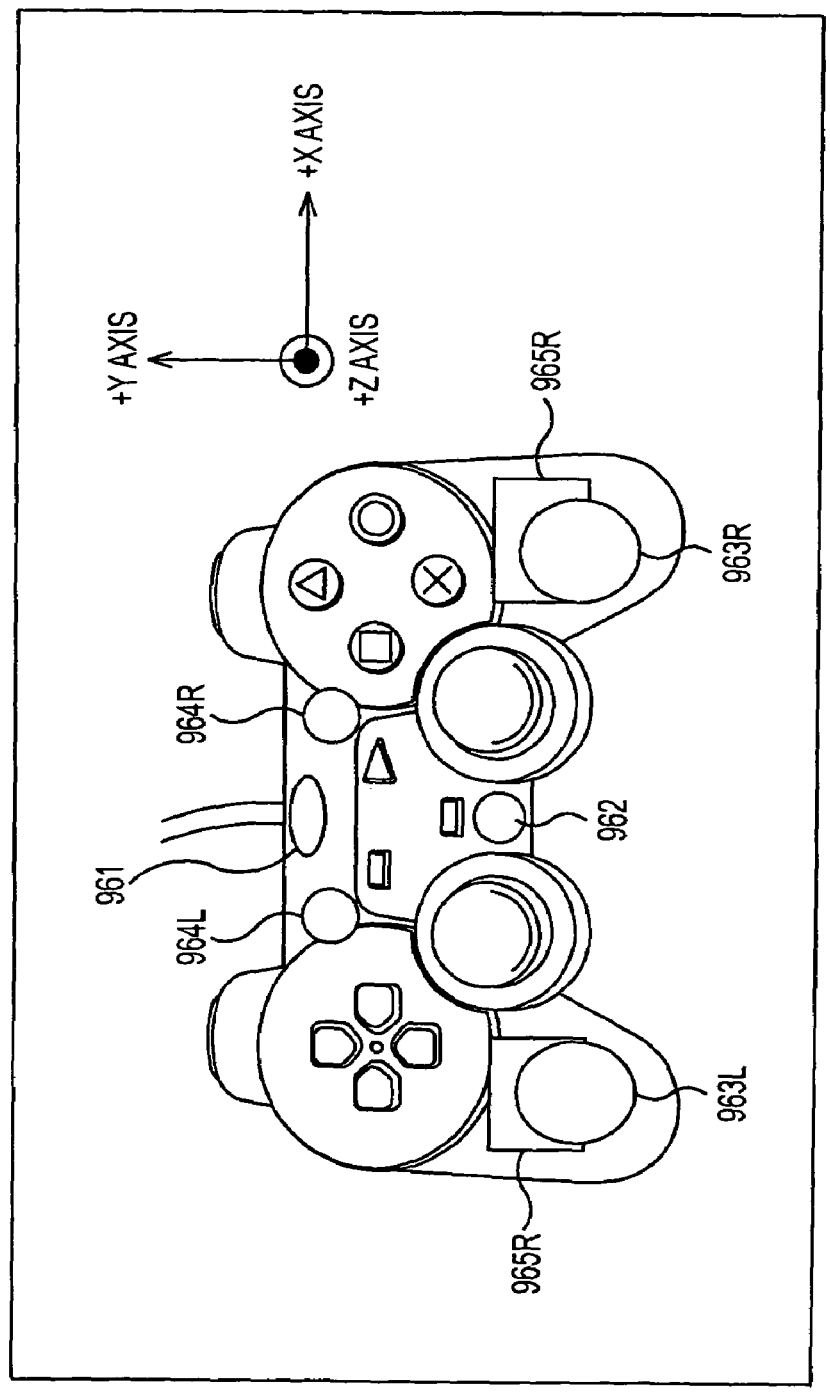
FIG. 94 is a diagram showing an example of a structure of a controller of a game machine according to the present invention.

FIG. 94 shows an example of a structure of the controller 941. A user can play a game by operating particular buttons on the controller 941. The 3-axis acceleration sensor 961 is disposed in the center in an upper part in the controller 941. If the controller 941 is moved by the user, the 3-axis acceleration sensor 961 detects an acceleration in the X direction (in a left-to-right direction on the page of FIG. 94), Y direction (in a down-to-up direction on the page of FIG. 94), and Z direction (in a direction normal to the page of FIG. 94). The microphone 962 is disposed in the center of a lower part of the controller 941. A voice generated by the user is detected by the microphone 962. Grasp pressure sensor 963L and 963R are disposed on the left and right ends in the lower part of the controller 941. When the controller 941 is used by a user, the parts on which the grasp pressure sensors 963L and 963R are generally disposed are grasped with left and right hands of the user.

Light emission parts 964L and 964R are respectively disposed at locations close to the left and right of the 3-axis acceleration sensor 961. Vibration presentation units 965L and 965R are disposed at locations substantially the same, but below, as the grasp pressure sensors 963L and 963R. As described above, the vibration presentation unit 965L and 965R are formed of vibration motors disposed in the controller 941.

Let us assume that the game machine A is used by a user a, and the game machine B is used as a user b. Using the game machines A and B, the user a and the user b can participate in a multi-player on-line game. In the on-line game, each player can make voice communicate with other players. For example, a voice of the user a is input to the microphone 962 of the controller of the game machine A and transmitted to the game machine B. On receiving the voice signal, the game machine B outputs the voice of the user a from a speaker of the television set connected to the game machine B or a speaker disposed on the game machine B so that the user b can listen to the voice of the user a. Similarly, a voice generated by the user b is transmitted to the game machine A so that the user a can listen to the voice of the user b. Thus, the users a and the user b can make a voice communication with each other.

Figure 95:
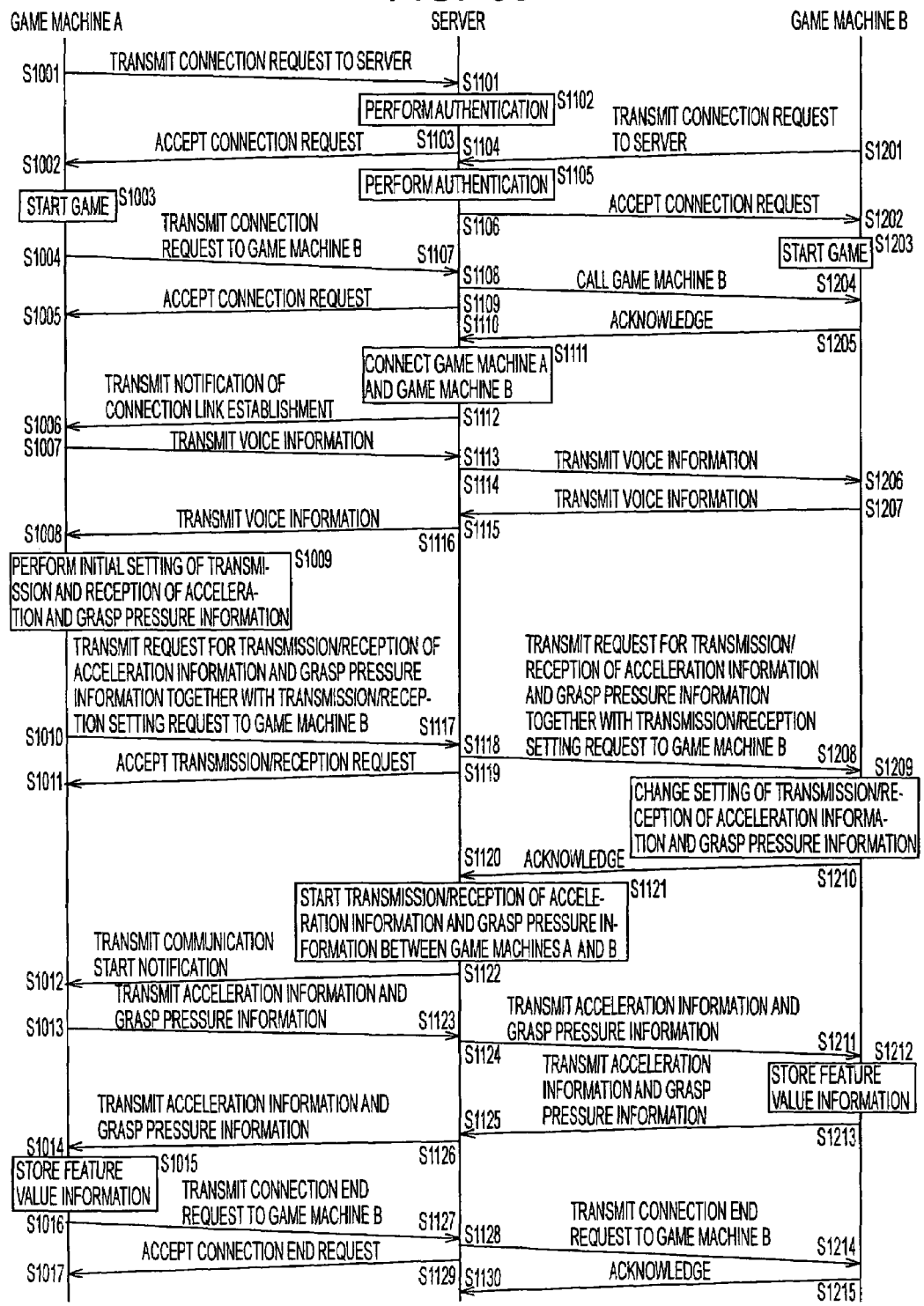
FIG. 95 is a diagram showing an example of a manner in which information is transmitted/received among a game machine A, a game machine B and a server.

Transmission/reception of information is performed in accordance with a procedure shown FIG. 95. First, in step S1001, the game machine A transmits a connection request to a server 881. In step S1101, the server 881 receives the connection request. In step S1102, the server 881 performs authentication associated with the connection request. The connection request transmitted from the game machine A includes information identifying the user a such as a name or a nickname of the user a and a password needed to participate in the game. The server 881 determines (authenticates), on the basis of such information, whether the user a is authorized to participate in the game. If it is determined that the user a is authorized to participate in the game, then in step S1103 the server 881 transmits a connection request acceptance message to the game machine A. In step S1002, the game machine A receives the connection request acceptance message. In step S1003, the game machine A starts the game.

After information is transmitted/received between the game machine B and the server 881 in a similar manner (step S1201 (corresponding to step S1001), (step S1104 (corresponding to step S1101), (step S1105 (corresponding to step S1102), (step S1106 (corresponding to step S1103), and (step S1202 (corresponding to step S1003)), the game machine B starts the game in step S1203.

In step S1004, the game machine A transmits, to the server 881, a request for connection to the game machine B. In step S1107, the server 881 receives the request for connection to the game machine B. In step S1109, the server 881 transmits a connection request acceptance message to the game machine A. In step S1005, the game machine A receives the connection request acceptance message. In step S1108, the server 881 calls the game machine B. The call is received by the game machine B in step S1204. In step S1205, the game machine B returns an acknowledgment message to the server 881. In step S1110, the server 881 receives the acknowledgment message. In step S1111, a process of connecting the game machine A and the game machine B is started. In step S1112, the server 881 transmits, to the game machine A, a notification of connection link establishment. In step S1006, the game machine A receives the notification.

Thereafter, the game machine A transmits voice information to the game machine B via the server 881, and the game machine B also transmits voice information to the game machine A via the server 881 (step S1007, S1113, S1114, S1206, S1207, S1115, S1116, and S1008).

In step S1009, the game machine A performs initial setting associated with transmission/reception of acceleration information and grasp pressure information. In step S1010, the game machine A transmits an acceleration/grasp pressure information transmission/reception request to the server 881. In step S1117, the server 881 receives the request. In step S1118, the server 881 transmits the acceleration/grasp pressure information transmission/reception request to the game machine B together with transmission setting information and reception setting information such as that shown in FIG. 11 transmitted from the game machine A, as in EXAMPLE 1.

In step S1208, the game machine B receives the acceleration/grasp pressure information transmission/reception request transferred from the server 881. In response, in step S1209, the game machine B changes the setting associated with transmission/reception of acceleration information and grasp pressure information. In step S1210, the game machine B transmits an acknowledgment message to the server 881. In step S1120, the server 881 receives the acknowledgment message transmitted from the game machine B. In response, in step S1121, the server 881 starts transmission/reception of acceleration/grasp pressure information between the game machines A and B. In step S1122, the server 881 transmits a communication start notification message to the game machine A. In step S1012, the game machine A receives the notification message. Thus, the game machine A recognizes that acceleration information and grasp pressure information associated with the user b are going to be transmitted from the game machine B, and the game machine B recognizes that acceleration information and grasp pressure information associated with the user a are going to be transmitted from the game machine A.

From the game machine A to the game machine B via the server 881, acceleration/grasp pressure information is transmitted (step S1013, S1123, S1124, and S1211). In step S1112, the game machine B stores feature value information. Similarly, from the game machine B to the game machine A via the server 881, acceleration/grasp pressure information is transmitted (step S1213, S1125, S1126, and S1014). In step S1015, the game machine A stores feature value information. The details of the feature value information storage process will be described later with reference to FIG. 97.

If the game machine A transmits, in step S1016, a connection end request to the game machine B via the server 881, the connection end request is received by the server 881 in step S1127. In step S1128, the server 881 transfers the connection end request to the game machine B. In step S1214, the game machine B receives the connection end request. In response, in step S1215, the game machine transmits an acknowledgment message. In step S1130, the server 881 receives the acknowledgment message. As a result, the communication is ended. In step S1129, the server 881 transmits a connection end request acceptance message to the game machine A. In step S1109, the game machine A receives the acceptance message.

In this way, communication between the game machine A and the game machine B is performed via the server 881, and acceleration information and grasp pressure information are stored. After sufficient amounts of acceleration information and grasp pressure information have been stored, an emotion information identification process is performed in the game machine A and the game machine B. The details of the emotion information identification process will be described later with reference to FIG. 114. In this process, information transmitted/received as shown in FIG. 96.

Figure 96:
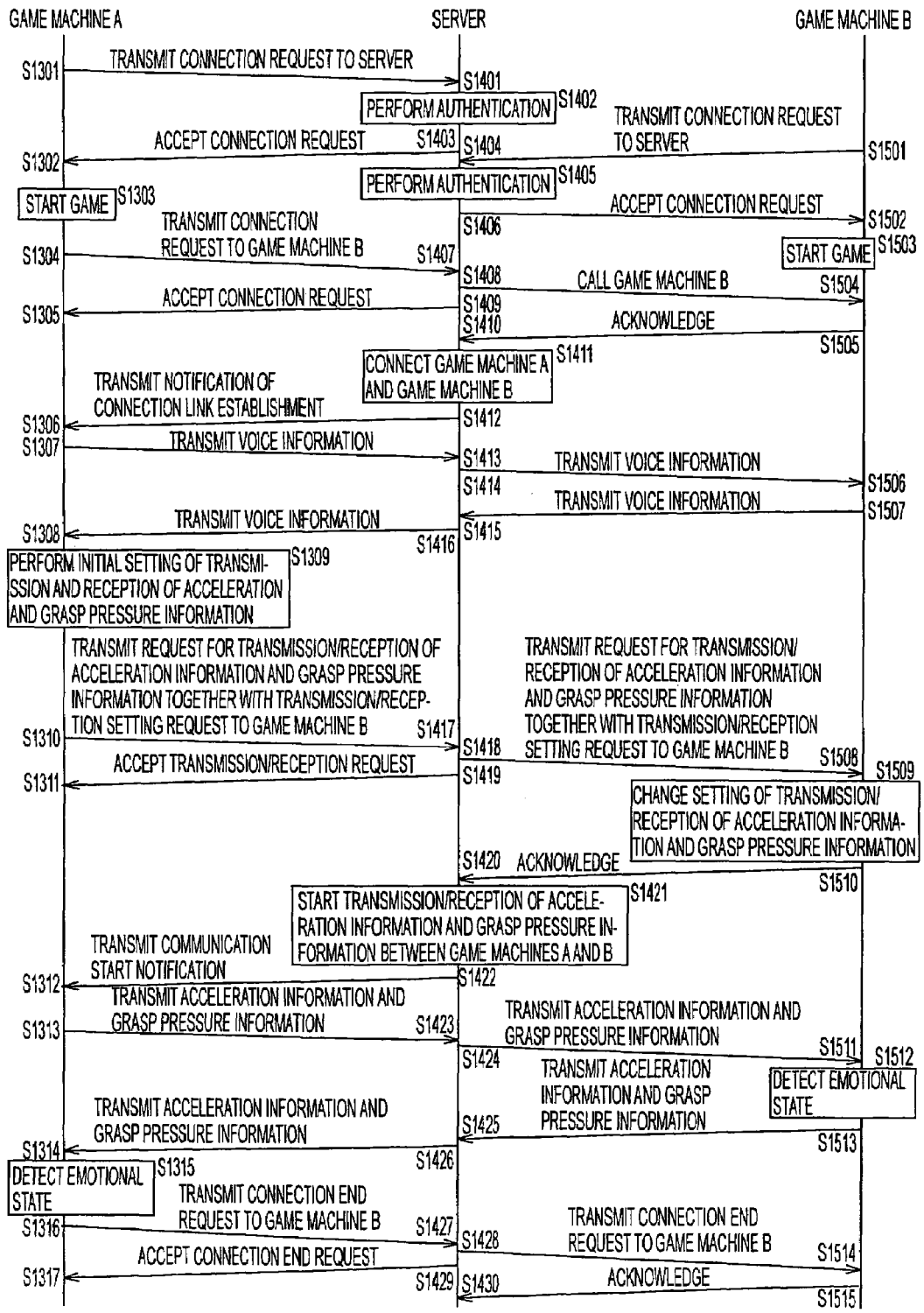
FIG. 96 is a diagram showing an example of a manner in which information is transmitted/received among a game machine A, a game machine B and a server.

In the process shown in FIG. 96, steps S1301 to S1317 performed by the game machine A are similar to step S1001 to S1017 in the process shown in FIG. 95 except that in step S1315 the game machine A performs emotion information identification on the basis of acceleration information and grasp pressure information received from the game machine B. In the process shown in FIG. 96, steps S1501 to S1515 performed by the game machine B are similar to step S1201 to S1215 in the process shown in FIG. 95 except that in step S1512 the game machine B performs emotion information identification on the basis of acceleration information and grasp pressure information received from the game machine A.

In the process shown in FIG. 96, steps 1401 to 1430 performed by the server 881 are similar to step S1101 to 1130 in the process shown in FIG. 95, and thus a duplicated description of those steps is not given herein.

Figure 97:
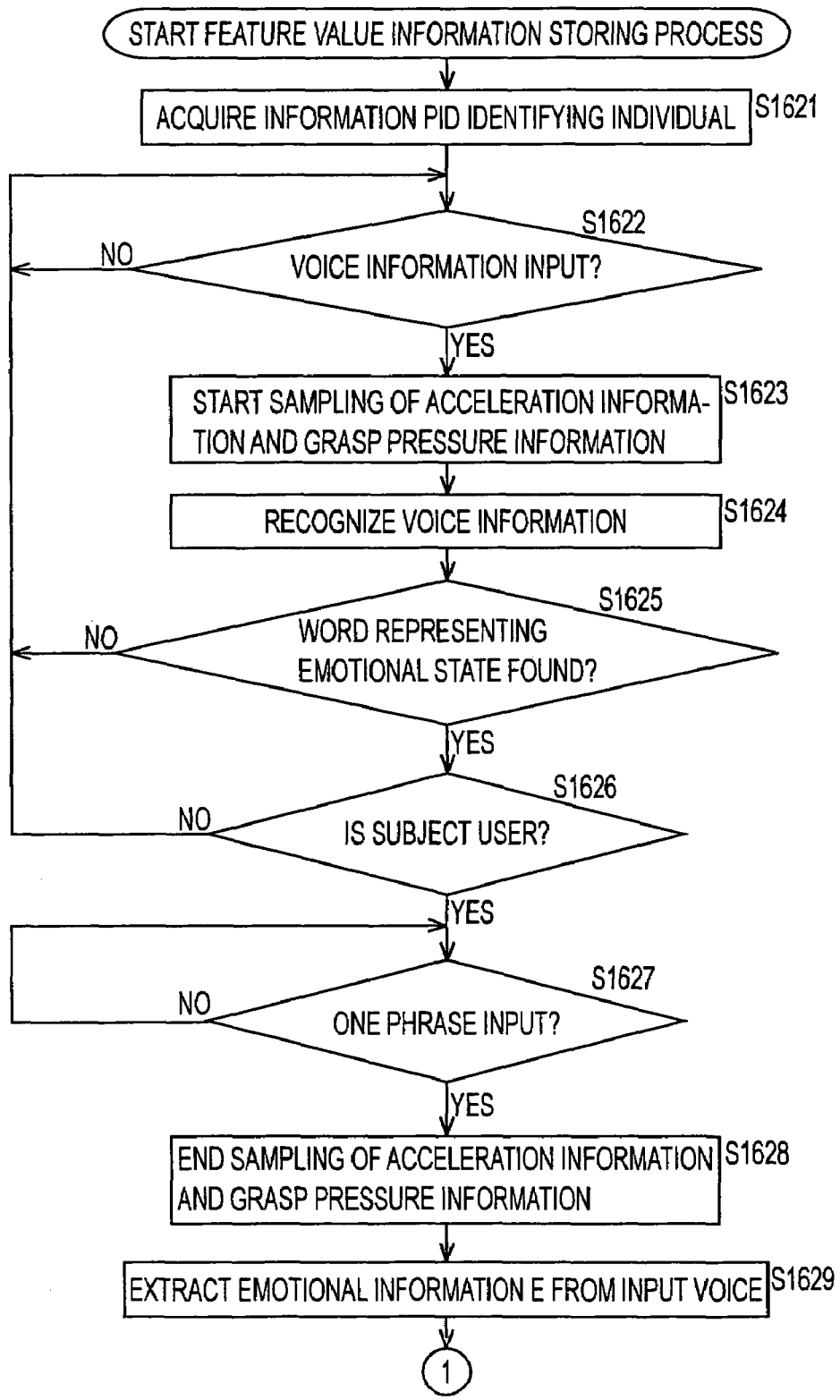
FIG. 97 is a flow chart showing a feature information storage process.

Referring to FIG. 97, the feature information storage process (steps S1015 and S1212 in FIG. 95) performed by the game machine A and the game machine B is described below. The mage machine A can store feature information on the basis of acceleration information and grasp pressure information associated with the user a output from the controller 941 coupled with the game machine A and also can store feature information on the basis of acceleration information and grasp pressure information associated with the user b transmitted from the game machine B.

First, the process is described below for a case in which the game machine A stores feature information on the basis of acceleration information and grasp pressure information associated with the user a. In step S1621, the system controller 897 of the game machine A acquires information (for example, a name or a nickname) PID identifying the user a of the game machine A In step S1622, the system controller 897 commands the information discriminator 911 to determine whether voice information of the user a is input. If voice information is not yet input, the process waits until voice information is input.

If it is determined in step S1622 that voice information is input, the process proceeds to step S1623. In step S1623, the system controller 897 commands the feature extractor 912 to start sampling of acceleration information and grasp pressure information associated with the user a. In step S1624, using the meaning extractor 913, the system controller 897 recognizes the input voice information, using the meaning extractor 913.

In step S1625, the system controller 897 determines whether the recognized voice includes a word indicating an emotion, a state, or a strength level of an emotion/state of the user a. If it is determined that the recognized voice does not include a word indicating emotion, a state, or the strength or level of the emotion, then the process returns to step S1622, and the above-described process is repeated. Words indicating emotions or states may be such as those shown in FIG. 23, and words indicating strength levels may be such as those shown in FIG. 24, as in EXAMPLE 1.

In the case in which it is determined in step S1625 that the recognized voice includes a word indicating an emotion, a state, or a strength level of an emotion/state, then, in step S1626, the system controller 897 determines whether the subject of the detected word is the user a, that is, whether the detected word indicates the emotion, state, or the level of the emotion of the user a. If the subject is not the user a, then the process returns to step S1622, and the above-described process is repeated.

In the case in which it is determined in step S1626 that the user is the subject, the process proceeds to step S897. In step S897, the system controller 897 determines whether one phrase of voice of the user a has been input. If one phrase of voice has not yet been input, the system controller 897 waits until one phrase of voice is input. If it is determined in step S1627 that one phrase has been input, then, in step S1628, the system controller 897 commands the feature extractor 912 to end the sampling of acceleration information and grasp pressure information.

In step S1629, the system controller 897 commands the meaning extractor 913 to extract emotion information E.

For example, if the user a utters "I am surprised!", an emotion/state corresponding to a word "surprised" is surprise. In this case, no adverbs (such as "very" or "a little") are included in the voice information uttered by the user a, and thus the strength level is regarded as a middle level. As a result, "middle-level surprise" is detected as the emotion information E.

In step S1630, the system controller 897 commands the feature extractor 912 to generate a feature vector Vc on the basis of acceleration information and grasp pressure information of the user a. In step S1631, acceleration information and grasp pressure information corresponding to information PID and the emotion information E is read from the storage unit 895. In this specific case, a feature vector of acceleration/ grasp pressure information corresponding to surprise of the user a is read.

In step S1632, using the learning unit 894, the system controller 897 adds the newly generated feature vector Vc to the read feature vectors and recalculates the vector distribution fvc, the distribution center vector Vµ, and the standard deviation vector Vσ. In step S1633, the recalculated vectors are stored in the storage unit 895.

Thus, the feature value vector corresponding to the surprise of the user a is generated from the acceleration information and the grasp pressure information, and the vector distribution, the distribution center vector, and the standard deviation vector are recalculated and stored.

Figure 99:
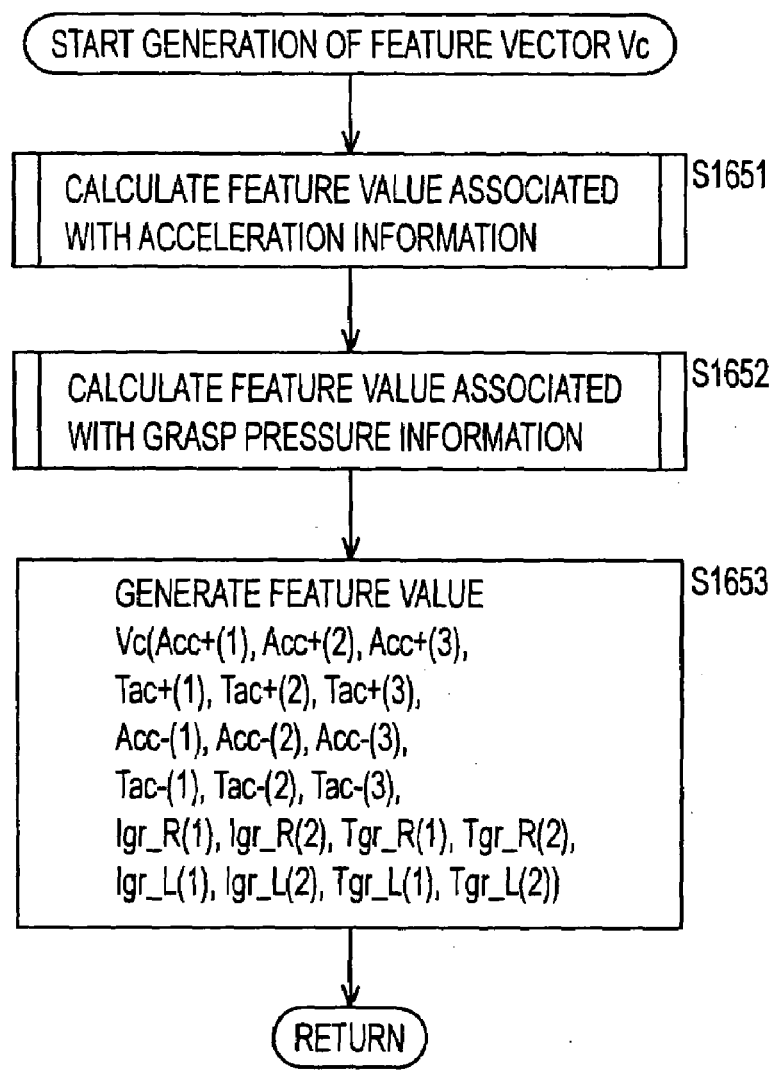
FIG. 99 is a flow chart showing a process of generating a feature value vector Vc.

Referring to FIG. 99, the process of generating the feature vectors Vc of acceleration information and grasp pressure information is described below. This process is performed by the feature extractor 912. In step S1651, the feature extractor 912 calculates the feature value of acceleration information. The details of this calculation process will be described later with reference to FIGS. 100 and 101. As a result, of components of the feature value vector Vc, first to twelfth components (Acc+(1), Acc+(2), Acc+(3), Tac+(1), Tac+(2), Tac+(3), Acc−(1), Acc−(2), Acc−(3), Tac−(1), Tac−(2), Tac−(3)) are obtained. In step S1652, the feature extractor 912 calculates the feature value of grasp pressure information. The details of this calculation process will be described later with reference to FIGS. 104 and 105. As a result, of components of the feature value vector Vc, thirteenth to twentieth components (lgr_R(1), lgr_R(2), Tgr_R(1), Tgr_R(2), lgr_L(1), lgr_L(2), Tgr_L(1), Tgr_L(2)) are obtained.

In step S1653, the feature extractor 912 generates a feature vector Vc (Acc+(1), Acc+(2), Acc+(3), Tac+(1), Tac+(2), Tac+(3), Acc−(1), Acc−(2), Acc−(3), Tac−(1), Tac−(2), Tac−(3), Igr_R(1), Igr_R(2), Tgr_R(1), Tgr_R(2), Igr_L(1), Igr_L(2), Tgr_L(1), Tgr_L(2)).

Thus, the feature value vector Vc corresponding to the surprise of the user a is generated from the acceleration information and the grasp pressure information.

Figure 100:
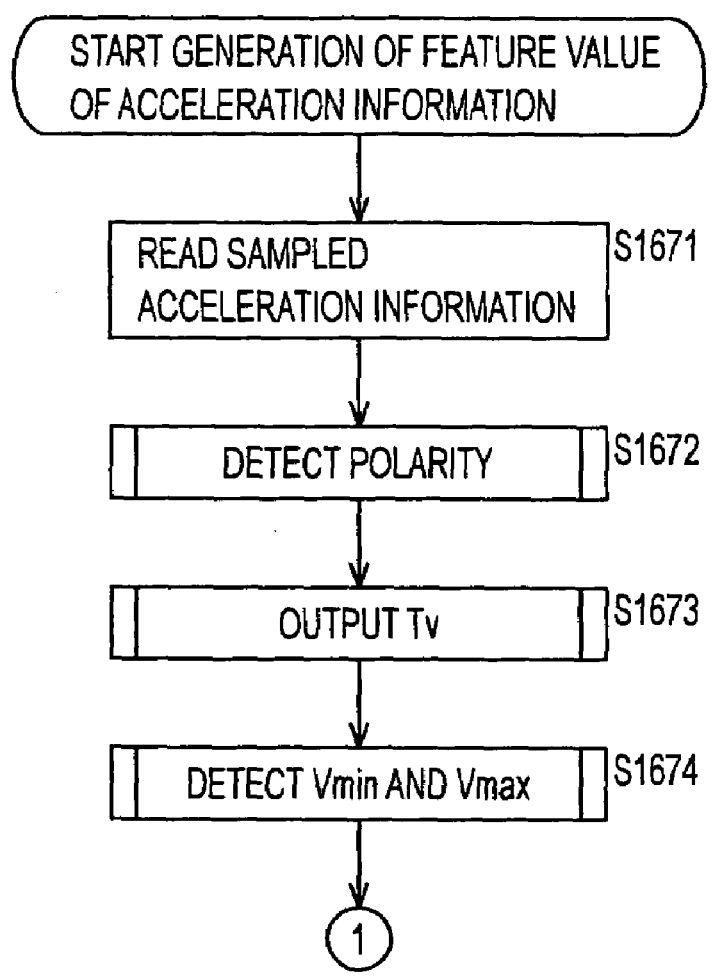
FIG. 100 is a flow chart showing a process of calculating feature values of acceleration information.

Now, referring to FIGS. 100 and 101, the process of calculating the feature value associated with acceleration information in step S851 in FIG. 99 is described below. In step S1671, the feature extractor 912 reads sampled acceleration information. Thereafter, in step S1672, as in EXAMPLE 1, the feature extractor 912 performs the polarity detection process described above with reference to FIG. 16, and then in step S1673 the Tv generation process described above with reference to FIG. 17, and furthermore in step S1674 the Vmin/Vmax detection process described above with reference to FIG. 18.

Figure 102:
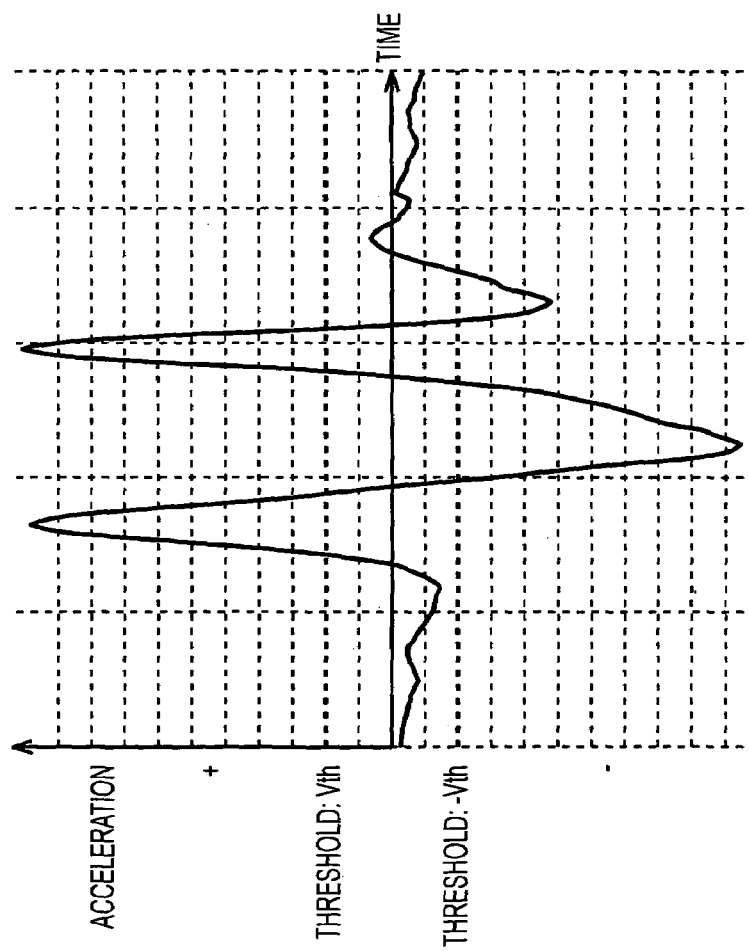
FIG. 102 is a diagram showing an example of a waveform of acceleration information associated with a controller of a game machine.

FIG. 102 shows an example of a waveform of acceleration information output from the 3-axis acceleration sensor 961 disposed in the controller 941. As described above, the 3-axis acceleration sensor 961 detects the acceleration along the X axis, the acceleration along the Y axis, and the acceleration along the Z axis. In FIG. 102, the vertical axis of the graph indicates the sum of accelerations along the X, Y, and Z axes, and the horizontal axis indicates the time. If this waveform is sampled, and the sampled data is subjected to the polarity detection process in step S1672 and the Tv generation process in step S1674, Tv+, Tv0, Tv−, Tv0, Tv+ ... are obtained as the result.

Tv+ indicates a period of time during which a possible acceleration is applied to the controller. Tv− indicates a period of time during which a negative acceleration is applied to the controller. Tv0 indicates a period of time during which substantially no acceleration is applied to the controller.

Furthermore, via the Vmin/Vmax detection process in step S1674, an output value Vmax in the period Tv+ and an output value Vmin in the period Tv− are obtained. As a result, waveform information is obtained as shown in FIG. 103.

Figure 101:
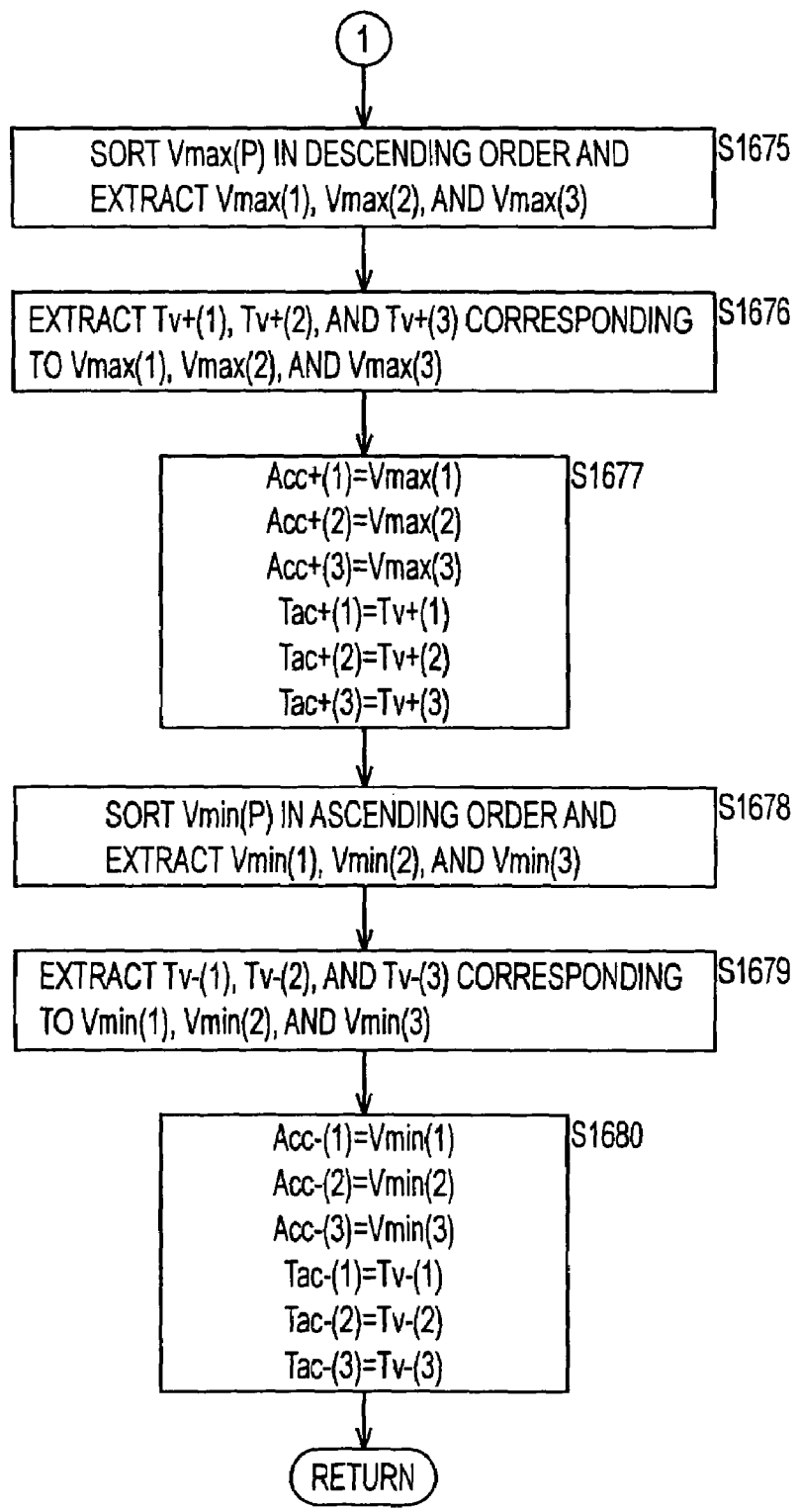
FIG. 101 is a flow chart showing a remaining part of the process of calculating feature values of acceleration information.

In step S1675 shown in FIG. 101, the feature extractor 912 sorts the output values Vmax(P) currently arranged in ascending order of time into a descending order of value, and the feature extractor 912 extracts output values Vmax(1), Vmax(2), and Vmax(3). In step S1676, the feature extractor 912 extracts periods of time Tv+(1), Tv+(2), and Tv+(3) corresponding to the respective output values Vmax(1), Vmax(2), and Vmax(3).

Figure 103:
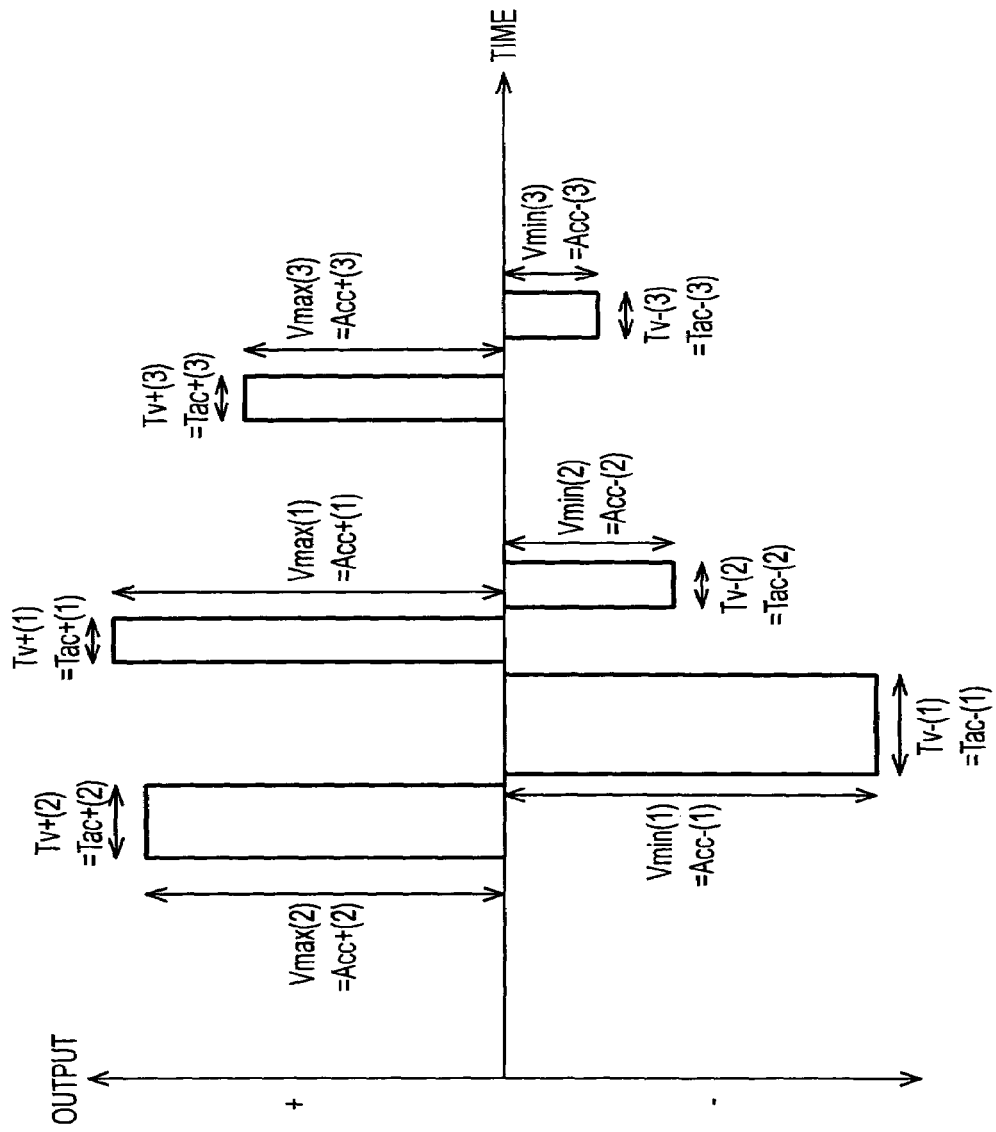
FIG. 103 is a diagram showing an example of data obtained from acceleration information associated with a controller of a game machine.

More specifically, of the three rectangular wave signals with negative output values shown in FIG. 103, a rectangular wave signal with a greatest amplitude (that is, a third rectangular wave signal as counted from the leftmost end in FIG. 103) is first selected, and the values of the output value and the period thereof are respectively set as Vmax(1) and Tv+(1). Similarly, the output value and the period of time with a second greatest amplitude are respectively set as Vmax(2) and Tv+(2), and the output value and the period of time with a third greatest amplitude are respectively set as Vmax(3) and Tv+(3). In the example shown in FIG. 103, the waveform includes three positive rectangular wave signals. When the waveform includes only two positive rectangular wave signals, Vmax(3) and Tv+(3) are respectively set to 0.

Referring again to FIG. 101, in step S1677, the feature extractor 912 sets the values of Vmax(1), Vmax(2), Vmax(3), Tv+(1), Tv+(2), and Tv+(3) into first to sixth components Acc+(1), Acc+(2), Acc+(3), Tac+(1), Tac+(2), and Tac+(3), respectively, of the feature vector Vc.

In step S1678, the feature extractor 912 sorts the output values Vmin(P) currently arranged in ascending order of time into a ascending order of value, and the feature extractor 912 extracts output values Vmin(1), Vmin(2), and Vmin(3). In step S1679, the feature extractor 912 extracts periods of time Tv−(1), Tv−(2), and Tv−(3) corresponding to the respective output values Vmin(1), Vmin(2), and Vmin(3).

More specifically, of the three rectangular wave signals with negative output values shown in FIG. 103, a rectangular wave signal with a greatest absolute amplitude (that is, a rectangular wave signal at the leftmost end) is first selected, and the values of the output value and the period thereof are respectively set as Vmin(1) and Tv−(1). Similarly, the output value and the period of time with a second greatest absolute amplitude are respectively set as Vmin(2) and Tv−(2), and the output value and the period of time with a third greatest absolute amplitude are respectively set as Vmin(3) and Tv−(3). In the example shown in FIG. 103, the waveform includes three negative rectangular wave signals. When the waveform includes only two negative rectangular wave signals, Vmin(3) and Tv−(3) are respectively set to 0.

Referring again to FIG. 101, in step S1680, the feature extractor 912 sets the values of Vmin(1), Vmin(2), Vmin(3), Tv−(1), Tv−(2), and Tv−(3) into seventh to twelfth components Acc−(1), Acc−(2), Acc−(3), Tac−(1), Tac−(2), and Tac−(3), respectively, of the feature vector Vc.

In this way, feature values of acceleration information are calculated.

Figure 104:
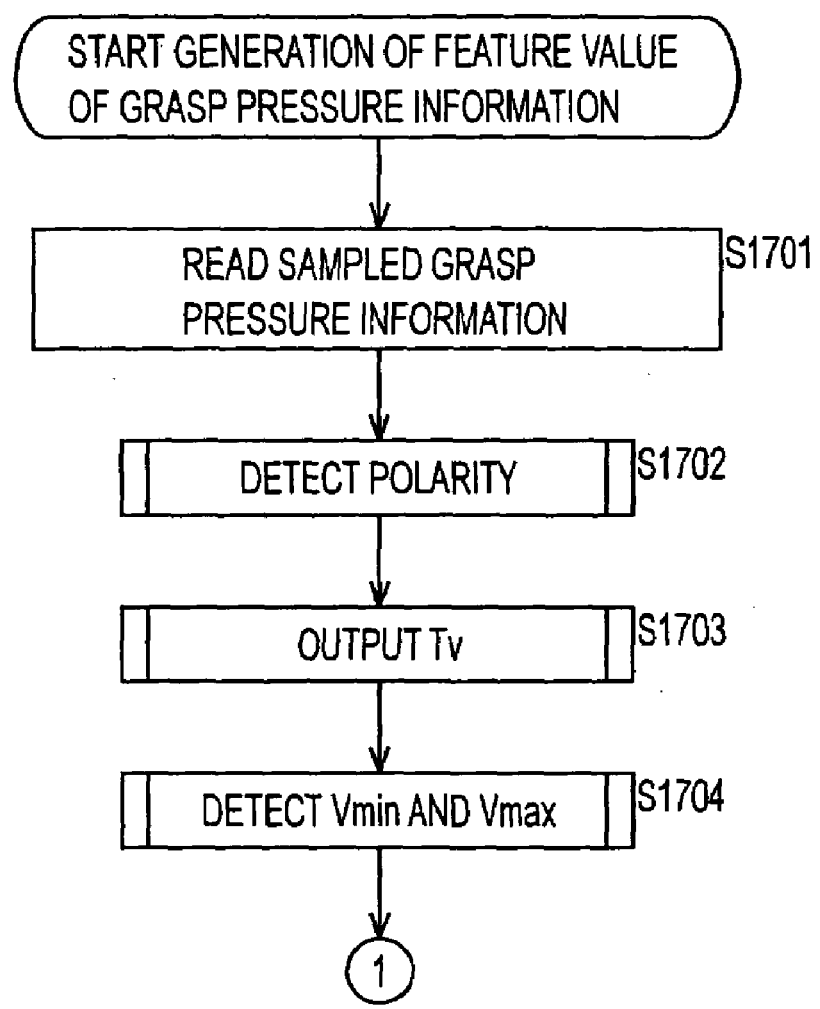
FIG. 104 is a flow chart showing a process of extracting feature values of grasp pressure information.

Now, referring to FIGS. 104 and 105, the process of calculating feature values associated with grasp pressure information in step S1652 in FIG. 99 is described below. Grasp pressure information is output from the right-hand grasp pressure sensor 963R and the left-hand grasp pressure sensor 963L of the controller 941. The feature values of grasp pressure information are calculated for each of grasp pressure information output from the grasp pressure sensor 963R and grasp pressure information output from the grasp pressure sensor 963L.

Figure 106:
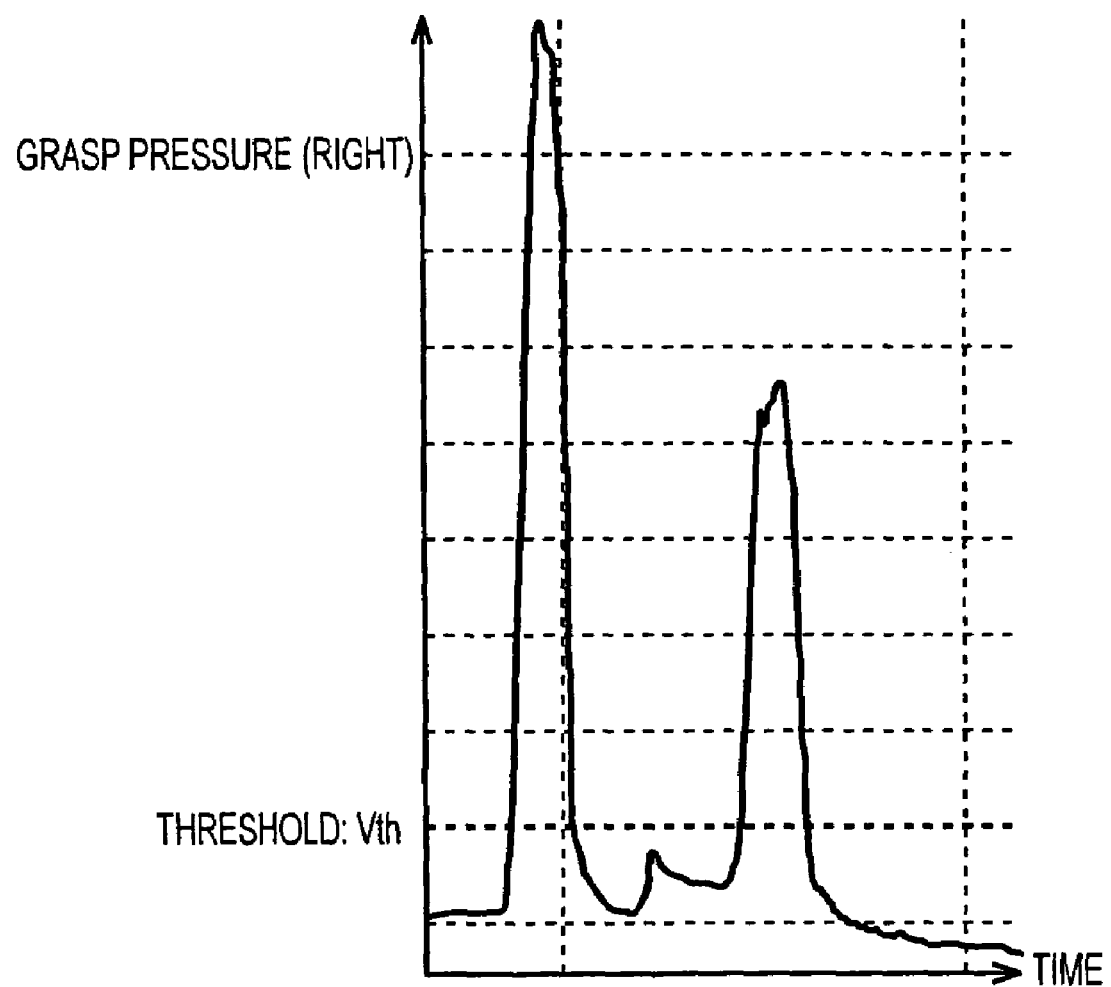
FIG. 106 is a diagram showing an example of a waveform of grasp pressure information associated with a right-hand part of a controller of a game machine.
Figure 107:
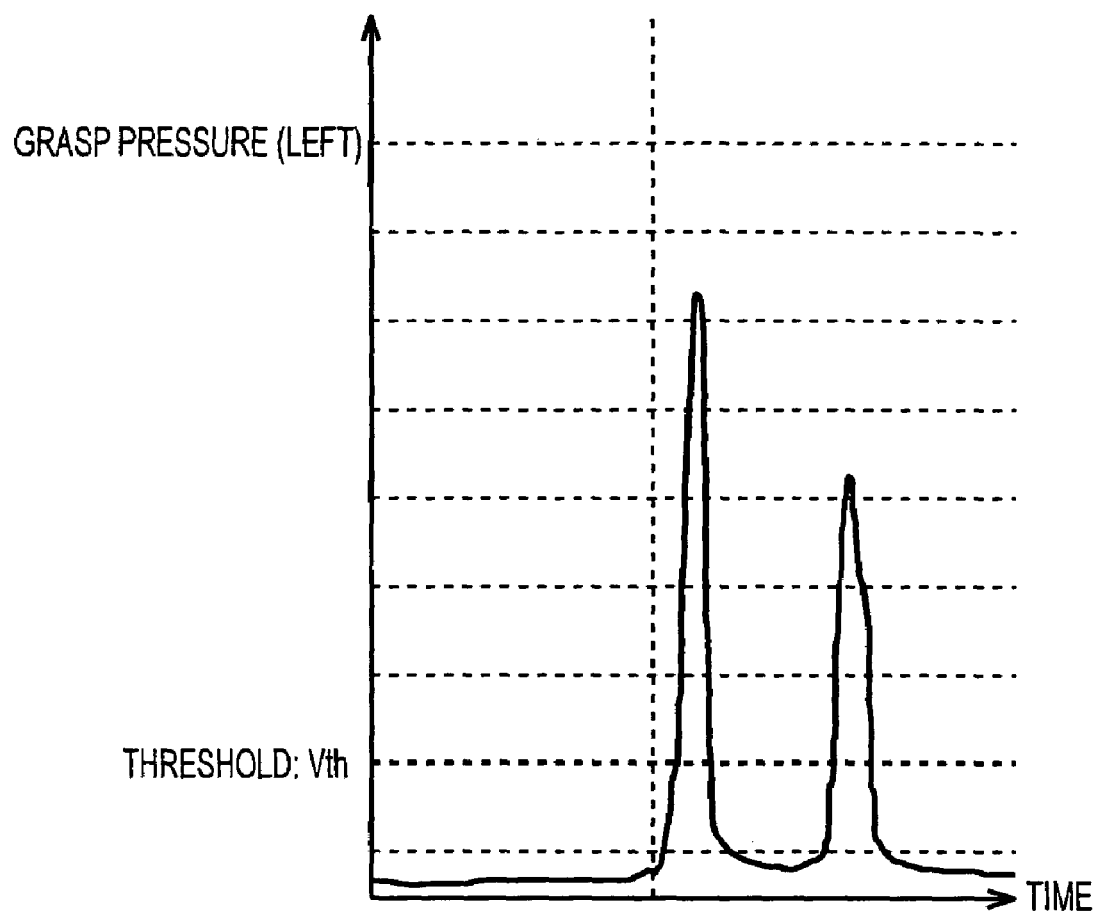
FIG. 107 is a diagram showing an example of a waveform of grasp pressure information associated with a left-hand part of a controller of a game machine.

In step S1701, the feature extractor 912 reads sampled grasp pressure information. Thereafter, in step S1702, as in EXAMPLE 1, the feature extractor 912 performs the polarity detection process described above with reference to FIG. 16, then in step S1703, the Tv generation process described above with reference to FIG. 17, and furthermore in step S1704, the Vmin/Vmax detection process described above with reference to FIG. 18. FIG. 106 shows an example of a waveform of grasp pressure information output from the grasp pressure sensor 963R, and FIG. 107 shows an example of a waveform of grasp pressure information output from the grasp pressure sensor 963L. In FIGS. 106 and 107, the vertical axis of the graph indicates the grasp pressure, and the horizontal axis indicates the time.

If this waveform is sampled, and the sampled data is subjected to the polarity detection process in step S1702 and the Tv generation process in step S703, Tv+, Tv0, Tv+, Tv0, . . . are obtained as the result.

Tv+ indicates a period of time during which the controller is grasped by the user a at a grasp pressure higher than a predetermined value. Tv0 indicates a period of time during which the controller is grasped by the user a at a grasp pressure lower than the predetermined value.

Furthermore, via the Vmin/Vmax detection process in step S1704, an output value Vmax in the period Tv+ and an output value Vmin in the period Tv− are obtained. As a result, waveform information such as that shown in FIG. 108 is obtained from the grasp information shown in FIG. 106, and waveform information such as that shown in FIG. 109 is obtained from the grasp information shown in FIG. 107.

Figure 105:
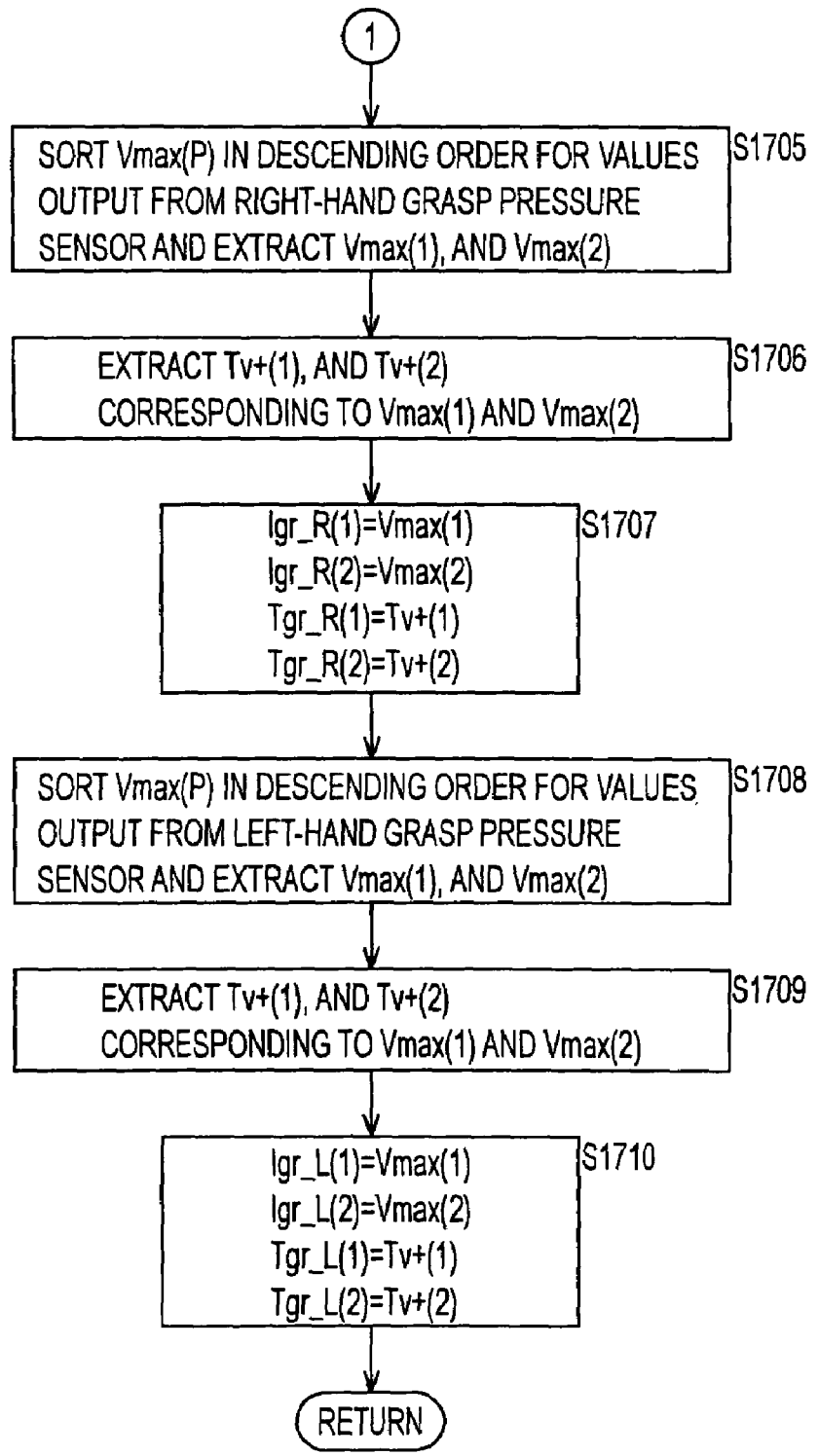
FIG. 105 is a flow chart showing a remaining part of the process of extracting feature values of grasp pressure information.

In step S1705 shown in FIG. 105, the feature extractor 912 sorts the values Vmax(P) output from the right-hand grasp pressure sensor 963R into a descending order of value from the current ascending order of time and the feature extractor 912 extracts output values Vmax(1) and Vmax(2). In step S1706, the feature extractor 912 extracts periods of time Tv+(1) and Tv+(2) corresponding to the respective output values Vmax(1) and Vmax(2).

Figure 108:
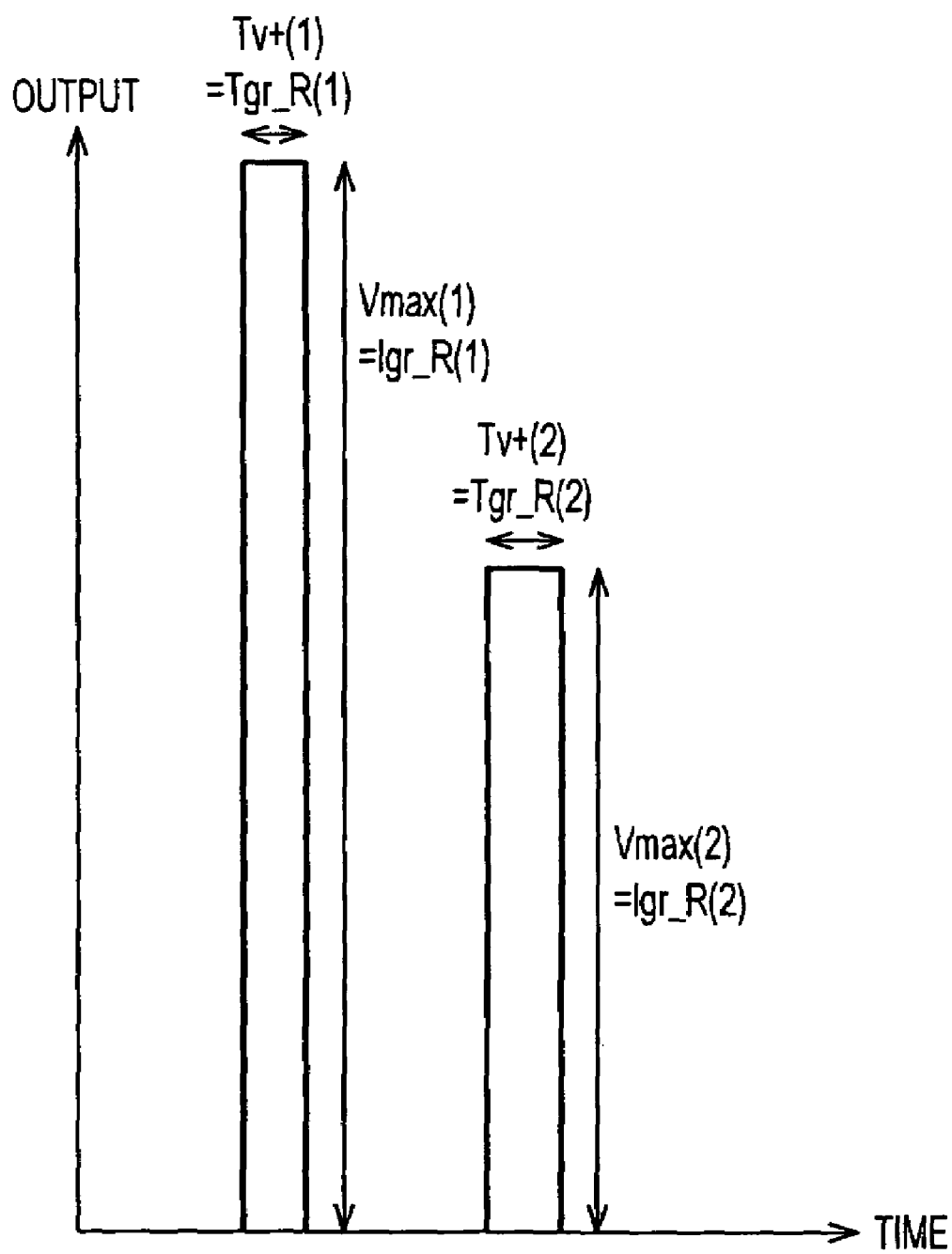
FIG. 108 is a diagram showing an example of data obtained from grasp pressure information associated with a right-hand part of a controller of a game machine.
Figure 109:
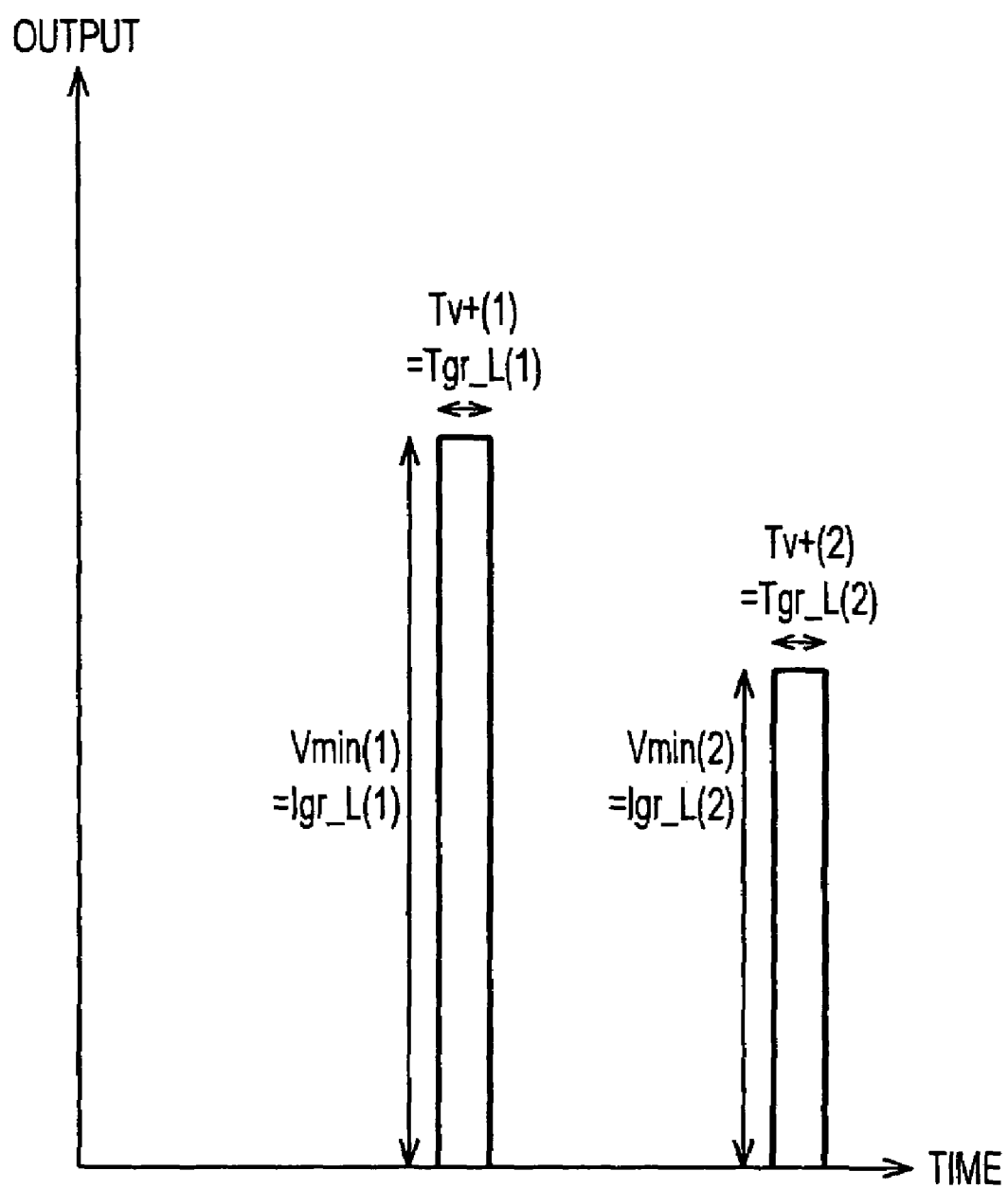
FIG. 109 is a diagram showing an example of data obtained from grasp pressure information associated with a left-hand part of a controller of a game machine.

More specifically, of the two positive rectangular wave signals shown in FIG. 108, a rectangular wave signal with a greatest amplitude (that is, a rectangular wave signal at the leftmost end in FIG. 108) is first selected, and the values of the output value and the period thereof are respectively set as Vmax(1) and Tv+(1). Similarly, the output value and the period of time with a second greatest amplitude are respectively set as Vmax(2) and Tv+(2). In the example shown in FIG. 103, the waveform includes two positive rectangular wave signals. When the waveform includes only one positive rectangular wave signal, Vmax(2) and Tv+(2) are respectively set to 0.

Referring again to FIG. 105, in step S1707, the feature extractor 912 sets the values of Vmax(1), Vmax(2), Tv+(1), and Tv+(2) into thirteenth to sixteenth components Igr_R(1), Igr_R(2), Tgr_R(1), and Tgr_R(2), respectively, of the feature vector Vc.

In step S1708, the feature extractor 912 sorts the values Vmax(P) output from the left-hand grasp pressure sensor 963L into a descending order of value from the current ascending order of time and the feature extractor 912 extracts output values Vmax(1) and Vmax(2). In step S1709, the feature extractor 912 extracts periods of time Tv+(1) and Tv+(2) corresponding to the respective output values Vmax(1) and Vmax(2).

In step S1710, the feature extractor 912 sets the values of Vmax(1), Vmax(2), Tv+(1), and Tv+(2) into seventeenth to twentieth components Igr_L(1), Igr_L(2), Tgr_L(1), and Tgr_L(2), respectively, of the feature vector Vc.

In this way, feature values of grasp pressure information are calculated.

The process has been described above for the case in which the game machine A stores feature information on the basis of acceleration information and grasp pressure information associated with the user a. The game machine can also store feature information on the basis of acceleration information and grasp pressure information associated with the user b transmitted from the game machine B. In this case, acceleration information and grasp pressure information associated with the user b are sampled by the feature extractor 912 of the game machine B and transmitted together with a header to the game machine A via the output controller 914 and the information transmitting unit 921. Voice information uttered by the user b is transmitted to the game machine A, and the meaning extractor 913 of the game machine A extracts emotion information from the voice information of the user b.

Figure 98:
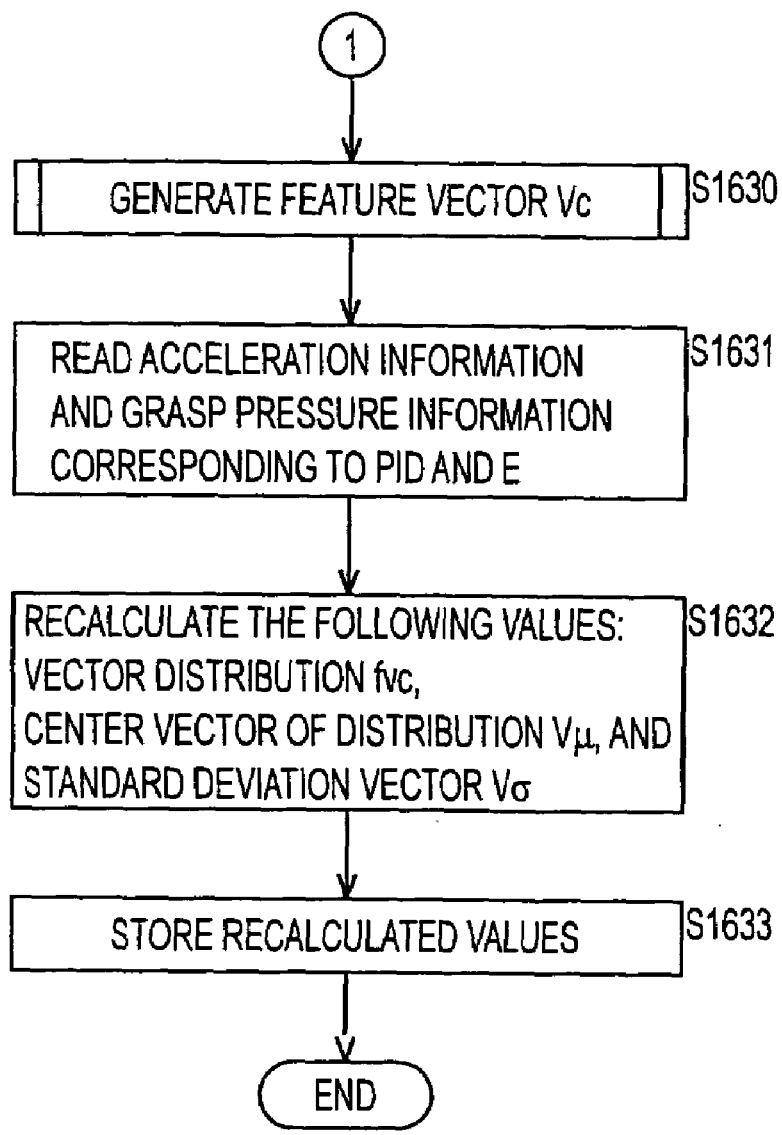
FIG. 98 is a flow chart showing a remaining part of the feature information storage process.

If the game machine receives the acceleration information and grasp pressure information associated with the user b from the game machine B, the game machine A performs the feature value storage process described above with reference to FIGS. 97 and 98. For example, if the user b utters "I am embarrassed.", then, in the feature information storage process in step S1629 in FIG. 97, the game machine A extracts "middle-level instability" as emotion information. On the other hand, in the game machine B, when the user b utters "I am embarrassed", the signal with the waveform shown in FIG. 110 is detected by the 3-axis acceleration sensor 961 of the controller 941 of the game machine B, the signal with the waveform shown in FIG. 111 is detected by the grasp pressure sensor 963R of the controller 941 of the game machine B, and the signal with the waveform shown in FIG. 112 is detected by the grasp pressure sensor 963L of the controller 941 of the game machine B.

Figure 110:
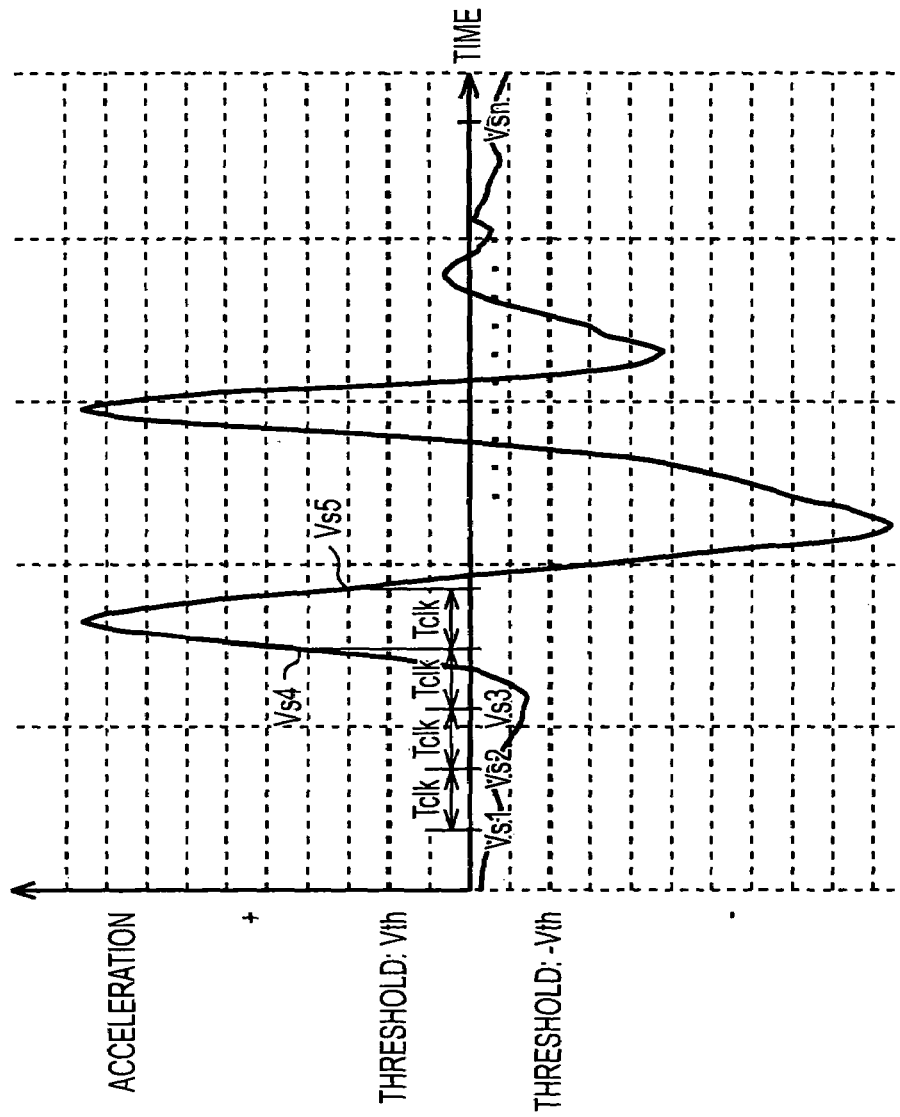
FIG. 110 is a diagram showing an example of a waveform of acceleration information associated with a controller of a game machine.
Figure 111:
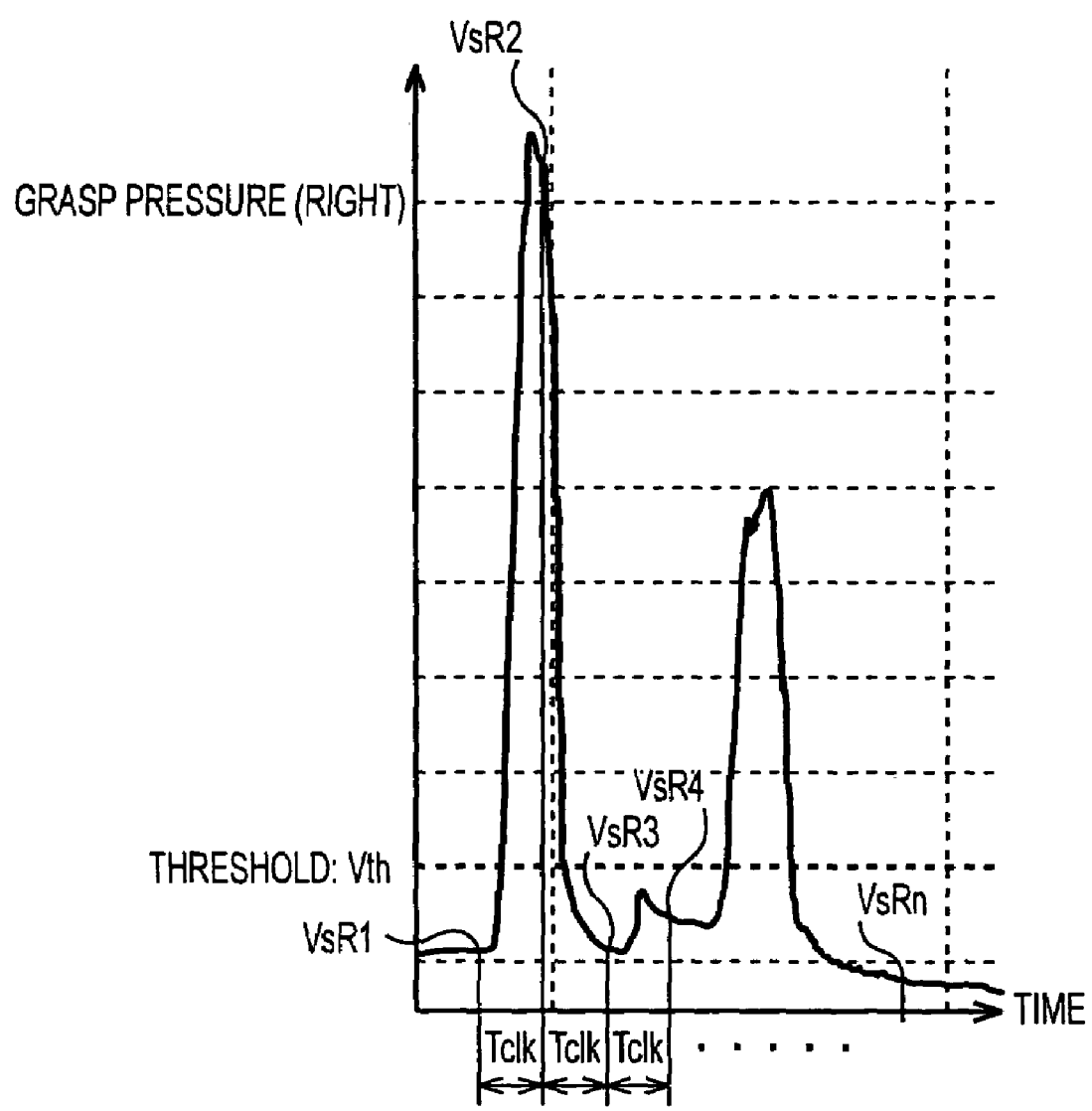
FIG. 111 is a diagram showing an example of a waveform of grasp pressure information associated with a right-hand part of a controller of a game machine.
Figure 112:
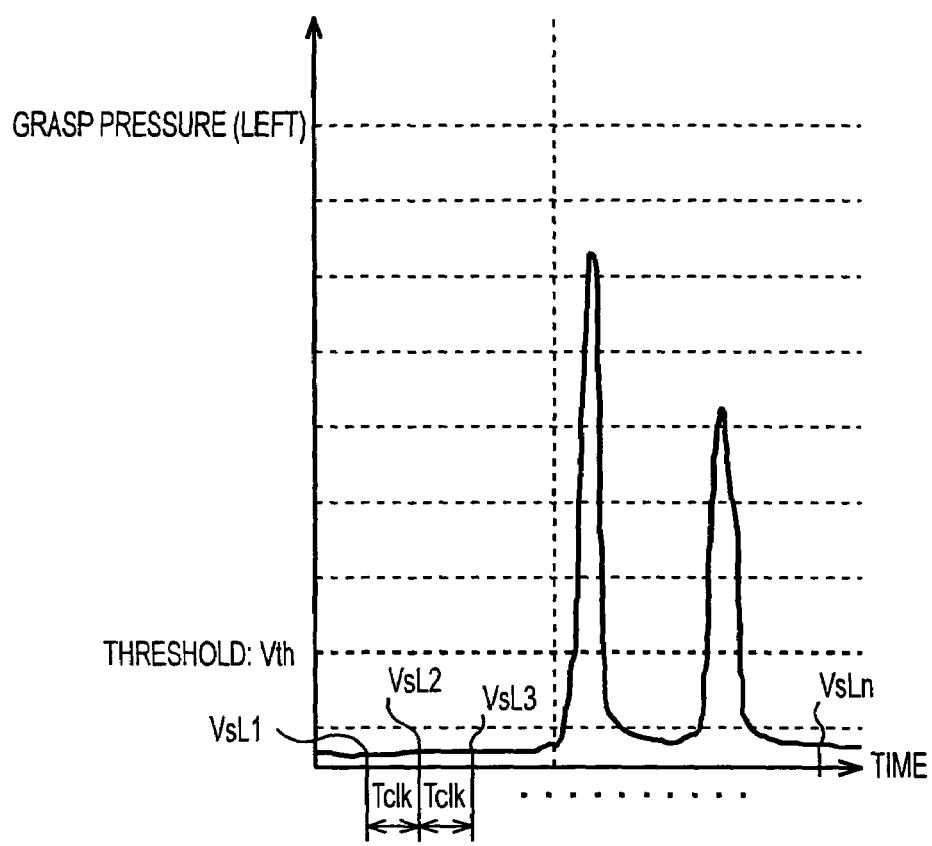
FIG. 112 is a diagram showing an example of a waveform of grasp pressure information associated with a left-hand part of a controller of a game machine.

The signals with waveforms shown in FIGS. 110 to 112 are sampled at intervals Tclk by the feature extractor 912 of the game machine B. From the signal shown in FIG. 110, sampled values Vs1, Vs2, Vs3, . . . , Vsn are obtained as acceleration information and transmitted to the game machine A together with a header indicating that the information is acceleration information associated with the user b. From the signal shown in FIG. 111, sampled values VsR1, VsR2, VsR3, . . . , VsRn are obtained as grasp pressure information and transmitted to the game machine A together with a header indicating that the information is right-hand grasp pressure information associated with the user b. Similarly, from the signal shown in FIG. 112, sampled values VsL1, VsL2, VsL3, . . . , VsLn are obtained as grasp pressure information and transmitted to the game machine A together with a header indicating that the information is left-hand grasp pressure information associated with the user b. In the process of generating a feature value vector Vc in step S1630 in FIG. 98, the game machine A generates a feature value vector corresponding to a middle-level instability of the user b on the basis of the acceleration information and grasp pressure information transmitted from the game machine B, and the game machine stores the resultant feature value vector Vc.

Figure 113:
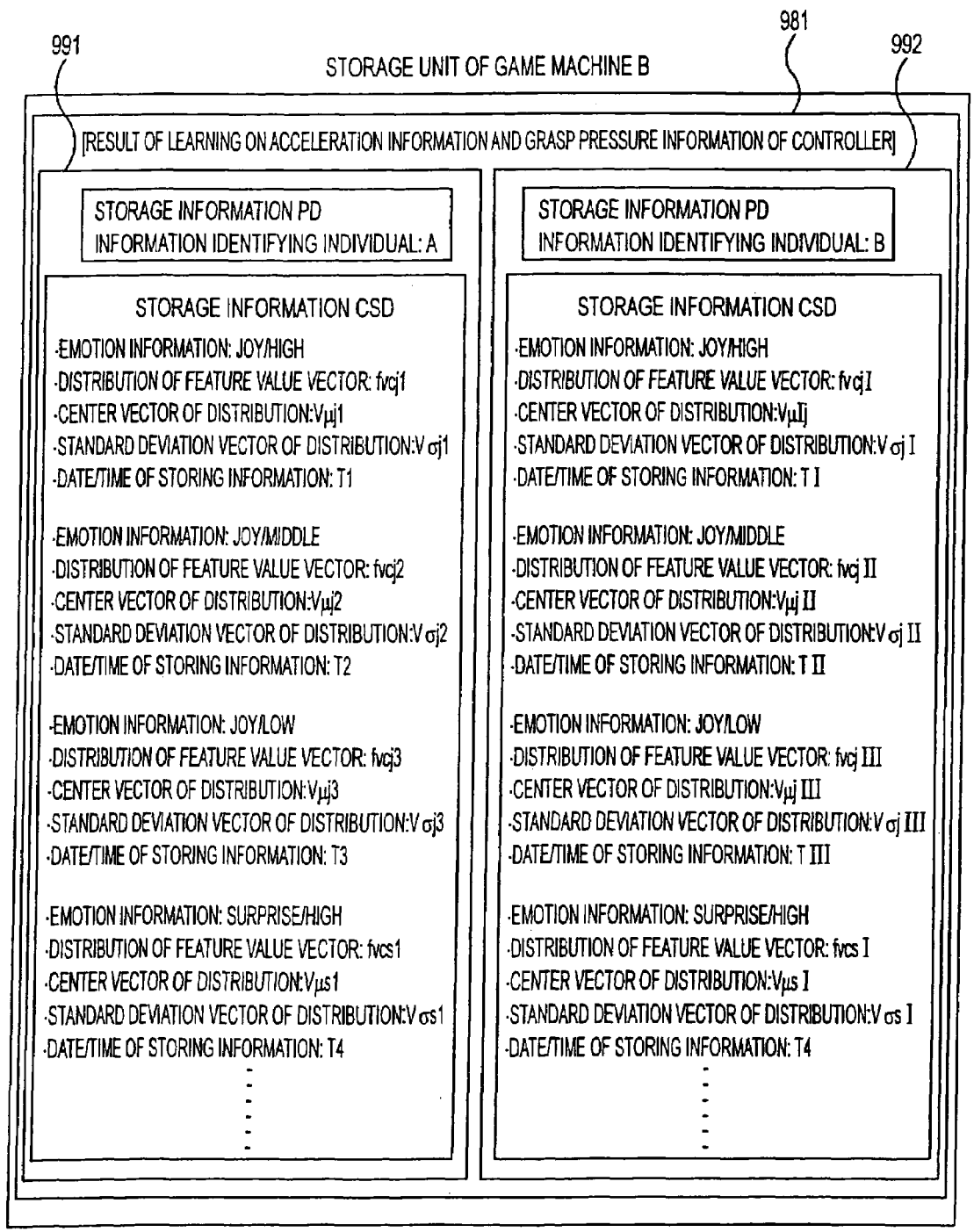
FIG. 113 is a diagram showing an example of information stored in a storage unit of a game machine.

The terminal B generates a feature value vector from acceleration information and grasp pressure information associated with the user b and stores the generated feature value vector, and the terminal B also generates a feature value vector from acceleration information and grasp pressure information associated with the user a transmitted from the game machine A and stores the generated feature value vector. As a result, as shown in FIG. 113, a learning result 981 associated with acceleration information and grasp pressure information is stored in the storage unit 895 of each of the game machine A and the game machine B, wherein the learning result 981 includes information 991 associated with the user a and information 992 associated with the user b.

Once sufficient amounts of acceleration information and grasp pressure information have been stored via a repetition of above-described feature information storage process, it becomes possible to identify the emotion/state and the strength level of each user from the acceleration information and grasp pressure information.

Now, referring to FIG. 114, the process performed by the terminal B to identify an emotional state of the user a is described below. In step S1731, the system controller 897 of the game machine B acquires information PID identifying the user a of the game machine A with which to communicate. In step S1732, the system controller 897 of the game machine B commands the information discriminator 911 to determine whether at least one of output values of the acceleration information or grasp pressure information associated with the user a exceeds a threshold value. If either one is lower than the threshold value, the process waits until at least one of output values of the acceleration information or grasp pressure information associated with the user a exceeds the threshold value. The threshold value may be set in a program or the like in advance, or the threshold value may be specified by the user each time a communication is performed.

If it is determined in step S1732 that at least one of output values of the acceleration information or grasp pressure information associated with the user a exceeds the threshold value, then in step S1733, the system controller 897 stores the acceleration information or grasp pressure information associated with the user a into a storage unit (not shown) in the feature extractor 912. Then in step S1734, the system controller 897 commands the information discriminator 911 to determine whether the output value of the acceleration information or grasp pressure information associated with the user a becomes and remains smaller than the threshold value for a period longer than a predetermined value (for example, 10 sec). If it is determined that the acceleration information or grasp pressure information associated with the user a does not become and remain smaller than the threshold value for a period longer than the predetermined value, the process returns to step S1733.

Figure 115:
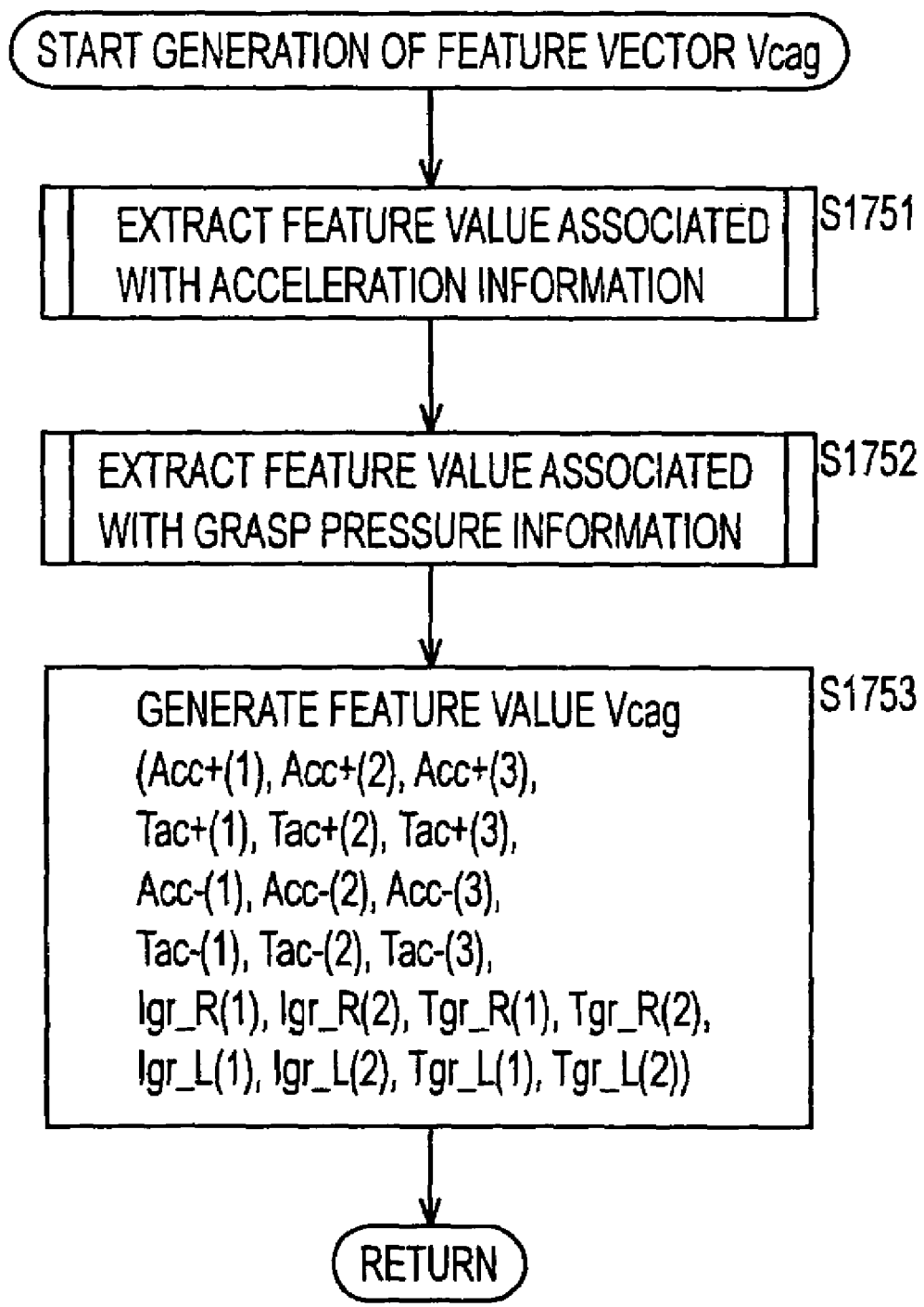
FIG. 115 is a flow chart showing a process of generating a feature value vector Vcag.

If it is determined in step S1734 that the acceleration information or grasp pressure information associated with the user a becomes and remains smaller than the threshold value for a period longer than the predetermined value, then in step S1735, the system controller 897 commands the feature extractor 912 to generate a feature vector Vcag that will be described later with reference to FIG. 115. Thus, a feature vector Vcag is generated on the basis of the acceleration information and grasp pressure information associated with the user a. In step S1736, the system controller 897 commands the learning unit 894 to perform an emotion information identification process associated with Vcag. The details of the emotion information identification process will be described later with reference to FIG. 120. Thus, emotion information corresponding to the feature vector Vcag is identified. In step S1737, the system controller 897 commands the learning unit 894 to output the identification result and perform a recalculation. The details of this process will be described later with reference to FIG. 122.

Now, referring to FIG. 115, the process of generating Vcag is described below. This process is performed by the feature extractor 912 of the game machine B. In step S1751, the feature extractor 912 performs the process of calculating the feature value associated with acceleration information (this process is performed in a similar manner as described above with reference to FIGS. 100 and 101, and thus a duplicated description of the details of the process is not given herein). In step S1752, the feature extractor 912 performs the process of calculating the feature value associated with grasp pressure information (this process is performed in a similar manner as described above with reference to FIGS. 104 and 105, and thus a duplicated description of the details of the process is not given herein). Then in step S1753, the feature extractor 912 generates a feature vector Vcag(Acc+(1), Acc+(2), Acc+(3), Tac+(1), Tac+(2), Tac+(3), Acc−(1), Acc−(2), Acc−(3), Tac−(1), Tac−(2), Tac−(3), Igr_R(1), Igr_R(2), Tgr_R(1), Tgr_R(2), Igr_L(1), Igr_L(2), Tgr_L(1), Tgr_L(2)).

Thus, the feature vector Vcag is generated from the acceleration information and grasp pressure information associated with the user a.

Figure 116:
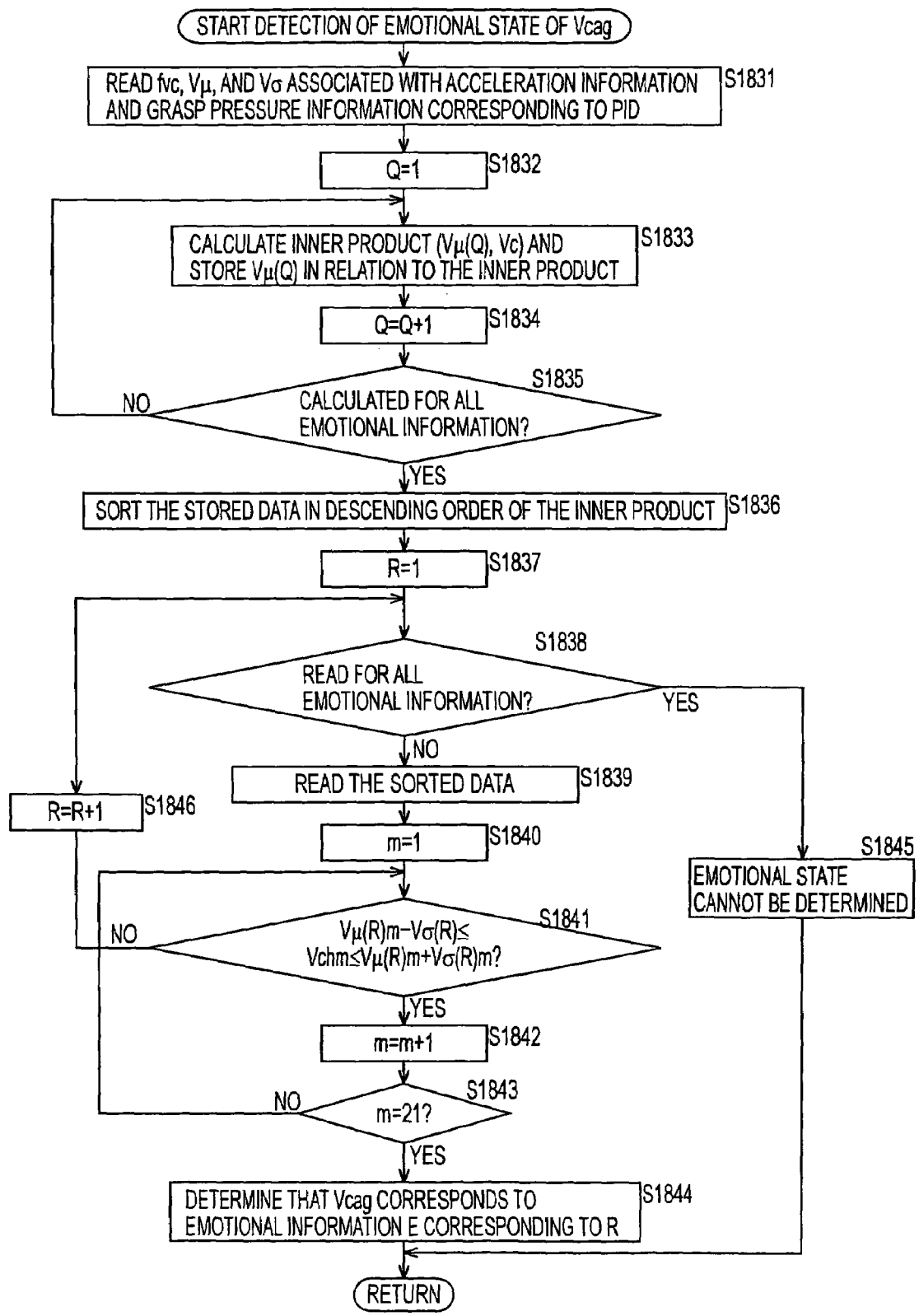
FIG. 116 is a flow chart showing an emotion/state identification process associated with y Vcag.

Now, referring to FIG. 116, the emotion information identification process associated with Vcag is described below. This process is performed by the learning unit 894 of the game machine B.

In step S1831, the learning unit 894 reads, from the storage unit 895, the feature value vector distribution fvc, the distribution center vector Vμ, and the distribution standard deviation vector Vσ associated with acceleration information and grasp pressure information of the user a.

As described above, there are 36 kinds of emotion information, and there are 36 feature value vector distributions fvc, 36 distribution center vectors Vμ, and 36 distribution standard deviation vectors Vσ corresponding to the respective 36 kinds of emotion information.

Then in step S1832, the learning unit 894 sets the parameter Q to 1. Note that the parameter Q can take an integral value in the range of from 1 to 36 depending on which one of the 36 kinds of emotion information is dealt with. In step S1833, the learning unit 894 of the terminal B calculates the inner product of the vector Vμ(Q) and the feature value vector Vcag generated in step S1735 (FIG. 114), and stores Vμ(Q) in relation to the inner product. Then in step S1834, the learning unit 894 increments the value of Q by 1. In step S1835, the learning unit 894 of the terminal B determines whether the calculation is completed for all kinds of emotion information, that is, whether the calculation of the inner product is completed for all 36 center vectors Vμ. If it is determined that the inner product is not calculated for all kinds of emotion information, the flow returns to step S1833, and the above-described process is repeated.

When the calculation of the inner product is completed for all 36 center vectors Vμ corresponding to the respective kinds of emotion information, data associated with the emotion information, the inner products, data indicating the kinds of the center vector Vμ, and data indicating the order of the inner products are stored in the storage unit (not shown) of the learning unit 894, as in EXAMPLE 1. In step S1836, the learning unit 894 sorts the data in descending order of inner product. The order of the magnitude of the inner product is represented by R that can take an integral value in the range from 1 to 36.

In step S1837, the learning unit 894 sets the parameter R to 1. In step S1838, the learning unit 894 determines whether data associated with all kinds of the emotion information are read. If it is determined that data associated with all kinds of the emotion information are not read, then in step S1839, the learning unit 894 reads, one by one, data sorted in step S1836. The inner products of the feature vector Vcag and center vectors corresponding to respective 36 kinds of emotion information are calculated in step S1833 as described above, and a greatest one of all inner products is selected. If the center vector corresponding to the detected greatest inner product of the center vector and the feature vector Vcag is, for example, a center vector Vμ30 of feature vectors corresponding to emotion information "strong vitality" of the user a, then, when R=1, the center vector Vμ30 and the standard deviation vector Vσ30 corresponding to emotion information "strong vitality" of the user a are read.

In step S1840, the learning unit 894 sets the parameter m to 1. Then in step S1841, the learning unit 894 determines whether the condition Vμ(R)m−Vσ(R)m≦Vcagm≦Vμ(R)m+Vσ(R)m is satisfied, wherein Vμ(R)m denotes an mth component of the vector Vμ(R), and Vσ(R)m and Vcagm respectively denote mth components of vectors Vσ and Vcag. As described above, the feature vector associated with acceleration information and grasp pressure information includes the following 20 components: Acc+(1), Acc+(2), Acc+(3), Tac+(1), Tac+(2), Tac+(3), Acc−(1), Acc−(2), Acc−(3), Tac−(1), Tac−(2), Tac−(3), Igr_R(1), Igr_R(2), Tgr_R(1), Tgr_R(2), Igr_L(1), Igr_L(2), Tgr_L(1), and Tgr_L(2). When m=1, the component Acc+(1) is extracted from each vector of Vμ(R), Vσ(R), and Vcag and subjected to the process.

If it is determined in step S1841 that the condition Vμ(R)m−Vσ(R)m≦Vcagm≦Vμ(R)m+Vσ(R)m is not satisfied, the process proceeds to step S1846. In step S1846, the learning unit 894 increments the value of R by 1 and returns the flow to step S1838 to repeat the above-described process. In the case in which it is determined in step S1841 that the condition Vμ(R)m−Vσ(R)m≦Vchm≦Vμ(R)m+Vσ(R)m is satisfied, the process proceeds to step S1842. In step S1842, the learning unit 894 increments the value of m by 1 and advances the flow to step S1843. In step S1843, the learning unit 894 determines whether m is equal to 21, that is, whether the judgment about the above condition has been performed for all 20 components of respective vectors Vμ(R), Vσ(R), and Vcag. If it is determined that m is not equal to 21, the process returns to step S1841, and the above-described process is repeated.

On the other hand, if it is determined in step S1843 that m is equal to 21, that is, if it is determined that the condition Vμ(R)m−Vσ(R)m≦Vcagm≦Vμ(R)m+Vσ(R)m is satisfied for all 20 components of respective vectors Vμ(R), Vσ(R), and Vcag, then, in step S1844, the learning unit 894 determines that Vcag belongs to emotion information E corresponding to R. For example, when R=1, if the condition Vμ30m−Vσ30m≦Vcagm≦Vμ30m+Vσ30m is satisfied for all 20 components of respective vectors Vμ30 and Vσ30, the feature vector Vcag is regarded as belonging to emotion information "strong vitality".

If it is determined in step S1838 that data associated with all kinds of emotion information are read, the process proceeds to step S1845. In step S1845, the learning unit 894 determines that the emotion information corresponding to Vcag cannot be identified, and ends the process. That is, when the condition Vμ(R)m−Vσ(R)m≦Vcagm≦Vμ(R)m+Vσ(R)m is examined for all 36 center vectors Vμ(R) and for all 36 standard deviation vectors Vσ(R) corresponding to respective 36 kinds of emotion information, if the condition Vμ(R)m−Vσ(R)m≦Vcagm≦Vμ(R)m+Vσ(R)m for all 20 components of respective vectors Vμ(R), Vσ(R), and Vcag is not satisfied for any R, it is determined that the emotion information corresponding to Vcag cannot be identified.

Figure 117:
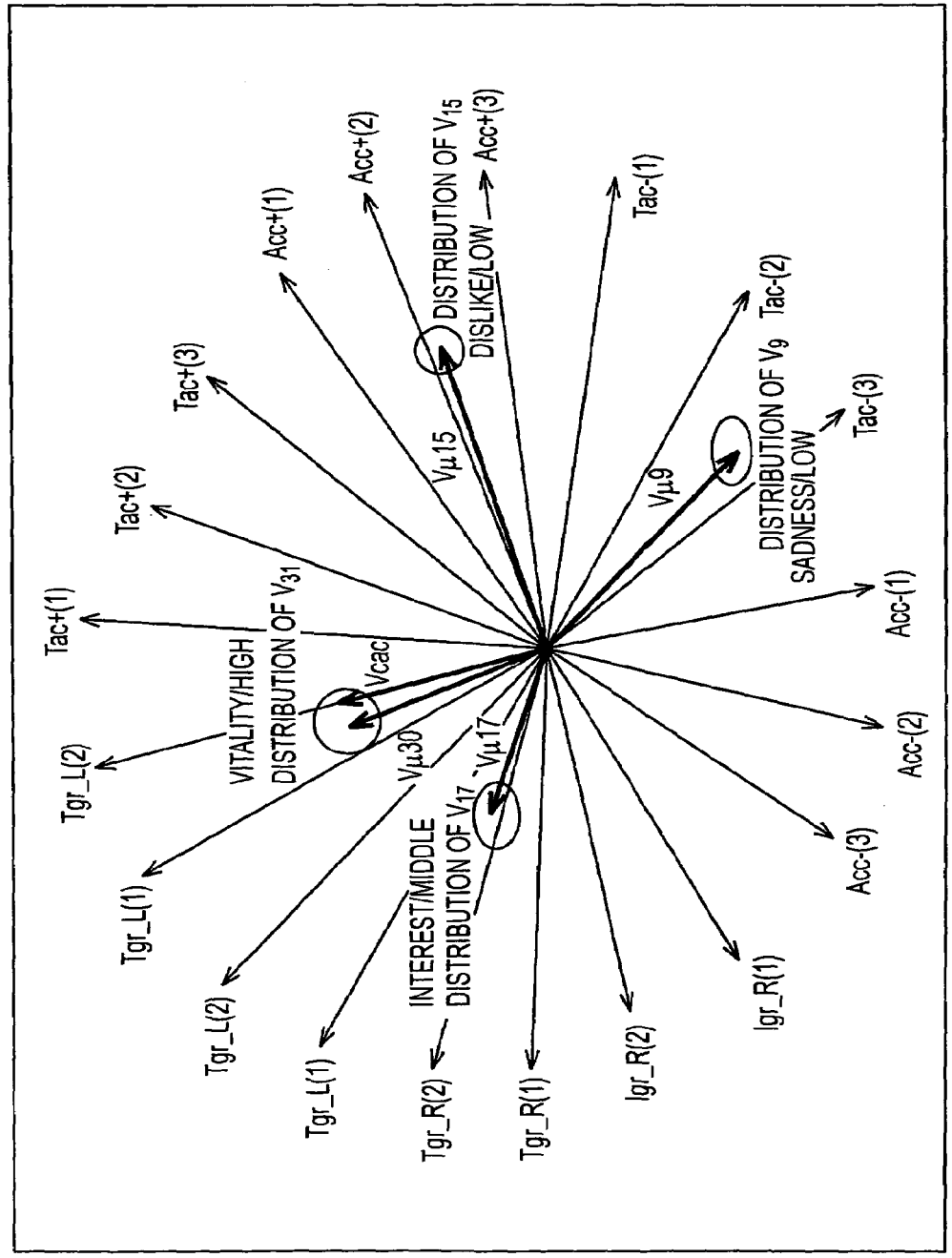
FIG. 117 is a diagram showing Vcag and distributions of various vectors.

FIG. 117 shows examples of feature vectors of vibration information corresponding to some kinds of emotion information of the user a. In FIG. 117, feature vectors are plotted in a 20-dimensional space including an Acc+(1) axis, an Acc+(2) axis, an Acc+(3) axis, a Tac+(1) axis, a Tac+(2) axis, a Tac+(3) axis, an Acc−(1) axis, an Acc−(2) axis, an Acc−(3) axis, a Tac−(1) axis, a Tac−(2) axis, a Tac−(3) axis, an Igr_R (1) axis, an Igr_R(2) axis, a Tgr_R(1) axis, a Tgr_R(2) axis, an Igr_L(1) axis, an Igr_L(2) axis, a Tgr_L(1) axis, and a Tgr_L(2) axis. In this space, by way of example, a distribution of feature vectors V9 corresponding to emotion information "weak sadness" of the user a and its center vector Vμ9, a distribution of feature vectors V15 corresponding to emotion information "weak dislike" of the user a and its center vector Vμ15, and a distribution of feature vectors V17 corresponding to emotion information "middle interest" of the user a and its center vector Vμ17 are plotted. There also can be other feature vectors corresponding to other kinds of emotion information in this space.

Figure 114:
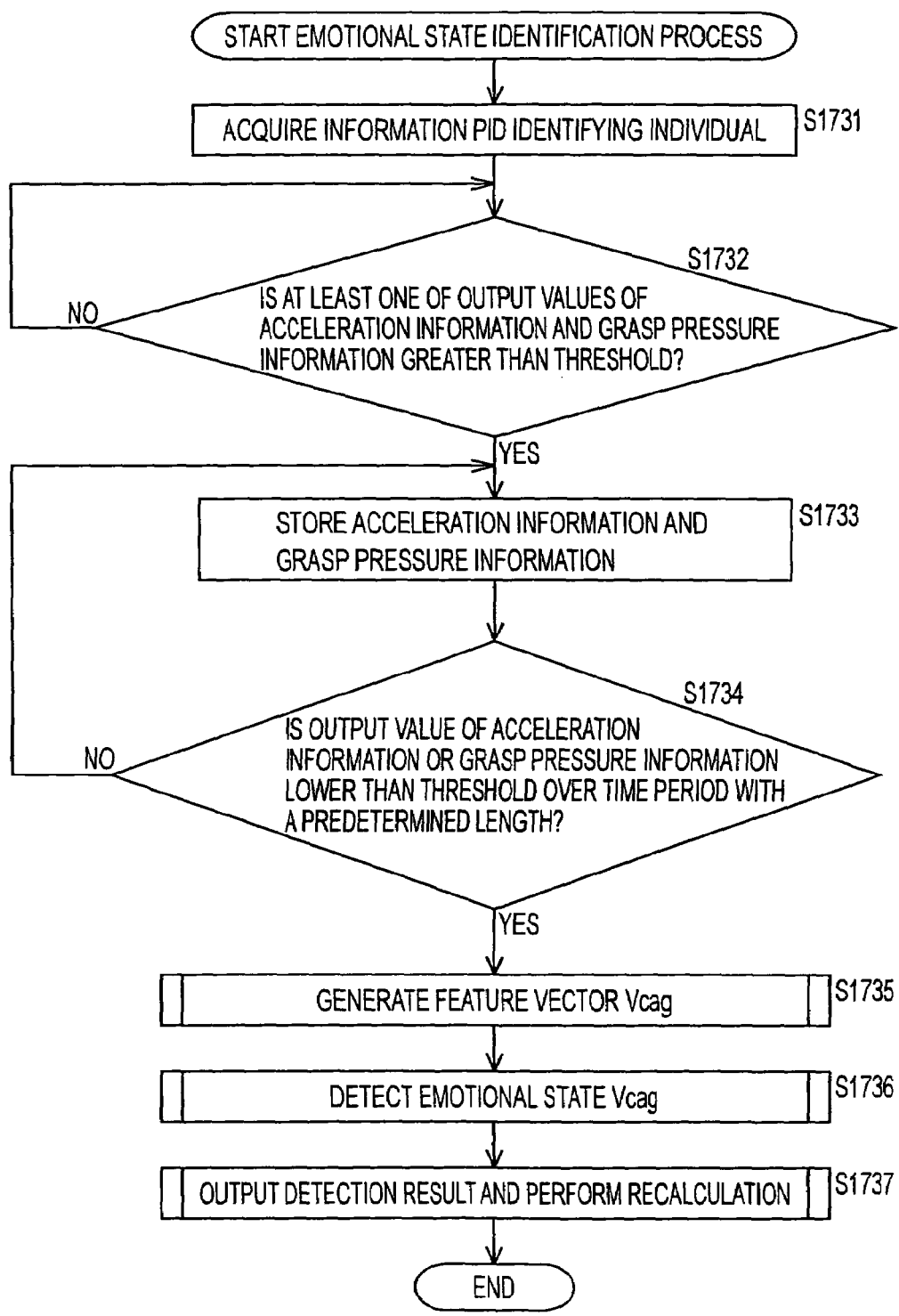
FIG. 114 is a flow chart showing an emotion/state identification process.

Among center vectors corresponding to respective kinds of emotion information, the feature value vector Vcag generated in step S1735 in FIG. 114 is close to a center vector Vμ30 of a distribution of a feature vectors V30 corresponding to emotion information "strong vitality", and thus, as a result of the process of identifying the emotion information identification process associated with Vcag, the Vcag is determined as a feature vector corresponding to "strong vitality".

In this way, the emotion/state and the strength level of the user a are identified from the feature value vector Vcag.

Figure 118:
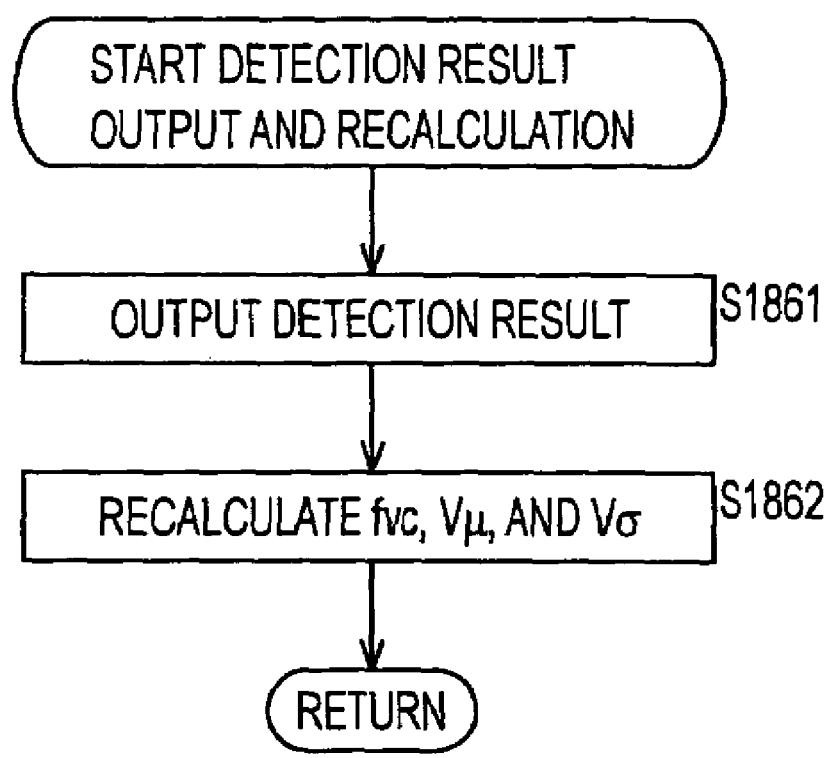
FIG. 118 is a flow chart showing a process of outputting an identification result and a recalculation process.

Now, referring to FIG. 118, the process of outputting the identification result and performing a recalculation is described below. This process is performed by the learning unit 894 of the game machine B. In step S1861, commands the learning unit 894 outputs the identification result to the output controller 914. In step S1862, the learning unit 894 of the terminal B recalculates the distribution fvc of the feature value vector of acceleration information and grasp pressure information corresponding to emotion information E of the user a and the center vector Vμ and the standard deviation vector Vσ of the distribution fvc, and the learning unit 894 of the terminal B stores the recalculated result. That is, the feature value vector Vcag generated in step S1735 (FIG. 114) is added to the feature value vector of acceleration/grasp pressure information indicating the "strong activity" of the user a stored in the storage unit 895, and fvc, Vμ, and Vσ are recalculated and stored in the storage unit 895.

In this way, the emotion/state and the level are identified from the acceleration information and grasp pressure information, and information associated with the feature vectors of the identified emotion/state and the strength level thereof is stored.

Thus, the game machine B generates the feature value vector Vcag from the acceleration information and grasp pressure information associated with the user a received from the game machine A, and the game machine B identifies the emotion/state and the strength level thereof. The game machine B can also generate feature value vectors from acceleration information and grasp pressure information associated with the user b and can identify the emotion/state and the strength level thereof.

Similarly, the game machine A identifies the emotion/state and the strength level of the user a and the user b.

Figure 119:
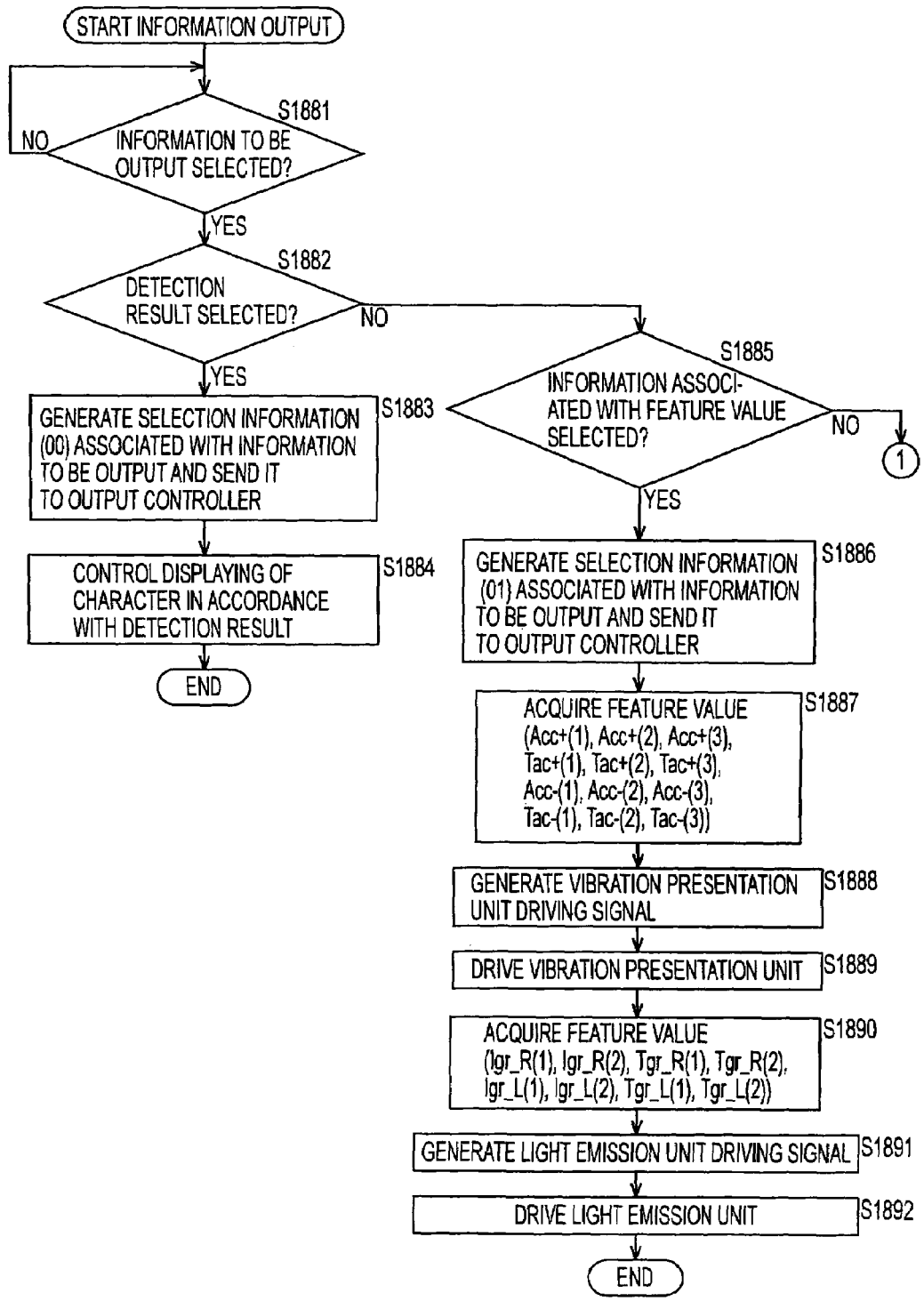

Now, referring to FIGS. 119 and 120, an information outputting process is described below. In step S1881, the system controller 897 determines whether information to be output is selected. If information to be output is not selected, the process waits until information to be output is selected. The selection of information to be output may be performed, for example, by clicking a menu item displayed on a display or a television set connected to the game machine of the terminal. The selection menu used by a user to select information to be output includes the following four items: "identification result", "information based on feature values", "waveform information", and "stored information".

If it is determined in step S1881 that information to be output is selected, then, in step S1882, the system controller 897 determines whether the information selected to be output is the identification result. If it is determined that the information selected to be output is the identification result, then in step S1883, the system controller 897 transmits, to the output controller 914, 2-bit selection information 00 indicating that the identification result should be output.

In step S1884, the output controller 914 controls displaying of a character on accordance with the identification result of emotion information. The character selected by the user is displayed on a television set or a display connected to the game machine, and the expression and the motion of the character are controlled by the output controller 914 in accordance with the identified emotion information. For example, when "strong vitality" is identified as the emotion information, a vivid face expression of the character is displayed, and arms and feet of the character are moved up and down.

If it is determined in step S1882 that the information selected to be output is not the identification result, then, in step S1885, the system controller 897 determines whether the information selected to be output is the information based on feature values. If it is determined that the information selected to be output is the information based on feature values, then in step S1886, the system controller 897 transmits, to the output controller 914, 2-bit selection information 01 indicating that the information based on feature values should be output.

Figure 122:
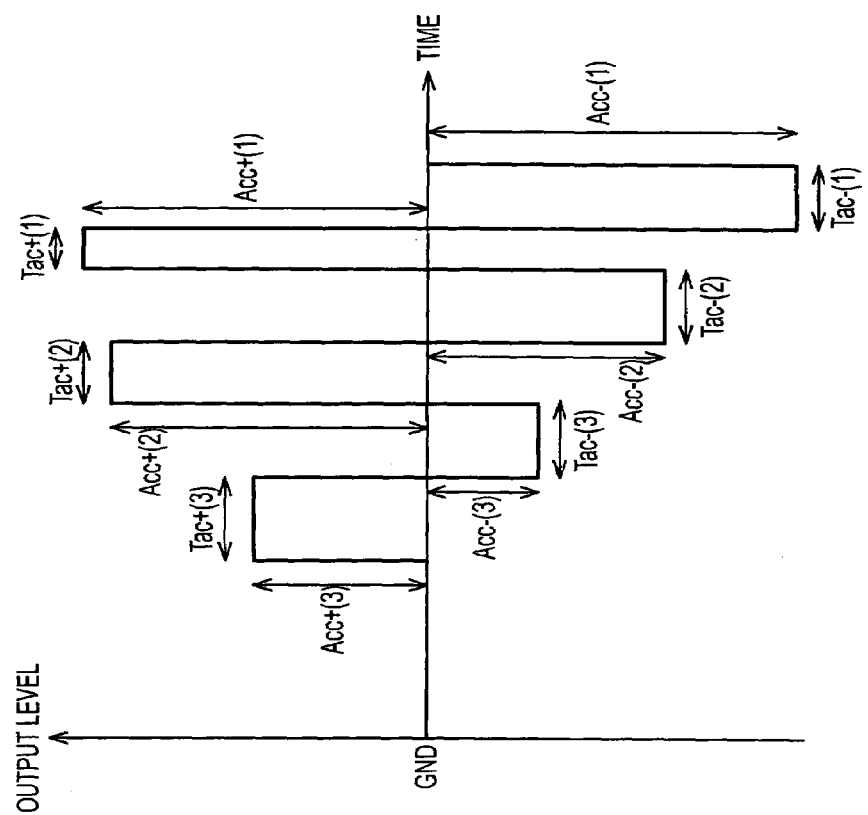

In step S1887, the output controller 914 acquires feature values (Acc+(1), Acc+(2), Acc+(3), Tac+(1), Tac+(2), Tac+(3), Acc−(1), Acc−(2), Acc−(3), Tac−(1), Tac−(2), Tac−(3)) from the feature extractor 912. Then in step S1888, the output controller 914 generates a vibration presentation unit driving signal. That is, as shown in FIG. 122, a driving signal composed of rectangular wave signals with output levels Acc+(1), Acc+(2), and Acc+(3) and on-periods Tac+(1), Tac+(2), and Tac+(3) and rectangular wave signals with output levels Acc−(1), Acc−(2), and Acc−(3) and on-periods Tac−(1), Tac−(2), and Tac−(3) is generated. Then in step S1889, the output controller 914 simultaneously drives the vibration presentation units 965L and 965R in accordance with the generated driving signal.

In step S1890, the output controller 914 acquires feature values (Igr_R(1), Igr_R(2), Tgr_R(1), Tgr_R(2), Igr_L(1), Igr_L(2), Tgr_L(1), Tgr_L(2)) from the feature extractor 912. Then in step S1891, the output controller 914 generates a light emission unit driving signal. More specifically, as shown in FIG. 123, the output controller 914 generates a driving signal composed of a sinusoidal wave signal with an amplitude Igr_R(1) and an on-period Tgr_R(1) and a sinusoidal wave signal with an amplitude Igr_R(2) and an on-period Tgr_R(2), and also generates, as shown in FIG. 124, a driving signal composed of a sinusoidal wave signal with an amplitude Igr_L(1) and an on-period Tgr_L(1) and a sinusoidal wave signal with an amplitude Igr_L(2) and an on-period Tgr_L(2).

Figure 123:
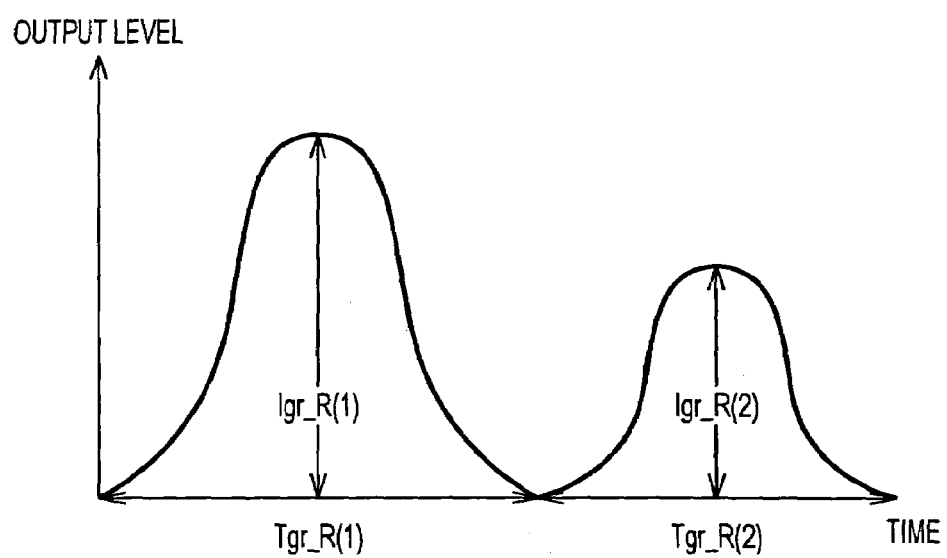
Figure 124:
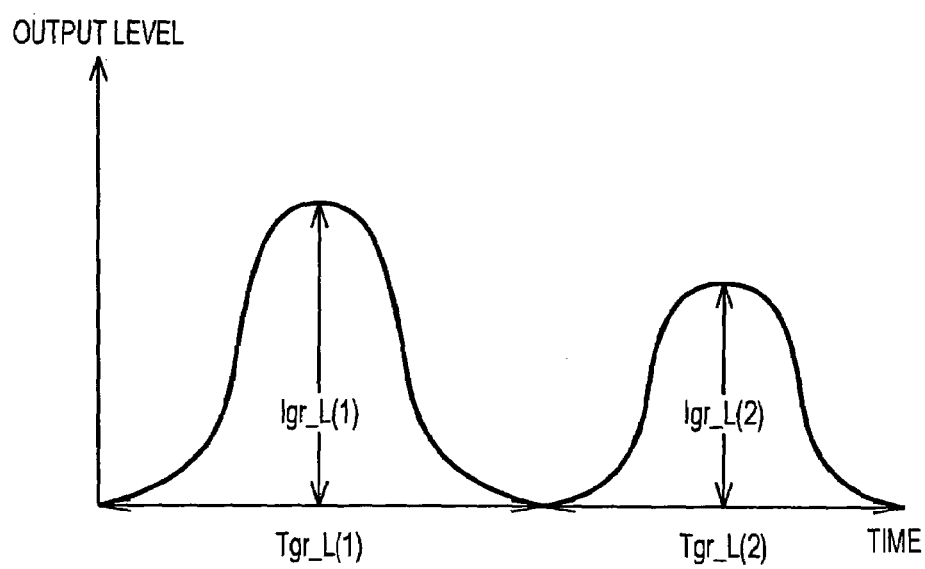

In step S1892, the output controller 914 drives the light emission unit 964R in accordance with the driving signal shown in FIG. 123 and drives the light emission unit 964L in accordance with the driving signal shown in FIG. 124.

If it is determined in step S1885 that the information selected to be output is not the information based on feature values, then, in step S1893, the system controller 897 determines whether the information selected to be output is the waveform information. If it is determined that the information selected to be output is the waveform information, then in step S1894, the system controller 897 transmits, to the output controller 114, 2-bit selection information 10 indicating that the waveform information should be output.

In step S1895, the output controller 914 acquires sampled acceleration information from the feature extractor 912 and generates driving a signal for driving the vibration presentation units 965L and 965R on the basis of the acquired acceleration information. In step S1896, the output controller 914 simultaneously drives both the vibration presentation units 965L and 965R in accordance with the generated driving signal. In step S1897, the output controller 914 acquires sampled grasp pressure information from the feature extractor 912 and generates a driving signal for driving the light emission unit 964R on the basis of the acquired right-hand grasp pressure information (grasp pressure information detected by the grasp pressure sensor 963R) and also generates a driving signal for driving the light emission unit 964L on the basis of the acquired left-hand grasp pressure information (grasp pressure information detected by the grasp pressure sensor 963L). In step S1898, the output controller 914 drives the light emission units 964R and 964L in accordance with the respective generated driving signals.

If it is determined in step S1893 that the information selected to be output is not the waveform information, then, in step S1899, the system controller 897 determines whether the information selected to be output is the stored information. If it is determined that the information selected to be output is not the stored information, then the process jumps to step S1904. In step S1904, the system controller 897 performs error handling. If it is determined in step S1899 that the information selected to be output is the stored information, then, in step S1900, the system controller 897 transmits, to the output controller 914, 2-bit selection information 01 indicating that the stored information should be output.

In the case in which the information selected to be output is the stored information, a sub-menu is displayed on the television set or the display connected to the game machine so that a user can specify an item of stored information to be output and also can specify a game machine to which to output the stored information. More specifically, the user can make selections in terms of items of information inf such as acceleration information or grasp pressure information, information PID identifying a user, emotion information E, and information To indicating a destination game machine. For example, the user can select acceleration information or grasp pressure information as inf, information indicating the user a as PID, "strong vitality" as emotion information E, and a user b as a destination.

In step S1901, the system controller 897 determines whether inf indicating a particular kind of information, PID identifying a user, emotion information E, and a destination To are selected. If selection is not performed, the process waits until selection is made.

In step S1902, the system controller 897 generates information (inf, PID, E, To) in accordance with the selection made by the user and transmits the generated information to the output controller 914.

In step S1903, the output controller 914 outputs stored information. The details of this process will be described later with reference to FIG. 121. In this process, a signal is generated in accordance with inf indicating the selected kind of information, PID identifying the user, and emotion information E, and the generated signal is transmitted to the selected destination To.

Figure 120:
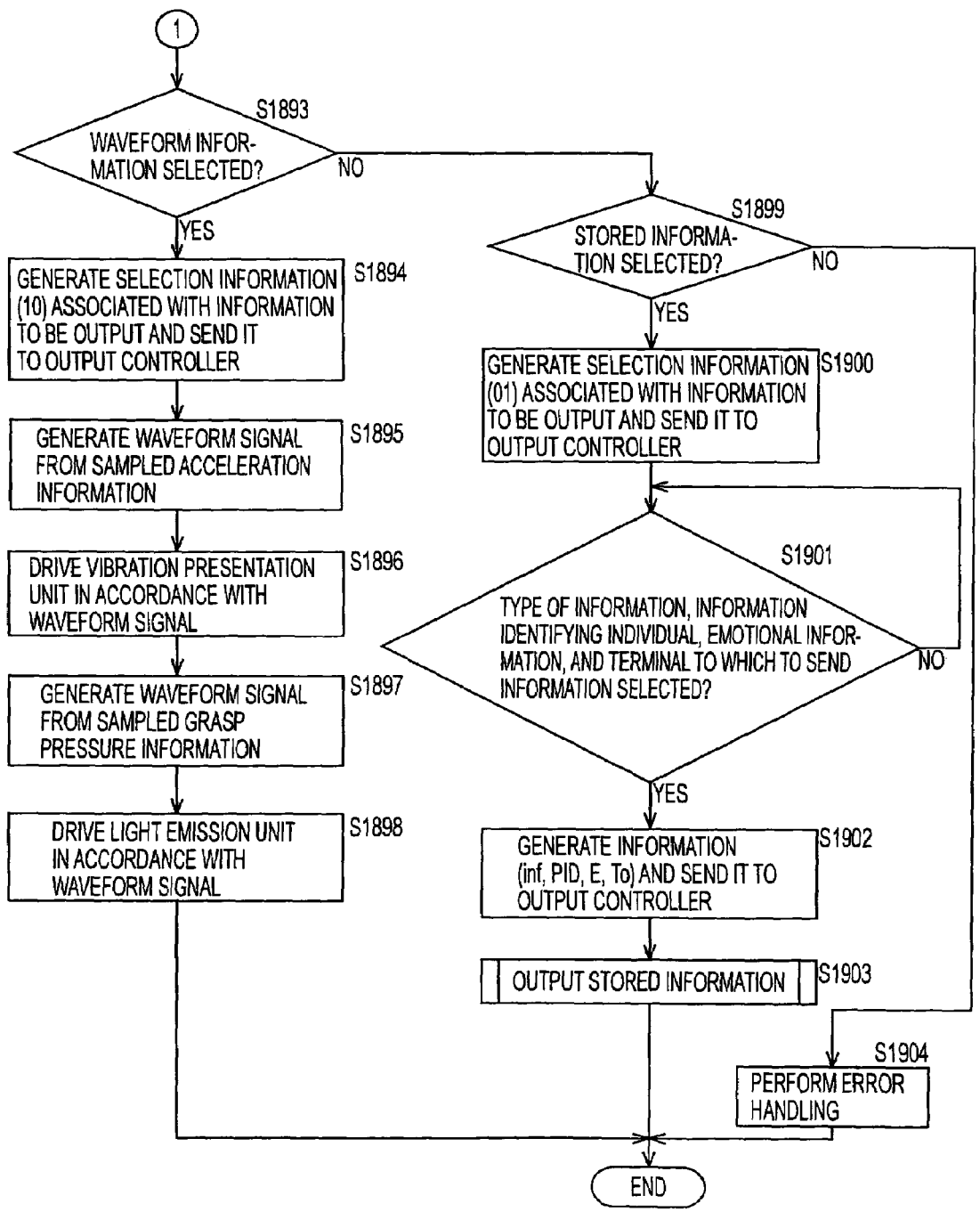
Figure 121:
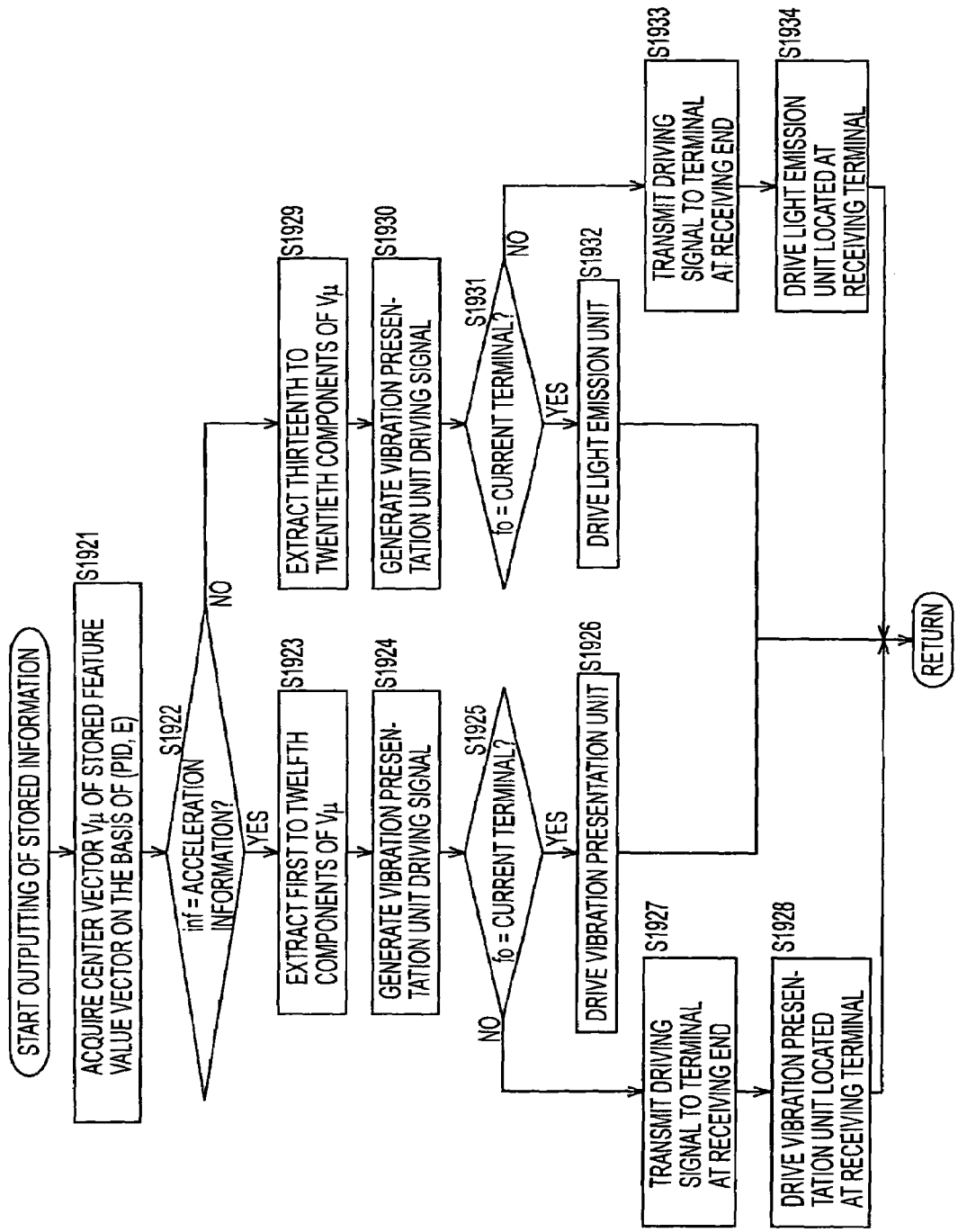

Referring to FIG. 121, the process of outputting stored information in step S1903 in FIG. 120 is described below.

In step S1921, in accordance with the selected information (PID, E), the output controller 914 acquires a center vector of acceleration information and grasp pressure information from the storage unit 895. In this specific example, a center vector of feature vectors of acceleration information and grasp pressure information corresponding to "strong vitality" of the user a is acquired from the storage unit 895, that is, a center vector Vμ30(Acc+30(1), Acc+30(2), Acc+30(3), Tac+30(1), Tac+30(2), Tac+30(3), Acc−30(1), Acc−30(2), Acc−30(3), Tac−30(1), Tac−30(2), Tac−30(3), Igr_R30(1), Igr_R30(2), Tgr_R30(1), Tgr_R30(2), Igr_L30(1), Igr_L30(2), Tgr_L30(1), Tgr_L30(2)) is acquired.

In step S1922, the output controller 914 determines whether acceleration information is selected as the kind of information inf. If it is determined that acceleration information is selected, the process proceeds to step S1923. In step S1923, the output controller 914 extracts first to twelfth components of Vμ30.

Figure 125:
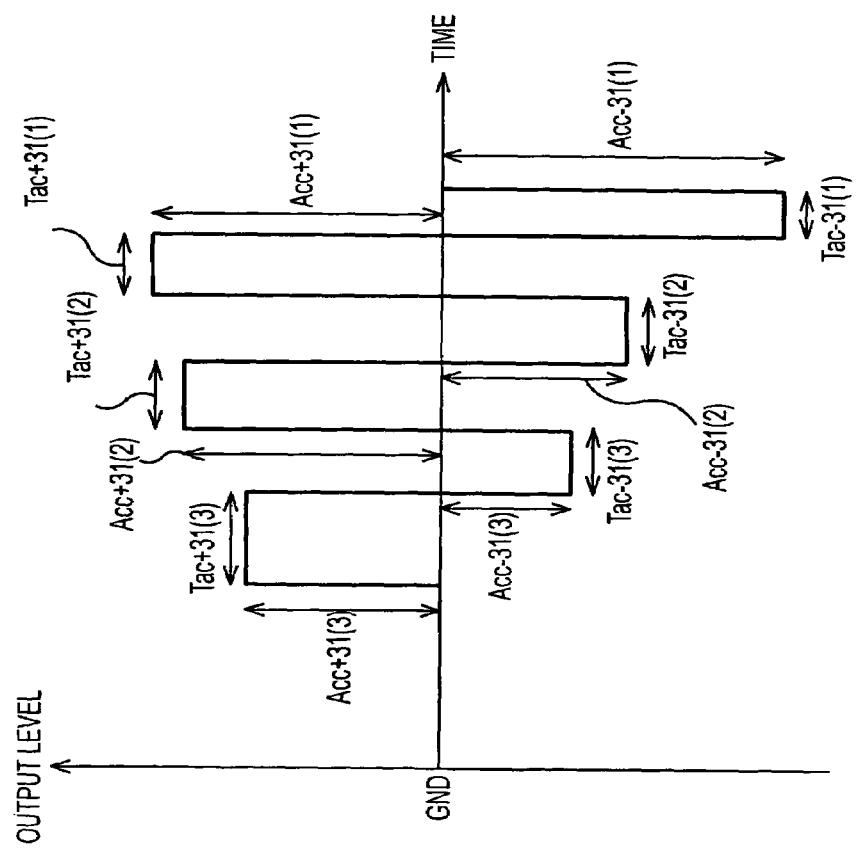

In step S1924, the output controller 914 generates a vibration presentation unit driving signal. That is, as shown in FIG. 125, the output controller 914 generates a driving signal composed of rectangular wave signals with output levels Acc+30(1), Acc+30(2), and Acc+30(3) and on-periods Tac+30(1), Tac+30(2), and Tac+30(3) and rectangular wave signals with output levels Acc−30(1), Acc−30(2), and Acc−30(3) and on-periods Tac−30(1), Tac−30(2), and Tac−30(3).

In step S1925, the output controller 914 determines whether the destination To of information is the terminal (game machine) of the present user. If it is determined that the destination is not the terminal of the current user, the process proceeds to step S1927. In step S1927, the output controller 914 transmits the driving signals to the terminal specified as the destination. For example, in the case in which the user b is specified as the destination To, the driving signals are transmitted to the terminal (game machine B) of the user b. In step S1928, the game machine B receives the driving signals via the information receiving unit 922. The received driving signals are supplied to the output controller 914 via the information discriminator 911. The output controller 914 of the game machine B simultaneously drives both the vibration presentation units 965R and 965L in accordance with the driving signals.

On the other hand, if it is determined in step S1925 that the destination To is the terminal (game machine) of the present user, the process proceeds to step S1926. In step S1926, the output controller 914 simultaneously drives both the vibration presentation units 965R and 965L of the present terminal (game machine) in accordance with the driving signals.

In the case in which it is determined in step S1922 that acceleration information is not selected as the kind of information inf (that is, grasp pressure information is selected), the process proceeds to step S1929. In step S1929, the output controller 914 extracts thirteenth to twentieth components of Vμ30.

Figure 126:
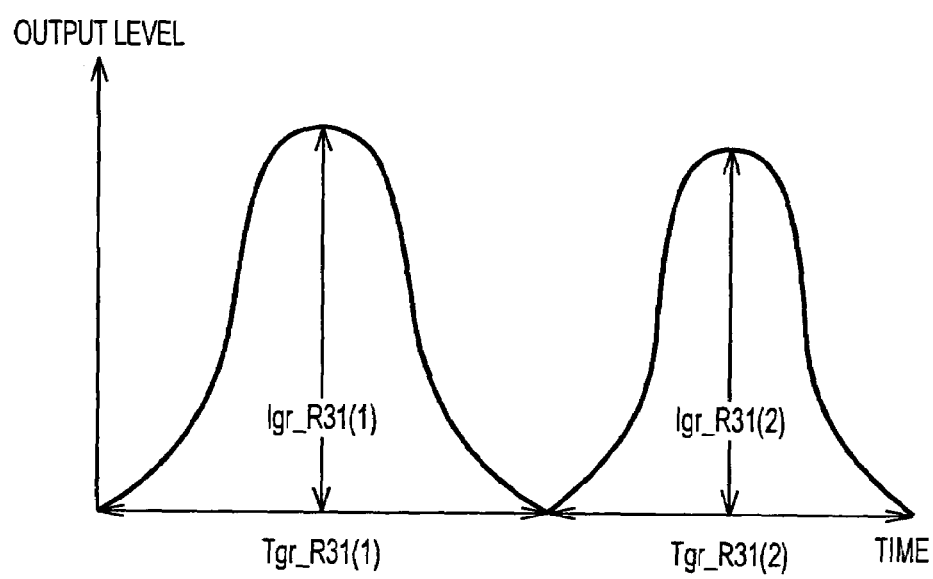
Figure 127:
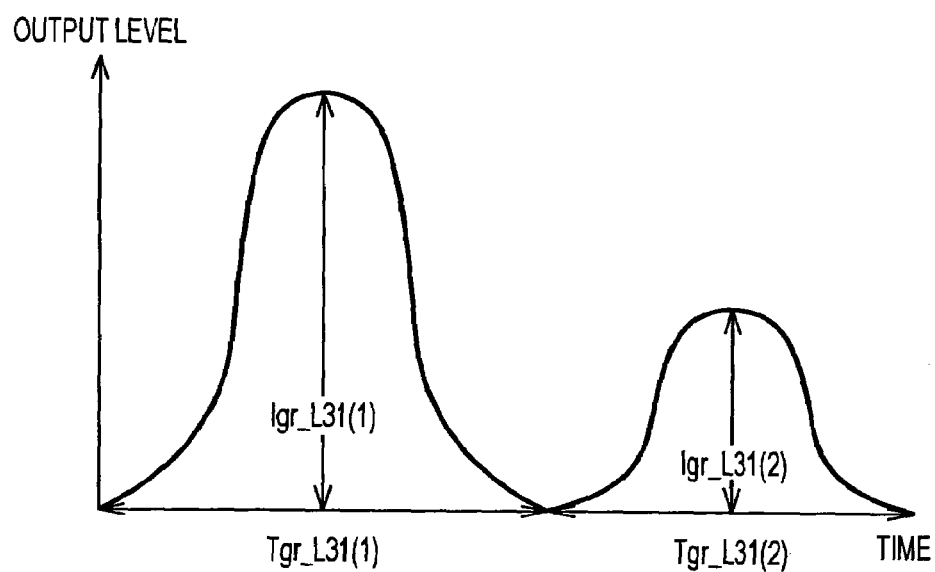

Then in step S1930, the output controller 914 generates a light emission unit driving signal. More specifically, as shown in FIG. 126, the output controller 914 generates a driving signal composed of a sinusoidal wave signal with an amplitude Igr_R30(1) and an on-period Tgr_R30(1) and a sinusoidal wave signal with an amplitude Igr_R30(2) and an on-period Tgr_R30(2), and also generates, as shown in FIG. 127, a driving signal composed of a sinusoidal wave signal with an amplitude Igr_L30(1) and an on-period Tgr_L30(1) and a sinusoidal wave signal with an amplitude Igr_L30(2) and an on-period Tgr_L30(2).

In step S1931, the output controller 914 determines whether the destination To of information is the terminal (game machine) of the present user. If it is determined that the destination is not the terminal of the current user, the process proceeds to step S1933. In step S1933, the output controller 914 transmits the driving signals to the terminal specified as the destination. For example, in the case in which the user b is specified as the destination To, the driving signals are transmitted to the terminal (game machine B) of the user b. In step S1934, the game machine B receives the driving signals via the information receiving unit 922. The received driving signals are supplied to the output controller 914 via the information discriminator 911. The output controller 914 of the game machine B drives the light emission unit 964R in accordance with the driving signal shown in FIG. 126 and drives the light emission unit 964L in accordance with the driving signal shown in FIG. 127.

On the other hand, if it is determined in step S1931 that the destination To is the terminal (game machine) of the present user, the process proceeds to step S1932. In step S1932, the output controller 914 drives the light emission unit 964R of the present terminal (game machine) in accordance with the driving signal shown in FIG. 126 drives the light emission unit 964L of the present terminal (game machine) in accordance with the driving signal shown in FIG. 127.

Thus, the emotion/state and the strength level thereof identified from the acceleration information and grasp pressure information are displayed so that the user can recognize them. The controller of the game machine is vibrated so that the user can recognize the acceleration information via a bodily sensation. Furthermore, light is emitted from the controller of the game machine so that the user can recognize grasp information via a bodily sensation. It is also possible for a user to specify acceleration information or grasp pressure information corresponding to a particular kind of emotion information of a particular user and specify a particular user to whom the acceleration information or grasp pressure information is presented so that the user can recognize the acceleration information or grasp pressure information via bodily sensations.

In on-line games, a user can recognize emotion/state and strength level of an opposing player via bodily sensations. This makes it possible for players to enjoy realistic feelings in on-line games.

The present invention has been described above with reference to specific examples 1 to 4. Not that a terminal may be formed according to a combination of techniques disclosed in examples 1 to 4 described above.

A sequence of processing steps described above in each example may or may not be performed time-sequentially in the same order as the order in which steps are described above. For example, steps may be performed in a parallel fashion or a separate fashion.

INDUSTRIAL APPLICABILITY

As described above, the present invention make it possible to identify the emotion/state the strength level of a user from vital sign information, keyboard vibration information, mouse click information, mouse grasp pressure information, and/or information about acceleration/grasp pressure applied to a controller of a game machine. Not only text information, voice information, and image information that can be transmitted in conventional techniques, but also vital sign information, keyboard vibration information, mouse click information, mouse grasp pressure information, information about acceleration/grasp pressure applied to a controller of a game machine and other similar information can be transmitted and output in various fashions, thereby making it possible to realize close communication that allows emotion to be directly conveyed to each other.

The invention claimed is:

1. An information processing apparatus comprising:
    input means for inputting non-linguistic information including a user's vital sign information and for inputting linguistic information, wherein the user's vital sign information includes at least one of a pulse, a blood flow, a blood pressure, breathing, body temperature, skin surface temperature, electric resistance of skin, sweat, brain waves, and brain magnetism and wherein the linguistic information includes recorded linguistic information;
    an extractor means for extracting emotional linguistic information from said recorded linguistic information by identifying in the recorded linguistic information first keywords representative of emotional states and second keywords representative of a strength level of the identified first keywords;
    learning means for learning an emotion of the user by relating the non-linguistic information to said emotional linguistic information;
    storage means for storing learned information obtained as a result of learning performed by the learning means; and
    output means for converting the non-linguistic sign information or the stored learned information and for outputting the converted non-linguistic information or the stored learned information regarding the emotion of the user.

2. An information processing apparatus according to claim 1, wherein the learning means learns the emotion of the user together with the strength level of the emotion.

3. An information processing apparatus according to claim 1, wherein when new non-linguistic information is input, the learning means identifies the emotion of the user on the basis of the non-linguistic information stored in the storage means; and the output means outputs an identification result made by the learning means.

4. An information processing apparatus according to claim 3, wherein the storage means stores new non-linguistic information corresponding to emotion identified by the learning means such that the new non-linguistic information is added to existing non-linguistic information accumulated in the storage means.

5. An information processing apparatus according to claim 1, further comprising parameter generation means for generating a parameter indicating a feature of the non-linguistic information, wherein the learning means performs statistical processing on values of the parameter and stores the resultant statistical value of the parameter in the storage means.

6. An information processing apparatus according to claim 5, wherein the learning means identifies the emotion of the user by comparing a parameter generated, by the parameter generation mean, from input non-linguistic information with the parameter stored in the storage means.

7. An information processing apparatus according to claim 1, wherein the input means inputs pulse information or body motion information associated with the user as the non-linguistic information.

8. An information processing apparatus according to claim 1, wherein the input means inputs, as the non-linguistic information, vibration information indicating a vibration generated when the user presses a keyboard.

9. An information processing apparatus according to claim 1, wherein the input means inputs, as the non-linguistic information, grasp pressure information indicating a grasp pressure at which a mouse is grasped by the user or ambient temperature information.

10. An information processing apparatus according to claim 1, wherein the information processing apparatus is a game machine used to play an on-line game.

11. An information processing apparatus according to claim 10, wherein the input means inputs, as the non-linguistic information, acceleration information or grasp pressure information associated with a controller of the game machine.

12. An information processing apparatus according to claim 10, wherein the output means extracts particular non-linguistic information specified by the user from the stored non-linguistic information, converts the extracted non-linguistic information, and outputs the converted non-linguistic information to another game machine specified by the user.

13. An information processing method, comprising:
inputting linguistic information and non-linguistic information including a user's vital sign information including at least one of a pulse, a blood flow, a blood pressure, breathing, body temperature, skin surface temperature, electric resistance of skin, sweat, brain waves, and brain magnetism and wherein the linguistic information includes recorded linguistic information;
extracting emotional linguistic information from said recorded linguistic information by identifying in the recorded linguistic information first keywords representative of emotional states and second keywords representative of a strength level of the identified first keywords;
learning an emotion of a user by relating the non-linguistic information to emotional linguistic information;
storing the learned information obtained as a result of the learning;
converting the non-linguistic information or the stored learned information; and
outputting the converted non-linguistic information or the stored learned information regarding the emotion of the user.

14. A computer readable medium encoded with a computer program for causing a computer to execute a process comprising:
inputting linguistic information and non-linguistic information including a user's vital sign information, wherein the user's vital sign information includes at least one of a pulse, a blood flow, a blood pressure, breathing, body temperature, skin surface temperature, electric resistance of skin, sweat, brain waves, and brain magnetism and wherein the linguistic information includes recorded linguistic information;
extracting emotional linguistic information from said recorded linguistic information by identifying in the recorded linguistic information first keywords representative of emotional states and second keywords representative of a strength level of the identified first keywords;
learning an emotion of a user by relating the non-linguistic information to emotional linguistic information;
storing the learned information obtained as a result of the learning;
converting the non-linguistic information or the stored learned information; and
outputting the converted non-linguistic information or the stored learned information regarding the emotion of the user.

15. A storage medium in which the program according to claim 14 is stored.

16. An information processing apparatus comprising:
an input unit configured to input non-linguistic information including a user's vital sign information and inputting linguistic information, wherein the user's vital sign information includes at least one of a pulse, a blood flow, a blood pressure, breathing, body temperature, skin surface temperature, electric resistance of skin, sweat, brain waves, and brain magnetism, and wherein the linguistic information includes recorded linguistic information;
an extractor unit configured to extract emotional linguistic information from said recorded linguistic information by identifying in the recorded linguistic information first keywords representative of emotional states and second keywords representative of a strength level of the identified first keywords;
a learning unit configured to learn an emotion of a user by relating the vital information to linguistic information;
a storage unit configured to store learned information obtained as a result of learning performed by the learning unit; and
an output unit configured to convert the non-linguistic or the stored information and to output the converted non-linguistic information or the stored learned information regarding the emotion of the user.

17. An information processing apparatus according to claim 1, wherein the extractor means for extracting emotional linguistic information comprises a processing unit which identifies said emotional linguistic information by a keyword recognition and classification of the recorded linguistic information.

18. An information processing apparatus according to claim 17, wherein the processor based on the keyword recognition deduces from said classification said emotion and derives a graded scaled indicative of a degree of said emotion.

19. A method according to claim 13, wherein the extracting emotional linguistic information comprises identifying said emotional linguistic information by a keyword recognition and classification of the recorded linguistic information.

20. An information processing apparatus according to claim 19, wherein the identifying said emotional linguistic information comprises based on the keyword recognition deducing from said classification said emotion and deriving a graded scaled indicative of a degree of said emotion.

21. A computer readable medium according to claim 14, wherein the extracting emotional linguistic information comprises identifying said emotional linguistic information by a keyword recognition and classification of the recorded linguistic information.

22. An information processing apparatus according to claim 19, wherein the identifying said emotional linguistic information comprises based on the keyword recognition deducing from said classification said emotion and deriving a graded scaled indicative of a degree of said emotion.

23. An information processing apparatus according to claim 16, wherein the extractor means for extracting emotional linguistic information comprises a processing unit which identifies said emotional linguistic information by a keyword recognition and classification of the recorded linguistic information.

24. An information processing apparatus according to claim 17, wherein the processor based on the keyword recognition deduces from said classification said emotion and derives a graded scaled indicative of a degree of said emotion.

25. An information processing apparatus comprising:
an input unit configured to input non-linguistic information including a user's vital sign information and inputting linguistic information, wherein the linguistic information includes recorded linguistic information;

an extractor unit configured to extract emotional linguistic information from said recorded linguistic information by identifying in said recorded linguistic information first keywords representative of emotional states and second keywords representative of a strength level of the identified first keywords;

a learning unit configured to learn an emotion of a user by relating the vital information to linguistic information;

a storage unit configured to store learned information obtained as a result of learning performed by the learning unit; and an output unit configured to convert the non-linguistic or the stored information and to output the converted non-linguistic information or the stored learned information regarding the emotion of the user.

* * * * *